United States Patent
Hoffberg

(10) Patent No.: US 12,528,027 B1
(45) Date of Patent: Jan. 20, 2026

(54) STEERABLE ROTATING PROJECTILE

(71) Applicant: Steven M. Hoffberg, West Harrison, NY (US)

(72) Inventor: Steven M. Hoffberg, West Harrison, NY (US)

(*) Notice: Subject to any disclaimer, the term of this patent is extended or adjusted under 35 U.S.C. 154(b) by 233 days.

(21) Appl. No.: 18/228,677

(22) Filed: Aug. 1, 2023

Related U.S. Application Data

(63) Continuation of application No. 16/363,305, filed on Mar. 25, 2019, now Pat. No. 11,712,637.

(60) Provisional application No. 62/813,987, filed on Mar. 5, 2019, provisional application No. 62/778,015, filed on Dec. 11, 2018, provisional application No. (Continued)

(51) Int. Cl.
| | | |
|---|---|---|
| A63H 33/18 | (2006.01) | |
| F42B 10/62 | (2006.01) | |
| G05D 1/00 | (2006.01) | |
| A63H 27/00 | (2006.01) | |
| A63H 30/04 | (2006.01) | |
| F42B 10/02 | (2006.01) | |

(52) U.S. Cl.
CPC ............ *A63H 33/18* (2013.01); *F42B 10/62* (2013.01); *G05D 1/0022* (2013.01); *G05D 1/105* (2013.01); *A63B 2225/01* (2013.01); *A63B 2225/20* (2013.01); *A63B 2225/50* (2013.01); *A63H 27/00* (2013.01); *A63H 30/04* (2013.01); *F42B 10/025* (2013.01)

(58) Field of Classification Search
None
See application file for complete search history.

(56) References Cited

U.S. PATENT DOCUMENTS

| 1,012,631 A | 12/1911 | Gridley |
|---|---|---|
| 1,291,345 A | 1/1919 | Zimdars |

(Continued)

FOREIGN PATENT DOCUMENTS

| DE | 10 2012 002 825 A1 | 8/2013 |
|---|---|---|
| JP | 3083654 | 2/2002 |
| JP | 3150942 | 6/2009 |

OTHER PUBLICATIONS

Ageev, N. "Numerical investigation of disc-wing MAV with propeller in a wing slot." In International Micro Air Vehicle conference and competitions 2011 (IMAV 2011),'t Harde, The Netherlands, Sep. 12-15, 2011. Delft University of Technology and Thales, 2011.

(Continued)

*Primary Examiner* — Peter D Nolan
*Assistant Examiner* — Jacob Kent Besteman-Street
(74) *Attorney, Agent, or Firm* — Hoffberg & Associates; Steven M. Hoffberg

(57) ABSTRACT

A method of controlling a gyroscopically-stabilized projectile, comprising a control system producing a control signal, a rotating aerodynamic shell, and a reaction mass system responsive to the control signal, the method comprising: imparting rotational and translational kinetic energy to induce gyroscopic stabilization of the projectile about a gyroscopic axis and a movement of the projectile along a flight path; interacting the shell with surrounding air while moving, to induce aerodynamic forces; generating the control signal from the control system; and altering a state of the reaction wheel system selectively in dependence on the control signal, to alter the flight path.

20 Claims, 13 Drawing Sheets

Related U.S. Application Data

62/681,193, filed on Jun. 6, 2018, provisional application No. 62/647,005, filed on Mar. 23, 2018.

(56) References Cited

U.S. PATENT DOCUMENTS

| | | |
|---|---|---|
| 1,405,035 A | 1/1922 | Hunt |
| 1,816,707 A | 7/1931 | Wardell |
| 1,907,815 A | 5/1933 | Hough |
| 1,911,041 A | 5/1933 | Smyser |
| 1,959,270 A | 5/1934 | Hedlof |
| 2,051,151 A | 8/1936 | Northrop |
| 2,077,471 A | 4/1937 | Fink |
| 2,201,042 A | 5/1940 | Katz |
| 2,201,108 A | 5/1940 | Mahler |
| 2,201,146 A | 5/1940 | Barker |
| 2,418,269 A | 4/1947 | Lewis |
| 2,461,435 A | 2/1949 | Neumann |
| 2,469,144 A | 5/1949 | Baggott |
| 2,567,392 A | 9/1951 | Naught |
| 2,598,349 A | 5/1952 | Carrington |
| D172,112 S | 5/1954 | Shoemaker |
| 2,728,537 A | 12/1955 | Elkins |
| 2,730,311 A | 1/1956 | Doak |
| 2,835,073 A | 5/1958 | Dame |
| 2,863,261 A | 12/1958 | Mead |
| 2,876,965 A | 3/1959 | Streib |
| 2,949,693 A | 8/1960 | Mcroskey |
| 2,953,321 A | 9/1960 | Robertson |
| 2,968,318 A | 1/1961 | Bauman |
| 2,968,453 A | 1/1961 | Bright |
| 2,988,301 A | 6/1961 | Fletcher |
| 3,002,709 A | 10/1961 | Cochran |
| D193,245 S | 7/1962 | Knox, Jr. |
| 3,053,480 A | 9/1962 | Vanderlip |
| 3,104,853 A | 9/1963 | Klein |
| 3,199,809 A | 8/1965 | Modesti |
| 3,204,891 A | 9/1965 | Cline |
| 3,224,488 A | 12/1965 | Skonecke |
| 3,229,416 A | 1/1966 | Bross |
| 3,256,020 A | 6/1966 | Smith |
| 3,359,678 A | 12/1967 | Headrick |
| D209,763 S | 1/1968 | Mueller |
| D210,791 S | 4/1968 | Tally |
| D211,104 S | 5/1968 | Steadman |
| 3,394,906 A | 7/1968 | Rogers |
| 3,395,876 A | 8/1968 | Green |
| 3,402,488 A | 9/1968 | Leavitt |
| D213,708 S | 4/1969 | Blumenthal |
| 3,442,469 A | 5/1969 | Davis |
| D214,577 S | 7/1969 | Mueller |
| 3,477,168 A | 11/1969 | Trodglen, Jr. |
| 3,503,573 A | 3/1970 | Modesti |
| 3,508,360 A | 4/1970 | Williams |
| 3,518,788 A | 7/1970 | Sides |
| 3,528,284 A | 9/1970 | Skoglund |
| 3,549,109 A | 12/1970 | Gilstrap |
| 3,557,304 A | 1/1971 | Rue |
| 3,568,358 A | 3/1971 | Bruce |
| 3,570,467 A | 3/1971 | Belokin, Jr. |
| D221,453 S | 8/1971 | Swanberg |
| 3,608,033 A | 9/1971 | Hall |
| 3,673,732 A | 7/1972 | Liotta |
| 3,677,503 A | 7/1972 | Freeman, Jr. |
| 3,727,055 A | 4/1973 | David et al. |
| 3,742,643 A | 7/1973 | Keith |
| 3,752,417 A | 8/1973 | Lagace |
| 3,774,865 A | 11/1973 | Pinto |
| 3,852,910 A | 12/1974 | Everett |
| 3,884,466 A | 5/1975 | MacDonald et al. |
| 3,933,325 A | 1/1976 | Kaelin |
| 3,935,663 A | 2/1976 | Leibowitz |
| 3,939,602 A | 2/1976 | Burke et al. |
| 3,946,970 A | 3/1976 | Blankenship |
| 3,960,379 A | 6/1976 | Maloney et al. |
| 3,976,265 A | 8/1976 | Doolittle |
| 3,982,126 A | 9/1976 | Von Alfthan |
| 4,047,832 A | 9/1977 | Sforza |
| 4,048,947 A | 9/1977 | Sicard |
| 4,051,622 A | 10/1977 | Sharp |
| 4,052,927 A | 10/1977 | Flatau |
| 4,065,873 A | 1/1978 | Jones |
| 4,072,049 A | 2/1978 | Miller |
| 4,111,594 A | 9/1978 | Sforza |
| 4,112,612 A | 9/1978 | Woods |
| 4,145,839 A | 3/1979 | Sampietro |
| 4,161,843 A | 7/1979 | Hui |
| 4,166,618 A | 9/1979 | Sheem |
| D253,525 S | 11/1979 | Wilson |
| 4,184,654 A | 1/1980 | Herrera |
| 4,196,877 A | 4/1980 | Mutrux |
| 4,212,131 A | 7/1980 | Ross, Jr. |
| 4,214,720 A | 7/1980 | DeSautel |
| 4,222,242 A | 9/1980 | Moseley |
| 4,222,361 A | 9/1980 | Jackson et al. |
| 4,223,473 A | 9/1980 | Brown |
| 4,225,286 A | 9/1980 | Fork |
| 4,243,190 A | 1/1981 | Sams |
| 4,246,720 A | 1/1981 | Stone |
| 4,249,334 A | 2/1981 | Goldfarb et al. |
| 4,253,673 A | 3/1981 | Bailey |
| 4,262,911 A | 4/1981 | Opresik et al. |
| 4,266,773 A | 5/1981 | Treadwell |
| 4,273,302 A | 6/1981 | Jordan |
| 4,274,639 A | 6/1981 | Flanders |
| D261,538 S | 10/1981 | Sides |
| 4,301,616 A | 11/1981 | Gudgel |
| 4,311,342 A | 1/1982 | Latimer |
| 4,313,512 A | 2/1982 | Jutras |
| 4,315,629 A | 2/1982 | English |
| 4,330,130 A | 5/1982 | Carr |
| 4,334,385 A | 6/1982 | Melin et al. |
| 4,335,537 A | 6/1982 | Walker |
| 4,355,813 A | 10/1982 | Rathjen |
| 4,366,386 A | 12/1982 | Hanson |
| 4,366,936 A | 1/1983 | Ferguson |
| 4,370,824 A | 2/1983 | Resnicow |
| 4,373,734 A | 2/1983 | Frank |
| 4,378,944 A | 4/1983 | Johnston |
| 4,386,748 A | 6/1983 | Jordan |
| 4,386,779 A | 6/1983 | Whitlock |
| 4,398,895 A | 8/1983 | Asker |
| 4,401,284 A | 8/1983 | Austin |
| 4,403,565 A | 9/1983 | Bleiweiss et al. |
| 4,431,150 A | 2/1984 | Epperson, Jr. |
| 4,433,819 A | 2/1984 | Carrington |
| 4,438,924 A | 3/1984 | Carr |
| 4,446,379 A | 5/1984 | Borg et al. |
| 4,452,007 A | 6/1984 | Martin |
| 4,452,174 A | 6/1984 | Fedder |
| 4,456,265 A | 6/1984 | Adler |
| 4,457,476 A | 7/1984 | Andresevitz |
| 4,461,436 A | 7/1984 | Messina |
| 4,461,485 A | 7/1984 | Horvath et al. |
| 4,502,724 A | 3/1985 | Grenadier |
| 4,516,776 A | 5/1985 | Nicholas |
| 4,529,390 A | 7/1985 | Levy et al. |
| 4,566,699 A | 1/1986 | Cucuzza |
| 4,576,581 A | 3/1986 | Borg |
| 4,600,398 A | 7/1986 | Fraga |
| 4,602,584 A | 7/1986 | North et al. |
| 4,630,997 A | 12/1986 | Cousteau et al. |
| 4,635,474 A | 1/1987 | Blackwood |
| 4,635,943 A | 1/1987 | Lumpkin |
| 4,661,052 A | 4/1987 | Ruhle |
| D292,194 S | 10/1987 | Moller |
| 4,709,928 A | 12/1987 | Willingham |
| 4,718,677 A | 1/1988 | Barnes |
| 4,732,384 A | 3/1988 | Seymour |
| 4,736,948 A | 4/1988 | Thomas |
| 4,741,109 A | 5/1988 | McCurdy et al. |
| 4,748,366 A | 5/1988 | Taylor |
| 4,752,267 A | 6/1988 | Layman |
| 4,759,146 A | 7/1988 | Le Beon et al. |
| 4,778,128 A | 10/1988 | Wright et al. |

(56) References Cited

U.S. PATENT DOCUMENTS

| | | |
|---|---|---|
| 4,795,111 A | 1/1989 | Moller |
| 4,796,836 A | 1/1989 | Buchelt |
| 4,804,156 A | 2/1989 | Harmon |
| 4,805,583 A | 2/1989 | Mosser |
| 4,809,988 A | 3/1989 | Hunter |
| 4,818,990 A | 4/1989 | Fernandes |
| 4,819,947 A | 4/1989 | Mackey |
| 4,828,525 A | 5/1989 | Okano |
| 4,832,569 A | 5/1989 | Samuelsen et al. |
| 4,839,838 A | 6/1989 | LaBiche et al. |
| 4,850,939 A | 7/1989 | Chilcote et al. |
| 4,852,543 A | 8/1989 | Mosser |
| 4,863,317 A | 9/1989 | Boyle |
| 4,867,727 A | 9/1989 | Lanius |
| 4,869,699 A | 9/1989 | Plambeck et al. |
| 4,880,071 A | 11/1989 | Tracy |
| 4,894,038 A | 1/1990 | Giese |
| 4,903,917 A | 2/1990 | Peller et al. |
| 4,911,020 A | 3/1990 | Thompson |
| 4,919,083 A | 4/1990 | Axelrod |
| 4,919,637 A | 4/1990 | Fleischmann |
| 4,923,196 A | 5/1990 | Rohring |
| 4,923,303 A | 5/1990 | Lutz |
| 4,931,028 A | 6/1990 | Jaeger et al. |
| 4,952,196 A | 8/1990 | Chilcote et al. |
| 4,955,620 A | 9/1990 | Reinke |
| 4,955,962 A | 9/1990 | Mell |
| 4,964,837 A | 10/1990 | Collier |
| 4,974,633 A | 12/1990 | Hickey |
| 4,976,155 A | 12/1990 | Challandes |
| 4,979,746 A | 12/1990 | Gentiluomo |
| 4,995,822 A | 2/1991 | Borden et al. |
| 5,014,990 A | 5/1991 | Kaser et al. |
| 5,026,067 A | 6/1991 | Gentiluomo |
| 5,032,098 A | 7/1991 | Balogh et al. |
| 5,033,750 A | 7/1991 | Yamagishi et al. |
| 5,035,377 A | 7/1991 | Buchelt |
| 5,043,646 A | 8/1991 | Smith, III et al. |
| 5,049,031 A | 9/1991 | Mintenko et al. |
| 5,050,439 A | 9/1991 | Thompson |
| 5,050,575 A | 9/1991 | Killion |
| 5,063,735 A | 11/1991 | Colgren et al. |
| 5,064,143 A | 11/1991 | Bucher |
| 5,066,258 A | 11/1991 | Tomberlin |
| 5,067,674 A | 11/1991 | Heyche et al. |
| 5,071,383 A | 12/1991 | Kinoshita |
| 5,072,892 A | 12/1991 | Carrington |
| 5,078,637 A | 1/1992 | McFarland |
| 5,080,624 A | 1/1992 | Brinker |
| 5,082,079 A | 1/1992 | Lissaman et al. |
| 5,082,205 A | 1/1992 | Caufman |
| 5,083,799 A | 1/1992 | Thill |
| D324,890 S | 3/1992 | Smiel |
| 5,092,608 A | 3/1992 | Snipes |
| 5,103,646 A | 4/1992 | Fini |
| 5,104,126 A | 4/1992 | Gentiluomo |
| 5,108,108 A | 4/1992 | Norman et al. |
| 5,125,862 A | 6/1992 | Paranto |
| 5,128,671 A | 7/1992 | Thomas, Jr. |
| 5,133,550 A | 7/1992 | Handy |
| 5,133,637 A | 7/1992 | Wadsworth |
| 5,145,444 A | 9/1992 | VanKuiken |
| 5,150,857 A | 9/1992 | Moffitt et al. |
| 5,152,478 A | 10/1992 | Cycon et al. |
| 5,159,407 A | 10/1992 | Churnside et al. |
| 5,178,344 A | 1/1993 | Dlouhy |
| 5,180,119 A | 1/1993 | Picard |
| 5,181,724 A | 1/1993 | Spadoni |
| 5,195,745 A | 3/1993 | Rudell et al. |
| 5,195,916 A | 3/1993 | Her |
| 5,195,920 A | 3/1993 | Collier |
| 5,203,521 A | 4/1993 | Day |
| 5,209,490 A | 5/1993 | Dallavecchia |
| 5,213,284 A | 5/1993 | Webster |
| 5,228,690 A | 7/1993 | Rudell et al. |
| 5,232,226 A | 8/1993 | Glickson |
| 5,234,367 A | 8/1993 | DeCesare |
| 5,240,207 A | 8/1993 | Eiband et al. |
| RE34,383 E | 9/1993 | Rohring |
| 5,254,077 A | 10/1993 | Nottingham et al. |
| 5,256,099 A | 10/1993 | Rudell et al. |
| 5,259,571 A | 11/1993 | Blazquez |
| 5,259,802 A | 11/1993 | Yang |
| 5,263,819 A | 11/1993 | O'Leary et al. |
| 5,267,735 A | 12/1993 | Bushman |
| 5,269,514 A | 12/1993 | Adler et al. |
| 5,277,380 A | 1/1994 | Cycon et al. |
| 5,284,341 A | 2/1994 | Routzong et al. |
| 5,287,004 A | 2/1994 | Finley |
| 5,295,643 A | 3/1994 | Ebbert et al. |
| 5,297,759 A | 3/1994 | Tilbor et al. |
| D346,001 S | 4/1994 | Stillinger et al. |
| 5,303,931 A | 4/1994 | Brown |
| 5,351,911 A | 10/1994 | Neumayr |
| 5,351,967 A | 10/1994 | Yang |
| 5,360,363 A | 11/1994 | Levin |
| 5,362,065 A | 11/1994 | Su |
| 5,366,219 A | 11/1994 | Salcer et al. |
| 5,367,503 A | 11/1994 | Lowrance |
| 5,370,699 A | 12/1994 | Hood et al. |
| 5,383,363 A | 1/1995 | Kulmaczewski |
| 5,395,071 A | 3/1995 | Felix |
| 5,397,130 A | 3/1995 | Brown |
| 5,404,868 A | 4/1995 | Sankrithi |
| 5,407,150 A | 4/1995 | Sadleir |
| 5,407,151 A | 4/1995 | Singhal |
| 5,411,265 A | 5/1995 | Falco |
| 5,417,602 A | 5/1995 | McGraw |
| 5,421,538 A | 6/1995 | Vassa |
| 5,429,542 A | 7/1995 | Britt, Jr. |
| D361,811 S | 8/1995 | Grimm et al. |
| 5,440,817 A | 8/1995 | Watson et al. |
| 5,446,599 A | 8/1995 | Lemelson |
| 5,452,907 A | 9/1995 | Meibock et al. |
| 5,453,758 A | 9/1995 | Sato |
| 5,458,329 A | 10/1995 | Bushman et al. |
| 5,480,334 A | 1/1996 | Wilson et al. |
| 5,492,494 A | 2/1996 | Keennon |
| 5,503,351 A | 4/1996 | Vass |
| 5,521,817 A | 5/1996 | Burdoin et al. |
| 5,522,753 A | 6/1996 | McGraw |
| 5,531,624 A | 7/1996 | Dunipace |
| 5,552,983 A | 9/1996 | Thornberg et al. |
| 5,569,131 A | 10/1996 | Giulianelli |
| 5,575,438 A | 11/1996 | McGonigle et al. |
| 5,584,901 A | 12/1996 | Bakharev et al. |
| 5,620,351 A | 4/1997 | Ho |
| D380,017 S | 6/1997 | McGowan et al. |
| 5,634,839 A | 6/1997 | Dixon |
| 5,636,844 A | 6/1997 | de Buys |
| 5,645,248 A | 7/1997 | Campbell |
| 5,655,777 A | 8/1997 | Neading et al. |
| 5,660,542 A | 8/1997 | Rinker et al. |
| 5,672,086 A | 9/1997 | Dixon |
| 5,676,344 A | 10/1997 | Graffin |
| 5,676,988 A | 10/1997 | Coleman et al. |
| 5,687,387 A | 11/1997 | Endejan et al. |
| 5,695,420 A | 12/1997 | Bellehumeur |
| 5,697,617 A | 12/1997 | Egging |
| 5,726,928 A | 3/1998 | Han |
| 5,746,930 A | 5/1998 | Belcher et al. |
| 5,757,181 A | 5/1998 | Wolf et al. |
| 5,774,357 A | 6/1998 | Hoffberg et al. |
| 5,776,021 A | 7/1998 | Rakonjac |
| 5,779,576 A | 7/1998 | Smith, III et al. |
| 5,781,399 A | 7/1998 | Lanigan et al. |
| 5,786,984 A | 7/1998 | Bonardi et al. |
| 5,793,606 A | 8/1998 | Cubbage et al. |
| 5,799,616 A | 9/1998 | McClung, III |
| 5,807,198 A | 9/1998 | Grimm |
| 5,816,879 A | 10/1998 | Kyame |
| 5,853,311 A | 12/1998 | Bartholomew |
| 5,854,736 A | 12/1998 | Fuhs et al. |
| 5,854,843 A | 12/1998 | Jacknin et al. |

(56) References Cited

U.S. PATENT DOCUMENTS

| | | |
|---|---|---|
| 5,865,690 A | 2/1999 | Giannoutsos |
| 5,867,386 A | 2/1999 | Hoffberg et al. |
| 5,871,397 A | 2/1999 | Nelson et al. |
| 5,872,205 A | 2/1999 | Balke et al. |
| 5,873,545 A | 2/1999 | Kapin et al. |
| 5,873,570 A | 2/1999 | Jones |
| 5,875,108 A | 2/1999 | Hoffberg et al. |
| 5,875,627 A | 3/1999 | Jeswine |
| 5,882,107 A | 3/1999 | Bornhorst et al. |
| 5,890,441 A | 4/1999 | Swinson et al. |
| 5,893,790 A | 4/1999 | Montgomery |
| 5,895,308 A | 4/1999 | Spector |
| 5,899,288 A | 5/1999 | Schubert et al. |
| 5,901,246 A | 5/1999 | Hoffberg et al. |
| 5,901,633 A | 5/1999 | Chan et al. |
| 5,902,166 A | 5/1999 | Robb |
| 5,903,454 A | 5/1999 | Hoffberg et al. |
| 5,904,724 A | 5/1999 | Margolin |
| 5,909,859 A | 6/1999 | Janicki |
| 5,916,179 A | 6/1999 | Sharrock |
| 5,920,477 A | 7/1999 | Hoffberg et al. |
| 5,920,995 A | 7/1999 | Sammut |
| 5,930,804 A | 7/1999 | Yu et al. |
| 5,934,966 A | 8/1999 | Ward |
| 5,934,997 A | 8/1999 | Nelson et al. |
| 5,935,023 A | 8/1999 | Maehara et al. |
| 5,941,920 A | 8/1999 | Schubert |
| 5,951,353 A | 9/1999 | Moore |
| 5,963,957 A | 10/1999 | Hoffberg |
| 5,971,320 A | 10/1999 | Jermyn et al. |
| 5,975,982 A | 11/1999 | Spector |
| 5,977,778 A | 11/1999 | Chan et al. |
| 5,977,913 A | 11/1999 | Christ |
| 5,984,753 A | 11/1999 | Perez |
| 5,988,562 A | 11/1999 | Linick |
| 5,996,933 A | 12/1999 | Schier |
| 6,000,703 A | 12/1999 | Schubert et al. |
| 6,005,395 A | 12/1999 | Chan et al. |
| D419,205 S | 1/2000 | Kownacki et al. |
| 6,010,419 A | 1/2000 | Rappaport et al. |
| 6,024,660 A | 2/2000 | Romanick |
| 6,029,764 A | 2/2000 | Schubert |
| 6,032,374 A | 3/2000 | Sammut |
| 6,042,494 A | 3/2000 | Rappaport et al. |
| 6,045,095 A | 4/2000 | Parrish, IV |
| 6,048,247 A | 4/2000 | Kownacki et al. |
| 6,049,448 A | 4/2000 | Lanigan et al. |
| 6,050,250 A | 4/2000 | Kerkau |
| 6,053,451 A | 4/2000 | Yu |
| 6,056,616 A | 5/2000 | Bushman |
| 6,060,815 A | 5/2000 | Nysen |
| 6,079,954 A | 6/2000 | Kownacki et al. |
| 6,081,750 A | 6/2000 | Hoffberg et al. |
| 6,083,128 A | 7/2000 | Young et al. |
| 6,097,104 A | 8/2000 | Russell |
| 6,106,355 A | 8/2000 | Hoerner |
| 6,107,910 A | 8/2000 | Nysen |
| 6,114,971 A | 9/2000 | Nysen |
| 6,120,398 A | 9/2000 | Myers |
| 6,126,332 A | 10/2000 | Cubbage et al. |
| 6,135,455 A | 10/2000 | McNally |
| 6,142,059 A | 11/2000 | Chan et al. |
| 6,148,271 A | 11/2000 | Marinelli |
| 6,151,563 A | 11/2000 | Marinelli |
| 6,157,898 A | 12/2000 | Marinelli |
| 6,172,429 B1 | 1/2001 | Russell |
| 6,179,247 B1 | 1/2001 | Milde, Jr. |
| 6,182,076 B1 | 1/2001 | Yu et al. |
| 6,182,923 B1 | 2/2001 | Weinhart |
| 6,186,902 B1 | 2/2001 | Briggs |
| 6,193,620 B1 | 2/2001 | Tarng |
| 6,198,275 B1 | 3/2001 | Wolf et al. |
| 6,202,198 B1 | 3/2001 | Bibyk |
| 6,206,537 B1 | 3/2001 | Hauck |
| 6,208,247 B1 | 3/2001 | Agre et al. |
| 6,224,452 B1 | 5/2001 | Morse |
| 6,227,485 B1 | 5/2001 | Porte |
| 6,227,992 B1 | 5/2001 | Brasier |
| 6,230,501 B1 | 5/2001 | Bailey, Sr. et al. |
| 6,231,414 B1 | 5/2001 | Ho |
| 6,234,102 B1 | 5/2001 | Russell et al. |
| 6,241,362 B1 | 6/2001 | Morrison |
| 6,247,989 B1 | 6/2001 | Neff |
| 6,252,544 B1 | 6/2001 | Hoffberg |
| 6,254,032 B1 | 7/2001 | Bucher |
| 6,254,832 B1 | 7/2001 | Rainin et al. |
| 6,260,796 B1 | 7/2001 | Klingensmith |
| 6,261,142 B1 | 7/2001 | Fiotakis |
| 6,265,984 B1 | 7/2001 | Molinaroli |
| 6,267,070 B1 | 7/2001 | Russell et al. |
| 6,270,036 B1 | 8/2001 | Lowe, Jr. |
| 6,270,038 B1 | 8/2001 | Cycon et al. |
| 6,270,391 B1 | 8/2001 | Emilsson |
| 6,273,370 B1 | 8/2001 | Colgren |
| 6,287,193 B1 | 9/2001 | Rehkemper et al. |
| 6,288,633 B1 | 9/2001 | Volpe et al. |
| 6,292,213 B1 | 9/2001 | Jones |
| 6,293,680 B1 | 9/2001 | Bruns |
| 6,302,229 B1 | 10/2001 | Triebel |
| 6,304,665 B1 | 10/2001 | Cavallaro et al. |
| 6,308,787 B1 | 10/2001 | Alft |
| 6,312,349 B1 | 11/2001 | Roberts |
| 6,315,062 B1 | 11/2001 | Alft et al. |
| 6,315,667 B1 | 11/2001 | Steinhart |
| 6,317,049 B1 | 11/2001 | Toubia et al. |
| 6,332,103 B1 | 12/2001 | Steenson, Jr. et al. |
| 6,338,391 B1 | 1/2002 | Severinsky et al. |
| 6,340,884 B1 | 1/2002 | Wolf et al. |
| 6,346,025 B1 | 2/2002 | Tachau et al. |
| 6,347,623 B1 | 2/2002 | Kownacki et al. |
| 6,348,010 B1 | 2/2002 | Doolen |
| 6,350,985 B1 | 2/2002 | Rodricks et al. |
| 6,351,698 B1 | 2/2002 | Kubota et al. |
| 6,357,158 B1 | 3/2002 | Smith, III |
| 6,364,614 B1 | 4/2002 | Mnatsakanian |
| 6,371,406 B1 | 4/2002 | Corcoran |
| 6,375,117 B1 | 4/2002 | Cain |
| 6,375,424 B1 | 4/2002 | Scarpa |
| 6,386,997 B1 | 5/2002 | Brown |
| 6,389,329 B1 | 5/2002 | Colens |
| 6,395,955 B1 | 5/2002 | Roe et al. |
| 6,398,159 B1 | 6/2002 | Di Stefano |
| 6,400,996 B1 | 6/2002 | Hoffberg et al. |
| 6,402,090 B1 | 6/2002 | Aaron |
| 6,402,342 B1 | 6/2002 | Chiang |
| 6,402,584 B1 | 6/2002 | Dear |
| 6,404,409 B1 | 6/2002 | Solomon |
| 6,405,132 B1 | 6/2002 | Breed et al. |
| 6,414,955 B1 | 7/2002 | Clare et al. |
| 6,418,424 B1 | 7/2002 | Hoffberg et al. |
| 6,421,622 B1 | 7/2002 | Horton et al. |
| 6,428,381 B1 | 8/2002 | Stern |
| 6,429,812 B1 | 8/2002 | Hoffberg |
| 6,431,494 B1 | 8/2002 | Kinkead et al. |
| 6,442,336 B1 | 8/2002 | Lemelson |
| 6,450,445 B1 | 9/2002 | Moller |
| 6,450,446 B1 | 9/2002 | Holben |
| 6,453,595 B1 | 9/2002 | Sammut |
| 6,454,623 B1 | 9/2002 | Flatau |
| 6,457,670 B1 | 10/2002 | Geranio et al. |
| 6,464,166 B1 | 10/2002 | Yoeli |
| 6,464,167 B2 | 10/2002 | Hayes |
| 6,468,123 B1 | 10/2002 | Valencia |
| 6,470,976 B2 | 10/2002 | Alft et al. |
| D465,196 S | 11/2002 | Dammar |
| 6,474,593 B1 | 11/2002 | Lipeles et al. |
| 6,484,818 B2 | 11/2002 | Alft et al. |
| 6,484,971 B2 | 11/2002 | Layukallo |
| 6,503,085 B1 | 1/2003 | Elkind |
| 6,513,345 B1 | 2/2003 | Betting et al. |
| 6,513,752 B2 | 2/2003 | Carter, Jr. |
| 6,516,699 B2 | 2/2003 | Sammut et al. |
| 6,519,564 B1 | 2/2003 | Hoffberg et al. |
| 6,524,073 B2 | 2/2003 | Mnatsakanian |

(56) References Cited

U.S. PATENT DOCUMENTS

| | | |
|---|---|---|
| 6,524,368 B2 | 2/2003 | Betting et al. |
| 6,526,352 B1 | 2/2003 | Breed et al. |
| 6,527,223 B1 | 3/2003 | Mondale |
| 6,531,957 B1 | 3/2003 | Nysen |
| 6,539,290 B1 | 3/2003 | Vos |
| 6,547,180 B1 | 4/2003 | Cassidy |
| 6,550,715 B1 | 4/2003 | Reynolds et al. |
| 6,554,088 B2 | 4/2003 | Severinsky et al. |
| 6,554,285 B2 | 4/2003 | Chittenden |
| 6,563,130 B2 | 5/2003 | Dworkowski et al. |
| 6,565,243 B1 | 5/2003 | Cheung |
| 6,565,404 B2 | 5/2003 | Oblack |
| 6,568,980 B2 | 5/2003 | Barthold |
| 6,570,487 B1 | 5/2003 | Steeves |
| 6,572,053 B2 | 6/2003 | Salas |
| 6,575,401 B1 | 6/2003 | Carver |
| 6,581,872 B2 | 6/2003 | Walmsley |
| 6,585,551 B2 | 7/2003 | McClung et al. |
| 6,588,701 B2 | 7/2003 | Yavnai |
| 6,591,537 B2 | 7/2003 | Smith |
| 6,592,071 B2 | 7/2003 | Kinkead et al. |
| 6,602,045 B2 | 8/2003 | Hickey |
| 6,604,706 B1 | 8/2003 | Bostan |
| 6,604,742 B2 | 8/2003 | El Sabbagh |
| 6,608,464 B1 | 8/2003 | Lew et al. |
| 6,611,224 B1 | 8/2003 | Nysen et al. |
| 6,612,893 B2 | 9/2003 | Rehkemper et al. |
| 6,616,094 B2 | 9/2003 | Illingworth |
| 6,622,973 B2 | 9/2003 | Al-Garni et al. |
| 6,626,078 B2 | 9/2003 | Thornton |
| 6,640,145 B2 | 10/2003 | Hoffberg et al. |
| 6,647,328 B2 | 11/2003 | Walker |
| 6,651,511 B1 | 11/2003 | Young |
| 6,659,466 B2 | 12/2003 | Searles et al. |
| 6,666,650 B1 | 12/2003 | Themel |
| 6,669,587 B2 | 12/2003 | Kessler |
| 6,677,257 B2 | 1/2004 | Brasier |
| 6,681,512 B2 | 1/2004 | Sammut |
| 6,688,936 B2 | 2/2004 | Davis |
| 6,694,228 B2 | 2/2004 | Rios |
| 6,695,728 B1 | 2/2004 | Eddins |
| 6,703,827 B1 | 3/2004 | Wolf et al. |
| 6,705,654 B2 | 3/2004 | Slauf |
| 6,708,920 B2 | 3/2004 | Fukuyama |
| 6,719,069 B2 | 4/2004 | Alft et al. |
| 6,719,653 B1 | 4/2004 | Nesbitt |
| 6,720,920 B2 | 4/2004 | Breed et al. |
| 6,723,013 B2 | 4/2004 | Ilcisin et al. |
| 6,726,265 B2 | 4/2004 | Miller |
| 6,735,500 B2 | 5/2004 | Nicholas et al. |
| 6,735,630 B1 | 5/2004 | Gelvin et al. |
| 6,739,189 B2 | 5/2004 | Lee et al. |
| 6,749,218 B2 | 6/2004 | Breed |
| 6,751,529 B1 | 6/2004 | Fouche |
| 6,755,263 B2 | 6/2004 | Alft et al. |
| 6,755,273 B2 | 6/2004 | Breed |
| 6,758,436 B2 | 7/2004 | Rehkemper et al. |
| 6,761,637 B2 | 7/2004 | Weston et al. |
| 6,768,944 B2 | 7/2004 | Breed et al. |
| 6,772,124 B2 | 8/2004 | Hoffberg et al. |
| 6,776,825 B2 | 8/2004 | Betting et al. |
| 6,791,091 B2 | 9/2004 | Rodricks et al. |
| 6,791,472 B1 | 9/2004 | Hoffberg |
| 6,824,095 B2 | 11/2004 | Mao |
| 6,826,607 B1 | 11/2004 | Gelvin et al. |
| 6,832,251 B1 | 12/2004 | Gelvin et al. |
| 6,833,795 B1 | 12/2004 | Johnson et al. |
| 6,843,447 B2 | 1/2005 | Morgan |
| 6,843,699 B2 | 1/2005 | Davis |
| 6,847,865 B2 | 1/2005 | Carroll |
| 6,850,252 B1 | 2/2005 | Hoffberg |
| 6,857,079 B2 | 2/2005 | Chen |
| 6,857,770 B2 | 2/2005 | Moore |
| 6,859,831 B1 | 2/2005 | Gelvin et al. |
| 6,865,825 B2 | 3/2005 | Bailey, Sr. et al. |
| 6,868,314 B1 | 3/2005 | Frink |
| 6,872,105 B2 | 3/2005 | Dusablon et al. |
| 6,880,722 B2 | 4/2005 | Anderson et al. |
| 6,885,968 B2 | 4/2005 | Breed et al. |
| 6,887,119 B2 | 5/2005 | Bloeme et al. |
| 6,892,666 B1 | 5/2005 | Plante et al. |
| 6,898,501 B2 | 5/2005 | Schubert |
| 6,899,586 B2 | 5/2005 | Davis |
| 6,910,977 B2 | 6/2005 | Baquero |
| 6,918,459 B2 | 7/2005 | Breed |
| 6,921,315 B2 | 7/2005 | Kownacki |
| 6,922,632 B2 | 7/2005 | Foxlin |
| D509,259 S | 9/2005 | Dennis |
| 6,972,659 B2 | 12/2005 | von Behrens et al. |
| 6,978,728 B2 | 12/2005 | Koop et al. |
| 6,981,499 B2 | 1/2006 | Anderson et al. |
| 6,982,697 B2 | 1/2006 | Wilson et al. |
| 6,987,442 B2 | 1/2006 | Pisarsky et al. |
| 6,988,026 B2 | 1/2006 | Breed et al. |
| 6,990,639 B2 | 1/2006 | Wilson |
| 6,991,565 B1 | 1/2006 | Kasashima |
| 7,002,553 B2 | 2/2006 | Shkolnikov |
| 7,006,881 B1 | 2/2006 | Hoffberg et al. |
| 7,018,308 B2 | 3/2006 | Kasashima |
| 7,020,701 B1 | 3/2006 | Gelvin et al. |
| 7,023,979 B1 | 4/2006 | Wu et al. |
| 7,029,406 B2 | 4/2006 | Kasashima et al. |
| 7,032,861 B2 | 4/2006 | Sanders, Jr. et al. |
| 7,034,660 B2 | 4/2006 | Watters et al. |
| 7,064,472 B2 | 6/2006 | Pelrine et al. |
| 7,069,684 B2 | 7/2006 | Smith, III |
| 7,073,750 B1 | 7/2006 | Choi |
| 7,081,693 B2 | 7/2006 | Hamel et al. |
| D526,029 S | 8/2006 | Ragonetti et al. |
| 7,082,890 B2 | 8/2006 | MacGregor et al. |
| 7,083,533 B2 | 8/2006 | Kasahima et al. |
| 7,085,637 B2 | 8/2006 | Breed et al. |
| 7,089,099 B2 | 8/2006 | Shostak et al. |
| 7,090,596 B2 | 8/2006 | David |
| 7,096,727 B2 | 8/2006 | Adamson et al. |
| 7,101,293 B2 | 9/2006 | Tarng et al. |
| 7,103,460 B1 | 9/2006 | Breed |
| 7,104,347 B2 | 9/2006 | Severinsky et al. |
| 7,107,706 B1 | 9/2006 | Bailey, Sr. et al. |
| 7,108,576 B2 | 9/2006 | LaPointe |
| 7,108,615 B2 | 9/2006 | Kasashima et al. |
| 7,110,525 B1 | 9/2006 | Heller et al. |
| 7,110,880 B2 | 9/2006 | Breed et al. |
| 7,136,710 B1 | 11/2006 | Hoffberg et al. |
| 7,143,844 B2 | 12/2006 | Alft et al. |
| 7,145,551 B1 | 12/2006 | Bathiche et al. |
| 7,147,246 B2 | 12/2006 | Breed et al. |
| 7,162,035 B1 | 1/2007 | Durst et al. |
| 7,164,117 B2 | 1/2007 | Breed et al. |
| 7,170,201 B2 | 1/2007 | Hamel et al. |
| 7,175,542 B2 | 2/2007 | Watanabe et al. |
| 7,181,017 B1 | 2/2007 | Nagel et al. |
| 7,187,295 B2 | 3/2007 | Saltzek |
| 7,194,838 B2 | 3/2007 | Smith, III |
| 7,201,671 B2 | 4/2007 | Watanabe et al. |
| 7,202,776 B2 | 4/2007 | Breed |
| 7,204,041 B1 | 4/2007 | Bailey, Sr. et al. |
| 7,204,453 B2 | 4/2007 | Muren |
| 7,204,455 B2 | 4/2007 | Sinclair |
| 7,207,701 B2 | 4/2007 | Kennedy et al. |
| 7,209,221 B2 | 4/2007 | Breed et al. |
| 7,213,786 B2 | 5/2007 | McKinney |
| 7,219,033 B2 | 5/2007 | Kolen |
| 7,219,449 B1 | 5/2007 | Hoffberg et al. |
| 7,219,861 B1 | 5/2007 | Barr |
| 7,222,452 B2 | 5/2007 | Smith, III |
| 7,231,920 B2 | 6/2007 | Harvey et al. |
| 7,237,355 B2 | 7/2007 | Smith, III |
| 7,237,634 B2 | 7/2007 | Severinsky et al. |
| 7,238,121 B2 | 7/2007 | Watanabe et al. |
| 7,242,988 B1 | 7/2007 | Hoffberg et al. |
| 7,243,945 B2 | 7/2007 | Breed et al. |
| 7,249,732 B2 | 7/2007 | Sanders, Jr. et al. |
| 7,250,936 B2 | 7/2007 | Wilson et al. |

(56) References Cited

U.S. PATENT DOCUMENTS

| | | |
|---|---|---|
| 7,255,304 B2 | 8/2007 | Ericson et al. |
| 7,255,623 B2 | 8/2007 | Davis |
| 7,259,357 B2 | 8/2007 | Walker |
| 7,264,534 B2 | 9/2007 | Stubenfoll |
| 7,268,700 B1 | 9/2007 | Hoffberg |
| 7,269,253 B1 | 9/2007 | Wu et al. |
| 7,270,614 B2 | 9/2007 | Watanabe et al. |
| 7,271,737 B1 | 9/2007 | Hoffberg |
| 7,285,032 B2 | 10/2007 | Cha |
| 7,288,037 B2 | 10/2007 | Myers |
| 7,295,925 B2 | 11/2007 | Breed et al. |
| 7,298,289 B1 | 11/2007 | Hoffberg |
| 7,300,363 B2 | 11/2007 | Kasashima |
| 7,300,584 B2 | 11/2007 | Langhans et al. |
| 7,307,617 B2 | 12/2007 | Wilson et al. |
| 7,309,967 B2 | 12/2007 | Moser et al. |
| 7,313,467 B2 | 12/2007 | Breed et al. |
| 7,322,355 B2 | 1/2008 | Jones et al. |
| 7,329,099 B2 | 2/2008 | Hartman |
| 7,330,784 B2 | 2/2008 | Johnson et al. |
| 7,331,838 B2 | 2/2008 | Shantz |
| 7,335,000 B2 | 2/2008 | Ferguson |
| 7,340,765 B2 | 3/2008 | Feldmeier |
| 7,343,707 B2 | 3/2008 | Smith, III |
| 7,347,200 B2 | 3/2008 | Jones et al. |
| 7,347,758 B2 | 3/2008 | Moore |
| 7,352,339 B2 | 4/2008 | Morgan et al. |
| 7,354,017 B2 | 4/2008 | Morris et al. |
| 7,357,732 B2 | 4/2008 | Watanabe et al. |
| 7,359,527 B2 | 4/2008 | Breed et al. |
| 7,359,782 B2 | 4/2008 | Breed |
| 7,362,032 B2 | 4/2008 | Pelrine et al. |
| 7,365,455 B2 | 4/2008 | Hamel et al. |
| 7,367,901 B2 | 5/2008 | Watanabe et al. |
| 7,372,952 B1 | 5/2008 | Wu et al. |
| 7,379,800 B2 | 5/2008 | Breed |
| 7,385,443 B1 | 6/2008 | Denison |
| 7,386,372 B2 | 6/2008 | Breed et al. |
| 7,391,257 B1 | 6/2008 | Denison et al. |
| 7,392,871 B2 | 7/2008 | Severinsky et al. |
| 7,394,182 B2 | 7/2008 | Pelrine et al. |
| 7,395,614 B1 | 7/2008 | Bailey, Sr. et al. |
| 7,407,029 B2 | 8/2008 | Breed et al. |
| 7,412,930 B2 | 8/2008 | Smith et al. |
| 7,418,346 B2 | 8/2008 | Breed et al. |
| D576,216 S | 9/2008 | Van de Rostyne et al. |
| D577,392 S | 9/2008 | Van de Rostyne et al. |
| 7,421,321 B2 | 9/2008 | Breed et al. |
| 7,426,437 B2 | 9/2008 | Breed et al. |
| 7,427,047 B2 | 9/2008 | Saeed Tehrani |
| 7,429,801 B2 | 9/2008 | Adamson et al. |
| RE40,533 E | 10/2008 | Oblack |
| 7,435,089 B2 | 10/2008 | Sato et al. |
| 7,444,210 B2 | 10/2008 | Breed et al. |
| 7,451,005 B2 | 11/2008 | Hoffberg et al. |
| 7,455,134 B2 | 11/2008 | Severinsky et al. |
| 7,467,629 B2 | 12/2008 | Rand |
| 7,476,865 B2 | 1/2009 | Lal et al. |
| 7,488,231 B2 | 2/2009 | Weston |
| 7,497,759 B1 | 3/2009 | Davis |
| 7,500,898 B2 | 3/2009 | Laurienzo et al. |
| 7,500,917 B2 | 3/2009 | Barney et al. |
| 7,504,740 B2 | 3/2009 | Murakami et al. |
| 7,520,353 B2 | 4/2009 | Severinsky et al. |
| 7,523,803 B2 | 4/2009 | Breed |
| 7,527,288 B2 | 5/2009 | Breed |
| 7,538,473 B2 | 5/2009 | Blandino et al. |
| 7,540,814 B2 | 6/2009 | Dilling |
| 7,541,995 B1 | 6/2009 | Murphy, Jr. |
| 7,545,994 B2 | 6/2009 | Reid |
| 7,552,403 B2 | 6/2009 | Wilson |
| 7,555,370 B2 | 6/2009 | Breed et al. |
| 7,557,433 B2 | 7/2009 | McCain |
| 7,559,388 B2 | 7/2009 | Severinsky et al. |
| 7,563,180 B2 | 7/2009 | Watanabe et al. |
| 7,568,986 B2 | 8/2009 | Watanabe et al. |
| 7,570,785 B2 | 8/2009 | Breed |
| 7,575,248 B2 | 8/2009 | Breed |
| 7,582,981 B1 | 9/2009 | Meller |
| 7,584,071 B2 | 9/2009 | Lee |
| 7,584,570 B2 | 9/2009 | Smith |
| 7,590,589 B2 | 9/2009 | Hoffberg |
| 7,596,242 B2 | 9/2009 | Breed et al. |
| 7,596,767 B2 | 9/2009 | Wilson |
| 7,597,099 B2 | 10/2009 | Jones et al. |
| 7,597,164 B2 | 10/2009 | Severinsky et al. |
| 7,602,077 B2 | 10/2009 | Ferguson |
| 7,603,998 B2 | 10/2009 | Finstad |
| 7,606,570 B2 | 10/2009 | Karaoguz et al. |
| 7,607,494 B2 | 10/2009 | Alft et al. |
| 7,607,610 B1 | 10/2009 | Sterchak |
| 7,610,146 B2 | 10/2009 | Breed |
| 7,614,958 B2 | 11/2009 | Weston et al. |
| 7,620,521 B2 | 11/2009 | Breed et al. |
| 7,621,484 B2 | 11/2009 | Wingert |
| 7,622,988 B2 | 11/2009 | Denison et al. |
| 7,623,053 B2 | 11/2009 | Terry et al. |
| 7,628,671 B2 | 12/2009 | Choi |
| 7,629,899 B2 | 12/2009 | Breed |
| 7,630,806 B2 | 12/2009 | Breed |
| 7,641,528 B2 | 1/2010 | Stolper |
| 7,647,180 B2 | 1/2010 | Breed |
| 7,650,212 B2 | 1/2010 | Breed et al. |
| 7,650,319 B2 | 1/2010 | Hoffberg et al. |
| 7,662,012 B2 | 2/2010 | Wright |
| 7,662,013 B2 | 2/2010 | Van de Rostyne et al. |
| 7,663,502 B2 | 2/2010 | Breed |
| 7,663,629 B2 | 2/2010 | Ajioka et al. |
| 7,665,453 B1 | 2/2010 | D'Agostino |
| 7,665,454 B1 | 2/2010 | D'Agostino |
| 7,670,204 B2 | 3/2010 | Huber |
| 7,672,756 B2 | 3/2010 | Breed |
| 7,672,781 B2 | 3/2010 | Churchill et al. |
| 7,676,034 B1 | 3/2010 | Wu et al. |
| 7,676,062 B2 | 3/2010 | Breed et al. |
| 7,682,214 B2 | 3/2010 | Barniak, Jr. |
| 7,689,378 B2 | 3/2010 | Kolen |
| 7,692,127 B1 | 4/2010 | Linn et al. |
| 7,708,658 B2 | 5/2010 | McInerney |
| 7,709,973 B2 | 5/2010 | Meller |
| 7,712,225 B2 | 5/2010 | Sammut |
| 7,712,777 B2 | 5/2010 | Breed |
| 7,714,757 B2 | 5/2010 | Denison et al. |
| 7,716,008 B2 | 5/2010 | Ohta |
| 7,716,013 B2 | 5/2010 | Orth et al. |
| 7,719,416 B2 | 5/2010 | Arms et al. |
| 7,721,231 B2 | 5/2010 | Wilson |
| 7,723,861 B2 | 5/2010 | Meller |
| 7,725,253 B2 | 5/2010 | Foxlin |
| 7,734,061 B2 | 6/2010 | Breed et al. |
| 7,738,678 B2 | 6/2010 | Breed et al. |
| 7,746,620 B2 | 6/2010 | Bedingfield |
| 7,762,582 B2 | 7/2010 | Breed |
| 7,766,274 B1 | 8/2010 | Jameson et al. |
| 7,766,383 B2 | 8/2010 | Breed et al. |
| 7,769,513 B2 | 8/2010 | Breed et al. |
| 7,770,920 B2 | 8/2010 | Breed et al. |
| 7,772,960 B2 | 8/2010 | Baker |
| 7,773,749 B1 | 8/2010 | Durst et al. |
| 7,774,155 B2 | 8/2010 | Sato et al. |
| 7,775,761 B2 | 8/2010 | Ferguson |
| 7,775,910 B2 | 8/2010 | Lessack |
| 7,779,956 B2 | 8/2010 | Breed et al. |
| 7,781,709 B1 | 8/2010 | Jones et al. |
| 7,782,590 B2 | 8/2010 | Bedingfield et al. |
| 7,783,277 B2 | 8/2010 | Walker et al. |
| 7,783,403 B2 | 8/2010 | Breed |
| 7,785,098 B1 | 8/2010 | Appleby et al. |
| 7,788,008 B2 | 8/2010 | Breed |
| 7,789,520 B2 | 9/2010 | Konig et al. |
| 7,791,503 B2 | 9/2010 | Breed et al. |
| 7,794,302 B2 | 9/2010 | Davis |
| 7,794,341 B2 | 9/2010 | Tarng et al. |
| 7,796,081 B2 | 9/2010 | Breed |

(56) References Cited

U.S. PATENT DOCUMENTS

| | | |
|---|---|---|
| 7,797,367 B1 | 9/2010 | Gelvin et al. |
| 7,798,875 B1 | 9/2010 | Angel et al. |
| 7,798,883 B2 | 9/2010 | Elson et al. |
| 7,811,150 B2 | 10/2010 | Amireh et al. |
| 7,813,822 B1 | 10/2010 | Hoffberg |
| 7,815,482 B2 | 10/2010 | Van De Rostyne |
| 7,819,003 B2 | 10/2010 | Breed et al. |
| 7,821,149 B2 | 10/2010 | Meller |
| 7,823,089 B2 | 10/2010 | Wilson |
| 7,830,033 B2 | 11/2010 | Meller |
| 7,832,137 B2 | 11/2010 | Sammut et al. |
| 7,834,301 B2 | 11/2010 | Clingman |
| 7,837,648 B2 | 11/2010 | Blair et al. |
| 7,840,342 B1 | 11/2010 | Breed |
| 7,840,355 B2 | 11/2010 | Breed et al. |
| 7,844,687 B1 | 11/2010 | Gelvin et al. |
| 7,845,508 B2 | 12/2010 | Rothschild et al. |
| 7,847,628 B2 | 12/2010 | Denison |
| 7,848,905 B2 | 12/2010 | Troxler et al. |
| 7,850,551 B2 | 12/2010 | Barber |
| 7,852,462 B2 | 12/2010 | Breed et al. |
| 7,854,087 B1 | 12/2010 | Pervez |
| 7,856,750 B2 | 12/2010 | Sammut et al. |
| 7,857,718 B2 | 12/2010 | Tarng et al. |
| 7,859,126 B2 | 12/2010 | Ferguson |
| 7,860,481 B2 | 12/2010 | Walker et al. |
| 7,866,717 B2 | 1/2011 | Martinez |
| 7,869,591 B1 | 1/2011 | Nagel et al. |
| 7,873,841 B2 | 1/2011 | Mullis, II et al. |
| 7,876,010 B2 | 1/2011 | Post |
| 7,877,224 B2 | 1/2011 | Ohta |
| 7,878,929 B2 | 2/2011 | Perry-Smith |
| 7,883,392 B2 | 2/2011 | Van de Rostyne et al. |
| 7,887,089 B2 | 2/2011 | Breed et al. |
| 7,891,298 B2 | 2/2011 | Minick et al. |
| 7,893,413 B1 | 2/2011 | Appleby et al. |
| 7,894,595 B1 | 2/2011 | Wu et al. |
| 7,896,609 B2 | 3/2011 | Mitchell et al. |
| 7,899,616 B2 | 3/2011 | Breed |
| 7,899,621 B2 | 3/2011 | Breed et al. |
| 7,900,736 B2 | 3/2011 | Breed |
| 7,904,187 B2 | 3/2011 | Hoffberg et al. |
| 7,907,838 B2 | 3/2011 | Nasiri et al. |
| 7,912,645 B2 | 3/2011 | Breed et al. |
| 7,916,858 B1 | 3/2011 | Heller et al. |
| 7,918,605 B2 | 4/2011 | Brown |
| 7,920,102 B2 | 4/2011 | Breed |
| 7,927,216 B2 | 4/2011 | Ikeda et al. |
| 7,931,239 B2 | 4/2011 | Pedersen et al. |
| 7,931,535 B2 | 4/2011 | Ikeda et al. |
| 7,935,013 B2 | 5/2011 | Pacheco |
| 7,937,878 B2 | 5/2011 | Sammut et al. |
| 7,942,745 B2 | 5/2011 | Ikeda et al. |
| 7,946,048 B2 | 5/2011 | Sammut |
| 7,946,526 B2 | 5/2011 | Zimet |
| 7,947,937 B1 | 5/2011 | Langner |
| D640,329 S | 6/2011 | Oblack et al. |
| 7,958,796 B2 | 6/2011 | Hsu et al. |
| 7,962,164 B2 | 6/2011 | Karaoguz et al. |
| 7,962,285 B2 | 6/2011 | Breed |
| 7,963,442 B2 | 6/2011 | Jenkins et al. |
| 7,966,078 B2 | 6/2011 | Hoffberg et al. |
| 7,971,823 B2 | 7/2011 | Martin |
| 7,971,824 B2 | 7/2011 | Van de Rostyne |
| 7,974,714 B2 | 7/2011 | Hoffberg |
| 7,976,060 B2 | 7/2011 | Breed |
| 7,979,172 B2 | 7/2011 | Breed |
| 7,979,173 B2 | 7/2011 | Breed |
| 7,983,802 B2 | 7/2011 | Breed |
| 7,983,836 B2 | 7/2011 | Breed |
| 7,986,054 B2 | 7/2011 | Douglas |
| 7,986,218 B2 | 7/2011 | Watters et al. |
| 7,987,003 B2 | 7/2011 | Hoffberg et al. |
| 7,988,190 B2 | 8/2011 | Breed |
| 7,989,973 B2 | 8/2011 | Birkestrand |
| 7,990,283 B2 | 8/2011 | Breed |
| 7,997,595 B1 | 8/2011 | Pope |
| 7,999,212 B1 | 8/2011 | Thiesen et al. |
| 8,000,314 B2 | 8/2011 | Brownrigg et al. |
| 8,000,897 B2 | 8/2011 | Breed et al. |
| 8,002,604 B2 | 8/2011 | Van de Rostyne et al. |
| 8,002,652 B2 | 8/2011 | Wong |
| 8,009,608 B2 | 8/2011 | Karaoguz et al. |
| 8,013,569 B2 | 9/2011 | Hartman |
| 8,018,933 B2 | 9/2011 | Dickens et al. |
| 8,027,572 B2 | 9/2011 | Bedingfield et al. |
| 8,031,060 B2 | 10/2011 | Hoffberg et al. |
| 8,032,324 B1 | 10/2011 | Bryant et al. |
| 8,032,477 B1 | 10/2011 | Hoffberg et al. |
| 8,033,253 B2 | 10/2011 | Ritchey et al. |
| 8,041,483 B2 | 10/2011 | Breed |
| 8,041,536 B2 | 10/2011 | Ohta |
| 8,046,313 B2 | 10/2011 | Hoffberg et al. |
| 8,049,193 B1 | 11/2011 | Appleby et al. |
| 8,051,079 B2 | 11/2011 | Cheng et al. |
| 8,052,500 B2 | 11/2011 | Van de Rostyne et al. |
| 8,054,203 B2 | 11/2011 | Breed et al. |
| 8,054,965 B1 | 11/2011 | Wu et al. |
| 8,060,308 B2 | 11/2011 | Breed |
| 8,062,087 B1 | 11/2011 | Davis et al. |
| 8,068,979 B2 | 11/2011 | Breed |
| 8,086,318 B2 | 12/2011 | Strother et al. |
| 8,089,458 B2 | 1/2012 | Barney et al. |
| 8,099,375 B2 | 1/2012 | Driessen |
| 8,106,748 B2 | 1/2012 | Lee |
| 8,109,029 B1 | 2/2012 | Sammut et al. |
| 8,113,905 B2 | 2/2012 | Davis |
| 8,119,958 B2 | 2/2012 | Adams et al. |
| 8,124,921 B2 | 2/2012 | Geswender et al. |
| 8,126,680 B2 | 2/2012 | Troxler et al. |
| 8,132,126 B2 | 3/2012 | Wilson |
| 8,135,413 B2 | 3/2012 | Dupray |
| 8,140,259 B2 | 3/2012 | Hall et al. |
| 8,140,658 B1 | 3/2012 | Gelvin et al. |
| 8,144,619 B2 | 3/2012 | Hoffberg |
| 8,148,838 B2 | 4/2012 | Ferguson |
| 8,152,198 B2 | 4/2012 | Breed et al. |
| 8,157,651 B2 | 4/2012 | Ohta et al. |
| 8,160,433 B2 | 4/2012 | Bedingfield et al. |
| 8,161,968 B2 | 4/2012 | Augustyn et al. |
| 8,164,567 B1 | 4/2012 | Barney et al. |
| 8,165,916 B2 | 4/2012 | Hoffberg et al. |
| 8,167,344 B2 | 5/2012 | Martinez |
| 8,169,406 B2 | 5/2012 | Barney et al. |
| 8,171,849 B2 | 5/2012 | Amick |
| 8,174,135 B1 | 5/2012 | Roe et al. |
| 8,177,260 B2 | 5/2012 | Tropper et al. |
| 8,182,231 B2 | 5/2012 | Corten |
| 8,182,306 B2 | 5/2012 | Scarborough |
| 8,184,097 B1 | 5/2012 | Barney et al. |
| 8,185,119 B2 | 5/2012 | Karaoguz et al. |
| 8,186,784 B2 | 5/2012 | Clarke et al. |
| 8,196,540 B2 | 6/2012 | Palladino |
| 8,202,180 B1 | 6/2012 | Perry-Smith |
| 8,205,578 B2 | 6/2012 | Curry et al. |
| 8,205,822 B1 | 6/2012 | Jameson et al. |
| 8,209,120 B2 | 6/2012 | Breed |
| 8,209,147 B2 | 6/2012 | Solinsky |
| D664,214 S | 7/2012 | Yuen |
| 8,214,097 B2 | 7/2012 | Severinsky et al. |
| 8,215,255 B2 | 7/2012 | Wobben et al. |
| 8,225,458 B1 | 7/2012 | Hoffberg |
| 8,226,493 B2 | 7/2012 | Briggs et al. |
| 8,230,635 B2 | 7/2012 | Sammut et al. |
| 8,231,506 B2 | 7/2012 | Molyneux et al. |
| 8,233,471 B2 | 7/2012 | Brownrigg et al. |
| 8,233,918 B2 | 7/2012 | Roin et al. |
| 8,235,416 B2 | 8/2012 | Breed et al. |
| 8,240,508 B2 | 8/2012 | Wegelin et al. |
| 8,242,623 B2 | 8/2012 | Lucero et al. |
| 8,247,912 B2 | 8/2012 | Da Costa Duarte Pardal et al. |
| 8,248,367 B1 | 8/2012 | Barney et al. |
| 8,250,921 B2 | 8/2012 | Nasiri et al. |
| 8,253,264 B2 | 8/2012 | Becker |

(56) References Cited

U.S. PATENT DOCUMENTS

| | | |
|---|---|---|
| 8,255,144 B2 | 8/2012 | Breed et al. |
| 8,256,826 B2 | 9/2012 | Fioravanti |
| 8,257,157 B2 | 9/2012 | Polchin |
| 8,260,537 B2 | 9/2012 | Breed |
| 8,260,883 B2 | 9/2012 | Mooring et al. |
| 8,261,681 B2 | 9/2012 | Wobben |
| 8,265,769 B2 | 9/2012 | Denison |
| 8,267,693 B1 | 9/2012 | Moss |
| 8,267,786 B2 | 9/2012 | Ikeda |
| 8,270,603 B1 | 9/2012 | Durst et al. |
| 8,282,498 B2 | 10/2012 | Publicover et al. |
| 8,286,265 B2 | 10/2012 | Karwan |
| 8,287,406 B2 | 10/2012 | Biederman et al. |
| 8,288,698 B2 | 10/2012 | Seidensticker |
| 8,289,162 B2 | 10/2012 | Mooring et al. |
| 8,300,798 B1 | 10/2012 | Wu et al. |
| 8,308,522 B2 | 11/2012 | Van de Rostyne et al. |
| 8,308,563 B2 | 11/2012 | Ikeda et al. |
| 8,310,368 B2 | 11/2012 | Hoover et al. |
| 8,313,379 B2 | 11/2012 | Ikeda et al. |
| 8,315,326 B2 | 11/2012 | Agee et al. |
| 8,315,327 B2 | 11/2012 | Agee et al. |
| 8,316,237 B1 | 11/2012 | Felsher et al. |
| 8,319,162 B2 | 11/2012 | Mccool |
| 8,322,308 B2 | 12/2012 | Curry et al. |
| 8,322,649 B2 | 12/2012 | Martin |
| 8,325,030 B2 | 12/2012 | Townsend et al. |
| 8,327,803 B2 | 12/2012 | Tamaru et al. |
| 8,335,304 B2 | 12/2012 | Petite |
| 8,341,289 B2 | 12/2012 | Hellhake et al. |
| 8,344,998 B2 | 1/2013 | Fitzgerald et al. |
| 8,348,618 B2 | 1/2013 | Hartman |
| 8,351,773 B2 | 1/2013 | Nasiri et al. |
| 8,352,400 B2 | 1/2013 | Hoffberg et al. |
| 8,353,454 B2 | 1/2013 | Sammut et al. |
| 8,354,881 B2 | 1/2013 | Denison |
| 8,355,410 B2 | 1/2013 | Hall |
| 8,357,023 B2 | 1/2013 | Van de Rostyne et al. |
| 8,362,408 B2 | 1/2013 | Carlson |
| 8,362,631 B2 | 1/2013 | Roe et al. |
| 8,363,744 B2 | 1/2013 | Agee et al. |
| 8,364,136 B2 | 1/2013 | Hoffberg et al. |
| 8,368,648 B2 | 2/2013 | Barney et al. |
| 8,369,967 B2 | 2/2013 | Hoffberg et al. |
| 8,373,582 B2 | 2/2013 | Hoffberg |
| 8,373,659 B2 | 2/2013 | Barney et al. |
| 8,384,538 B2 | 2/2013 | Breed |
| 8,384,668 B2 | 2/2013 | Barney et al. |
| D678,959 S | 3/2013 | Ventola |
| 8,398,449 B2 | 3/2013 | Forti |
| 8,402,490 B2 | 3/2013 | Hoffberg-Borghesani et al. |
| 8,406,906 B2 | 3/2013 | Connelly |
| 8,409,003 B2 | 4/2013 | Ikeda |
| 8,411,842 B1 | 4/2013 | Wu et al. |
| 8,417,481 B2 | 4/2013 | Cook et al. |
| 8,428,913 B2 | 4/2013 | Troxler |
| 8,430,753 B2 | 4/2013 | Ikeda et al. |
| 8,432,084 B2 | 4/2013 | Roberts et al. |
| 8,444,513 B2 | 5/2013 | Cournoyer |
| 8,447,474 B2 | 5/2013 | Breed |
| 8,451,928 B2 | 5/2013 | Agee et al. |
| 8,451,929 B2 | 5/2013 | Agee et al. |
| 8,452,575 B2 | 5/2013 | Sato |
| 8,452,577 B2 | 5/2013 | Sato |
| 8,454,459 B1 | 6/2013 | Reed |
| 8,456,159 B2 | 6/2013 | Polzer et al. |
| 8,456,419 B2 | 6/2013 | Wilson |
| 8,462,109 B2 | 6/2013 | Nasiri et al. |
| 8,467,133 B2 | 6/2013 | Miller |
| 8,469,815 B2 | 6/2013 | Hovseth |
| 8,472,120 B2 | 6/2013 | Border et al. |
| 8,472,986 B2 | 6/2013 | Karmarkar et al. |
| 8,473,245 B2 | 6/2013 | Ohta |
| 8,475,275 B2 | 7/2013 | Weston et al. |
| 8,477,425 B2 | 7/2013 | Border et al. |
| 8,482,859 B2 | 7/2013 | Border et al. |
| 8,488,246 B2 | 7/2013 | Border et al. |
| 8,491,389 B2 | 7/2013 | Weston et al. |
| 8,494,530 B2 | 7/2013 | Karaoguz et al. |
| 8,495,879 B2 | 7/2013 | Grace |
| 8,500,507 B2 | 8/2013 | Davis et al. |
| 8,500,604 B2 | 8/2013 | Srinivasan et al. |
| 8,504,008 B1 | 8/2013 | Gossweiler, III et al. |
| 8,509,827 B2 | 8/2013 | Karmarkar |
| 8,511,304 B2 | 8/2013 | Anderson et al. |
| 8,514,825 B1 | 8/2013 | Addepalli et al. |
| 8,516,266 B2 | 8/2013 | Hoffberg et al. |
| 8,516,886 B2 | 8/2013 | Acar et al. |
| 8,516,887 B2 | 8/2013 | Acar et al. |
| 8,528,855 B2 | 9/2013 | Seifert |
| 8,535,066 B2 | 9/2013 | Li et al. |
| 8,539,894 B2 | 9/2013 | Levander |
| 8,541,745 B2 | 9/2013 | Dickinson et al. |
| D691,673 S | 10/2013 | Vazquez |
| 8,554,325 B2 | 10/2013 | Molnar et al. |
| 8,561,937 B2 | 10/2013 | Goodarzi |
| 8,562,487 B2 | 10/2013 | Berggren et al. |
| 8,565,747 B2 | 10/2013 | Karaoguz et al. |
| 8,566,247 B1 | 10/2013 | Nagel et al. |
| 8,569,090 B2 | 10/2013 | Taheri |
| 8,571,781 B2 | 10/2013 | Bernstein et al. |
| 8,574,146 B2 | 11/2013 | Gillespie, Jr. et al. |
| 8,576,073 B2 | 11/2013 | Mooring et al. |
| 8,578,646 B2 | 11/2013 | Joannes |
| 8,579,671 B2 | 11/2013 | DeRennaux et al. |
| 8,579,734 B2 | 11/2013 | Stemle |
| 8,582,753 B1 | 11/2013 | Heller et al. |
| 8,583,263 B2 | 11/2013 | Hoffberg et al. |
| 8,583,329 B2 | 11/2013 | Breed |
| 8,584,522 B2 | 11/2013 | Acar et al. |
| 8,584,944 B2 | 11/2013 | White et al. |
| 8,585,476 B2 | 11/2013 | Mullen |
| 8,593,331 B2 | 11/2013 | Tsai et al. |
| 8,594,779 B2 | 11/2013 | Denison et al. |
| 8,600,830 B2 | 12/2013 | Hoffberg |
| 8,601,964 B2 | 12/2013 | Rohden |
| 8,602,350 B2 | 12/2013 | Inamori |
| 8,602,718 B2 | 12/2013 | Rokeby-Thomas |
| 8,608,167 B2 | 12/2013 | Raymond |
| 8,608,535 B2 | 12/2013 | Weston et al. |
| 8,608,598 B2 | 12/2013 | Hoang |
| 8,612,617 B2 | 12/2013 | Yaqoob et al. |
| 8,618,690 B2 | 12/2013 | Seifert |
| 8,620,239 B2 | 12/2013 | Harrat et al. |
| 8,625,496 B2 | 1/2014 | Brownrigg et al. |
| 8,626,472 B2 | 1/2014 | Solinsky |
| 8,628,333 B2 | 1/2014 | Prinzel, III et al. |
| 8,628,453 B2 | 1/2014 | Balakrishnan et al. |
| 8,629,789 B2 | 1/2014 | Hoffberg |
| 8,629,836 B2 | 1/2014 | Liberty |
| 8,630,761 B2 | 1/2014 | Severinsky et al. |
| 8,630,795 B2 | 1/2014 | Breed et al. |
| 8,638,217 B2 | 1/2014 | Arms et al. |
| 8,644,165 B2 | 2/2014 | Saarimaki et al. |
| 8,644,692 B2 | 2/2014 | Bedingfield et al. |
| 8,655,307 B1 | 2/2014 | Walker et al. |
| 8,656,630 B2 | 2/2014 | Sammut |
| 8,657,351 B2 | 2/2014 | Johnson |
| 8,661,500 B2 | 2/2014 | Boldyrev et al. |
| 8,668,604 B2 | 3/2014 | Stemle |
| 8,678,873 B2 | 3/2014 | Lang et al. |
| 8,682,726 B2 | 3/2014 | Hoffberg |
| 8,683,065 B2 | 3/2014 | Dickens et al. |
| 8,686,579 B2 | 4/2014 | Barney et al. |
| 8,688,403 B2 | 4/2014 | Oka et al. |
| 8,689,426 B2 | 4/2014 | Thalmayr et al. |
| 8,693,653 B1 | 4/2014 | Mullen |
| 8,702,515 B2 | 4/2014 | Weston et al. |
| 8,707,216 B2 | 4/2014 | Wilson |
| 8,707,608 B2 | 4/2014 | Sammut et al. |
| 8,708,821 B2 | 4/2014 | Barney et al. |
| 8,708,824 B2 | 4/2014 | Ohta et al. |
| 8,711,094 B2 | 4/2014 | Barney et al. |
| 8,714,389 B2 | 5/2014 | Rothschild et al. |

(56) References Cited

U.S. PATENT DOCUMENTS

| | | |
|---|---|---|
| 8,718,837 B2 | 5/2014 | Wang et al. |
| 8,721,520 B2 | 5/2014 | Caira et al. |
| 8,727,265 B2 | 5/2014 | Altmikus et al. |
| 8,738,944 B2 | 5/2014 | Addepalli et al. |
| 8,746,162 B2 | 6/2014 | Holohan et al. |
| 8,747,241 B2 | 6/2014 | Molinari |
| 8,750,897 B2 | 6/2014 | Czompo |
| 8,751,063 B2 | 6/2014 | Bernstein et al. |
| 8,756,010 B2 | 6/2014 | Gupta et al. |
| 8,756,173 B2 | 6/2014 | Hunzinger et al. |
| 8,758,136 B2 | 6/2014 | Briggs et al. |
| 8,768,865 B2 | 7/2014 | Narayanan et al. |
| 8,770,586 B2 | 7/2014 | Kody et al. |
| 8,771,148 B2 | 7/2014 | Balakrishnan et al. |
| 8,776,705 B2 | 7/2014 | Poulsen |
| 8,777,785 B2 | 7/2014 | Martino |
| 8,781,595 B2 | 7/2014 | Grevious et al. |
| 8,781,669 B1 | 7/2014 | Teller et al. |
| 8,784,268 B2 | 7/2014 | Molyneux et al. |
| 8,787,246 B2 | 7/2014 | Brownrigg |
| 8,790,180 B2 | 7/2014 | Barney et al. |
| 8,795,022 B2 | 8/2014 | Lipman et al. |
| 8,797,167 B2 | 8/2014 | Bangera et al. |
| 8,801,359 B2 | 8/2014 | Sherrer |
| 8,803,089 B2 | 8/2014 | Walerow et al. |
| 8,808,100 B2 | 8/2014 | Publicover et al. |
| 8,808,119 B1 | 8/2014 | Dubuisson |
| 8,812,654 B2 | 8/2014 | Gelvin et al. |
| 8,814,688 B2 | 8/2014 | Barney et al. |
| 8,814,691 B2 | 8/2014 | Haddick et al. |
| 8,816,536 B2 | 8/2014 | Borke et al. |
| 8,820,782 B2 | 9/2014 | Breed et al. |
| 8,821,293 B2 | 9/2014 | Hall |
| 8,822,924 B2 | 9/2014 | Valentino et al. |
| 8,827,761 B2 | 9/2014 | Lipman et al. |
| 8,827,810 B2 | 9/2014 | Weston et al. |
| 8,827,845 B1 | 9/2014 | Griffin |
| 8,831,205 B1 | 9/2014 | Wu et al. |
| 8,832,244 B2 | 9/2014 | Gelvin et al. |
| 8,833,607 B2 | 9/2014 | Wegelin et al. |
| 8,834,271 B2 | 9/2014 | Ikeda |
| 8,836,503 B2 | 9/2014 | Gelvin et al. |
| 8,843,279 B2 | 9/2014 | Tafazoli Bilandi et al. |
| 8,845,557 B1 | 9/2014 | Giuffrida et al. |
| 8,847,137 B2 | 9/2014 | Kennedy |
| 8,849,697 B2 | 9/2014 | Tropper et al. |
| 8,855,838 B2 | 10/2014 | Berthier |
| 8,860,409 B2 | 10/2014 | Seeger et al. |
| 8,870,655 B2 | 10/2014 | Ikeda |
| 8,874,129 B2 | 10/2014 | Forutanpour et al. |
| 8,874,477 B2 | 10/2014 | Hoffberg |
| 8,874,747 B2 | 10/2014 | Boldyrev et al. |
| D717,570 S | 11/2014 | Cornacchia |
| 8,875,643 B2 | 11/2014 | Rohden |
| 8,878,528 B2 | 11/2014 | Quevy |
| 8,878,673 B2 | 11/2014 | Grant et al. |
| 8,880,296 B2 | 11/2014 | Breed |
| 8,880,378 B2 | 11/2014 | Cook et al. |
| 8,884,455 B2 | 11/2014 | Reimer et al. |
| 8,885,979 B2 | 11/2014 | Machitani et al. |
| 8,888,576 B2 | 11/2014 | Briggs et al. |
| 8,892,185 B2 | 11/2014 | Chi Sing et al. |
| 8,892,271 B2 | 11/2014 | Breed |
| 8,892,495 B2 | 11/2014 | Hoffberg et al. |
| 8,893,785 B2 | 11/2014 | Skinner et al. |
| 8,893,971 B1 | 11/2014 | Sammut et al. |
| 8,896,301 B2 | 11/2014 | Oka et al. |
| 8,899,513 B1 | 12/2014 | Jameson et al. |
| 8,904,181 B1 | 12/2014 | Felsher et al. |
| 8,905,307 B2 | 12/2014 | Sammut et al. |
| 8,905,800 B2 | 12/2014 | Dusablon |
| 8,908,922 B2 | 12/2014 | Marty et al. |
| 8,909,543 B2 | 12/2014 | Tropper et al. |
| 8,912,892 B2 | 12/2014 | Davoodi et al. |
| 8,913,011 B2 | 12/2014 | Barney et al. |
| 8,915,785 B2 | 12/2014 | Barney et al. |
| 8,920,267 B2 | 12/2014 | Gable |
| 8,920,287 B2 | 12/2014 | Doshi et al. |
| 8,923,186 B1 | 12/2014 | daCosta |
| 8,924,248 B2 | 12/2014 | Tropper et al. |
| 8,924,249 B2 | 12/2014 | Tropper et al. |
| 8,924,587 B2 | 12/2014 | Petite |
| 8,924,588 B2 | 12/2014 | Petite |
| 8,930,300 B2 | 1/2015 | Grokop et al. |
| 8,930,571 B2 | 1/2015 | Petite |
| 8,931,144 B2 | 1/2015 | Freeman et al. |
| 8,932,092 B1 | 1/2015 | Sadowski |
| 8,938,612 B1 | 1/2015 | Mittal |
| 8,939,708 B2 | 1/2015 | Gorlov |
| 8,942,301 B2 | 1/2015 | Hui et al. |
| 8,946,923 B2 | 2/2015 | Steel |
| 8,947,081 B2 | 2/2015 | Seeger et al. |
| 8,948,442 B2 | 2/2015 | Breed et al. |
| 8,948,457 B2 | 2/2015 | Marty et al. |
| 8,951,123 B2 | 2/2015 | Waugaman et al. |
| 8,954,290 B2 | 2/2015 | Yuen et al. |
| 8,954,292 B2 | 2/2015 | Troxler |
| 8,957,783 B2 | 2/2015 | Aguilar et al. |
| 8,959,824 B2 | 2/2015 | Sammut et al. |
| 8,960,113 B2 | 2/2015 | Levander et al. |
| 8,961,260 B2 | 2/2015 | Weston |
| 8,961,312 B2 | 2/2015 | Barney et al. |
| 8,962,308 B2 | 2/2015 | Wilson et al. |
| 8,963,845 B2 | 2/2015 | Alameh et al. |
| 8,964,298 B2 | 2/2015 | Haddick et al. |
| 8,965,579 B2 | 2/2015 | Wang et al. |
| 8,965,587 B2 | 2/2015 | Modi et al. |
| 8,965,677 B2 | 2/2015 | Breed et al. |
| 8,966,377 B2 | 2/2015 | Tarkoma |
| 8,966,806 B2 | 3/2015 | Sammut et al. |
| 8,968,195 B2 | 3/2015 | Tran |
| 8,969,101 B1 | 3/2015 | Wan et al. |
| 8,971,274 B1 | 3/2015 | Teller et al. |
| 8,971,519 B1 | 3/2015 | Hoffberg |
| 8,972,053 B2 | 3/2015 | Bruemmer et al. |
| 8,974,386 B2 | 3/2015 | Peyser et al. |
| 8,977,494 B2 | 3/2015 | Gupta et al. |
| 8,980,198 B2 | 3/2015 | Srinivasan et al. |
| 8,982,105 B2 | 3/2015 | Frisbee |
| 8,982,856 B2 | 3/2015 | Brownrigg |
| 8,991,702 B1 | 3/2015 | Sammut et al. |
| 8,996,320 B2 | 3/2015 | Gwynn et al. |
| 8,997,564 B2 | 4/2015 | Nasiri et al. |
| 8,997,725 B2 | 4/2015 | McAlister |
| 8,998,894 B2 | 4/2015 | Mauch et al. |
| 9,002,583 B2 | 4/2015 | Gruener et al. |
| 9,004,973 B2 | 4/2015 | Condon et al. |
| 9,005,055 B2 | 4/2015 | Gonzalez |
| 9,007,178 B2 | 4/2015 | Nikitin et al. |
| 9,009,810 B2 | 4/2015 | Grigoriev et al. |
| 9,010,002 B2 | 4/2015 | Popa-Simil |
| 9,011,248 B2 | 4/2015 | Ikeda et al. |
| 9,011,250 B2 | 4/2015 | Condon et al. |
| 9,011,329 B2 | 4/2015 | Ferren et al. |
| 9,011,331 B2 | 4/2015 | Say et al. |
| 9,011,332 B2 | 4/2015 | Heller et al. |
| 9,013,144 B2 | 4/2015 | Cooley et al. |
| 9,014,773 B2 | 4/2015 | Say et al. |
| 9,020,191 B2 | 4/2015 | Gupta et al. |
| 9,021,880 B2 | 5/2015 | Stephanou et al. |
| 9,027,490 B2 | 5/2015 | Winkler |
| 9,028,405 B2 | 5/2015 | Tran |
| 9,030,321 B2 | 5/2015 | Breed |
| 9,030,437 B2 | 5/2015 | Uzelac et al. |
| 9,031,568 B2 | 5/2015 | Karaoguz et al. |
| 9,031,573 B2 | 5/2015 | Khorashadi et al. |
| 9,032,796 B2 | 5/2015 | Stephanou et al. |
| 9,032,890 B2 | 5/2015 | Winkler |
| 9,033,116 B2 | 5/2015 | Breed |
| 9,035,777 B2 | 5/2015 | Bangera et al. |
| 9,037,087 B2 | 5/2015 | Holman et al. |
| 9,037,455 B1 | 5/2015 | Faaborg et al. |
| 9,037,578 B2 | 5/2015 | Brust et al. |
| 9,037,600 B1 | 5/2015 | Garrigues et al. |

(56) References Cited

U.S. PATENT DOCUMENTS

| | | |
|---|---|---|
| 9,038,197 B2 | 5/2015 | Boldyrev et al. |
| 9,039,533 B2 | 5/2015 | Barney et al. |
| 9,042,953 B2 | 5/2015 | Say et al. |
| 9,044,209 B2 | 6/2015 | Dayton et al. |
| 9,044,671 B2 | 6/2015 | Ikeda |
| 9,045,927 B1 | 6/2015 | Hoffberg |
| 9,046,455 B2 | 6/2015 | Wilson et al. |
| 9,050,972 B2 | 6/2015 | Severinsky et al. |
| 9,052,276 B2 | 6/2015 | Matsiev et al. |
| 9,053,516 B2 | 6/2015 | Stempora |
| 9,053,562 B1 | 6/2015 | Rabin et al. |
| 9,056,676 B1 | 6/2015 | Wang |
| 9,057,361 B2 | 6/2015 | Donelan et al. |
| 9,060,683 B2 | 6/2015 | Tran |
| 9,063,165 B2 | 6/2015 | Valentino et al. |
| 9,066,694 B2 | 6/2015 | Say et al. |
| 9,066,695 B2 | 6/2015 | Say et al. |
| 9,066,697 B2 | 6/2015 | Peyser et al. |
| 9,068,794 B1 | 6/2015 | Sammut |
| 9,069,067 B2 | 6/2015 | Bangera et al. |
| 9,070,101 B2 | 6/2015 | Abhyanker |
| 9,072,477 B2 | 7/2015 | Say et al. |
| 9,073,532 B2 | 7/2015 | Pedersen et al. |
| 9,075,146 B1 | 7/2015 | Valentino et al. |
| 9,078,607 B2 | 7/2015 | Heller et al. |
| 9,079,311 B2 | 7/2015 | Wang et al. |
| 9,081,885 B2 | 7/2015 | Bangera et al. |
| 9,086,782 B2 | 7/2015 | Sasaki et al. |
| 9,089,760 B2 | 7/2015 | Tropper et al. |
| 9,090,339 B2 | 7/2015 | Arms et al. |
| 9,095,072 B2 | 7/2015 | Bryzek et al. |
| 9,097,662 B2 | 8/2015 | Pollack et al. |
| 9,097,890 B2 | 8/2015 | Miller et al. |
| 9,097,891 B2 | 8/2015 | Border et al. |
| 9,102,220 B2 | 8/2015 | Breed |
| 9,102,407 B2 | 8/2015 | Greenyer |
| 9,103,920 B2 | 8/2015 | Valentino et al. |
| 9,105,025 B2 | 8/2015 | Poole et al. |
| 9,105,281 B2 | 8/2015 | Kadlec |
| 9,106,286 B2 | 8/2015 | Agee et al. |
| 9,107,586 B2 | 8/2015 | Tran |
| 9,108,060 B2 | 8/2015 | Kilgore et al. |
| 9,114,838 B2 | 8/2015 | Bernstein et al. |
| 9,115,989 B2 | 8/2015 | Valentino et al. |
| 9,117,318 B2 | 8/2015 | Ricci |
| 9,117,447 B2 | 8/2015 | Gruber et al. |
| 9,121,217 B1 | 9/2015 | Hoffberg |
| 9,122,307 B2 | 9/2015 | Jacobsen et al. |
| 9,122,966 B2 | 9/2015 | Glaser |
| 9,127,908 B2 | 9/2015 | Miralles |
| 9,127,910 B2 | 9/2015 | Volfson |
| 9,128,281 B2 | 9/2015 | Osterhout et al. |
| 9,129,295 B2 | 9/2015 | Border et al. |
| 9,130,651 B2 | 9/2015 | Tabe |
| 9,132,352 B1 | 9/2015 | Rabin et al. |
| 9,134,464 B2 | 9/2015 | Feng et al. |
| 9,134,534 B2 | 9/2015 | Border et al. |
| 9,134,552 B2 | 9/2015 | Ni Chleirigh et al. |
| 9,137,397 B2 | 9/2015 | Silverbrook |
| 9,139,865 B2 | 9/2015 | Pollack et al. |
| 9,140,444 B2 | 9/2015 | Connor |
| 9,140,715 B2 | 9/2015 | Wilson et al. |
| 9,143,392 B2 | 9/2015 | Duchesneau |
| 9,146,147 B1 | 9/2015 | Bakhsh |
| 9,148,530 B2 | 9/2015 | Silverbrook |
| RE45,775 E | 10/2015 | Agee et al. |
| D740,892 S | 10/2015 | Chen |
| 9,149,695 B2 | 10/2015 | Evans |
| 9,149,717 B2 | 10/2015 | Barney et al. |
| 9,150,263 B2 | 10/2015 | Bernstein et al. |
| 9,151,633 B2 | 10/2015 | Hoffberg |
| 9,155,168 B2 | 10/2015 | Araujo et al. |
| 9,157,736 B2 | 10/2015 | Oka et al. |
| 9,161,303 B2 | 10/2015 | Maguire |
| 9,162,027 B2 | 10/2015 | Kamen et al. |
| 9,162,120 B2 | 10/2015 | Jertson et al. |
| 9,162,148 B2 | 10/2015 | Barney et al. |
| 9,166,845 B2 | 10/2015 | Hui et al. |
| 9,166,953 B2 | 10/2015 | Luukkala et al. |
| 9,168,656 B1 | 10/2015 | Wang et al. |
| 9,170,070 B2 | 10/2015 | Sharpin et al. |
| 9,170,074 B2 | 10/2015 | Beckman |
| 9,170,288 B2 | 10/2015 | O'Brien et al. |
| 9,172,551 B2 | 10/2015 | Dickens et al. |
| RE45,807 E | 11/2015 | Agee et al. |
| 9,173,600 B2 | 11/2015 | Matsiev et al. |
| 9,173,837 B2 | 11/2015 | Hillis et al. |
| 9,174,508 B2 | 11/2015 | Anderson et al. |
| 9,174,733 B1 | 11/2015 | Burgess et al. |
| 9,176,500 B1 | 11/2015 | Teller et al. |
| 9,176,924 B2 | 11/2015 | Ricci |
| 9,177,476 B2 | 11/2015 | Breed |
| 9,179,020 B2 | 11/2015 | Silverbrook |
| 9,182,596 B2 | 11/2015 | Border et al. |
| 9,185,246 B2 | 11/2015 | Silverbrook |
| 9,186,096 B2 | 11/2015 | Solinsky |
| 9,186,098 B2 | 11/2015 | Lee et al. |
| 9,186,567 B2 | 11/2015 | Molyneux et al. |
| 9,186,585 B2 | 11/2015 | Briggs et al. |
| 9,187,099 B2 | 11/2015 | Powers et al. |
| 9,187,173 B2 | 11/2015 | Morris et al. |
| 9,192,815 B2 | 11/2015 | Molyneux et al. |
| 9,193,404 B2 | 11/2015 | Bernstein et al. |
| 9,197,173 B2 | 11/2015 | Denison et al. |
| 9,197,297 B2 | 11/2015 | Agee et al. |
| 9,197,736 B2 | 11/2015 | Davis et al. |
| 9,198,563 B2 | 12/2015 | Ferren et al. |
| 9,199,734 B2 | 12/2015 | Campolo et al. |
| 9,204,796 B2 | 12/2015 | Tran |
| 9,205,921 B1 | 12/2015 | Chubb |
| 9,206,309 B2 | 12/2015 | Appleby et al. |
| 9,208,676 B2 | 12/2015 | Fadell et al. |
| 9,209,871 B2 | 12/2015 | Agee et al. |
| 9,209,888 B2 | 12/2015 | Smith |
| 9,211,201 B2 | 12/2015 | Herr et al. |
| 9,211,811 B2 | 12/2015 | Breed |
| 9,211,920 B1 | 12/2015 | Bernstein et al. |
| 9,211,947 B2 | 12/2015 | Miralles |
| 9,215,322 B1 | 12/2015 | Wu et al. |
| 9,215,980 B2 | 12/2015 | Tran et al. |
| 9,215,992 B2 | 12/2015 | Donnay et al. |
| 9,216,249 B2 | 12/2015 | Smith et al. |
| 9,217,376 B2 | 12/2015 | Sweet et al. |
| 9,218,316 B2 | 12/2015 | Bernstein et al. |
| 9,218,364 B1 | 12/2015 | Garrigues et al. |
| 9,218,698 B2 | 12/2015 | Ricci |
| 9,219,832 B2 | 12/2015 | Silverbrook |
| 9,221,356 B2 | 12/2015 | Fernandez |
| 9,223,134 B2 | 12/2015 | Miller et al. |
| 9,225,782 B2 | 12/2015 | Addepalli et al. |
| 9,227,122 B2 | 1/2016 | Jakubowski |
| 9,227,138 B2 | 1/2016 | Ikeda |
| 9,229,227 B2 | 1/2016 | Border et al. |
| 9,233,623 B2 | 1/2016 | Fernandez |
| 9,233,645 B2 | 1/2016 | Schofield et al. |
| 9,235,241 B2 | 1/2016 | Newham et al. |
| 9,237,211 B2 | 1/2016 | Tabe |
| 9,237,244 B2 | 1/2016 | Silverbrook |
| 9,237,297 B1 | 1/2016 | Waddell et al. |
| 9,237,411 B2 | 1/2016 | Holman et al. |
| 9,238,142 B2 | 1/2016 | Heldman et al. |
| 9,239,951 B2 | 1/2016 | Hoffberg et al. |
| 9,240,018 B2 | 1/2016 | Ricci |
| 9,240,913 B2 | 1/2016 | Hui et al. |
| 9,242,572 B2 | 1/2016 | Fernandez |
| 9,243,282 B2 | 1/2016 | Pollack et al. |
| 9,245,569 B1 | 1/2016 | Kadlec |
| 9,246,554 B2 | 1/2016 | Maguire |
| 9,248,288 B2 | 2/2016 | Panken et al. |
| 9,248,343 B2 | 2/2016 | Molyneux et al. |
| 9,250,038 B2 | 2/2016 | Sammut et al. |
| 9,254,759 B1 | 2/2016 | Henderson et al. |
| 9,255,771 B2 | 2/2016 | Sammut et al. |
| 9,257,054 B2 | 2/2016 | Coza et al. |

(56) References Cited

U.S. PATENT DOCUMENTS

| | | |
|---|---|---|
| 9,261,289 B2 | 2/2016 | Ruff et al. |
| 9,261,978 B2 | 2/2016 | Liberty et al. |
| 9,264,552 B2 | 2/2016 | Kahn |
| 9,265,453 B2 | 2/2016 | Curry et al. |
| 9,265,991 B2 | 2/2016 | Hohteri |
| 9,266,178 B2 | 2/2016 | Eshleman et al. |
| 9,266,233 B2 | 2/2016 | Kornbluh et al. |
| 9,268,344 B2 | 2/2016 | Warren et al. |
| 9,269,022 B2 | 2/2016 | Rhoads et al. |
| RE45,905 E | 3/2016 | Ikeda et al. |
| 9,271,851 B2 | 3/2016 | Clausen et al. |
| 9,272,206 B2 | 3/2016 | Weston et al. |
| 9,272,782 B1 | 3/2016 | Freeman et al. |
| 9,273,666 B2 | 3/2016 | Kheirandish |
| 9,273,981 B1 | 3/2016 | Downey et al. |
| 9,274,132 B2 | 3/2016 | Wilson et al. |
| 9,280,205 B2 | 3/2016 | Rosenberg et al. |
| 9,280,717 B2 | 3/2016 | Polo |
| 9,283,468 B2 | 3/2016 | Prinzel, III et al. |
| 9,284,062 B2 | 3/2016 | Wang |
| 9,285,241 B2 | 3/2016 | Rogel et al. |
| 9,285,382 B2 | 3/2016 | Wilson et al. |
| 9,285,589 B2 | 3/2016 | Osterhout et al. |
| 9,286,726 B2 | 3/2016 | Balram et al. |
| 9,290,146 B2 | 3/2016 | Breed |
| 9,290,220 B2 | 3/2016 | Bernstein et al. |
| 9,292,102 B2 | 3/2016 | Nasiri et al. |
| 9,292,758 B2 | 3/2016 | Polo et al. |
| 9,297,358 B2 | 3/2016 | Rohden et al. |
| 9,298,282 B2 | 3/2016 | Liberty |
| 9,300,481 B2 | 3/2016 | Teller et al. |
| 9,301,085 B2 | 3/2016 | Parkinson et al. |
| 9,302,783 B2 | 4/2016 | Wang |
| 9,309,861 B1 | 4/2016 | Gaul et al. |
| 9,311,670 B2 | 4/2016 | Hoffberg |
| 9,329,597 B2 | 5/2016 | Stoschek et al. |
| 9,329,689 B2 | 5/2016 | Osterhout et al. |
| 9,335,123 B2 | 5/2016 | Sammut |
| 9,339,708 B2 | 5/2016 | Gonzalez |
| 9,341,843 B2 | 5/2016 | Border et al. |
| 9,346,527 B2 | 5/2016 | Holohan et al. |
| 9,351,060 B2 | 5/2016 | Wilker et al. |
| 9,352,209 B2 | 5/2016 | Tropper et al. |
| 9,352,216 B2 | 5/2016 | Mullen |
| 9,366,862 B2 | 6/2016 | Haddick et al. |
| 9,371,661 B2 | 6/2016 | Grace |
| 9,373,149 B2 | 6/2016 | Abhyanker |
| 9,376,168 B2 | 6/2016 | Rohden |
| 9,383,208 B2 | 7/2016 | Mohanty |
| 9,384,668 B2 | 7/2016 | Raptopoulos et al. |
| 9,389,612 B2 | 7/2016 | Bernstein et al. |
| 9,394,016 B2 | 7/2016 | Bernstein et al. |
| 9,394,043 B2 | 7/2016 | Riski et al. |
| 9,395,725 B2 | 7/2016 | Bernstein et al. |
| 9,403,060 B2 | 8/2016 | Molyneux et al. |
| 9,403,272 B2 | 8/2016 | Kornbluh et al. |
| 9,408,143 B2 | 8/2016 | Walker et al. |
| 9,408,477 B1 | 8/2016 | Robinson et al. |
| 9,409,643 B2 | 8/2016 | Mores et al. |
| 9,415,263 B2 | 8/2016 | DeCarlo |
| 9,419,951 B1 | 8/2016 | Felsher et al. |
| 9,421,448 B2 | 8/2016 | Tropper et al. |
| 9,426,430 B2 | 8/2016 | Aguilar et al. |
| 9,427,624 B2 | 8/2016 | Molyneux et al. |
| 9,427,864 B2 | 8/2016 | Kornbluh et al. |
| 9,429,653 B2 | 8/2016 | Volfson |
| 9,429,940 B2 | 8/2016 | Bernstein et al. |
| 9,437,088 B2 | 9/2016 | Phillips et al. |
| 9,448,043 B2 | 9/2016 | Roberts |
| 9,451,020 B2 | 9/2016 | Liu et al. |
| 9,452,287 B2 | 9/2016 | Rosenbluth et al. |
| 9,452,319 B2 | 9/2016 | Molyneux et al. |
| 9,452,685 B2 | 9/2016 | Hyde et al. |
| 9,456,086 B1 | 9/2016 | Wu et al. |
| 9,457,730 B2 | 10/2016 | Bernstein et al. |
| 9,457,915 B2 | 10/2016 | Wang |
| 9,459,077 B2 | 10/2016 | Sammut et al. |
| 9,464,873 B2 | 10/2016 | Orlev et al. |
| 9,468,272 B1 | 10/2016 | Hyde et al. |
| 9,478,063 B2 | 10/2016 | Rhoads et al. |
| 9,479,697 B2 | 10/2016 | Aguilar et al. |
| 9,481,410 B2 | 11/2016 | Bernstein et al. |
| 9,483,876 B2 | 11/2016 | Polo et al. |
| 9,498,689 B2 | 11/2016 | Publicover et al. |
| 9,500,444 B2 | 11/2016 | Sammut et al. |
| 9,511,260 B2 | 12/2016 | Molyneux et al. |
| 9,512,816 B2 | 12/2016 | Ferguson |
| 9,514,604 B1 | 12/2016 | Cioe |
| 9,519,750 B2 | 12/2016 | Balakrishnan et al. |
| 9,525,438 B2 | 12/2016 | Smith |
| 9,527,557 B2 | 12/2016 | Koop et al. |
| 9,535,563 B2 | 1/2017 | Hoffberg et al. |
| 9,540,087 B2 | 1/2017 | Winkler |
| 9,545,542 B2 | 1/2017 | Binder |
| 9,550,582 B2 | 1/2017 | Wang |
| 9,551,582 B2 | 1/2017 | Hoffberg |
| 9,552,708 B2 | 1/2017 | Grant et al. |
| 9,555,292 B2 | 1/2017 | Binder |
| 9,560,725 B2 | 1/2017 | Wilson |
| RE46,310 E | 2/2017 | Hoffberg et al. |
| 9,573,035 B2 | 2/2017 | DeCarlo |
| 9,574,850 B2 | 2/2017 | Sammut et al. |
| 9,576,475 B2 | 2/2017 | Bardin et al. |
| 9,579,552 B2 | 2/2017 | Martin et al. |
| 9,582,034 B2 | 2/2017 | Von Badinski et al. |
| 9,582,072 B2 | 2/2017 | Connor |
| 9,589,446 B1 | 3/2017 | Dey et al. |
| 9,591,902 B1 | 3/2017 | Hyde et al. |
| 9,592,428 B2 | 3/2017 | Binder |
| 9,600,645 B2 | 3/2017 | Fadell et al. |
| 9,615,264 B2 | 4/2017 | Hoffberg |
| 9,630,062 B2 | 4/2017 | Binder |
| 9,630,076 B2 | 4/2017 | Evans |
| 9,635,177 B2 | 4/2017 | Hoffberg |
| 9,642,415 B2 | 5/2017 | Pease et al. |
| 9,645,580 B2 | 5/2017 | Pedersen et al. |
| 9,648,452 B1 | 5/2017 | Cronin |
| 9,653,637 B2 | 5/2017 | Lee et al. |
| 9,656,732 B2 | 5/2017 | Samelian |
| 9,687,698 B2 | 6/2017 | Hollinger |
| 9,692,949 B2 | 6/2017 | Hollinger |
| 9,697,617 B2 | 7/2017 | Marty et al. |
| 9,726,447 B2 | 8/2017 | Fridman et al. |
| 9,727,042 B2 | 8/2017 | Hoffberg-Borghesani et al. |
| 9,736,308 B1 | 8/2017 | Wu et al. |
| 9,744,448 B2 | 8/2017 | Mullen |
| 9,757,624 B2 | 9/2017 | Binder |
| 9,764,201 B2 | 9/2017 | Binder |
| 9,766,620 B2 | 9/2017 | Bernstein et al. |
| D800,557 S | 10/2017 | Nestor |
| 9,782,636 B2 | 10/2017 | Martino |
| 9,782,637 B2 | 10/2017 | Binder |
| 9,794,797 B2 | 10/2017 | Hoffberg |
| 9,795,868 B2 | 10/2017 | Miller |
| 9,795,882 B1 | 10/2017 | Rabin et al. |
| 9,802,083 B2 | 10/2017 | Martino |
| 9,804,672 B2 | 10/2017 | Anderson et al. |
| 9,807,239 B1 | 10/2017 | Wu et al. |
| 9,808,678 B2 | 11/2017 | Binder |
| 9,811,094 B2 | 11/2017 | Tsai |
| 9,818,136 B1 | 11/2017 | Hoffberg |
| 9,827,487 B2 | 11/2017 | Polo et al. |
| 9,829,882 B2 | 11/2017 | MacGregor et al. |
| 9,841,758 B2 | 12/2017 | Bernstein et al. |
| 9,855,510 B2 | 1/2018 | Tarng et al. |
| 9,860,391 B1 | 1/2018 | Wu et al. |
| 9,868,034 B2 | 1/2018 | Binder |
| 9,873,063 B2 | 1/2018 | Parsley |
| 9,878,214 B2 | 1/2018 | Binder |
| 9,878,228 B2 | 1/2018 | Binder |
| 9,886,032 B2 | 2/2018 | Bernstein et al. |
| 9,904,292 B2 | 2/2018 | Pedersen et al. |
| 9,914,069 B2 | 3/2018 | Lehman et al. |
| 9,915,726 B2 | 3/2018 | Bailey et al. |

(56) References Cited

U.S. PATENT DOCUMENTS

| | | |
|---|---|---|
| 9,970,732 B2 | 5/2018 | Mellen |
| 9,993,694 B1 | 6/2018 | Warren |
| 9,993,738 B2 | 6/2018 | Christiansen |
| 10,010,750 B2 | 7/2018 | Tropper et al. |
| 10,096,033 B2 | 10/2018 | Heath |
| 10,099,104 B2 | 10/2018 | Marcin et al. |
| 10,112,076 B2 | 10/2018 | DeCarlo |
| 10,118,696 B1* | 11/2018 | Hoffberg .............. B64C 39/001 |
| 10,127,563 B2 | 11/2018 | Heath |
| 10,127,564 B2 | 11/2018 | Heath |
| 10,129,211 B2 | 11/2018 | Heath |
| 10,150,014 B2 | 12/2018 | Warren |
| 10,302,007 B2 | 5/2019 | Erdel |
| 11,230,375 B1* | 1/2022 | Hoffberg ................ B64C 21/00 |
| 11,712,637 B1* | 8/2023 | Hoffberg ................ F42B 10/64 |
| | | 701/2 |
| 2001/0000170 A1 | 4/2001 | Doolen |
| 2001/0020665 A1 | 9/2001 | Hayes |
| 2001/0021617 A1 | 9/2001 | Brasier |
| 2001/0021669 A1 | 9/2001 | Gabai et al. |
| 2001/0024923 A1 | 9/2001 | Streit |
| 2001/0033057 A1 | 10/2001 | Chittenden |
| 2001/0033790 A1 | 10/2001 | Hickey |
| 2001/0039221 A1 | 11/2001 | Schneider |
| 2001/0039230 A1 | 11/2001 | Severinsky et al. |
| 2001/0044685 A1 | 11/2001 | Schubert |
| 2001/0049249 A1 | 12/2001 | Tachau et al. |
| 2001/0051488 A1 | 12/2001 | Tachau et al. |
| 2001/0056544 A1 | 12/2001 | Walker |
| 2002/0005297 A1 | 1/2002 | Alft et al. |
| 2002/0005614 A1 | 1/2002 | Krull et al. |
| 2002/0017759 A1 | 2/2002 | McClung, III et al. |
| 2002/0020561 A1 | 2/2002 | Alft et al. |
| 2002/0049096 A1 | 4/2002 | Doolen |
| 2002/0067990 A1 | 6/2002 | Mnatsakanian |
| 2002/0077906 A1 | 6/2002 | Remler |
| 2002/0079405 A1 | 6/2002 | Layukallo |
| 2002/0092693 A1 | 7/2002 | Breed |
| 2002/0093180 A1 | 7/2002 | Breed |
| 2002/0100040 A1 | 7/2002 | Bull |
| 2002/0104921 A1 | 8/2002 | Louvel |
| 2002/0105966 A1 | 8/2002 | Patel et al. |
| 2002/0106966 A1 | 8/2002 | Jimenez et al. |
| 2002/0115508 A1 | 8/2002 | Bourdages |
| 2002/0116652 A1 | 8/2002 | Chen |
| 2002/0118147 A1 | 8/2002 | Solomon |
| 2002/0124452 A1 | 9/2002 | Sammut |
| 2002/0139030 A1 | 10/2002 | Smith |
| 2002/0142699 A1 | 10/2002 | Davis |
| 2002/0142701 A1 | 10/2002 | Rosenberg |
| 2002/0154029 A1 | 10/2002 | Watters et al. |
| 2002/0163132 A1 | 11/2002 | Searles et al. |
| 2002/0166710 A1 | 11/2002 | Breed |
| 2002/0179777 A1 | 12/2002 | Al-Garni et al. |
| 2002/0180154 A1 | 12/2002 | Sabbagh |
| 2002/0189612 A1 | 12/2002 | Rand |
| 2002/0190230 A1 | 12/2002 | Dworkowski et al. |
| 2002/0193914 A1 | 12/2002 | Talbert et al. |
| 2002/0194988 A1 | 12/2002 | Betting et al. |
| 2002/0198632 A1 | 12/2002 | Breed et al. |
| 2003/0000524 A1 | 1/2003 | Anderson et al. |
| 2003/0005926 A1 | 1/2003 | Jones et al. |
| 2003/0010190 A1 | 1/2003 | Sammut et al. |
| 2003/0027672 A1 | 2/2003 | Leal et al. |
| 2003/0045200 A1 | 3/2003 | Tarng et al. |
| 2003/0056983 A1 | 3/2003 | Alft et al. |
| 2003/0079744 A1 | 5/2003 | Bonney et al. |
| 2003/0096554 A1 | 5/2003 | Persall |
| 2003/0096663 A1 | 5/2003 | Kasashima et al. |
| 2003/0100391 A1 | 5/2003 | Kessler |
| 2003/0111268 A1 | 6/2003 | Alft et al. |
| 2003/0111575 A1 | 6/2003 | Rehkemper et al. |
| 2003/0122390 A1 | 7/2003 | Slauf |
| 2003/0145724 A1 | 8/2003 | Betting et al. |
| 2003/0149803 A1 | 8/2003 | Wilson |
| 2003/0184013 A1 | 10/2003 | Chodosh |
| 2003/0190968 A1 | 10/2003 | Kasashima |
| 2003/0191568 A1 | 10/2003 | Breed |
| 2003/0193572 A1 | 10/2003 | Wilson et al. |
| 2003/0194924 A1 | 10/2003 | Dusablon et al. |
| 2003/0199343 A1 | 10/2003 | Ilcisin et al. |
| 2003/0217876 A1 | 11/2003 | Severinsky et al. |
| 2003/0234914 A1 | 12/2003 | Solomon |
| 2004/0007818 A1 | 1/2004 | Newman |
| 2004/0008853 A1 | 1/2004 | Pelrine et al. |
| 2004/0009063 A1 | 1/2004 | Polacsek |
| 2004/0022070 A1 | 2/2004 | Moore |
| 2004/0025871 A1 | 2/2004 | Davies |
| 2004/0049324 A1 | 3/2004 | Walker |
| 2004/0061347 A1 | 4/2004 | Miller |
| 2004/0073360 A1 | 4/2004 | Foxlin |
| 2004/0077255 A1 | 4/2004 | Tarng et al. |
| 2004/0077975 A1 | 4/2004 | Zimmerman |
| 2004/0078662 A1 | 4/2004 | Hamel et al. |
| 2004/0094152 A1 | 5/2004 | Harvey et al. |
| 2004/0094662 A1 | 5/2004 | Sanders, Jr. et al. |
| 2004/0099676 A1 | 5/2004 | Anderson et al. |
| 2004/0113431 A1 | 6/2004 | Huang |
| 2004/0129478 A1 | 7/2004 | Breed et al. |
| 2004/0130442 A1 | 7/2004 | Breed et al. |
| 2004/0148057 A1 | 7/2004 | Breed et al. |
| 2004/0157687 A1 | 8/2004 | Bourdages |
| 2004/0162001 A1 | 8/2004 | Davis |
| 2004/0163289 A1 | 8/2004 | Pearson |
| 2004/0169485 A1 | 9/2004 | Clancy |
| 2004/0185972 A1 | 9/2004 | Baquero |
| 2004/0190374 A1 | 9/2004 | Alft et al. |
| 2004/0192473 A1 | 9/2004 | Kasashima et al. |
| 2004/0195436 A1 | 10/2004 | Sinclair |
| 2004/0209712 A1 | 10/2004 | Tarng et al. |
| 2004/0211250 A1 | 10/2004 | Adamson et al. |
| 2004/0214666 A1 | 10/2004 | Dilling |
| 2004/0220001 A1 | 11/2004 | Oister et al. |
| 2004/0231667 A1 | 11/2004 | Horton et al. |
| 2004/0235388 A1 | 11/2004 | Padilla |
| 2004/0244034 A1 | 12/2004 | Saltzek |
| 2004/0245376 A1 | 12/2004 | Muren |
| 2004/0256159 A1 | 12/2004 | Alft et al. |
| 2004/0263479 A1 | 12/2004 | Shkolnikov |
| 2005/0005495 A1 | 1/2005 | Smith |
| 2005/0005934 A1 | 1/2005 | Harvey |
| 2005/0017488 A1 | 1/2005 | Breed et al. |
| 2005/0021282 A1 | 1/2005 | Sammut et al. |
| 2005/0022806 A1 | 2/2005 | Beaumont et al. |
| 2005/0043674 A1 | 2/2005 | Blair et al. |
| 2005/0046584 A1 | 3/2005 | Breed |
| 2005/0048918 A1 | 3/2005 | Frost et al. |
| 2005/0049055 A1 | 3/2005 | Publicover et al. |
| 2005/0060069 A1 | 3/2005 | Breed et al. |
| 2005/0061707 A1 | 3/2005 | Naelitz-Thomas |
| 2005/0066961 A1 | 3/2005 | Rand |
| 2005/0076387 A1 | 4/2005 | Feldmeier |
| 2005/0076904 A1 | 4/2005 | Jones et al. |
| 2005/0082762 A1 | 4/2005 | David |
| 2005/0090177 A1 | 4/2005 | Moore |
| 2005/0091903 A1 | 5/2005 | Smith |
| 2005/0095072 A1 | 5/2005 | Gaiser et al. |
| 2005/0110277 A1 | 5/2005 | Adamson et al. |
| 2005/0110751 A1 | 5/2005 | Wilson et al. |
| 2005/0126997 A1 | 6/2005 | Langhans et al. |
| 2005/0134440 A1 | 6/2005 | Breed |
| 2005/0137786 A1 | 6/2005 | Breed et al. |
| 2005/0140212 A1 | 6/2005 | Hamel et al. |
| 2005/0145151 A1 | 7/2005 | Koop et al. |
| 2005/0151941 A1 | 7/2005 | Solomon |
| 2005/0154491 A1 | 7/2005 | Anderson et al. |
| 2005/0156883 A1 | 7/2005 | Wilson et al. |
| 2005/0161467 A1 | 7/2005 | Jones |
| 2005/0173153 A1 | 8/2005 | Alft et al. |
| 2005/0173589 A1 | 8/2005 | Davis |
| 2005/0192727 A1 | 9/2005 | Shostak et al. |
| 2005/0192852 A1 | 9/2005 | Sorensen |
| 2005/0195383 A1 | 9/2005 | Breed et al. |
| 2005/0200079 A1 | 9/2005 | Barber |

(56) References Cited

U.S. PATENT DOCUMENTS

| | | |
|---|---|---|
| 2005/0210727 A1 | 9/2005 | Smith |
| 2005/0210728 A1 | 9/2005 | Smith |
| 2005/0215210 A1 | 9/2005 | Walker et al. |
| 2005/0215764 A1 | 9/2005 | Tuszynski et al. |
| 2005/0232186 A1 | 10/2005 | Karaoguz et al. |
| 2005/0233672 A1 | 10/2005 | Shantz |
| 2005/0233749 A1 | 10/2005 | Karaoguz et al. |
| 2005/0247312 A1 | 11/2005 | Davies |
| 2005/0248136 A1 | 11/2005 | Breed et al. |
| 2005/0249667 A1 | 11/2005 | Tuszynski et al. |
| 2005/0251289 A1 | 11/2005 | Bonney et al. |
| 2005/0257173 A1 | 11/2005 | Wilson |
| 2005/0257174 A1 | 11/2005 | Wilson |
| 2005/0260548 A1 | 11/2005 | Nava |
| 2005/0260918 A1 | 11/2005 | LaPointe |
| 2005/0273218 A1 | 12/2005 | Breed et al. |
| 2005/0274378 A1 | 12/2005 | Bonney et al. |
| 2005/0278098 A1 | 12/2005 | Breed |
| 2006/0005449 A1 | 1/2006 | Smith |
| 2006/0010757 A1 | 1/2006 | Smith |
| 2006/0022083 A1 | 2/2006 | Sumpter et al. |
| 2006/0023117 A1 | 2/2006 | Feldmeier |
| 2006/0025149 A1 | 2/2006 | Karaoguz et al. |
| 2006/0025897 A1 | 2/2006 | Shostak et al. |
| 2006/0027404 A1 | 2/2006 | Foxlin |
| 2006/0027482 A1 | 2/2006 | Pearson |
| 2006/0035726 A1 | 2/2006 | Kasashima et al. |
| 2006/0049304 A1 | 3/2006 | Sanders et al. |
| 2006/0057549 A1 | 3/2006 | Prinzel et al. |
| 2006/0073758 A1 | 4/2006 | Goodwin et al. |
| 2006/0092630 A1 | 5/2006 | Kennedy et al. |
| 2006/0100057 A1 | 5/2006 | Severinsky et al. |
| 2006/0105838 A1 | 5/2006 | Mullen |
| 2006/0105865 A1 | 5/2006 | Bourdages |
| 2006/0116221 A1 | 6/2006 | Watanabe et al. |
| 2006/0124800 A1 | 6/2006 | Tehrani |
| 2006/0128504 A1 | 6/2006 | Watanabe et al. |
| 2006/0136498 A1 | 6/2006 | Insley |
| 2006/0144211 A1 | 7/2006 | Yoshimoto |
| 2006/0144994 A1 | 7/2006 | Spirov et al. |
| 2006/0147371 A1 | 7/2006 | Tuszynski et al. |
| 2006/0148377 A1 | 7/2006 | Stubenfoll |
| 2006/0158065 A1 | 7/2006 | Pelrine et al. |
| 2006/0160457 A1 | 7/2006 | Moore |
| 2006/0166589 A1 | 7/2006 | Moore |
| 2006/0167595 A1 | 7/2006 | Breed et al. |
| 2006/0167784 A1 | 7/2006 | Hoffberg |
| 2006/0169691 A1 | 8/2006 | Rothschild et al. |
| 2006/0170535 A1 | 8/2006 | Watters et al. |
| 2006/0178231 A1 | 8/2006 | Kasashima |
| 2006/0180371 A1 | 8/2006 | Breed et al. |
| 2006/0184336 A1 | 8/2006 | Kolen |
| 2006/0185899 A1 | 8/2006 | Alft et al. |
| 2006/0189386 A1* | 8/2006 | Rosenberg ............ A63F 13/12 463/37 |
| 2006/0196504 A1 | 9/2006 | Augustyn et al. |
| 2006/0199682 A1 | 9/2006 | Holms |
| 2006/0200253 A1 | 9/2006 | Hoffberg et al. |
| 2006/0200258 A1 | 9/2006 | Hoffberg et al. |
| 2006/0200259 A1 | 9/2006 | Hoffberg et al. |
| 2006/0200260 A1 | 9/2006 | Hoffberg et al. |
| 2006/0200314 A1 | 9/2006 | Ajioka et al. |
| 2006/0208169 A1 | 9/2006 | Breed et al. |
| 2006/0212193 A1 | 9/2006 | Breed |
| 2006/0212194 A1 | 9/2006 | Breed |
| 2006/0217864 A1 | 9/2006 | Johnson et al. |
| 2006/0229143 A1 | 10/2006 | Watanabe et al. |
| 2006/0231304 A1 | 10/2006 | Severinsky et al. |
| 2006/0231305 A1 | 10/2006 | Severinsky et al. |
| 2006/0231306 A1 | 10/2006 | Severinsky et al. |
| 2006/0231677 A1 | 10/2006 | Zimet et al. |
| 2006/0234596 A1 | 10/2006 | Arredondo |
| 2006/0237246 A1 | 10/2006 | Severinsky et al. |
| 2006/0237247 A1 | 10/2006 | Severinsky et al. |
| 2006/0251505 A1 | 11/2006 | Ferguson |
| 2006/0255281 A1 | 11/2006 | Lal et al. |
| 2006/0262120 A1 | 11/2006 | Rosenberg |
| 2006/0277466 A1 | 12/2006 | Anderson |
| 2006/0284839 A1 | 12/2006 | Breed et al. |
| 2006/0287137 A1 | 12/2006 | Chu |
| 2007/0005609 A1 | 1/2007 | Breed |
| 2007/0010342 A1 | 1/2007 | Sato et al. |
| 2007/0016476 A1 | 1/2007 | Hoffberg et al. |
| 2007/0017498 A1 | 1/2007 | Finstad |
| 2007/0021915 A1 | 1/2007 | Breed et al. |
| 2007/0027129 A1 | 2/2007 | Tuszynski et al. |
| 2007/0029272 A1 | 2/2007 | Wroten |
| 2007/0032318 A1 | 2/2007 | Nishimura et al. |
| 2007/0034738 A1 | 2/2007 | Sanders et al. |
| 2007/0035059 A1 | 2/2007 | Ruuttu |
| 2007/0038743 A1 | 2/2007 | Hellhake et al. |
| 2007/0044364 A1 | 3/2007 | Sammut et al. |
| 2007/0046029 A1 | 3/2007 | Murakami et al. |
| 2007/0046143 A1 | 3/2007 | Blandino et al. |
| 2007/0048137 A1 | 3/2007 | Hartman |
| 2007/0053513 A1 | 3/2007 | Hoffberg |
| 2007/0057781 A1 | 3/2007 | Breed |
| 2007/0060416 A1 | 3/2007 | Watanabe et al. |
| 2007/0061022 A1 | 3/2007 | Hoffberg-Borghesani et al. |
| 2007/0061023 A1 | 3/2007 | Hoffberg et al. |
| 2007/0061735 A1 | 3/2007 | Hoffberg et al. |
| 2007/0063875 A1 | 3/2007 | Hoffberg |
| 2007/0069064 A1 | 3/2007 | Mott |
| 2007/0070038 A1 | 3/2007 | Hoffberg et al. |
| 2007/0073482 A1 | 3/2007 | Churchill et al. |
| 2007/0075919 A1 | 4/2007 | Breed |
| 2007/0077857 A1 | 4/2007 | Wright |
| 2007/0085697 A1 | 4/2007 | Breed |
| 2007/0086624 A1 | 4/2007 | Breed et al. |
| 2007/0087756 A1 | 4/2007 | Hoffberg |
| 2007/0092549 A1 | 4/2007 | Tuszynski et al. |
| 2007/0096445 A1 | 5/2007 | Breed |
| 2007/0096446 A1 | 5/2007 | Breed |
| 2007/0100666 A1 | 5/2007 | Stivoric et al. |
| 2007/0109111 A1 | 5/2007 | Breed et al. |
| 2007/0116327 A1 | 5/2007 | Breed et al. |
| 2007/0120347 A1 | 5/2007 | Breed et al. |
| 2007/0123952 A1 | 5/2007 | Strother et al. |
| 2007/0125351 A1 | 6/2007 | Campo et al. |
| 2007/0132219 A1 | 6/2007 | Breed |
| 2007/0132220 A1 | 6/2007 | Breed et al. |
| 2007/0135247 A1 | 6/2007 | Huber |
| 2007/0135982 A1 | 6/2007 | Breed et al. |
| 2007/0144052 A1 | 6/2007 | Smith |
| 2007/0146325 A1 | 6/2007 | Poston et al. |
| 2007/0149496 A1 | 6/2007 | Tuszynski et al. |
| 2007/0152804 A1 | 7/2007 | Breed et al. |
| 2007/0154063 A1 | 7/2007 | Breed |
| 2007/0155263 A1 | 7/2007 | Cha |
| 2007/0155541 A1 | 7/2007 | Watanabe et al. |
| 2007/0155549 A1 | 7/2007 | Keker |
| 2007/0160472 A1 | 7/2007 | Jobmann et al. |
| 2007/0164150 A1 | 7/2007 | Van de Rostyne et al. |
| 2007/0164641 A1 | 7/2007 | Pelrine et al. |
| 2007/0174163 A1 | 7/2007 | Griffin |
| 2007/0180751 A1 | 8/2007 | Joannes |
| 2007/0182528 A1 | 8/2007 | Breed et al. |
| 2007/0187897 A1 | 8/2007 | Dilling |
| 2007/0193811 A1 | 8/2007 | Breed et al. |
| 2007/0197318 A1 | 8/2007 | Serrano |
| 2007/0205553 A1 | 9/2007 | Turley |
| 2007/0212973 A1 | 9/2007 | Brockes et al. |
| 2007/0213126 A1 | 9/2007 | Deutsch et al. |
| 2007/0218988 A1 | 9/2007 | Lucich |
| 2007/0219426 A1 | 9/2007 | Moore |
| 2007/0219744 A1 | 9/2007 | Kolen |
| 2007/0232412 A1 | 10/2007 | Watanabe et al. |
| 2007/0240903 A1 | 10/2007 | Alft et al. |
| 2007/0251749 A1 | 11/2007 | Breed et al. |
| 2007/0262574 A1 | 11/2007 | Breed et al. |
| 2007/0280505 A1 | 12/2007 | Breed |
| 2007/0282506 A1 | 12/2007 | Breed et al. |
| 2007/0296571 A1 | 12/2007 | Kolen |
| 2007/0298913 A1 | 12/2007 | Winn et al. |

(56) References Cited

U.S. PATENT DOCUMENTS

| | | |
|---|---|---|
| 2008/0004798 A1 | 1/2008 | Troxler et al. |
| 2008/0008588 A1 | 1/2008 | Hartman |
| 2008/0015771 A1 | 1/2008 | Breed et al. |
| 2008/0017193 A1 | 1/2008 | Jones et al. |
| 2008/0033581 A1 | 2/2008 | Doshi et al. |
| 2008/0036185 A1 | 2/2008 | Breed |
| 2008/0036252 A1 | 2/2008 | Breed |
| 2008/0036580 A1 | 2/2008 | Breed |
| 2008/0036617 A1 | 2/2008 | Arms et al. |
| 2008/0039246 A1 | 2/2008 | Martino |
| 2008/0039250 A1 | 2/2008 | Martino |
| 2008/0040004 A1 | 2/2008 | Breed |
| 2008/0040023 A1 | 2/2008 | Breed et al. |
| 2008/0040029 A1 | 2/2008 | Breed |
| 2008/0040749 A1 | 2/2008 | Hoffberg et al. |
| 2008/0042408 A1 | 2/2008 | Breed et al. |
| 2008/0042409 A1 | 2/2008 | Breed |
| 2008/0042815 A1 | 2/2008 | Breed et al. |
| 2008/0046150 A1 | 2/2008 | Breed |
| 2008/0046200 A1 | 2/2008 | Breed et al. |
| 2008/0047329 A1 | 2/2008 | Breed |
| 2008/0047770 A1 | 2/2008 | Breed et al. |
| 2008/0051957 A1 | 2/2008 | Breed et al. |
| 2008/0062677 A1 | 3/2008 | Konig et al. |
| 2008/0065182 A1 | 3/2008 | Strother et al. |
| 2008/0069403 A1 | 3/2008 | Breed |
| 2008/0086240 A1 | 4/2008 | Breed |
| 2008/0091309 A1 | 4/2008 | Walker |
| 2008/0093838 A1 | 4/2008 | Tropper et al. |
| 2008/0096654 A1 | 4/2008 | Mondesir et al. |
| 2008/0096657 A1 | 4/2008 | Benoist |
| 2008/0098640 A1 | 5/2008 | Sammut et al. |
| 2008/0104422 A1 | 5/2008 | Mullis et al. |
| 2008/0106436 A1 | 5/2008 | Breed |
| 2008/0110388 A1 | 5/2008 | Palladino |
| 2008/0111312 A1 | 5/2008 | Longo et al. |
| 2008/0114502 A1 | 5/2008 | Breed et al. |
| 2008/0116644 A1 | 5/2008 | Knoernschild |
| 2008/0116692 A1 | 5/2008 | Lagstrom et al. |
| 2008/0119421 A1 | 5/2008 | Tuszynski et al. |
| 2008/0119993 A1 | 5/2008 | Breed |
| 2008/0125001 A1 | 5/2008 | Barniak |
| 2008/0125002 A1 | 5/2008 | Goitein |
| 2008/0129475 A1 | 6/2008 | Breed et al. |
| 2008/0132361 A1 | 6/2008 | Barber |
| 2008/0133136 A1 | 6/2008 | Breed et al. |
| 2008/0140318 A1 | 6/2008 | Breed |
| 2008/0142060 A1 | 6/2008 | Orth et al. |
| 2008/0143085 A1 | 6/2008 | Breed et al. |
| 2008/0145224 A1 | 6/2008 | Mitchell et al. |
| 2008/0147253 A1 | 6/2008 | Breed |
| 2008/0148723 A1 | 6/2008 | Birkestrand |
| 2008/0150786 A1 | 6/2008 | Breed |
| 2008/0154495 A1 | 6/2008 | Breed |
| 2008/0154629 A1 | 6/2008 | Breed et al. |
| 2008/0154898 A1 | 6/2008 | Cheng et al. |
| 2008/0157940 A1 | 7/2008 | Breed et al. |
| 2008/0161986 A1 | 7/2008 | Breed |
| 2008/0161987 A1 | 7/2008 | Breed |
| 2008/0162036 A1 | 7/2008 | Breed |
| 2008/0165018 A1 | 7/2008 | Breed |
| 2008/0167535 A1 | 7/2008 | Stivoric et al. |
| 2008/0167819 A1 | 7/2008 | Breed |
| 2008/0167821 A1 | 7/2008 | Breed |
| 2008/0174281 A1 | 7/2008 | Shau |
| 2008/0176676 A1 | 7/2008 | Watanabe et al. |
| 2008/0181773 A1 | 7/2008 | Ferguson |
| 2008/0185785 A1 | 8/2008 | Sullivan |
| 2008/0189053 A1 | 8/2008 | Breed et al. |
| 2008/0192007 A1 | 8/2008 | Wilson |
| 2008/0192070 A1 | 8/2008 | Wilson |
| 2008/0195261 A1 | 8/2008 | Breed |
| 2008/0204410 A1 | 8/2008 | Wilson |
| 2008/0204411 A1 | 8/2008 | Wilson |
| 2008/0214068 A1 | 9/2008 | Stolper |
| 2008/0215202 A1 | 9/2008 | Breed |
| 2008/0215231 A1 | 9/2008 | Breed |
| 2008/0234899 A1 | 9/2008 | Breed et al. |
| 2008/0236275 A1 | 10/2008 | Breed et al. |
| 2008/0242415 A1 | 10/2008 | Ahmed |
| 2008/0248449 A1 | 10/2008 | Sammut |
| 2008/0250869 A1 | 10/2008 | Breed et al. |
| 2008/0252162 A1 | 10/2008 | Post |
| 2008/0259055 A1 | 10/2008 | Wilson |
| 2008/0262893 A1 | 10/2008 | Hoffberg |
| 2008/0274844 A1 | 11/2008 | Ward |
| 2008/0282817 A1 | 11/2008 | Breed |
| 2008/0290650 A1 | 11/2008 | Valkov |
| 2008/0293523 A1 | 11/2008 | Perry-Smith |
| 2008/0296157 A1 | 12/2008 | Bauer et al. |
| 2008/0296905 A1 | 12/2008 | Ferguson |
| 2008/0313575 A1 | 12/2008 | Wilson |
| 2009/0004628 A1 | 1/2009 | Knutson |
| 2009/0007661 A1 | 1/2009 | Nasiri et al. |
| 2009/0012741 A1 | 1/2009 | Hall et al. |
| 2009/0013983 A1 | 1/2009 | Polk et al. |
| 2009/0017714 A1 | 1/2009 | DeRennaux et al. |
| 2009/0020649 A1 | 1/2009 | Wingert |
| 2009/0029754 A1 | 1/2009 | Slocum et al. |
| 2009/0030605 A1 | 1/2009 | Breed |
| 2009/0031438 A1 | 1/2009 | Kennard et al. |
| 2009/0033034 A1 | 2/2009 | Jakubowski |
| 2009/0033540 A1 | 2/2009 | Breed et al. |
| 2009/0036235 A1 | 2/2009 | Watanabe et al. |
| 2009/0039207 A1 | 2/2009 | Van De Rostyne |
| 2009/0043506 A1 | 2/2009 | Breed |
| 2009/0047861 A1 | 2/2009 | Van de Rostyne et al. |
| 2009/0048750 A1 | 2/2009 | Breed |
| 2009/0058091 A1 | 3/2009 | Douglas |
| 2009/0061727 A1 | 3/2009 | Styles |
| 2009/0066065 A1 | 3/2009 | Breed et al. |
| 2009/0068018 A1 | 3/2009 | Corten |
| 2009/0082144 A1 | 3/2009 | Pacheco |
| 2009/0082691 A1 | 3/2009 | Denison et al. |
| 2009/0088266 A1 | 4/2009 | Mcinerney |
| 2009/0092284 A1 | 4/2009 | Breed et al. |
| 2009/0104836 A1 | 4/2009 | Van de Rostyne et al. |
| 2009/0115211 A1 | 5/2009 | Johnson |
| 2009/0119543 A1 | 5/2009 | Driessen |
| 2009/0121484 A1 | 5/2009 | Newman |
| 2009/0129929 A1 | 5/2009 | Bahadir |
| 2009/0134580 A1 | 5/2009 | Lessack |
| 2009/0134966 A1 | 5/2009 | Baker |
| 2009/0140887 A1 | 6/2009 | Breed et al. |
| 2009/0143175 A1 | 6/2009 | Tarng et al. |
| 2009/0143923 A1 | 6/2009 | Breed |
| 2009/0163110 A1 | 6/2009 | Van de Rostyne et al. |
| 2009/0164952 A1 | 6/2009 | Wilson |
| 2009/0169388 A1 | 7/2009 | Klimov et al. |
| 2009/0170639 A1 | 7/2009 | Wong |
| 2009/0171788 A1 | 7/2009 | Tropper et al. |
| 2009/0174192 A1 | 7/2009 | Newman |
| 2009/0177345 A1 | 7/2009 | Severinsky et al. |
| 2009/0183417 A1 | 7/2009 | Smith |
| 2009/0195497 A1 | 8/2009 | Fitzgerald et al. |
| 2009/0197658 A1 | 8/2009 | Polchin |
| 2009/0198354 A1 | 8/2009 | Wilson |
| 2009/0213519 A1 | 8/2009 | Bedingfield |
| 2009/0213520 A1 | 8/2009 | Bedingfield et al. |
| 2009/0213521 A1 | 8/2009 | Bedingfield |
| 2009/0217851 A1 | 9/2009 | Kind |
| 2009/0228157 A1 | 9/2009 | Breed |
| 2009/0235570 A1 | 9/2009 | Sammut et al. |
| 2009/0262074 A1 | 10/2009 | Nasiri et al. |
| 2009/0265974 A1 | 10/2009 | Joannes |
| 2009/0275262 A1 | 11/2009 | Wright |
| 2009/0278317 A1 | 11/2009 | Lima |
| 2009/0278353 A1 | 11/2009 | Da Costa Duarte Pardal et al. |
| 2009/0280931 A1 | 11/2009 | Barber |
| 2009/0291614 A1 | 11/2009 | Tu |
| 2009/0300551 A1 | 12/2009 | French et al. |
| 2009/0303204 A1 | 12/2009 | Nasiri et al. |
| 2009/0311924 A1 | 12/2009 | Wobben |
| 2010/0013160 A1 | 1/2010 | Tarng et al. |

(56) References Cited

U.S. PATENT DOCUMENTS

| | | |
|---|---|---|
| 2010/0013238 A1 | 1/2010 | Jessie et al. |
| 2010/0022157 A1 | 1/2010 | Van de Rostyne et al. |
| 2010/0032963 A1 | 2/2010 | Ferguson |
| 2010/0033142 A1 | 2/2010 | Roberts et al. |
| 2010/0034466 A1 | 2/2010 | Jing et al. |
| 2010/0038915 A1 | 2/2010 | Murakami |
| 2010/0040025 A1 | 2/2010 | Karaoguz et al. |
| 2010/0052945 A1 | 3/2010 | Breed |
| 2010/0057305 A1 | 3/2010 | Breed |
| 2010/0062847 A1 | 3/2010 | Moore et al. |
| 2010/0063774 A1 | 3/2010 | Cook et al. |
| 2010/0064983 A1 | 3/2010 | Ritchey et al. |
| 2010/0066093 A1 | 3/2010 | Meller |
| 2010/0066095 A1 | 3/2010 | Meller |
| 2010/0072190 A1 | 3/2010 | Crucs |
| 2010/0076642 A1 | 3/2010 | Hoffberg et al. |
| 2010/0079748 A1 | 4/2010 | Ryzhikov |
| 2010/0088532 A1 | 4/2010 | Pollock et al. |
| 2010/0117363 A1 | 5/2010 | Meller |
| 2010/0123605 A1 | 5/2010 | Wilson |
| 2010/0129193 A1 | 5/2010 | Sherrer |
| 2010/0130093 A1 | 5/2010 | Van de Rostyne et al. |
| 2010/0139738 A1 | 6/2010 | Lee et al. |
| 2010/0140873 A1 | 6/2010 | Britton et al. |
| 2010/0141609 A1 | 6/2010 | Frisbee |
| 2010/0142447 A1 | 6/2010 | Schlicht et al. |
| 2010/0142868 A1 | 6/2010 | Brown |
| 2010/0148940 A1 | 6/2010 | Gelvin et al. |
| 2010/0153175 A1 | 6/2010 | Pearson et al. |
| 2010/0153215 A1 | 6/2010 | Abraham |
| 2010/0156676 A1 | 6/2010 | Mooring et al. |
| 2010/0163573 A1 | 7/2010 | Wegelin et al. |
| 2010/0164711 A1 | 7/2010 | Arms et al. |
| 2010/0169009 A1 | 7/2010 | Breed et al. |
| 2010/0175575 A1 | 7/2010 | Amick |
| 2010/0186648 A1 | 7/2010 | Wobben et al. |
| 2010/0187829 A1 | 7/2010 | Douglas |
| 2010/0194573 A1 | 8/2010 | Hoover et al. |
| 2010/0198514 A1 | 8/2010 | Miralles |
| 2010/0201516 A1 | 8/2010 | Gelvin et al. |
| 2010/0204615 A1 | 8/2010 | Kyle et al. |
| 2010/0214216 A1 | 8/2010 | Nasiri et al. |
| 2010/0222802 A1 | 9/2010 | Gillespie, Jr. et al. |
| 2010/0225266 A1 | 9/2010 | Hartman |
| 2010/0226775 A1 | 9/2010 | Hartman |
| 2010/0235285 A1 | 9/2010 | Hoffberg |
| 2010/0253624 A1 | 10/2010 | Wilson |
| 2010/0254312 A1 | 10/2010 | Kennedy |
| 2010/0257251 A1 | 10/2010 | Mooring et al. |
| 2010/0259050 A1 | 10/2010 | Meller |
| 2010/0261526 A1 | 10/2010 | Anderson et al. |
| 2010/0267492 A1 | 10/2010 | McCracken |
| 2010/0269069 A1 | 10/2010 | Paila et al. |
| 2010/0279639 A1 | 11/2010 | Walker et al. |
| 2010/0279776 A1 | 11/2010 | Hall |
| 2010/0280751 A1 | 11/2010 | Breed |
| 2010/0281874 A1 | 11/2010 | Rice |
| 2010/0282918 A1 | 11/2010 | Martin |
| 2010/0283273 A1 | 11/2010 | Martinez |
| 2010/0298958 A1 | 11/2010 | Connelly |
| 2010/0299102 A1 | 11/2010 | Hall et al. |
| 2010/0299738 A1 | 11/2010 | Wahl |
| 2010/0315516 A1 | 12/2010 | Silverbrook et al. |
| 2010/0317420 A1 | 12/2010 | Hoffberg |
| 2010/0320333 A1 | 12/2010 | Martin |
| 2010/0321449 A1 | 12/2010 | Clarke et al. |
| 2010/0323730 A1 | 12/2010 | Karmarkar |
| 2011/0001696 A1 | 1/2011 | Wilson |
| 2011/0003653 A1 | 1/2011 | Stemle |
| 2011/0004329 A1 | 1/2011 | Wilson |
| 2011/0004363 A1 | 1/2011 | Severinsky et al. |
| 2011/0004513 A1 | 1/2011 | Hoffberg |
| 2011/0004851 A1 | 1/2011 | Nurmi et al. |
| 2011/0004975 A1 | 1/2011 | Karwan |
| 2011/0009218 A1 | 1/2011 | Wallach et al. |
| 2011/0011856 A1 | 1/2011 | Rothschild et al. |
| 2011/0014933 A1 | 1/2011 | Karmarkar et al. |
| 2011/0017114 A1 | 1/2011 | Koop et al. |
| 2011/0027087 A1 | 2/2011 | Rokeby-Thomas |
| 2011/0029922 A1 | 2/2011 | Hoffberg et al. |
| 2011/0035491 A1 | 2/2011 | Gelvin et al. |
| 2011/0040535 A1 | 2/2011 | Sato |
| 2011/0040879 A1 | 2/2011 | Konig et al. |
| 2011/0042476 A1 | 2/2011 | McAlister |
| 2011/0042901 A1 | 2/2011 | Raymond |
| 2011/0048374 A1 | 3/2011 | McAlister |
| 2011/0053440 A1 | 3/2011 | Dusablon |
| 2011/0053716 A1 | 3/2011 | Lewis |
| 2011/0059672 A1 | 3/2011 | Davis |
| 2011/0063114 A1 | 3/2011 | Ikoyan |
| 2011/0066398 A1 | 3/2011 | Troxler et al. |
| 2011/0074109 A1 | 3/2011 | Werth |
| 2011/0074850 A1 | 3/2011 | Walmsley et al. |
| 2011/0077758 A1 | 3/2011 | Tran et al. |
| 2011/0078461 A1 | 3/2011 | Hellhake et al. |
| 2011/0079453 A1 | 4/2011 | Wanger et al. |
| 2011/0085530 A1 | 4/2011 | Hellhake et al. |
| 2011/0087431 A1 | 4/2011 | Gupta et al. |
| 2011/0089238 A1 | 4/2011 | Sammut et al. |
| 2011/0090338 A1 | 4/2011 | DeLine et al. |
| 2011/0092319 A1 | 4/2011 | Gurgul et al. |
| 2011/0092337 A1 | 4/2011 | Srinivasan et al. |
| 2011/0100823 A1 | 5/2011 | Pollack et al. |
| 2011/0101692 A1 | 5/2011 | Bilaniuk |
| 2011/0102234 A1 | 5/2011 | Adams et al. |
| 2011/0109097 A1 | 5/2011 | Ferguson |
| 2011/0115624 A1 | 5/2011 | Tran |
| 2011/0121578 A1 | 5/2011 | Ferguson |
| 2011/0122261 A1 | 5/2011 | Silverbrook |
| 2011/0124442 A1 | 5/2011 | Erme |
| 2011/0125063 A1 | 5/2011 | Shalon et al. |
| 2011/0130114 A1 | 6/2011 | Boudville |
| 2011/0132983 A1 | 6/2011 | Sammut et al. |
| 2011/0142025 A1 | 6/2011 | Agee et al. |
| 2011/0142108 A1 | 6/2011 | Agee et al. |
| 2011/0143631 A1 | 6/2011 | Lipman et al. |
| 2011/0144574 A1 | 6/2011 | Kamen et al. |
| 2011/0156896 A1 | 6/2011 | Hoffberg et al. |
| 2011/0161076 A1 | 6/2011 | Davis et al. |
| 2011/0161254 A1 | 6/2011 | Van Den Bogart |
| 2011/0163955 A1 | 7/2011 | Nasiri et al. |
| 2011/0167110 A1 | 7/2011 | Hoffberg et al. |
| 2011/0173988 A1 | 7/2011 | Sweet et al. |
| 2011/0180654 A1 | 7/2011 | Thiesen et al. |
| 2011/0181422 A1 | 7/2011 | Tran |
| 2011/0184602 A1 | 7/2011 | Severinsky et al. |
| 2011/0186177 A1 | 8/2011 | Lanier, Jr. et al. |
| 2011/0187136 A1 | 8/2011 | Martinez |
| 2011/0188597 A1 | 8/2011 | Agee et al. |
| 2011/0189440 A1 | 8/2011 | Appleby et al. |
| 2011/0190056 A1 | 8/2011 | Xu et al. |
| 2011/0190694 A1 | 8/2011 | Lanier, Jr. et al. |
| 2011/0190971 A1 | 8/2011 | Severinsky et al. |
| 2011/0194591 A1 | 8/2011 | Agee et al. |
| 2011/0198857 A1 | 8/2011 | Becker |
| 2011/0204187 A1 | 8/2011 | Spirov et al. |
| 2011/0208444 A1 | 8/2011 | Solinsky |
| 2011/0211080 A1 | 9/2011 | Silverbrook |
| 2011/0213664 A1 | 9/2011 | Osterhout et al. |
| 2011/0214044 A1 | 9/2011 | Davis et al. |
| 2011/0214082 A1 | 9/2011 | Osterhout et al. |
| 2011/0215586 A1 | 9/2011 | Grace |
| 2011/0219634 A1 | 9/2011 | Sammut |
| 2011/0221219 A1 | 9/2011 | Heaton |
| 2011/0221656 A1 | 9/2011 | Haddick et al. |
| 2011/0221657 A1 | 9/2011 | Haddick et al. |
| 2011/0221658 A1 | 9/2011 | Haddick et al. |
| 2011/0221659 A1 | 9/2011 | King et al. |
| 2011/0221668 A1 | 9/2011 | Haddick et al. |
| 2011/0221669 A1 | 9/2011 | Shams et al. |
| 2011/0221670 A1 | 9/2011 | King et al. |
| 2011/0221671 A1 | 9/2011 | King et al. |
| 2011/0221672 A1 | 9/2011 | Osterhout et al. |
| 2011/0221793 A1 | 9/2011 | King et al. |

(56) References Cited

U.S. PATENT DOCUMENTS

| | | |
|---|---|---|
| 2011/0221896 A1 | 9/2011 | Haddick et al. |
| 2011/0221897 A1 | 9/2011 | Haddick et al. |
| 2011/0222745 A1 | 9/2011 | Osterhout et al. |
| 2011/0224498 A1 | 9/2011 | Banet et al. |
| 2011/0224499 A1 | 9/2011 | Banet et al. |
| 2011/0224500 A1 | 9/2011 | Banet et al. |
| 2011/0224506 A1 | 9/2011 | Moon et al. |
| 2011/0224507 A1 | 9/2011 | Banet et al. |
| 2011/0224508 A1 | 9/2011 | Moon |
| 2011/0224556 A1 | 9/2011 | Moon et al. |
| 2011/0224557 A1 | 9/2011 | Banet et al. |
| 2011/0224564 A1 | 9/2011 | Moon et al. |
| 2011/0225536 A1 | 9/2011 | Shams et al. |
| 2011/0226191 A1 | 9/2011 | Curry et al. |
| 2011/0227812 A1 | 9/2011 | Haddick et al. |
| 2011/0227813 A1 | 9/2011 | Haddick et al. |
| 2011/0227820 A1 | 9/2011 | Haddick et al. |
| 2011/0231757 A1 | 9/2011 | Haddick et al. |
| 2011/0232555 A1 | 9/2011 | Levander |
| 2011/0236207 A1 | 9/2011 | Klimov et al. |
| 2011/0237151 A1 | 9/2011 | Martino |
| 2011/0250819 A1 | 10/2011 | Tashman |
| 2011/0255513 A1 | 10/2011 | Karaoguz et al. |
| 2011/0255577 A1 | 10/2011 | Agee et al. |
| 2011/0256944 A1 | 10/2011 | Sato |
| 2011/0257701 A1 | 10/2011 | Strother et al. |
| 2011/0257945 A1 | 10/2011 | Sato |
| 2011/0264230 A1 | 10/2011 | Herr et al. |
| 2011/0265564 A1 | 11/2011 | Acar et al. |
| 2011/0265565 A1 | 11/2011 | Acar et al. |
| 2011/0265566 A1 | 11/2011 | Acar et al. |
| 2011/0265568 A1 | 11/2011 | Stephanou et al. |
| 2011/0265958 A1 | 11/2011 | Skinner et al. |
| 2011/0270569 A1 | 11/2011 | Stephanou et al. |
| 2011/0273061 A1 | 11/2011 | Thalmayr et al. |
| 2011/0273378 A1 | 11/2011 | Alameh et al. |
| 2011/0276123 A1 | 11/2011 | Davies et al. |
| 2011/0278355 A1 | 11/2011 | Silverbrook et al. |
| 2011/0283438 A1 | 11/2011 | Davis et al. |
| 2011/0285527 A1 | 11/2011 | Arms et al. |
| 2011/0288480 A1 | 11/2011 | Bedingfield et al. |
| 2011/0296006 A1 | 12/2011 | Krishnaswamy et al. |
| 2011/0296517 A1 | 12/2011 | Grigoriev et al. |
| 2011/0300001 A1 | 12/2011 | Murphy et al. |
| 2011/0304497 A1 | 12/2011 | Molyneux et al. |
| 2011/0306304 A1 | 12/2011 | Forutanpour et al. |
| 2011/0309624 A1 | 12/2011 | Ettanoor Thuppale et al. |
| 2011/0310209 A1 | 12/2011 | Silverbrook |
| 2011/0312279 A1 | 12/2011 | Tsai et al. |
| 2012/0000408 A1 | 1/2012 | Levander et al. |
| 2012/0001463 A1 | 1/2012 | Breed et al. |
| 2012/0006282 A1 | 1/2012 | Kates |
| 2012/0011853 A1 | 1/2012 | Grace |
| 2012/0015734 A1 | 1/2012 | Lipman et al. |
| 2012/0015766 A1 | 1/2012 | Yap |
| 2012/0016492 A1 | 1/2012 | Clausen |
| 2012/0017232 A1 | 1/2012 | Hoffberg et al. |
| 2012/0018567 A1 | 1/2012 | Geswender et al. |
| 2012/0028680 A1 | 2/2012 | Breed |
| 2012/0032876 A1 | 2/2012 | Tabe |
| 2012/0034954 A1 | 2/2012 | Tabe |
| 2012/0036016 A1 | 2/2012 | Hoffberg et al. |
| 2012/0038185 A1 | 2/2012 | Fioravanti |
| 2012/0040758 A1 | 2/2012 | Hovseth |
| 2012/0042835 A1 | 2/2012 | Curry et al. |
| 2012/0047443 A1 | 2/2012 | Tarkoma |
| 2012/0056799 A1 | 3/2012 | Solomon |
| 2012/0062445 A1 | 3/2012 | Haddick et al. |
| 2012/0062744 A1 | 3/2012 | Schofield et al. |
| 2012/0066883 A1 | 3/2012 | Forti |
| 2012/0067294 A1 | 3/2012 | Curry et al. |
| 2012/0068927 A1 | 3/2012 | Poston et al. |
| 2012/0069799 A1 | 3/2012 | Karaoguz et al. |
| 2012/0070294 A1 | 3/2012 | Gorlov |
| 2012/0075168 A1 | 3/2012 | Osterhout et al. |
| 2012/0078170 A1 | 3/2012 | Smith et al. |
| 2012/0078181 A1 | 3/2012 | Smith et al. |
| 2012/0078182 A1 | 3/2012 | Smith et al. |
| 2012/0078183 A1 | 3/2012 | Smith et al. |
| 2012/0078184 A1 | 3/2012 | Smith et al. |
| 2012/0078185 A1 | 3/2012 | Smith et al. |
| 2012/0078216 A1 | 3/2012 | Smith et al. |
| 2012/0078217 A1 | 3/2012 | Smith et al. |
| 2012/0078222 A1 | 3/2012 | Smith et al. |
| 2012/0091158 A1 | 4/2012 | Polack et al. |
| 2012/0091259 A1 | 4/2012 | Morris et al. |
| 2012/0091717 A1 | 4/2012 | Roe et al. |
| 2012/0092156 A1 | 4/2012 | Tran |
| 2012/0092157 A1 | 4/2012 | Tran |
| 2012/0095352 A1 | 4/2012 | Tran |
| 2012/0095357 A1 | 4/2012 | Tran |
| 2012/0097110 A1 | 4/2012 | Tamaru et al. |
| 2012/0101413 A1 | 4/2012 | Beetel et al. |
| 2012/0103274 A1 | 5/2012 | Curry et al. |
| 2012/0103275 A1 | 5/2012 | Curry et al. |
| 2012/0106869 A1 | 5/2012 | Machitani et al. |
| 2012/0109427 A1 | 5/2012 | Berthier |
| 2012/0113293 A1 | 5/2012 | Silverbrook |
| 2012/0115597 A1 | 5/2012 | Waugaman et al. |
| 2012/0116382 A1 | 5/2012 | Ku et al. |
| 2012/0116383 A1 | 5/2012 | Mauch et al. |
| 2012/0120239 A1 | 5/2012 | Hutzel et al. |
| 2012/0132708 A1 | 5/2012 | White et al. |
| 2012/0133213 A1 | 5/2012 | Borke et al. |
| 2012/0136490 A1 | 5/2012 | Weatherbee et al. |
| 2012/0137567 A1 | 6/2012 | Sammut |
| 2012/0140451 A1 | 6/2012 | Araujo et al. |
| 2012/0142144 A1 | 6/2012 | Taheri |
| 2012/0142235 A1 | 6/2012 | Wobben |
| 2012/0143152 A1 | 6/2012 | Hunter et al. |
| 2012/0143293 A1 | 6/2012 | Mauch et al. |
| 2012/0150651 A1 | 6/2012 | Hoffberg et al. |
| 2012/0151816 A1 | 6/2012 | Kleck et al. |
| 2012/0158354 A1 | 6/2012 | Troxler |
| 2012/0160955 A1 | 6/2012 | Seifert |
| 2012/0161447 A1 | 6/2012 | Seifert |
| 2012/0165238 A1 | 6/2012 | Pamula et al. |
| 2012/0166645 A1 | 6/2012 | Boldyrev et al. |
| 2012/0166646 A1 | 6/2012 | Boldyrev et al. |
| 2012/0168240 A1 | 7/2012 | Wilson et al. |
| 2012/0168241 A1 | 7/2012 | Bernstein et al. |
| 2012/0172050 A1 | 7/2012 | Ledlie et al. |
| 2012/0173047 A1 | 7/2012 | Bernstein et al. |
| 2012/0173048 A1 | 7/2012 | Bernstein et al. |
| 2012/0173049 A1 | 7/2012 | Bernstein et al. |
| 2012/0173050 A1 | 7/2012 | Bernstein et al. |
| 2012/0176128 A1 | 7/2012 | Seeger et al. |
| 2012/0176129 A1 | 7/2012 | Seeger et al. |
| 2012/0176237 A1 | 7/2012 | Tabe |
| 2012/0179133 A1 | 7/2012 | Bedingfield et al. |
| 2012/0183099 A1 | 7/2012 | Harrat et al. |
| 2012/0194418 A1 | 8/2012 | Osterhout et al. |
| 2012/0194419 A1 | 8/2012 | Osterhout et al. |
| 2012/0194420 A1 | 8/2012 | Osterhout et al. |
| 2012/0194549 A1 | 8/2012 | Osterhout et al. |
| 2012/0194550 A1 | 8/2012 | Osterhout et al. |
| 2012/0194551 A1 | 8/2012 | Osterhout et al. |
| 2012/0194552 A1 | 8/2012 | Osterhout et al. |
| 2012/0194553 A1 | 8/2012 | Osterhout et al. |
| 2012/0197439 A1 | 8/2012 | Wang et al. |
| 2012/0197464 A1 | 8/2012 | Wang et al. |
| 2012/0198251 A1 | 8/2012 | Boldryev et al. |
| 2012/0200488 A1 | 8/2012 | Osterhout et al. |
| 2012/0200499 A1 | 8/2012 | Osterhout et al. |
| 2012/0200601 A1 | 8/2012 | Osterhout et al. |
| 2012/0203177 A1 | 8/2012 | Lanier, Jr. et al. |
| 2012/0206322 A1 | 8/2012 | Osterhout et al. |
| 2012/0206323 A1 | 8/2012 | Osterhout et al. |
| 2012/0206334 A1 | 8/2012 | Osterhout et al. |
| 2012/0206335 A1 | 8/2012 | Osterhout et al. |
| 2012/0206485 A1 | 8/2012 | Osterhout et al. |
| 2012/0207134 A1 | 8/2012 | Karaoguz et al. |
| 2012/0209405 A1 | 8/2012 | Herr et al. |
| 2012/0209505 A1 | 8/2012 | Breed et al. |

(56) References Cited

U.S. PATENT DOCUMENTS

| | | |
|---|---|---|
| 2012/0211987 A1 | 8/2012 | Roe et al. |
| 2012/0212398 A1 | 8/2012 | Border et al. |
| 2012/0212399 A1 | 8/2012 | Border et al. |
| 2012/0212400 A1 | 8/2012 | Border et al. |
| 2012/0212406 A1 | 8/2012 | Osterhout et al. |
| 2012/0212414 A1 | 8/2012 | Osterhout et al. |
| 2012/0212484 A1 | 8/2012 | Haddick et al. |
| 2012/0212499 A1 | 8/2012 | Haddick et al. |
| 2012/0217958 A1 | 8/2012 | Oka et al. |
| 2012/0218172 A1 | 8/2012 | Border et al. |
| 2012/0218301 A1 | 8/2012 | Miller |
| 2012/0221290 A1 | 8/2012 | Oka et al. |
| 2012/0221861 A1 | 8/2012 | Boldyrev et al. |
| 2012/0222104 A1 | 8/2012 | Boldyrev et al. |
| 2012/0223480 A1 | 9/2012 | North |
| 2012/0224456 A1 | 9/2012 | Visser et al. |
| 2012/0233838 A1 | 9/2012 | Swist |
| 2012/0235883 A1 | 9/2012 | Border et al. |
| 2012/0235884 A1 | 9/2012 | Miller et al. |
| 2012/0235885 A1 | 9/2012 | Miller et al. |
| 2012/0235886 A1 | 9/2012 | Border et al. |
| 2012/0235887 A1 | 9/2012 | Border et al. |
| 2012/0235900 A1 | 9/2012 | Border et al. |
| 2012/0236025 A1 | 9/2012 | Jacobsen et al. |
| 2012/0236030 A1 | 9/2012 | Border et al. |
| 2012/0236031 A1 | 9/2012 | Haddick et al. |
| 2012/0239231 A1 | 9/2012 | McKeon |
| 2012/0242501 A1 | 9/2012 | Tran et al. |
| 2012/0242678 A1 | 9/2012 | Border et al. |
| 2012/0242697 A1 | 9/2012 | Border et al. |
| 2012/0242698 A1 | 9/2012 | Haddick et al. |
| 2012/0245464 A1 | 9/2012 | Tran |
| 2012/0248195 A1 | 10/2012 | Feng et al. |
| 2012/0248243 A1 | 10/2012 | Greenyer |
| 2012/0249797 A1 | 10/2012 | Haddick et al. |
| 2012/0250517 A1 | 10/2012 | Saarimaki et al. |
| 2012/0253738 A1 | 10/2012 | Nasiri et al. |
| 2012/0254100 A1 | 10/2012 | Grokop et al. |
| 2012/0256042 A1 | 10/2012 | Altmikus et al. |
| 2012/0258804 A1 | 10/2012 | Ahmed |
| 2012/0259578 A1 | 10/2012 | Bevilacqua et al. |
| 2012/0262329 A1 | 10/2012 | Molyneux et al. |
| 2012/0264376 A1 | 10/2012 | Breed |
| 2012/0265716 A1 | 10/2012 | Hunzinger et al. |
| 2012/0265717 A1 | 10/2012 | Narayanan et al. |
| 2012/0268074 A1 | 10/2012 | Cooley et al. |
| 2012/0270564 A1 | 10/2012 | Gum et al. |
| 2012/0287431 A1 | 11/2012 | Matsiev et al. |
| 2012/0291096 A1 | 11/2012 | Boldyrev et al. |
| 2012/0293330 A1 | 11/2012 | Grant et al. |
| 2012/0297441 A1 | 11/2012 | Boldyrev et al. |
| 2012/0299344 A1 | 11/2012 | Breed et al. |
| 2012/0301011 A1 | 11/2012 | Grzechnik |
| 2012/0302125 A1 | 11/2012 | Choh et al. |
| 2012/0308354 A1 | 12/2012 | Tafazoli Bilandi et al. |
| 2012/0308443 A1 | 12/2012 | Tropper et al. |
| 2012/0309295 A1 | 12/2012 | Maguire |
| 2012/0309453 A1 | 12/2012 | Maguire |
| 2012/0310714 A1 | 12/2012 | Tropper et al. |
| 2012/0316406 A1 | 12/2012 | Rahman et al. |
| 2012/0316455 A1 | 12/2012 | Rahman et al. |
| 2012/0323474 A1 | 12/2012 | Breed et al. |
| 2012/0330109 A1 | 12/2012 | Tran |
| 2013/0000439 A1 | 1/2013 | Wanger et al. |
| 2013/0001244 A1 | 1/2013 | Wegelin et al. |
| 2013/0001878 A1 | 1/2013 | Kody et al. |
| 2013/0002538 A1 | 1/2013 | Mooring et al. |
| 2013/0006572 A1 | 1/2013 | Hayner |
| 2013/0006573 A1 | 1/2013 | Brunner et al. |
| 2013/0007088 A1 | 1/2013 | Alfredo et al. |
| 2013/0008363 A1 | 1/2013 | Winkler |
| 2013/0009783 A1 | 1/2013 | Tran |
| 2013/0010125 A1 | 1/2013 | Silverbrook |
| 2013/0010128 A1 | 1/2013 | Silverbrook |
| 2013/0010129 A1 | 1/2013 | Silverbrook |
| 2013/0010135 A1 | 1/2013 | Silverbrook |
| 2013/0010136 A1 | 1/2013 | Silverbrook |
| 2013/0010150 A1 | 1/2013 | Silverbrook |
| 2013/0010151 A1 | 1/2013 | Silverbrook |
| 2013/0010159 A1 | 1/2013 | Silverbrook |
| 2013/0010167 A1 | 1/2013 | Silverbrook |
| 2013/0013085 A1 | 1/2013 | Smith et al. |
| 2013/0013839 A1 | 1/2013 | Silverbrook |
| 2013/0013893 A1 | 1/2013 | Silverbrook |
| 2013/0014421 A1 | 1/2013 | Sammut et al. |
| 2013/0015239 A1 | 1/2013 | Silverbrook |
| 2013/0016012 A1 | 1/2013 | Beauregard |
| 2013/0016232 A1 | 1/2013 | Silverbrook |
| 2013/0016233 A1 | 1/2013 | Silverbrook |
| 2013/0016235 A1 | 1/2013 | Silverbrook |
| 2013/0016236 A1 | 1/2013 | Silverbrook |
| 2013/0016247 A1 | 1/2013 | Silverbrook |
| 2013/0016248 A1 | 1/2013 | Silverbrook |
| 2013/0016266 A1 | 1/2013 | Silverbrook |
| 2013/0018766 A1 | 1/2013 | Christman |
| 2013/0021443 A1 | 1/2013 | Silverbrook |
| 2013/0021444 A1 | 1/2013 | Silverbrook |
| 2013/0021482 A1 | 1/2013 | Silverbrook |
| 2013/0024029 A1 | 1/2013 | Tran et al. |
| 2013/0024660 A1 | 1/2013 | Silverbrook |
| 2013/0029681 A1 | 1/2013 | Grokop |
| 2013/0030259 A1 | 1/2013 | Thomsen et al. |
| 2013/0032070 A1 | 2/2013 | Winkler |
| 2013/0033381 A1 | 2/2013 | Breed |
| 2013/0033418 A1 | 2/2013 | Bevilacqua et al. |
| 2013/0035893 A1 | 2/2013 | Grokop et al. |
| 2013/0038056 A1 | 2/2013 | Donelan et al. |
| 2013/0042798 A1 | 2/2013 | Holohan et al. |
| 2013/0043974 A1 | 2/2013 | Hyde et al. |
| 2013/0043975 A1 | 2/2013 | Hyde et al. |
| 2013/0043991 A1 | 2/2013 | Hyde et al. |
| 2013/0043993 A1 | 2/2013 | Hyde et al. |
| 2013/0045813 A1 | 2/2013 | Publicover et al. |
| 2013/0046153 A1 | 2/2013 | Hyde et al. |
| 2013/0046477 A1 | 2/2013 | Hyde et al. |
| 2013/0055944 A1 | 3/2013 | Poulsen |
| 2013/0063568 A1 | 3/2013 | Silverbrook |
| 2013/0065604 A1 | 3/2013 | Werner et al. |
| 2013/0069372 A1 | 3/2013 | Ferguson |
| 2013/0069780 A1 | 3/2013 | Tran et al. |
| 2013/0072807 A1 | 3/2013 | Tran |
| 2013/0073387 A1 | 3/2013 | Heath |
| 2013/0073389 A1 | 3/2013 | Heath |
| 2013/0078908 A1 | 3/2013 | Smith |
| 2013/0078909 A1 | 3/2013 | Smith |
| 2013/0079152 A1 | 3/2013 | Hall |
| 2013/0080307 A1 | 3/2013 | Hoffberg |
| 2013/0083941 A1 | 4/2013 | Rogel et al. |
| 2013/0085713 A1 | 4/2013 | Rogel et al. |
| 2013/0092539 A1 | 4/2013 | Pollack et al. |
| 2013/0095459 A1 | 4/2013 | Tran |
| 2013/0096752 A1 | 4/2013 | Severinsky et al. |
| 2013/0096753 A1 | 4/2013 | Severinsky et al. |
| 2013/0096825 A1 | 4/2013 | Mohanty |
| 2013/0102323 A1 | 4/2013 | Czompo |
| 2013/0108040 A1 | 5/2013 | Luukkala et al. |
| 2013/0109265 A1 | 5/2013 | Lang et al. |
| 2013/0110256 A1 | 5/2013 | Herr et al. |
| 2013/0119255 A1 | 5/2013 | Dickinson et al. |
| 2013/0124048 A1 | 5/2013 | Gruener et al. |
| 2013/0124883 A1 | 5/2013 | Addepalli et al. |
| 2013/0127980 A1 | 5/2013 | Haddick et al. |
| 2013/0130843 A1 | 5/2013 | Burroughs et al. |
| 2013/0139073 A1 | 5/2013 | Crames et al. |
| 2013/0141247 A1 | 6/2013 | Ricci |
| 2013/0144402 A1 | 6/2013 | Clausen et al. |
| 2013/0146675 A1 | 6/2013 | Seifert |
| 2013/0147598 A1 | 6/2013 | Hoffberg et al. |
| 2013/0151088 A1 | 6/2013 | Ricci |
| 2013/0154553 A1 | 6/2013 | Steele |
| 2013/0157729 A1 | 6/2013 | Tabe |
| 2013/0158821 A1 | 6/2013 | Ricci |
| 2013/0164742 A1 | 6/2013 | Pollack et al. |
| 2013/0165070 A1 | 6/2013 | Hoffberg |

(56) References Cited

U.S. PATENT DOCUMENTS

| | | |
|---|---|---|
| 2013/0166387 A1 | 6/2013 | Hoffberg |
| 2013/0169830 A1 | 7/2013 | Silverbrook |
| 2013/0170986 A1 | 7/2013 | Steel |
| 2013/0170990 A1 | 7/2013 | Birkestrand |
| 2013/0172691 A1 | 7/2013 | Tran |
| 2013/0173171 A1 | 7/2013 | Drysdale et al. |
| 2013/0178718 A1 | 7/2013 | Tran et al. |
| 2013/0184787 A1 | 7/2013 | Kilgore et al. |
| 2013/0186953 A1 | 7/2013 | Silverbrook et al. |
| 2013/0194066 A1 | 8/2013 | Rahman et al. |
| 2013/0197322 A1 | 8/2013 | Tran |
| 2013/0201098 A1 | 8/2013 | Schilit et al. |
| 2013/0201316 A1 | 8/2013 | Binder et al. |
| 2013/0204962 A1 | 8/2013 | Estevez et al. |
| 2013/0211291 A1 | 8/2013 | Tran |
| 2013/0212713 A1 | 8/2013 | Boldyrev et al. |
| 2013/0214909 A1 | 8/2013 | Meijers et al. |
| 2013/0217332 A1 | 8/2013 | Altman et al. |
| 2013/0217333 A1 | 8/2013 | Sprigg et al. |
| 2013/0218312 A1 | 8/2013 | Connelly, Jr. |
| 2013/0218505 A1 | 8/2013 | Bhandari et al. |
| 2013/0220191 A1 | 8/2013 | Rohden |
| 2013/0221195 A1 | 8/2013 | Kennedy |
| 2013/0222115 A1 | 8/2013 | Davoodi et al. |
| 2013/0225032 A1 | 8/2013 | Abarzua-Kocking |
| 2013/0226511 A1 | 8/2013 | Troxler |
| 2013/0229522 A1 | 9/2013 | Schofield et al. |
| 2013/0231574 A1 | 9/2013 | Tran |
| 2013/0233223 A1 | 9/2013 | Rohden |
| 2013/0238538 A1 | 9/2013 | Cook et al. |
| 2013/0250112 A1 | 9/2013 | Breed |
| 2013/0250866 A1 | 9/2013 | Hui et al. |
| 2013/0250969 A1 | 9/2013 | Hui et al. |
| 2013/0251054 A1 | 9/2013 | Hui et al. |
| 2013/0252262 A1 | 9/2013 | Srinivasan et al. |
| 2013/0253387 A1 | 9/2013 | Bonutti et al. |
| 2013/0260620 A1 | 10/2013 | Rohden |
| 2013/0265225 A1 | 10/2013 | Nasiri et al. |
| 2013/0267194 A1 | 10/2013 | Breed |
| 2013/0273968 A1 | 10/2013 | Rhoads et al. |
| 2013/0274040 A1 | 10/2013 | Coza et al. |
| 2013/0276832 A1 | 10/2013 | Langner et al. |
| 2013/0278631 A1 | 10/2013 | Border et al. |
| 2013/0281235 A1 | 10/2013 | Stemle |
| 2013/0281974 A1 | 10/2013 | Kamen et al. |
| 2013/0282438 A1 | 10/2013 | Hunter et al. |
| 2013/0285577 A1 | 10/2013 | O'Brien et al. |
| 2013/0285739 A1 | 10/2013 | Blaquiere et al. |
| 2013/0289529 A1 | 10/2013 | Caira et al. |
| 2013/0289678 A1 | 10/2013 | Clark et al. |
| 2013/0291775 A1 | 11/2013 | Wobben |
| 2013/0294443 A1 | 11/2013 | Kahn |
| 2013/0297022 A1 | 11/2013 | Pathak |
| 2013/0297217 A1 | 11/2013 | Bangera et al. |
| 2013/0297422 A1 | 11/2013 | Hunter et al. |
| 2013/0298208 A1 | 11/2013 | Ayed |
| 2013/0302164 A1 | 11/2013 | Rohden et al. |
| 2013/0303225 A1 | 11/2013 | Maguire |
| 2013/0303314 A1 | 11/2013 | Tackett |
| 2013/0309921 A1 | 11/2013 | Dusablon |
| 2013/0314092 A1 | 11/2013 | Shumway et al. |
| 2013/0314303 A1 | 11/2013 | Osterhout et al. |
| 2013/0317415 A1 | 11/2013 | Kilgore et al. |
| 2013/0320212 A1 | 12/2013 | Valentino et al. |
| 2013/0324888 A1 | 12/2013 | Solinsky |
| 2013/0325244 A1 | 12/2013 | Wang et al. |
| 2013/0325357 A1 | 12/2013 | Walerow et al. |
| 2013/0328320 A1 | 12/2013 | Seifert |
| 2013/0329522 A1 | 12/2013 | Skinner et al. |
| 2013/0333175 A1 | 12/2013 | Acar et al. |
| 2013/0334816 A1 | 12/2013 | Houis et al. |
| 2013/0334821 A1 | 12/2013 | Reimer et al. |
| 2013/0338267 A1 | 12/2013 | Appleby et al. |
| 2013/0344958 A1 | 12/2013 | Mullen |
| 2013/0345566 A1 | 12/2013 | Weitzel et al. |
| 2014/0001308 A1 | 1/2014 | Costa Duarte Pardal et al. |
| 2014/0012531 A1 | 1/2014 | Bhandari et al. |
| 2014/0013557 A1 | 1/2014 | Acar et al. |
| 2014/0018792 A1 | 1/2014 | Gang et al. |
| 2014/0020964 A1 | 1/2014 | Bernstein et al. |
| 2014/0025330 A1 | 1/2014 | Bhandari |
| 2014/0028539 A1 | 1/2014 | Newham et al. |
| 2014/0031743 A1 | 1/2014 | Kamen et al. |
| 2014/0032034 A1 | 1/2014 | Raptopoulos et al. |
| 2014/0039277 A1 | 2/2014 | Abraham |
| 2014/0041174 A1 | 2/2014 | Acar et al. |
| 2014/0046260 A1 | 2/2014 | Kamen et al. |
| 2014/0046463 A1 | 2/2014 | Molyneux et al. |
| 2014/0048037 A1 | 2/2014 | McAlister |
| 2014/0048174 A1 | 2/2014 | Lanigan et al. |
| 2014/0052275 A1 | 2/2014 | Pathak |
| 2014/0054883 A1 | 2/2014 | Lanigan et al. |
| 2014/0054895 A1 | 2/2014 | Steel |
| 2014/0055268 A1 | 2/2014 | Bangera et al. |
| 2014/0055284 A1 | 2/2014 | Tran et al. |
| 2014/0055588 A1 | 2/2014 | Bangera et al. |
| 2014/0055589 A1 | 2/2014 | Bangera et al. |
| 2014/0059914 A1 | 3/2014 | Sammut et al. |
| 2014/0059915 A1 | 3/2014 | Sammut et al. |
| 2014/0061379 A1 | 3/2014 | Campolo et al. |
| 2014/0063054 A1 | 3/2014 | Osterhout et al. |
| 2014/0063055 A1 | 3/2014 | Osterhout et al. |
| 2014/0063255 A1 | 3/2014 | Breed |
| 2014/0064112 A1 | 3/2014 | Das et al. |
| 2014/0066206 A1 | 3/2014 | Gale |
| 2014/0070493 A1 | 3/2014 | Gonzalez |
| 2014/0071432 A1 | 3/2014 | Dunne |
| 2014/0074180 A1 | 3/2014 | Heldman et al. |
| 2014/0074263 A1 | 3/2014 | Balakrishnan et al. |
| 2014/0076415 A1 | 3/2014 | Dunki-Jacobs et al. |
| 2014/0077946 A1 | 3/2014 | Tran |
| 2014/0081076 A1 | 3/2014 | Schutt et al. |
| 2014/0081793 A1 | 3/2014 | Hoffberg |
| 2014/0083402 A1 | 3/2014 | Fridman et al. |
| 2014/0089241 A1 | 3/2014 | Hoffberg et al. |
| 2014/0099853 A1 | 4/2014 | Condon et al. |
| 2014/0102344 A1 | 4/2014 | Wobben |
| 2014/0104059 A1 | 4/2014 | Tran |
| 2014/0106908 A1 | 4/2014 | Johnson et al. |
| 2014/0107579 A1 | 4/2014 | Lanigan et al. |
| 2014/0109459 A1 | 4/2014 | Sammut et al. |
| 2014/0111187 A1 | 4/2014 | Harrat et al. |
| 2014/0111594 A1 | 4/2014 | Schuh et al. |
| 2014/0111595 A1 | 4/2014 | Vetterling et al. |
| 2014/0112695 A1 | 4/2014 | van Dijk et al. |
| 2014/0113561 A1 | 4/2014 | Maguire |
| 2014/0113739 A1 | 4/2014 | Jertson et al. |
| 2014/0113828 A1 | 4/2014 | Gilbert et al. |
| 2014/0119567 A1 | 5/2014 | DeLine et al. |
| 2014/0120961 A1 | 5/2014 | Buck |
| 2014/0121476 A1 | 5/2014 | Tran et al. |
| 2014/0123533 A1 | 5/2014 | Sammut et al. |
| 2014/0123534 A1 | 5/2014 | Hodnett |
| 2014/0126431 A1 | 5/2014 | Hui et al. |
| 2014/0128021 A1 | 5/2014 | Walker et al. |
| 2014/0128182 A1 | 5/2014 | Hohteri |
| 2014/0130570 A1 | 5/2014 | Lal et al. |
| 2014/0130748 A1 | 5/2014 | Curry et al. |
| 2014/0131124 A1 | 5/2014 | Severinsky et al. |
| 2014/0133428 A1 | 5/2014 | Kazmi et al. |
| 2014/0133656 A1 | 5/2014 | Wurster et al. |
| 2014/0136414 A1 | 5/2014 | Abhyanker |
| 2014/0137781 A1 | 5/2014 | Rohden |
| 2014/0137840 A1 | 5/2014 | McAlister |
| 2014/0140846 A1 | 5/2014 | Birkestrand |
| 2014/0141865 A1 | 5/2014 | Tropper et al. |
| 2014/0142467 A1 | 5/2014 | Tropper et al. |
| 2014/0142498 A1 | 5/2014 | Lanier, Jr. et al. |
| 2014/0142507 A1 | 5/2014 | Armes |
| 2014/0142733 A1 | 5/2014 | Tropper et al. |
| 2014/0143031 A1 | 5/2014 | Tropper et al. |
| 2014/0143038 A1 | 5/2014 | Tropper et al. |
| 2014/0143064 A1 | 5/2014 | Tran |
| 2014/0144417 A1 | 5/2014 | Evans |

(56) References Cited

U.S. PATENT DOCUMENTS

| | | |
|---|---|---|
| 2014/0147248 A1 | 5/2014 | Akimoto |
| 2014/0152008 A1 | 6/2014 | Donelan et al. |
| 2014/0152507 A1 | 6/2014 | McAllister |
| 2014/0153773 A1 | 6/2014 | Gupta et al. |
| 2014/0156039 A1 | 6/2014 | Prinzel et al. |
| 2014/0156676 A1 | 6/2014 | Brust et al. |
| 2014/0158704 A1 | 6/2014 | Anderson et al. |
| 2014/0159894 A1 | 6/2014 | Tropper et al. |
| 2014/0159903 A1 | 6/2014 | Tropper et al. |
| 2014/0162779 A1 | 6/2014 | Kawaguchi |
| 2014/0163425 A1 | 6/2014 | Tran |
| 2014/0163428 A1 | 6/2014 | Tropper et al. |
| 2014/0163429 A1 | 6/2014 | Tropper et al. |
| 2014/0163430 A1 | 6/2014 | Tropper et al. |
| 2014/0163664 A1 | 6/2014 | Goldsmith |
| 2014/0163768 A1 | 6/2014 | Purdy et al. |
| 2014/0164049 A1 | 6/2014 | Yakos et al. |
| 2014/0166751 A1 | 6/2014 | Sammut et al. |
| 2014/0168443 A1 | 6/2014 | Aguilar et al. |
| 2014/0171046 A1 | 6/2014 | Mullen |
| 2014/0171749 A1 | 6/2014 | Chin et al. |
| 2014/0172200 A1 | 6/2014 | Miralles |
| 2014/0172310 A1 | 6/2014 | Chin et al. |
| 2014/0173452 A1 | 6/2014 | Hoffberg et al. |
| 2014/0180914 A1 | 6/2014 | Abhyanker |
| 2014/0183269 A1 | 7/2014 | Glaser |
| 2014/0184496 A1 | 7/2014 | Gribetz et al. |
| 2014/0187258 A1 | 7/2014 | Khorashadi et al. |
| 2014/0187969 A1 | 7/2014 | Hunter et al. |
| 2014/0194702 A1 | 7/2014 | Tran |
| 2014/0195078 A1 | 7/2014 | Severinsky et al. |
| 2014/0196648 A1 | 7/2014 | Holohan et al. |
| 2014/0197304 A1 | 7/2014 | Feng et al. |
| 2014/0197926 A1 | 7/2014 | Nikitin et al. |
| 2014/0202800 A1 | 7/2014 | Breed |
| 2014/0203797 A1 | 7/2014 | Stivoric et al. |
| 2014/0204984 A1 | 7/2014 | Agee et al. |
| 2014/0207286 A1 | 7/2014 | Wang et al. |
| 2014/0208841 A1 | 7/2014 | Hausot et al. |
| 2014/0212986 A1 | 7/2014 | Angelescu et al. |
| 2014/0214357 A1 | 7/2014 | Oka et al. |
| 2014/0215876 A1 | 8/2014 | Popa-Simil |
| 2014/0220849 A1 | 8/2014 | Kessler |
| 2014/0221732 A1 | 8/2014 | Dayton et al. |
| 2014/0222334 A1 | 8/2014 | Gupta et al. |
| 2014/0228157 A1 | 8/2014 | Johnston |
| 2014/0231259 A1 | 8/2014 | Srinivasan et al. |
| 2014/0232516 A1 | 8/2014 | Stivoric et al. |
| 2014/0235169 A1 | 8/2014 | Parkinson et al. |
| 2014/0235380 A1 | 8/2014 | Martino |
| 2014/0236393 A1 | 8/2014 | Bernstein et al. |
| 2014/0240916 A1 | 8/2014 | Daidzic |
| 2014/0243971 A1 | 8/2014 | Pugh et al. |
| 2014/0245161 A1 | 8/2014 | Yuen et al. |
| 2014/0246471 A1 | 9/2014 | Jaworek et al. |
| 2014/0246472 A1 | 9/2014 | Kimsey et al. |
| 2014/0246473 A1 | 9/2014 | Auld |
| 2014/0246474 A1 | 9/2014 | Hall et al. |
| 2014/0246475 A1 | 9/2014 | Hall et al. |
| 2014/0246476 A1 | 9/2014 | Hall et al. |
| 2014/0246477 A1 | 9/2014 | Koch, Jr. et al. |
| 2014/0246478 A1 | 9/2014 | Baber et al. |
| 2014/0246479 A1 | 9/2014 | Baber et al. |
| 2014/0246538 A1 | 9/2014 | Morris et al. |
| 2014/0249429 A1 | 9/2014 | Tran |
| 2014/0249557 A1 | 9/2014 | Koch, Jr. et al. |
| 2014/0256479 A1 | 9/2014 | Bynum, Jr. |
| 2014/0257141 A1 | 9/2014 | Giuffrida et al. |
| 2014/0257519 A1 | 9/2014 | Herr et al. |
| 2014/0259549 A1 | 9/2014 | Freeman et al. |
| 2014/0262862 A1 | 9/2014 | Rothschild et al. |
| 2014/0263537 A1 | 9/2014 | Leimbach et al. |
| 2014/0263538 A1 | 9/2014 | Leimbach et al. |
| 2014/0263539 A1 | 9/2014 | Leimbach et al. |
| 2014/0263541 A1 | 9/2014 | Leimbach et al. |
| 2014/0263542 A1 | 9/2014 | Leimbach et al. |
| 2014/0263543 A1 | 9/2014 | Leimbach et al. |
| 2014/0263553 A1 | 9/2014 | Leimbach et al. |
| 2014/0263554 A1 | 9/2014 | Leimbach et al. |
| 2014/0263564 A1 | 9/2014 | Leimbach et al. |
| 2014/0263565 A1 | 9/2014 | Lytle et al. |
| 2014/0263697 A1 | 9/2014 | McAlister |
| 2014/0263989 A1 | 9/2014 | Valentino et al. |
| 2014/0264047 A1 | 9/2014 | Valentino et al. |
| 2014/0266669 A1 | 9/2014 | Fadell et al. |
| 2014/0266773 A1 | 9/2014 | Aguilar et al. |
| 2014/0266780 A1 | 9/2014 | Rahman et al. |
| 2014/0266787 A1 | 9/2014 | Tran |
| 2014/0267586 A1 | 9/2014 | Aguilar et al. |
| 2014/0268601 A1 | 9/2014 | Valentino et al. |
| 2014/0269555 A1 | 9/2014 | Sadasivam et al. |
| 2014/0269658 A1 | 9/2014 | Sadasivam et al. |
| 2014/0273730 A1 | 9/2014 | Brandwijk |
| 2014/0276718 A1 | 9/2014 | Turovskiy et al. |
| 2014/0277017 A1 | 9/2014 | Leimbach et al. |
| 2014/0277739 A1 | 9/2014 | Kornbluh et al. |
| 2014/0279546 A1 | 9/2014 | Poole et al. |
| 2014/0288682 A1 | 9/2014 | Balakrishnan et al. |
| 2014/0288776 A1 | 9/2014 | Anderson et al. |
| 2014/0288873 A1 | 9/2014 | Czompo et al. |
| 2014/0292654 A1 | 10/2014 | Wilson |
| 2014/0297312 A1 | 10/2014 | Bangera et al. |
| 2014/0299783 A1 | 10/2014 | Valentino et al. |
| 2014/0301598 A1 | 10/2014 | Marty et al. |
| 2014/0301600 A1 | 10/2014 | Marty et al. |
| 2014/0301601 A1 | 10/2014 | Marty et al. |
| 2014/0303591 A1 | 10/2014 | Peterfreund et al. |
| 2014/0303900 A1 | 10/2014 | Rahman et al. |
| 2014/0306580 A1 | 10/2014 | Thalmayr et al. |
| 2014/0306799 A1 | 10/2014 | Ricci |
| 2014/0306821 A1 | 10/2014 | Rahman et al. |
| 2014/0306826 A1 | 10/2014 | Ricci |
| 2014/0309805 A1 | 10/2014 | Ricci |
| 2014/0309847 A1 | 10/2014 | Ricci |
| 2014/0309852 A1 | 10/2014 | Ricci |
| 2014/0309853 A1 | 10/2014 | Ricci |
| 2014/0309935 A1 | 10/2014 | Ricci |
| 2014/0310186 A1 | 10/2014 | Ricci |
| 2014/0312242 A1 | 10/2014 | Valentino et al. |
| 2014/0313303 A1 | 10/2014 | Davis et al. |
| 2014/0316235 A1 | 10/2014 | Davis et al. |
| 2014/0319231 A1 | 10/2014 | Matsuoka et al. |
| 2014/0323142 A1 | 10/2014 | Rodriguez et al. |
| 2014/0324348 A1 | 10/2014 | Volfson |
| 2014/0328199 A1 | 11/2014 | Matischek et al. |
| 2014/0328423 A1 | 11/2014 | Agee et al. |
| 2014/0335952 A1 | 11/2014 | Hall |
| 2014/0336561 A1 | 11/2014 | Hyde et al. |
| 2014/0337346 A1 | 11/2014 | Barthel et al. |
| 2014/0337732 A1 | 11/2014 | Bevilacqua et al. |
| 2014/0337733 A1 | 11/2014 | Rodriguez et al. |
| 2014/0339307 A1 | 11/2014 | Sammut et al. |
| 2014/0340300 A1 | 11/2014 | Momin et al. |
| 2014/0342324 A1 | 11/2014 | Ghovanloo et al. |
| 2014/0345563 A1 | 11/2014 | McAlister |
| 2014/0349269 A1 | 11/2014 | Canoy et al. |
| 2014/0350459 A1 | 11/2014 | Lanier, Jr. et al. |
| 2014/0353332 A1 | 12/2014 | Wegelin et al. |
| 2014/0354350 A1 | 12/2014 | Bowers et al. |
| 2014/0358261 A1 | 12/2014 | Molyneux et al. |
| 2014/0360083 A1 | 12/2014 | Sammut |
| 2014/0361079 A1 | 12/2014 | Sammut et al. |
| 2014/0364254 A1 | 12/2014 | Publicover et al. |
| 2014/0376427 A1 | 12/2014 | Hui et al. |
| 2014/0376656 A1 | 12/2014 | Agee et al. |
| 2014/0376657 A1 | 12/2014 | Agee et al. |
| 2014/0378810 A1 | 12/2014 | Davis et al. |
| 2014/0379696 A1 | 12/2014 | Gyongyi et al. |
| 2015/0001335 A1 | 1/2015 | Pettersson |
| 2015/0002336 A1 | 1/2015 | Thubert et al. |
| 2015/0003698 A1 | 1/2015 | Davis et al. |
| 2015/0003699 A1 | 1/2015 | Davis et al. |
| 2015/0005039 A1 | 1/2015 | Liu et al. |
| 2015/0005084 A1 | 1/2015 | Tawwater et al. |

(56) References Cited

U.S. PATENT DOCUMENTS

| | | |
|---|---|---|
| 2015/0005640 A1 | 1/2015 | Davis et al. |
| 2015/0005644 A1 | 1/2015 | Rhoads |
| 2015/0005912 A1 | 1/2015 | Tropper et al. |
| 2015/0006186 A1 | 1/2015 | Davis et al. |
| 2015/0008260 A1 | 1/2015 | Volfson |
| 2015/0009034 A1 | 1/2015 | Grant et al. |
| 2015/0016712 A1 | 1/2015 | Rhoads et al. |
| 2015/0019266 A1 | 1/2015 | Stempora |
| 2015/0020431 A1 | 1/2015 | Sammut et al. |
| 2015/0025917 A1 | 1/2015 | Stempora |
| 2015/0027125 A1 | 1/2015 | Raj |
| 2015/0031293 A1 | 1/2015 | Holman et al. |
| 2015/0031294 A1 | 1/2015 | Holman et al. |
| 2015/0031480 A1 | 1/2015 | Kidd et al. |
| 2015/0036047 A1 | 2/2015 | Bledsoe |
| 2015/0040243 A1 | 2/2015 | Mittal |
| 2015/0040665 A1 | 2/2015 | Borkholder et al. |
| 2015/0040669 A1 | 2/2015 | Borkholder et al. |
| 2015/0042619 A1 | 2/2015 | Forti et al. |
| 2015/0046582 A1 | 2/2015 | Gelvin et al. |
| 2015/0049487 A1 | 2/2015 | Connor |
| 2015/0051571 A1 | 2/2015 | Lanigan et al. |
| 2015/0053104 A1 | 2/2015 | Schuh et al. |
| 2015/0053562 A1 | 2/2015 | Pollack et al. |
| 2015/0054318 A1 | 2/2015 | Howard |
| 2015/0054633 A1 | 2/2015 | Saddik et al. |
| 2015/0057112 A1 | 2/2015 | Sak et al. |
| 2015/0057808 A1 | 2/2015 | Cook et al. |
| 2015/0058159 A1 | 2/2015 | Balram et al. |
| 2015/0058192 A1 | 2/2015 | Balram et al. |
| 2015/0059002 A1 | 2/2015 | Balram et al. |
| 2015/0061294 A1 | 3/2015 | Kheirandish |
| 2015/0061859 A1 | 3/2015 | Matsuoka et al. |
| 2015/0062959 A1 | 3/2015 | Wilson |
| 2015/0067008 A1 | 3/2015 | Kamath et al. |
| 2015/0068069 A1 | 3/2015 | Tran et al. |
| 2015/0070323 A1 | 3/2015 | Hong et al. |
| 2015/0071648 A1 | 3/2015 | Hong et al. |
| 2015/0075486 A1 | 3/2015 | McAlister |
| 2015/0078680 A1 | 3/2015 | Shakib et al. |
| 2015/0078732 A1 | 3/2015 | Shakib et al. |
| 2015/0078888 A1 | 3/2015 | Golshany et al. |
| 2015/0079869 A1 | 3/2015 | Neth |
| 2015/0079989 A1 | 3/2015 | Tambaram Kailasam et al. |
| 2015/0081220 A1 | 3/2015 | Matsiev et al. |
| 2015/0081247 A1 | 3/2015 | Valentino et al. |
| 2015/0081444 A1 | 3/2015 | Hoffberg |
| 2015/0082172 A1 | 3/2015 | Shakib et al. |
| 2015/0083495 A1 | 3/2015 | Walker |
| 2015/0087257 A1 | 3/2015 | Balram et al. |
| 2015/0088452 A1 | 3/2015 | Troxler |
| 2015/0088546 A1 | 3/2015 | Balram et al. |
| 2015/0088547 A1 | 3/2015 | Balram et al. |
| 2015/0088786 A1 | 3/2015 | Anandhakrishnan |
| 2015/0090237 A1 | 4/2015 | Williams |
| 2015/0091507 A1 | 4/2015 | Hyde et al. |
| 2015/0091531 A1 | 4/2015 | Hyde et al. |
| 2015/0091729 A1 | 4/2015 | Phillips et al. |
| 2015/0094867 A1 | 4/2015 | Hyde et al. |
| 2015/0095789 A1 | 4/2015 | Hyde et al. |
| 2015/0097719 A1 | 4/2015 | Balachandreswaran et al. |
| 2015/0099941 A1 | 4/2015 | Tran |
| 2015/0100107 A1 | 4/2015 | Kiani et al. |
| 2015/0102156 A1 | 4/2015 | Devenyi |
| 2015/0103168 A1 | 4/2015 | Marty et al. |
| 2015/0105631 A1 | 4/2015 | Tran et al. |
| 2015/0108872 A1 | 4/2015 | Pinkerton et al. |
| 2015/0109104 A1 | 4/2015 | Fadell et al. |
| 2015/0109112 A1 | 4/2015 | Fadell et al. |
| 2015/0109128 A1 | 4/2015 | Fadell et al. |
| 2015/0111465 A1 | 4/2015 | Lipman et al. |
| 2015/0111591 A1 | 4/2015 | Hoffberg |
| 2015/0112536 A1 | 4/2015 | Severinsky et al. |
| 2015/0112885 A1 | 4/2015 | Fadell et al. |
| 2015/0113417 A1 | 4/2015 | Yuen et al. |
| 2015/0115767 A1 | 4/2015 | Pinkerton et al. |
| 2015/0116106 A1 | 4/2015 | Fadell et al. |
| 2015/0116107 A1 | 4/2015 | Fadell et al. |
| 2015/0116108 A1 | 4/2015 | Fadell et al. |
| 2015/0116109 A1 | 4/2015 | Fadell et al. |
| 2015/0120015 A1 | 4/2015 | Fadell et al. |
| 2015/0120596 A1 | 4/2015 | Fadell et al. |
| 2015/0120598 A1 | 4/2015 | Fadell et al. |
| 2015/0125832 A1 | 5/2015 | Tran |
| 2015/0126997 A1 | 5/2015 | Beetel et al. |
| 2015/0127712 A1 | 5/2015 | Fadell et al. |
| 2015/0128067 A1 | 5/2015 | Wong et al. |
| 2015/0130135 A1 | 5/2015 | Shalhoub |
| 2015/0133855 A1 | 5/2015 | Smith et al. |
| 2015/0134107 A1 | 5/2015 | Hyde et al. |
| 2015/0134345 A1 | 5/2015 | Hyde et al. |
| 2015/0134346 A1 | 5/2015 | Hyde et al. |
| 2015/0137806 A1 | 5/2015 | Wan et al. |
| 2015/0137994 A1 | 5/2015 | Rahman et al. |
| 2015/0140893 A1 | 5/2015 | Lipman et al. |
| 2015/0141140 A1 | 5/2015 | Lampe et al. |
| 2015/0144018 A1 | 5/2015 | Buys |
| 2015/0145643 A1 | 5/2015 | Fadell et al. |
| 2015/0146579 A1 | 5/2015 | Teller et al. |
| 2015/0148238 A1 | 5/2015 | Pamula et al. |
| 2015/0150140 A1 | 5/2015 | Biswas et al. |
| 2015/0150647 A1 | 6/2015 | Chevalier |
| 2015/0151180 A1 | 6/2015 | Gonzalez |
| 2015/0151857 A1 | 6/2015 | Lanigan et al. |
| 2015/0154850 A1 | 6/2015 | Fadell et al. |
| 2015/0156030 A1 | 6/2015 | Fadell et al. |
| 2015/0156031 A1 | 6/2015 | Fadell et al. |
| 2015/0157537 A1 | 6/2015 | Lanigan et al. |
| 2015/0158600 A1 | 6/2015 | Hachtmann et al. |
| 2015/0160791 A1 | 6/2015 | Tarkoma |
| 2015/0165114 A1 | 6/2015 | Grant et al. |
| 2015/0166072 A1 | 6/2015 | Powers et al. |
| 2015/0168105 A1 | 6/2015 | Sammut et al. |
| 2015/0174320 A1 | 6/2015 | Grant et al. |
| 2015/0174577 A1 | 6/2015 | Srinivasan et al. |
| 2015/0178794 A1 | 6/2015 | Sheng et al. |
| 2015/0178998 A1 | 6/2015 | Attard et al. |
| 2015/0180372 A1 | 6/2015 | Pinkerton et al. |
| 2015/0186700 A1 | 7/2015 | Nikitin et al. |
| 2015/0191245 A1 | 7/2015 | Mores et al. |
| 2015/0192416 A1 | 7/2015 | Nasiri et al. |
| 2015/0192682 A1 | 7/2015 | Valentino et al. |
| 2015/0192976 A1 | 7/2015 | Jeganathan et al. |
| 2015/0194165 A1 | 7/2015 | Faaborg et al. |
| 2015/0195145 A1 | 7/2015 | Di Pietro et al. |
| 2015/0197248 A1 | 7/2015 | Breed et al. |
| 2015/0198419 A1 | 7/2015 | Sammut |
| 2015/0200562 A1 | 7/2015 | Kilinc et al. |
| 2015/0200738 A1 | 7/2015 | Wetterwald et al. |
| 2015/0202770 A1 | 7/2015 | Patron et al. |
| 2015/0204305 A1 | 7/2015 | Wasilewski |
| 2015/0204559 A1 | 7/2015 | Hoffberg et al. |
| 2015/0205298 A1 | 7/2015 | Stoschek et al. |
| 2015/0215323 A1 | 7/2015 | Grigoriev et al. |
| 2015/0215740 A1 | 7/2015 | Khorashadi et al. |
| 2015/0215858 A1 | 7/2015 | Karaoguz et al. |
| 2015/0218913 A1 | 8/2015 | Cooley et al. |
| 2015/0219425 A1 | 8/2015 | Beckman |
| 2015/0219457 A1 | 8/2015 | Stephanou et al. |
| 2015/0220109 A1 | 8/2015 | von Badinski et al. |
| 2015/0220701 A1 | 8/2015 | Bangera et al. |
| 2015/0224378 A1 | 8/2015 | Ruyssenaars et al. |
| 2015/0224845 A1 | 8/2015 | Anderson et al. |
| 2015/0226522 A1 | 8/2015 | Sammut et al. |
| 2015/0227794 A1 | 8/2015 | Gupta et al. |
| 2015/0229019 A1 | 8/2015 | Osterhout et al. |
| 2015/0231329 A1 | 8/2015 | Murphy et al. |
| 2015/0237424 A1 | 8/2015 | Wilker et al. |
| 2015/0238963 A1 | 8/2015 | Han et al. |
| 2015/0239534 A1 | 8/2015 | Koop et al. |
| 2015/0242120 A1 | 8/2015 | Rodriguez |
| 2015/0243068 A1 | 8/2015 | Solomon |
| 2015/0243085 A1 | 8/2015 | Newhouse et al. |
| 2015/0247702 A1 | 9/2015 | Davidson et al. |

(56) References Cited

U.S. PATENT DOCUMENTS

| | | |
|---|---|---|
| 2015/0247709 A1 | 9/2015 | Roberts |
| 2015/0247917 A1 | 9/2015 | Gum et al. |
| 2015/0250393 A1 | 9/2015 | Tran |
| 2015/0250682 A1 | 9/2015 | Bangera et al. |
| 2015/0258373 A1 | 9/2015 | Molyneux et al. |
| 2015/0258413 A1 | 9/2015 | Molyneux et al. |
| 2015/0258679 A1 | 9/2015 | Izhikevich et al. |
| 2015/0258682 A1 | 9/2015 | Izikevich et al. |
| 2015/0258683 A1 | 9/2015 | Izhikevich et al. |
| 2015/0260512 A1 | 9/2015 | Greiner et al. |
| 2015/0264626 A1 | 9/2015 | Perdomo |
| 2015/0264627 A1 | 9/2015 | Perdomo |
| 2015/0265458 A1 | 9/2015 | Andersen et al. |
| 2015/0265459 A1 | 9/2015 | Andersen et al. |
| 2015/0266180 A1 | 9/2015 | Kornbluh et al. |
| 2015/0266181 A1 | 9/2015 | Kornbluh et al. |
| 2015/0268355 A1 | 9/2015 | Valentino et al. |
| 2015/0269825 A1 | 9/2015 | Tran |
| 2015/0271004 A1 | 9/2015 | Agee et al. |
| 2015/0273296 A1 | 10/2015 | Marcin et al. |
| 2015/0273351 A1 | 10/2015 | Condon et al. |
| 2015/0274272 A1 | 10/2015 | Winkler |
| 2015/0283031 A1 | 10/2015 | Lanier, Jr. et al. |
| 2015/0283397 A1 | 10/2015 | Andersen et al. |
| 2015/0283398 A1 | 10/2015 | Andersen et al. |
| 2015/0284058 A1 | 10/2015 | Swain et al. |
| 2015/0290453 A1 | 10/2015 | Tyler et al. |
| 2015/0290454 A1 | 10/2015 | Tyler et al. |
| 2015/0293580 A1 | 10/2015 | Munoz et al. |
| 2015/0294141 A1 | 10/2015 | Molyneux et al. |
| 2015/0294363 A1 | 10/2015 | Bhola et al. |
| 2015/0297951 A1 | 10/2015 | Molyneux et al. |
| 2015/0297964 A1 | 10/2015 | Evans |
| 2015/0298317 A1 | 10/2015 | Wang et al. |
| 2015/0302207 A1 | 10/2015 | Sprenger et al. |
| 2015/0302393 A1 | 10/2015 | Poole et al. |
| 2015/0302777 A1 | 10/2015 | Campolo et al. |
| 2015/0303563 A1 | 10/2015 | Blumberg, Jr. |
| 2015/0303768 A1 | 10/2015 | Henderson et al. |
| 2015/0306455 A1 | 10/2015 | DeCarlo |
| 2015/0307191 A1 | 10/2015 | Samuel et al. |
| 2015/0308782 A1 | 10/2015 | Chia |
| 2015/0309316 A1 | 10/2015 | Osterhout et al. |
| 2015/0309562 A1 | 10/2015 | Shams et al. |
| 2015/0309563 A1 | 10/2015 | Connor |
| 2015/0312764 A1 | 10/2015 | Tuukkanen et al. |
| 2015/0313663 A1 | 11/2015 | Sisken et al. |
| 2015/0314086 A1 | 11/2015 | Curtis et al. |
| 2015/0314449 A1 | 11/2015 | Wang et al. |
| 2015/0319562 A1 | 11/2015 | Martin et al. |
| 2015/0321000 A1 | 11/2015 | Rosenbluth et al. |
| 2015/0326049 A1 | 11/2015 | Cooley et al. |
| 2015/0328516 A1 | 11/2015 | Coza et al. |
| 2015/0330738 A1 | 11/2015 | Tarazon |
| 2015/0330778 A1 | 11/2015 | Sinha et al. |
| 2015/0330943 A1 | 11/2015 | Pollack et al. |
| 2015/0331420 A1 | 11/2015 | Chubb |
| 2015/0335288 A1 | 11/2015 | Toth et al. |
| 2015/0338525 A1 | 11/2015 | Valentino et al. |
| 2015/0339570 A1 | 11/2015 | Scheffler |
| 2015/0344109 A1 | 12/2015 | Davoodi et al. |
| 2015/0346726 A1 | 12/2015 | Davoodi et al. |
| 2015/0347910 A1 | 12/2015 | Fadell et al. |
| 2015/0351690 A1 | 12/2015 | Toth et al. |
| 2015/0352450 A1 | 12/2015 | Burrows et al. |
| 2015/0353206 A1 | 12/2015 | Wang |
| 2015/0356261 A1 | 12/2015 | Brust et al. |
| 2015/0356285 A1 | 12/2015 | Glaser |
| 2015/0356289 A1 | 12/2015 | Brown et al. |
| 2015/0356610 A1 | 12/2015 | Ponoth |
| 2015/0359467 A1 | 12/2015 | Tran |
| 2015/0360049 A1 | 12/2015 | Kaplitt et al. |
| 2015/0360050 A1 | 12/2015 | Kaplitt et al. |
| 2015/0360777 A1 | 12/2015 | Mottale |
| 2015/0362287 A1 | 12/2015 | Sammut et al. |
| 2015/0362288 A1 | 12/2015 | Sammut et al. |
| 2015/0362919 A1 | 12/2015 | Bernstein et al. |
| 2015/0367212 A1 | 12/2015 | Marcin et al. |
| 2015/0367243 A1 | 12/2015 | Frost et al. |
| 2015/0370257 A1 | 12/2015 | Bernstein et al. |
| 2015/0372819 A1 | 12/2015 | Luukkala et al. |
| 2015/0373036 A1 | 12/2015 | Patne et al. |
| 2016/0001158 A1 | 1/2016 | Tawwater et al. |
| 2016/0001882 A1 | 1/2016 | Pedersen et al. |
| 2016/0004253 A1 | 1/2016 | Bernstein et al. |
| 2016/0005320 A1 | 1/2016 | deCharms et al. |
| 2016/0008686 A1 | 1/2016 | Jertson et al. |
| 2016/0009364 A1 | 1/2016 | Goel |
| 2016/0010950 A1 | 1/2016 | Sammut et al. |
| 2016/0012707 A1 | 1/2016 | McKinley et al. |
| 2016/0013818 A1 | 1/2016 | Smith |
| 2016/0015004 A1 | 1/2016 | Bonge, Jr. |
| 2016/0015006 A1 | 1/2016 | Bonge, Jr. |
| 2016/0018083 A1 | 1/2016 | Kelly et al. |
| 2016/0020506 A1 | 1/2016 | Mahanfar et al. |
| 2016/0021178 A1 | 1/2016 | Liu et al. |
| 2016/0023762 A1 | 1/2016 | Wang |
| 2016/0025500 A1 | 1/2016 | Hoffberg |
| 2016/0025856 A1 | 1/2016 | Volfson |
| 2016/0027399 A1 | 1/2016 | Wilde et al. |
| 2016/0033966 A1 | 2/2016 | Farris et al. |
| 2016/0033967 A1 | 2/2016 | Bernstein et al. |
| 2016/0039542 A1 | 2/2016 | Wang |
| 2016/0048369 A1 | 2/2016 | Zenoff |
| 2016/0048370 A1 | 2/2016 | Zenoff |
| 2016/0052618 A1 | 2/2016 | Norden |
| 2016/0058644 A1 | 3/2016 | Cheatham et al. |
| 2016/0059074 A1 | 3/2016 | Molyneux et al. |
| 2016/0059075 A1 | 3/2016 | Molyneux et al. |
| 2016/0061396 A1 | 3/2016 | Bosua et al. |
| 2016/0067556 A1 | 3/2016 | Martino |
| 2016/0082953 A1 | 3/2016 | Teller et al. |
| 2016/0089089 A1 | 3/2016 | Kakkar et al. |
| 2016/0090133 A1 | 3/2016 | Bernstein et al. |
| 2016/0091938 A1 | 3/2016 | Edwards et al. |
| 2016/0096093 A1 | 4/2016 | Evans |
| 2016/0096095 A1 | 4/2016 | Williams |
| 2016/0099602 A1 | 4/2016 | Leabman et al. |
| 2016/0099613 A1 | 4/2016 | Bell et al. |
| 2016/0099614 A1 | 4/2016 | Leabman et al. |
| 2016/0099756 A1 | 4/2016 | Leabman et al. |
| 2016/0099757 A1 | 4/2016 | Leabman et al. |
| 2016/0101516 A1 | 4/2016 | Kornbluh et al. |
| 2016/0101517 A1 | 4/2016 | Kornbluh et al. |
| 2016/0101741 A1 | 4/2016 | Bernstein et al. |
| 2016/0107309 A1 | 4/2016 | Walsh et al. |
| 2016/0119541 A1 | 4/2016 | Alvarado-Moya et al. |
| 2016/0120733 A1 | 5/2016 | Ishikawa et al. |
| 2016/0120734 A1 | 5/2016 | Ishikawa et al. |
| 2016/0121164 A1 | 5/2016 | Coza et al. |
| 2016/0121986 A1 | 5/2016 | Riski et al. |
| 2016/0123301 A1 | 5/2016 | Mohajer |
| 2016/0135431 A1 | 5/2016 | Sheldon et al. |
| 2016/0136482 A1 | 5/2016 | Askew, Jr. et al. |
| 2016/0136494 A1 | 5/2016 | Johnston |
| 2016/0136525 A1 | 5/2016 | Soni |
| 2016/0136532 A1 | 5/2016 | Tarng et al. |
| 2016/0137208 A1 | 5/2016 | Powers et al. |
| 2016/0147228 A1 | 5/2016 | Riski |
| 2016/0147308 A1 | 5/2016 | Gelman et al. |
| 2016/0150362 A1 | 5/2016 | Shaprio et al. |
| 2016/0153749 A1 | 6/2016 | Sammut et al. |
| 2016/0154170 A1 | 6/2016 | Thompson et al. |
| 2016/0155200 A1 | 6/2016 | Basu et al. |
| 2016/0163204 A1 | 6/2016 | Raptopoulos et al. |
| 2016/0167807 A1 | 6/2016 | Wang |
| 2016/0171744 A1 | 6/2016 | Rhoads et al. |
| 2016/0179096 A1 | 6/2016 | Bradlow et al. |
| 2016/0184720 A1 | 6/2016 | Christiansen |
| 2016/0187654 A1 | 6/2016 | Border et al. |
| 2016/0191121 A1 | 6/2016 | Bell et al. |
| 2016/0199598 A1 | 7/2016 | Curtis et al. |
| 2016/0202696 A1 | 7/2016 | Bernstein et al. |
| 2016/0205500 A1 | 7/2016 | Lee et al. |

(56) References Cited

U.S. PATENT DOCUMENTS

| | | |
|---|---|---|
| 2016/0209648 A1 | 7/2016 | Haddick et al. |
| 2016/0217327 A1 | 7/2016 | Osterhout et al. |
| 2016/0221683 A1 | 8/2016 | Roberts et al. |
| 2016/0224951 A1 | 8/2016 | Hoffberg |
| 2016/0227361 A1 | 8/2016 | Booth et al. |
| 2016/0233912 A1 | 8/2016 | Thomas et al. |
| 2016/0234356 A1 | 8/2016 | Thomas et al. |
| 2016/0236102 A1 | 8/2016 | Shlomot |
| 2016/0243701 A1 | 8/2016 | Gildert et al. |
| 2016/0246299 A1 | 8/2016 | Berberian et al. |
| 2016/0246326 A1 | 8/2016 | von Badinski et al. |
| 2016/0250516 A1 | 9/2016 | Tropper et al. |
| 2016/0252325 A1 | 9/2016 | Sammut et al. |
| 2016/0257388 A1 | 9/2016 | Holohan et al. |
| 2016/0259979 A1 | 9/2016 | Aguilar et al. |
| 2016/0262608 A1 | 9/2016 | Krueger |
| 2016/0267809 A1 | 9/2016 | deCharms et al. |
| 2016/0269812 A1 | 9/2016 | Wilker et al. |
| 2016/0269819 A1 | 9/2016 | Wilker et al. |
| 2016/0271492 A1 | 9/2016 | Mullen |
| 2016/0273879 A1 | 9/2016 | Volfson |
| 2016/0278652 A1 | 9/2016 | Kaib et al. |
| 2016/0280347 A1 | 9/2016 | Levander et al. |
| 2016/0282871 A1 | 9/2016 | Bernstein et al. |
| 2016/0282956 A1 | 9/2016 | Ouyang et al. |
| 2016/0287937 A1 | 10/2016 | Fitzgerald et al. |
| 2016/0290637 A1 | 10/2016 | Noman et al. |
| 2016/0291591 A1 | 10/2016 | Bernstein et al. |
| 2016/0295978 A1 | 10/2016 | Hyde et al. |
| 2016/0296053 A1 | 10/2016 | Bakhsh |
| 2016/0300508 A1 | 10/2016 | Bakhsh |
| 2016/0302148 A1 | 10/2016 | Buck et al. |
| 2016/0310838 A1 | 10/2016 | Poisner et al. |
| 2016/0313174 A1 | 10/2016 | Lightstone |
| 2016/0327073 A1 | 11/2016 | Amlani et al. |
| 2016/0332060 A1 | 11/2016 | Rogel et al. |
| 2016/0332064 A1 | 11/2016 | Rogel et al. |
| 2016/0332712 A1 | 11/2016 | Holohan et al. |
| 2016/0332748 A1 | 11/2016 | Wang |
| 2016/0338457 A1 | 11/2016 | Gharabegian |
| 2016/0338644 A1 | 11/2016 | Connor |
| 2016/0342767 A1 | 11/2016 | Narasimhan et al. |
| 2016/0346627 A1 | 12/2016 | Le et al. |
| 2016/0349748 A1 | 12/2016 | Bernstein et al. |
| 2016/0353996 A1 | 12/2016 | Fink |
| 2016/0354664 A1 | 12/2016 | DeCarlo |
| 2016/0355257 A1 | 12/2016 | Chappell |
| 2016/0357187 A1 | 12/2016 | Ansari |
| 2016/0357188 A1 | 12/2016 | Ansari |
| 2016/0357262 A1 | 12/2016 | Ansari |
| 2016/0358477 A1 | 12/2016 | Ansari |
| 2016/0368811 A1 | 12/2016 | Eguchi |
| 2016/0371944 A1 | 12/2016 | Phillips et al. |
| 2016/0375333 A1 | 12/2016 | Fryer et al. |
| 2016/0375983 A1 | 12/2016 | Yan et al. |
| 2016/0377271 A1 | 12/2016 | Kelly et al. |
| 2016/0377380 A1 | 12/2016 | Sammut |
| 2016/0379141 A1 | 12/2016 | Judge et al. |
| 2016/0381536 A1 | 12/2016 | Li et al. |
| 2016/0381727 A1 | 12/2016 | Dwarakanath et al. |
| 2017/0010622 A1 | 1/2017 | Pedersen et al. |
| 2017/0014625 A1 | 1/2017 | Rosenbluth et al. |
| 2017/0018001 A1 | 1/2017 | Tunnell et al. |
| 2017/0023458 A1 | 1/2017 | Hart et al. |
| 2017/0039336 A1 | 2/2017 | Bitran et al. |
| 2017/0039599 A1 | 2/2017 | Tunnell et al. |
| 2017/0043216 A1 | 2/2017 | Balakrishnan et al. |
| 2017/0043478 A1 | 2/2017 | Blakely et al. |
| 2017/0045327 A1 | 2/2017 | Arnold |
| 2017/0046979 A1 | 2/2017 | Lehary |
| 2017/0050113 A1 | 2/2017 | Mullen |
| 2017/0050116 A1 | 2/2017 | Shlomot |
| 2017/0055652 A1 | 3/2017 | Hyde et al. |
| 2017/0060646 A1 | 3/2017 | Komulainen |
| 2017/0061404 A1 | 3/2017 | Tunnell et al. |
| 2017/0064058 A1 | 3/2017 | Smith |
| 2017/0071300 A1 | 3/2017 | Gharabegian |
| 2017/0076194 A1 | 3/2017 | Versace et al. |
| 2017/0078400 A1 | 3/2017 | Binder et al. |
| 2017/0080332 A1 | 3/2017 | Poisner et al. |
| 2017/0080352 A1 | 3/2017 | Bernstein et al. |
| 2017/0080861 A1 | 3/2017 | Vora et al. |
| 2017/0082749 A1 | 3/2017 | Volfson |
| 2017/0086015 A1 | 3/2017 | Elkehag |
| 2017/0103457 A1 | 4/2017 | Acuna-Rohter et al. |
| 2017/0132931 A1 | 5/2017 | Hoffberg |
| 2017/0165551 A1 | 6/2017 | Cosman |
| 2017/0173488 A1* | 6/2017 | Yang ............... A63H 33/22 |
| 2017/0206512 A1 | 7/2017 | Hoffberg |
| 2017/0220046 A1 | 8/2017 | Tsai |
| 2017/0246552 A1 | 8/2017 | Anderson |
| 2017/0304705 A1 | 10/2017 | Hermandorfer |
| 2017/0305538 A1 | 10/2017 | Iskrev et al. |
| 2017/0331988 A1 | 11/2017 | Hollinger |
| 2017/0356707 A1 | 12/2017 | Fridman et al. |
| 2017/0358103 A1 | 12/2017 | Shao et al. |
| 2018/0021630 A1* | 1/2018 | Monnin ............. A63F 13/235 |
| | | 473/570 |
| 2018/0036641 A1 | 2/2018 | Parisi |
| 2018/0043229 A1 | 2/2018 | Stemle |
| 2018/0049043 A1 | 2/2018 | Hoffberg |
| 2018/0068358 A1 | 3/2018 | Hoffberg |
| 2018/0082601 A1 | 3/2018 | Muir et al. |
| 2018/0093133 A1 | 4/2018 | Decarlo |
| 2018/0093781 A1 | 4/2018 | Mallinson |
| 2018/0147455 A1 | 5/2018 | Lee |
| 2018/0161637 A1 | 6/2018 | Warren |
| 2018/0161638 A1 | 6/2018 | Warren |
| 2018/0161639 A1 | 6/2018 | Warren |
| 2018/0181654 A1* | 6/2018 | Young ............... A63B 43/06 |
| 2018/0182147 A1 | 6/2018 | Imamura et al. |
| 2018/0189971 A1 | 7/2018 | Hildreth |
| 2018/0200641 A1 | 7/2018 | Warren |
| 2018/0200642 A1 | 7/2018 | Warren |
| 2018/0271062 A1 | 9/2018 | Toolan et al. |
| 2018/0274938 A1 | 9/2018 | Okada |
| 2018/0275248 A1 | 9/2018 | Bailey et al. |
| 2018/0280780 A1 | 10/2018 | Nakao et al. |
| 2018/0326318 A1 | 11/2018 | Blumenfeld et al. |
| 2018/0338709 A1 | 11/2018 | Krans et al. |
| 2018/0349504 A1 | 12/2018 | Gyongyi et al. |
| 2018/0369639 A1 | 12/2018 | Tropper et al. |
| 2019/0054358 A1 | 2/2019 | Bennrubi et al. |
| 2019/0060714 A1 | 2/2019 | Wolfe |
| 2019/0060770 A1 | 2/2019 | Shlomot |
| 2019/0118094 A1* | 4/2019 | McCoy ............. H04L 9/0643 |
| 2023/0327874 A1* | 10/2023 | True, Jr. ............ H04L 9/32 |
| | | 701/519 |

OTHER PUBLICATIONS

Alam, F., S. Watkins, and A. Subic. "The aerodynamic forces on a series of tennis balls." In Proceedings of the 15th Australasian fluid mechanics conference, pp. 13-17. 2004.

Alaways, LeRoy Ward. "Aerodynamics of the curve-ball: an investigation of the effects of angular velocity on baseball trajectories." PhD diss., University of California, Davis, 1998.

Barrios, Carlos, "IMU-Based Inertial Navigation—Algorithm Design Using Adaptive Kalman Filtering and Cosine Matrices", M.S. Thesis, Rochester Inst. Of Tech. (2006).

Bauer, Steven. "An aerodynamic assessment of micro-drag generators (MDGs)." In 16th AIAA Applied Aerodynamics Conference, p. 2621. 1998.58.

Baumback, Kathleen. "The aerodynamics of frisbee flight." Undergraduate Journal of Mathematical Modeling: One+ Two 3, No. 1 (2010): 31.

Bryan, George Hartley, and W. Ewart Williams. "The longitudinal stability of aerial gliders." Proceedings of the Royal Society of London 73, No. 488 (1904): 100-116.

Carwell, Michael, and Ignacio Birriel. "The Physics of Frisbee Golf." (2018).

(56) References Cited

OTHER PUBLICATIONS

Christidis, Konstantinos, and Michael Devetsikiotis. "Blockchains and smart contracts for the internet of things." Ieee Access 4 (2016): 2292-2303.
Cohen, Graeme, Langtry, Tim, Proc. Of the 5$^{th}$ Australian Conf. on Mathematics and Computers in Sport, 5M&CS Jun. 14-16, 2000.
Craft, Tim, Nick Johnson, and Brian Launder. "Back to the future? A re-examination of the aerodynamics of Flettner-Thom rotors for maritime propulsion." Flow, turbulence and combustion 92, No. 1 (2014): 413-427.
Crowther, W. J., and J. R. Potts. "Simulation of a spin-stabilised sports disc." Sports Engineering 10, No. 1 (2007): 3-21.
De Marco, A., S. Mancini, C. Pensa, G. Calise, and F. De Luca. "Flettner rotor concept for marine applications: A systematic study." International Journal of Rotating Machinery 2016 (2016).
Dol, Sharul Sham, Gregory A. Kopp, and Robert J. Martinuzzi. "The suppression of periodic vortex shedding from a rotating circular cylinder." Journal of Wind Engineering and Industrial Aerodynamics 96, No. 6-7 (2008): 1164-1184.
Fantoni, Iet Gsanahuja, and Guillaume Sanahuja. "Optic flow-based control and navigation of mini aerial vehicles." (2014).
Fregene, Kingsley, David Sharp, Cortney Bolden, Jennifer King, Craig Stoneking, and Steve Jameson. "Autonomous guidance and control of a biomimetic single-wing MAV." In AUVSI Unmanned Systems Conference, pp. 1-12. Arlington, VA: Assoc. for Unmanned Vehicle Systems International, 2011.
Haake, S. J., S. R. Goodwill, and M. J. Carre. "A new measure of roughness for defining the aerodynamic performance of sports balls." Proceedings of the Institution of Mechanical Engineers, part C: Journal of mechanical engineering science 221, No. 7 (2007): 789-806.
Hably, Ahmad, Jonathan Dumon, and Garrett Smith. "Control of an airborne wind energy system with a Magnus effect." In 2016 American Control Conference (ACC), pp. 4978-4983. IEEE, 2016.
Han, Cheolheui, "한철희."미래 수직 이착륙 항공기 로서의 UFO 형 항공기 공기역학 추정." ("Estimation of the Aerodynamics of UFO-Type Aircraft as a Future VTOL Aircraft") 융·복합기술연구소 논문집 5, No. 2 (2015): 1-6, ISSN : 2233-8667.
Hannah, Elizabeth Mackenzie. "Constraining frisbee tracking methods through Bayesian analysis of flying disc models." (2017).
Hasegawa, Hiroaki, Tatsuya Shimakawa, Kazuo Matsuuchi and Kenichi Nakagawa, "Transient Vortex Structures of a Discoid Airfoil during Impulsive Incidence Variation", 可視化情 報学会論文集 vol.*, No.* ( **年  月 ) pp .*-* (circa 2014).
Hildebrand, Falk. "Modelling Of Discus-Flight." In ISBS-Conference Proceedings Archive. 2001.
Hubbard, M., and S. A. Hummel. "Simulation of Frisbee flight." In 5th Conference on Mathematics and Computers in Sport, University of Technology, Sydney, pp. 124-134. 2000.
Hummel, S., and Mont Hubbard. "Identification of Frisbee aerodynamic coefficients using flight data." In 4th International Conference on the Engineering of Sport, Kyoto, Japan, vol. 20. 2002.
Hummel, Sarah Ann. Frisbee flight simulation and throw biomechanics. University of California, Davis, 2003.
Imayama, Shintaro, P. Henrik Alfredsson, and Rebecca J. Lingwood. "Experimental study of rotating-disk boundary-layer flow with surface roughness." Journal of Fluid Mechanics 786 (2016): 5-28.
Imayama, Shintaro. "Experimental study of the rotating-disk boundary-layer flow." PhD diss., KTH Royal Institute of Technology, 2012.
Jalilian, Pouya, Patrick K. Kreun, M. M. Makhmalbaf, and William W. Liou. "Computational aerodynamics of baseball, soccer ball and volleyball." American Journal of Sports Science 2, No. 5 (2014): 115-121.
James, David, and Steve Haake. "The spin decay of sports balls in flight." The engineering of sport 7 (2008): 165-170.
John, Benzi, Xiao-Jun Gu, Robert W. Barber, and David R. Emerson. "High-speed rarefied flow past a rotating cylinder: the inverse Magnus effect." Aiaa Journal 54, No. 5 (2016): 1670-1681.

Kamaruddin, Noorfazreena Mohammad. "Dynamics and Performance of Flying Discs." (2011).
Kamaruddin, Noorfazreena, Jonathan Potts, and William Crowther. "Aerodynamic performance of flying discs." Aircraft Engineering and Aerospace Technology (2018).
Kao, Shawn S., Richard W. Sellens, and Joan M. Stevenson. "A mathematical model for the trajectory of a spiked volleyball and its coaching application." Journal of applied biomechanics 10, No. 2 (1994): 95-109.
Karabelas, S. J., and N. C. Markatos. "Aerodynamics of fixed and rotating spoked cycling wheels." Journal of fluids engineering 134, No. 1 (2012).
Kensrud, Jeffrey R., and Lloyd V. Smith. "In situ drag measurements of sports balls." Procedia Engineering 2, No. 2 (2010): 2437-2442.
Kim, Jooha, Haecheon Choi, Hyungmin Park, and Jung Yul Yoo. "Inverse Magnus effect on a rotating sphere: when and why." Journal of Fluid Mechanics 754 (2014).
Libii, J. Njock. "Design of an experiment to test the effect of dimples on the magnitude of the drag force on a golf ball." World Transactions on Engineering and Technology Education 5, No. 3 (2006): 477.
Lindebaum, B., and William Blake. "The VZ-9 Avrocar." web.archive.org/web/20060927042257/http://www.vtol.org/pdf/Vertiite-VZ9.pdf (1998).
Lissaman, Peter, and Mont Hubbard. "Maximum range of flying discs." Procedia Engineering 2, No. 2 (2010): 2529-2535.
Lorenz, Ralph D. "Flight and attitude dynamics measurements of an instrumented Frisbee." Measurement Science and Technology 16, No. 3 (2005): 738.
Lorenz, Ralph D. "Flight Dynamics Measurements on an Instrumented Frisbee" unpublished note (2003).
Lorenz, Ralph D. "The Instrumented Frisbee® as a Prototype for Planetary Entry Probes." (2005).
Lorenz, Ralph D., "Spinning Flight Dynamics of Frisbees, Boomerangs, samaras, and Skipping Stones", Springer (2006).
Lukes, R. A., J. H. Hart, Jonathan Potts, and S. J. Haake. "A CFD analysis of flow around a disc." Procedia Engineering 72 (2014): 685-690.
Luu, Loi, Viswesh Narayanan, Chaodong Zheng, Kunal Baweja, Seth Gilbert, and Prateek Saxena. "A secure sharding protocol for open blockchains." In Proceedings of the 2016 ACM SIGSAC Conference on Computer and Communications Security, pp. 17-30. 2016.
Mehta, Rabindra D. "Aerodynamics of sports balls." Annual Review of Fluid Mechanics 17, No. 1 (1985): 151-189.
Mehta, Rabindra D., and Jani M. Pallis. "Sports ball aerodynamics: effects of velocity, spin and surface roughness." Minerals, Metals and Materials Society/AIME, Materials and Science in Sports (USA), (2001): 185-197.
Mitchell, Timothy Lewis. "The aerodynamic response of airborne discs." (1999).
Morrison, V. R. "The physics of frisbees." Electronic Journal of Classical Mechanics and Relativity 8, No. 48 (2005).
Motoyama, Eugene. "The Physics of Flying Discs." Semantic Scholar (2002).
Moukhtar khalid, Hanaa Khalid "Study of the aerodynamics of translating spinning discs in laminar and turbulent flow." Ph.D. Dissertation, University of Khartoum 2012.
Nakamoto, Satoshi. Bitcoin: A peer-to-peer electronic cash system. Manubot, 2019.
Nakamura, Y., and N. Fukamachi. "Visualization of the flow past a frisbee." *Fluid dynamics research* 7, No. 1 (1991): 31.
Nathan, Alan M. "The Effect of Spin-Down on the Flight of a Baseball." (2008).
Nian, Lam Pak, and David Lee Kuo Chuen. "Introduction to bitcoin." In Handbook of digital currency, pp. 5-30. Academic Press, 2015.
Pallis, J. M., and R. D. Mehta. "Aerodynamics and hydrodynamics in sports." The Engineering of Sport 4 (2002): 31-39.
Pearson, D. R. "The use of flettner rotors in efficient ship design." In Proceedings of the Influence of EEDI on Ship Design Conference. 2014.

(56) References Cited

OTHER PUBLICATIONS

Pilkington, Marc. "Blockchain technology: principles and applications." In Research handbook on digital transformations. Edward Elgar Publishing, 2016.
Plakhov, Alexander, Tatiana Tchemisova, and Paulo Gouveia. "Spinning rough disc moving in a rarefied medium." Proceedings of the Royal Society A: Mathematical, Physical and Engineering Sciences 466, No. 2119 (2010): 2033-2055.
Potts, J. R., and W. J. Crowther. "Visualisation of the Flow Over a Disc-wing." In Proc. of the Ninth International Symposium on Flow Visualization, Edinburgh, Scotland, UK. 2000.
Potts, Jonathan R., and Dominic Masters. "Validation of the aerodynamic loading on basic flying disc geometries derived from CFD simulations." Procedia Engineering 112 (2015): 400-405.
Potts, Jonathan R., and William J. Crowther. "Application of flow control to a disc-wing UAV." In Proc. 16th Bristol UAV Systems Conf. UK. 2000.
Potts, Jonathan Roger, "Disc-wing aerodynamics." PhD diss., University of Manchester, 2005.
Potts, Jonathan, and William Crowther. "Flight control of a spin stabilised axi-symmetric disc-wing." In 39th Aerospace Sciences Meeting and Exhibit, p. 253. 2001.
Potts, Jonathan, and William Crowther. "Frisbee (TM) aerodynamics." In 20th AIAA applied aerodynamics conference, p. 3150. 2002.
Povarov, O. A., O. I. Nazarov, L. A. Ignat'evskaya, and A. I. Nikol'Skii. "Interaction of drops with boundary layer on rotating surface." Journal of engineering physics 31, No. 6 (1976): 1453-1456.
Quabeck, Helmut, "On the Longitudinal Stability of Gliders", HQ-Modellflugliteratur circa 2007.
Recktenwald, Bryan, Gilbert L. Crouse Jr, and Anwar Ahmed. "Experimental investigation of a circular-planform concept aircraft." Journal of aircraft 47, No. 3 (2010): 887-894.
Ren, Larry. "Proof of stake velocity: Building the social currency of the digital age." Self-published white paper (2014).
Rohde, Axel. "A computational study of flow around a rotating disc in flight." PhD diss., Florida Institute of Technology, 2000.
Sadek, S.A., and S.A. Ragab, "Aerodynamics of Rotating Discs", Proceedings of ICFD 10: Tenth International Congress of Fluid Dynamics, Dec. 16-19, 2010, Stella Di Mare Sea Club Hotel, Ain Soukhna, Red Sea, Egypt.
Schroeder, Erynn J. "An Aerodynamic Simulation of Disc Flight." (2015).
Schuurmans, Macé. "Flight of the Frisbee." New Scientist 127, No. 1727 (1990): 37-40.
Scodary, Anthony, "The Aerodynamics and Stability of Flying Disks", (Submitted as coursework for Physics 210, Stanford University, Autumn 2007).
Seifert, Jost. "A review of the Magnus effect in aeronautics." Progress in Aerospace Sciences 55 (2012): 17-45.
Smits, A. J., and D. R. Smith. "A new aerodynamic model of a golf ball in flight." In Proceedings of the 1994 World Scientific Congress of Golf. 1994.
Stilley, G. D. Aerodynamic analysis of the self-suspended flare. Honeywell Inc Hopkins MN Government and Aeronautical Products Div, 1972.
Tanzosh, John P., and Howard A. Stone. "Transverse motion of a disk through a rotating viscous fluid." Journal of Fluid Mechanics 301 (1995): 295-324.
Tuck, E. O., and L. Lazauskas. "Lifting surfaces with circular planforms." Journal of ship research 49, No. 4 (2005): 274-278.
USA Ultimate, 5825 Delmonico Dr., Suite 350, Colorado Springs, CO 80919, "Drawing No. DSWG-002-01_Disk Technical Standard" (2015).
Watts, Robert G., and Ricardo Ferrer. "The lateral force on a spinning sphere: Aerodynamics of a curveball." American Journal of Physics 55, No. 1 (1987): 40-44.
Weidman, Patrick D., and Michael A. Sprague. "Steady and unsteady modelling of the float height of a rotating air hockey disk." Journal of Fluid Mechanics 778 (2015): 39.
Wheatley, John B. "The aerodynamic analysis of the gyroplane rotating-wing system." (1934).
Zhao, Jie, Qingming Hou, Hongzhe Jin, Jihong Yan, Yanhe Zhu, and Ge Li. "Discussion on improving Magnus effect of cylinder based on CFD." In 2013 IEEE International Conference on Mechatronics and Automation, pp. 539-543. IEEE, 2013.
Zimmerman, Charles H. Aerodynamic characteristics of several airfoils of low aspect ratio. No. 539. National Advisory Committee for Aeronautics, 1935.

\* cited by examiner

STEERABLE ROTATING PROJECTILE

CROSS REFERENCE TO RELATED APPLICATIONS

The present application is Continuation of U.S. patent application Ser. No. 16/363,305, filed Mar. 25, 2019, now U.S. Pat. No. 11,712,637, issued Aug. 1, 2023, which is a non-provisional of, and claims benefit of priority from, U.S. Provisional Patent Application No. 62/647,005, filed Mar. 23, 2018, and U.S. Provisional Patent Application No. 62/681,193, filed Jun. 6, 2018, U.S. Provisional Patent Application No. 62/778,015, filed Dec. 11, 2018, and U.S. Provisional Patent Application No. 62/813,987, filed Mar. 5, 2019, the entirety of which are expressly incorporated herein by reference in their entirety.

FIELD OF THE INVENTION

The present application relates to systems and methods for controlling a flight path and/or steering force on a moving projectile that may be subject to rotation.

BACKGROUND OF THE INVENTION

Each reference cited herein is expressly incorporated by reference in its entirety. These incorporations are intended to provide written description for aspects of the invention, to provide enabling teachings, regardless of field of specialization, and to define useful combinations and contexts of use. Reference citation is not intended to admit prior art or analogous art status, which is determined by 35 USC §§ 102, 103. The scope of the claims herein are expressly limited to the patent eligible (e.g., non-abstract) embodiments disclosed herein, and any interpretation that encompasses merely abstract ideas or natural principles is hereby disclaimed. This shall be an express governing principle, and shall override any extrinsic evidence.

The "Frisbee®" is a well-known flying disk toy that is typically formed as an integral aerodynamic rigid tough plastic shell, in a dished shape of about 8-12 inches in diameter, with a weight of about 110-200 gm, with a typical design having a standard weight of about 175 gm and 10.75" (27.5 cm) diameter (e.g., Ultimate Frisbee). It is thrown with an applied torque, such that it acquires spin as it is launched, i.e., has rotational and translational components to its motion vector. An inverted dish shape provides lift, while drag on the exterior surface(s) also impact aerodynamics. In flight, a Frisbee is gyroscopically stabilized, and the lift is balanced by the weight, permitting nearly level flight for a significant portion of the path. If launched with a non-neutral roll while thrown, dished disks tend to assume a curved flight path, due to the effect of gravitational force, precession, and aerodynamics on the flight path. Other anomalies can also disrupt a straight line flight. Frisbees are related to boomerangs, which also rotate during flight and have significant aerodynamic influences on their flight path.

DE102012002825A1, expressly incorporated by reference, proposes (with sparse disclosure) a number of possible methods of steering a Frisbee, including moving a mass laterally within the spinning shell to produce an impulse, drive a counter-rotating mass to create a static mass offset, and rotationally synchronized laterally-oriented thrusters. However, this does not disclose power and power management for useful duration of use, weight control, etc., and is an incomplete solution.

A Frisbee is a low-aspect ratio wing-in that sense its lift and drag can be considered conventionally. Various studies have shown that in a typical design, the rotation of the disk during flight has a relatively small influence on the aerodynamics, principally related to asymmetric drag, and typical disks are designed to minimize the asymmetric forces. In common with many low-aspect ratio shapes, the flight behavior of a rotating disk may be predictable. A key aspect of control is the pitch moment, and how to mitigate its effects. The conventional Frisbee does this in two ways. First, a deep peripheral lip reduces the pitch moment to manageable values. Secondly, the thickness of the plastic in a Frisbee is adjusted across the disc, such that much of the disc's mass is concentrated at the edge, to make a thick lip and increase the moment of inertia. The precession rate is equal to the pitch moment divided by the moment of inertia and spin angular velocity. Keeping the precession down to a few degrees over the flight duration of a couple of seconds is important to stable flight. (According to one aspect of the inventive technology, the pitch moment may be varied, for example by altering the moment of inertia by a radial displacement of a set of balanced masses or fluidic mass. The aerodynamics may also be controlled during flight to alter the pitch moment). A Frisbee is manufactured to be robust, and its intended use subjects the projectile to harsh conditions, such as shock, dirt, water, salt water, mud, impacts, manual launch, grabbing, dog catching and retrieval, etc.

Several sports have developed using the Frisbee® notably Guts, Freestyle, Ultimate, and Disc Golf. Guts is a game in which two opposing teams take turns throwing the disc at each other, the goal being to have the disc hit the ground in a designated zone without being caught. Freestyle is more of a demonstration sport like gymnastics, with exotic and contorted throws, catches, and juggles evaluated for difficulty, precision, and artistic impression. The Frisbee may also be used as a target sport. In one variant, a golf-like game, the aim is to hit the targets in as few throws as possible. "Hot Zone," is a competition sport where a player throws a Frisbee to be caught in a specified zone by a dog (often a sheepdog breed).

Ultimate is a team passing game with similarities to basketball and American football. Teammates work the Frisbee forward across a 70-yard long field, 40 yards across, by passing from one team member to the other. If possession is lost, either by the disc going out of bounds, falling to the ground without being caught, or being caught by a member of the opposing team, the opposing team takes possession. A point is scored when the disc is caught in the end-zone. A thrower in Ultimate must toss to a teammate while avoiding interception, and therefore curved flights are essential. Sometimes the thrower may be blocked by an opposing player and thus must use an exotic throw, such as the overhead "hammer", where the disc is thrown over the shoulder in a vertical orientation, to roll onto its back and fly at near −90° angle of attack. The catcher must anticipate how long the disc may hang in the air, and especially any turns it may make towards the end of its flight.

An "Aerobie" is a toroid-shaped object with a flat profile, open center, and aerodynamic inner and outer edges to provide stability over a range of speeds, and long-distance flight. The configuration better aligns the center of lift and center of mass as compared to a closed surface, since during flight the lift attributable to the forward edge of the ring and the rear edge of the ring tend to balance, reducing misalignment of center of lift and center of mass.

One issue in guiding a rotating object is that the rotation gyroscopically stabilizes the projectile, and attempts to steer the projectile with modification of the axis of rotation, and off the gyroscopically stabilized flight path, result in reactive forces. Meanwhile, the vertical cross section is small, making generation of forces purely orthogonal to the axis of rotation difficult.

A Frisbee in flight is subject to three main external forces: weight (along a gravitational vector from the center of mass), lift (along a lift axis from center of lift) and drag (along a translational axis and a rotational axis). In addition, the Frisbee rotation induces gyroscopic reactive forces in response to perturbations. See, Hanaa Khalid Moukhtar Khalid, Study of the aerodynamics of translating spinning discs in laminar and turbulent flow, Ph.D. dissertation, University of Khartoum (2012); Erynn J. Schroeder, An Aerodynamic Simulation of Disc Flight, Honors Thesis, College of St. Benedict and St. John's University (April 2015).

Weight acts along the gravitational vector, generally downward. In a typical Frisbee, the structure is dynamically balanced with the center of mass at the physical center of the disk.

Lift from the airflow along the axis of translation (generally in the y axis direction) opposes the gravitational force, and maintains the Frisbee in the air. Lift is caused by differential air pressure and follows what is known as the Bernoulli principle. The curvature of the disc causes the air moving on top of the disc to travel faster and therefore have lower pressure than the air moving on the bottom of the disc. Similar to a plane wing, this difference in pressure above the disc and below the disc results in lift. The center of lift is typically offset from the center of mass due to the aerodynamics of the axisymmetric inverted disk shape, and thus applies a torque. This, in turn, causes a reaction force when the disk is spinning. Lift can be calculated using the equation: $L=(\frac{1}{2})C_l A \rho V^2$, where A is the Area of the cross section; p is the density of air, V is the relative velocity between the air and the Frisbee; and $C_l$ is the Coefficient of lift. This depends on the shape of the disc and angle of attack (the angle between the horizontal and the direction of air flow). Generally, $C_l$ increases linearly in relation to an increase of an angle of attack, until a certain point where it drops off.

Drag, the result of air resistance, acts parallel to the flow of the air (x-direction), opposite the direction of flight, and is what slows translation and rotation of the Frisbee. Translational drag is calculated using an equation similar to lift: $L=(\frac{1}{2})C_d A \rho V^2$, where $C_d$ in this equation is the coefficient of drag. Contrary to lift, the coefficient of drag increases quadratically with an increase in the angle of attack. Because the Frisbee typically has an angle of attack, and the drag acts along the axis of movement, the drag is not normal to the axis of rotation. The rotation creates a circumferential drag, having a drag asymmetry due to translation, since the pressure on the leading edge is higher than the pressure on the trailing edge, and the flow of air around the disk and relative speed between the edge of the disk and the surrounding air is also asymmetric. This leads to a Magnus force along a horizontal vector normal to the translational vector.

A relationship between L and D is formed through the lift-to-drag ratio (L/D). The lift-to-drag ratio varies depending on the angle of attack. An angle of attack of around 15° maximizes the lift-to-drag ratio, resulting in the most efficient flight. That is, a vertical axis of rotation is less efficient than an inclined axis of rotation. Shereef A. Sadek, Saad A. Ragab, Aerodynamics of Rotating Discs, Tenth International Congress of Fluid Dynamics Dec. 16-19, 2010, Ain Soukhna, Red Sea, Egypt, ICFDIO-EG-3901. Potts and Cowther [2], studied the aerodynamics of Frisbee-like discs that had an approximately elliptic cross-section and hollowed out underside cavity. The lift and drag coefficients were found to be independent of Reynolds number for the range of tunnel speeds tested. The upper surface flow is characterized by separation at a line (arc) of constant radius on the leading edge rim, followed by reattachment at a line of similar geometry. Trailing vortices detach from the trailing edge rim. Cavity flow is characterized by separation at the leading edge lip, followed by straight-line reattachment. Badalamenti and Prince [3], studied rotating disk endplates in crossflow for a range of Reynolds numbers, finding that endplates enhance the lift/drag ratio and increase lift up to a limiting value.

The Navier-Stokes equations are of general application in aerodynamic analysis: $\partial Q/\partial t + \partial E/\partial \varepsilon + \partial F/\partial \eta + \partial G/\partial \zeta = 0$, where Q is the vector of conserved variables in generalized coordinates: $\varepsilon$, $\eta$ and $\zeta$ are the generalized coordinates; and G, F and G are the total flux (convective and viscous) in the direction of generalized coordinates $\varepsilon$, $\eta$ and $\zeta$, respectively. See, Imayama, Shintaro, "Experimental study of the rotating-disk boundary-layer flow", May 2012, Technical Reports from Royal Institute of Technology, KTH Mechanics, SE-100 44 Stockholm, Sweden.

For a non-rotating disc, the minimum friction velocity occurs at the leading and trailing edges of the disc. At the leading edge, the flow is stagnant and the boundary layer is very thin. At the trailing edge, there is a small separation region where the flow is recirculating at a very low speed. As the rotation speed is increased, $\lambda=0.78$, the contour lines become asymmetric and the location of the minimum value moves counterclockwise along the circumference in the negative x-y plane. The maxima of z increases with the increase in $\lambda$, but remains in the positive x-y plane along the circumference near the leading edge. This is due to the fact that the net relative flow velocity to the disc surface increases in the positive x-y plane while it is reduced in the negative x-y plane. As the rotation speed is increased above the free stream speed, $\lambda=1.51$, a double-minima is developed on the upper and lower disc surfaces and the location of the minima moves inward towards the center at −90° with the positive x-axis direction. This is due to the fact that the surface speed matches the flow speed at some radial distance less than the disc radius. Finally, at $\lambda=1.89$, a well defined minima is present on the upper and lower surfaces approximately half a radius away from the center. This is a unique feature of this flowfield. The maximum z is always located on the disc's circumference since the relative flow velocity is always positive in the positive x-y plane.

For the non-rotating case, the disc behaves like a finite wing with low aspect ratio. Upstream of the disc center on the upper side, the typical leading edge suction, and on the lower side, high pressure region. A common feature of finite wings are the tip vortices, which are present in here as well. Low pressure coefficient can be seen at the disc tips at an approximate angle of 75° from the positive x-direction. These suction peaks are due to the tip vortices formation that is typical of such flowfields. For the rotating-disc, the first noticeable effect due to rotation is the breaking of the flow symmetry. Upstream of the disc center, the pressure coefficient looks similar to the non-rotating case, this might be due to the fact that the boundary layer is very thin and still developing. On the other hand, downstream of the disc center, the rotation effects are more significant. This is evident by the degree of asymmetry in the pressure coefficient contours downstream of the disc center on the upper and lower surfaces. This asymmetry is because the disc rotation affects the surface shear stress distribution along the disc surface as shown above, the surface shear stress being higher in the positive x-y-half-plane than in the negative x-y-half-plane. This in turn changes the boundary thickness distribution along the disc surface in an asymmetric manner. The asymmetric surface shear stress creates more adverse pressure gradient in the positive x-y half-plane and more favorable pressure gradient in the negative x-y half-plane. Hence, to the incoming inviscid flow the effective disc shape is asymmetric.

The asymmetric surface shear stress affects the surface pressure distribution, and also affects the shape of the tip vortices and the shed wake. The vortex size is greater for the rotating disc, which also indicates that the separation at the tip occurs earlier than in the non-rotating case. For the rotating disc, the vortex size is reduced and its center is further off the disc surface. For the rotating disc the wake diffuses much faster than the non-rotating case. This suggests that the rotation has the effect of weakening the tip vortices which means that the disc loses lift.

In general, the rotation increases drag of the disc. The side force is directed in the negative y-direction and the moment direction is opposite to the direction of rotation as expected. The increase in drag coefficient is mainly due to increase in the shear stress. For $\alpha=0.0°$, the viscous drag increases by about 40% and by 50% for $\alpha=10.00$. On the other hand, disc rotation increases the pressure drag at $\alpha=0.0°$ by about 380% for the same rotation speed; but it has insignificant influence at $\alpha=10.0°$. In summary, the drag coefficient increases with disc rotation; however, disc rotation reduces the increase in drag with $\alpha$. Disc rotation reduces the lift coefficient by about 4% of the non-rotating disc value. In a rotating-disc, the tip vortices are weaker than in the case of nonrotating disc. Disc rotation alters the surface shear stress distribution which in turn changes the boundary layer thickness and structure. The asymmetric surface shear stress creates asymmetric boundary layer thickness, and hence viscous-inviscid interaction leads to asymmetric surface pressure distribution. Disc rotation also affects the tip vortices which leads to weakening of the shed vorticity, this in turn reduces the lift coefficient. Drag coefficient increase significantly due to rotation at zero angle of attack but is reduced significantly at 10.0° angle of attack.

Aerodynamic drag on sports balls was observed to depend on the ball speed, rotation, roughness, and orientation. A so-called "drag crisis" is observed. See, Jeffrey R. Kensrud, Lloyd V. Smith, Ball Aerodynamics, 8th Conference of the International Sports Engineering Association (ISEA) In situ drag measurements of sports balls. Understanding the flight of a ball involves two aerodynamic properties, lift and drag. Lift can be described as the force, not including gravity, on a ball that is directed perpendicular to the ball's trajectory. Drag is the force, $F_d$ in the direction opposing the ball's flight path. The drag coefficient, $C_d$ is found from $D_d+=2F_d/\rho AV^2$, where $\rho$ is the density of air, A is the cross sectional area of the ball, and V is the speed of the ball. Drag is a function of surface roughness, velocity, and orientation of the ball. It is convenient to use a non-dimensional form of velocity, expressed in terms of the Reynolds number, Re, defined by $Re=v_D/v$, where D is diameter of the ball and v is kinematic viscosity of air. The effect of speed on drag can be described by three characteristic ranges. At a low Reynolds number, flow is laminar until separation occurs at roughly 80° from the stagnation point. When the Reynolds number is increased, the separation region becomes turbulent and attaches itself again, carrying the separation point to the backside of the ball to about 120° from the stagnation point. As the separation point moves to the back of the ball, drag is reduced. The reduction in drag can be large and occur over a small change in the Reynolds number. This is referred to as the Drag Crisis, and often occurs at game speeds. In other words, the ball is designed so that, during typical game play, drag crisis is relevant to the ball motion.

As the Reynolds number is increased further, the flow becomes completely turbulent in the boundary layer just after the stagnation point, causing the drag to increase again. The drag crisis has been observed on a smooth sphere for many years. Millikan and Klein explored the drag crisis in their free flight test finding $C_d$ on a smooth sphere as low as 0.08. Achenbach analyzed how surface roughness on a sphere can change behavior in the critical Reynolds region. His data suggested that as surface roughness increased on a sphere, the drag crisis was induced at a lower Reynolds number and was less severe.

The drag crisis is apparent for both the golf ball and smooth sphere. A dimpled surface of the golf ball causes a drag crisis at a lower Reynolds number than the smooth sphere. The optimized dimple pattern of the golf ball helps maintain a relatively large magnitude of its drag crisis. While the stitched balls (baseballs, softballs, and cricket balls) show $C_d$ decreasing with increasing speed, the magnitude of their drag crisis is significantly smaller than the smooth sphere and golf ball. Scatter in drag is larger for the balls with raised seams (NCAA baseball and 89 mm softball). The arrangement of the stitches likely plays a role in the drag crisis. The drag crisis is a result of turbulence developing in the boundary layer of the ball. The stitches trip the boundary layer earlier than a smooth sphere, inducing turbulence and moving the flow separation point to the backside of the ball. In the normal orientation, the stitches are close to the flow separation point, which is apparently fixed to the stitch location for balls with raised seams. For smooth spheres, the separation point (and drag) depends on the air speed. For balls with raised seams, the separation point (and drag) depends on variation in ball orientation and air speed. The parallel orientation of the cricket ball exhibited the largest drag crisis; as the stitches are removed from the separation point in this orientation, providing a relatively smooth flow surface. Balls with raised seams (NCAA baseball and 89 mm softball) exhibit a higher relative Cd and a drag crisis at a lower relative Reynolds number. Both trends are consistent for balls of higher relative roughness. Similar to rotating dimpled spheres, drag on a baseball increases with spin but with less magnitude. While the effect is small, it is measurable and affects the ball flight. Pitched balls (including knuckleballs) usually have some rotation and therefore do not achieve the low $C_d$. Thus, in play, one should expect pitched balls to have a drag coefficient between 0.3 and 0.4. However, for pitchers like Tim Wakefield, who can deliver a ball with no rotation, a pronounced drag crisis is more likely to occur, where the $C_d$ could be as low as 0.26. Smooth spheres, golf balls, and balls with flat seams show a strong drag crisis, while raised seam balls show a weak drag crisis. Rotation had an effect on drag, increasing the average $C_d$ on a baseball by 20%. It is difficult to pitch baseballs with no rotation. Hence, most baseball pitches will have a $C_d$ of 0.35 (the average drag observed for rotating balls).

For spinning balls, the Magnus effect is responsible for producing the side or lift force. A negative or reverse Magnus effect can be created. Surface roughness, can be used to generate an asymmetric flow, assisting in the Magnus effect. See, Rabindra D. Mehta and Jani Macari Pallis, "Sports Ball Aerodynamics: Effects of Velocity, Spin and Surface Roughness", Materials and Science In Sports, Edited by: E H. (Sam) Froes and S. J. Haake, Pgs. 185-197. Almost all ball games are played in the Reynolds Number range of between about 40,000 to 400,000. The Reynolds number is defined as, Re=Ud/v, where V is the ball velocity, d is the ball diameter and v is the air kinematic viscosity. Small disturbances on the ball surface, such as the stitching on baseballs and cricket balls, the felt cover on tennis balls and patch-seams on volleyballs and soccer balls, are about the right size to affect boundary layer transition and development in this Re range. See Mehta and Pallis (2001a).

Consider the flight of a smooth sphere through an ideal or inviscid fluid. As the flow accelerates around the front of the sphere, the surface pressure decreases (Bernoulli equation) until a maximum velocity and minimum pressure are achieved half-way around the sphere. The reverse occurs over the back part of the sphere so that the velocity decreases and the pressure increases (adverse pressure gradient). In a real viscous fluid such as air, a boundary layer, defined as a thin region of air near the surface, which the sphere carries with it, is formed around the sphere. The boundary layer cannot typically negotiate the adverse pressure gradient over the back part of the sphere and it will tend to peel away or "separate" from the surface. The pressure becomes constant once the boundary layer has separated and the pressure difference between the front and back of the sphere results in a drag force that slows down the sphere. The boundary layer can have two distinct states: "laminar", with smooth tiers of air passing one on top of the other, or "turbulent", with the air moving chaotically throughout the layer. The turbulent boundary layer has higher momentum near the wall, compared to the laminar layer, and it is continually replenished by turbulent mixing and transport. It is therefore better able to withstand the adverse pressure gradient over the back part of the sphere and, as a result, separates relatively late compared to a laminar boundary layer. This results in a smaller separated region or "wake" behind the ball and thus less drag.

The "transition" from a laminar to a turbulent boundary layer occurs when a critical sphere Reynolds number Re is achieved. The flow over a sphere can be divided into four distinct regimes. The drag coefficient is defined as, $C_D=D/(\frac{1}{2}\rho U^2 A)$, where D is the drag force, p is the air density and A is the cross-sectional area of the sphere. In the subcritical regime, laminar boundary layer separation occurs at an angle from the front stagnation point of about 80° and the $C_D$ is nearly independent of Re. In the critical regime, the $C_D$ drops rapidly and reaches a minimum at the critical Re. The initial drop in $C_D$ is due to the laminar boundary layer separation location moving downstream (OS=95°). At critical Re, a separation bubble forms at this location whereby the laminar boundary layer separates, transition occurs in the free-shear layer and the layer turbulently reattaches to the sphere surface. The turbulent boundary layer is better able to withstand the adverse pressure gradient over the back part of the ball and separation is delayed to OS=120°. In the supercritical regime, transition occurs in the attached boundary layer and the $C_D$ increases gradually as the transition and the separation locations creep upstream with increasing Re. A limit is reached in the transcritical regime when the transition location moves all the way upstream, close to the front stagnation point. The turbulent boundary layer development and separation is then determined solely by sphere surface roughness, and $C_D$ becomes independent of Re since the transition location is not further affected by increasing Re.

Earlier transition of the boundary layer can be induced by "tripping" the laminar boundary layer using a protuberance (e.g. seam on a baseball or cricket ball) or surface roughness (e.g. dimples on a golf ball or fabric cover on a tennis ball). For the smooth sphere, the $C_D$ in the subcritical regime is about 0.5 and at the critical Re of about 400,000 the $C_D$ drops to a minimum of about 0.07, before increasing again in the supercritical regime. The critical Re, and amount by which the $C_D$ drops, both decrease as the surface roughness increases on the sports balls.

In a viscous flow such as air, a sphere that is spinning at a relatively high rate can generate a flow field that is very similar to that of a sphere in an inviscid flow with added circulation. That is because the boundary layer is forced to spin with the ball due to viscous friction, which produces a circulation around the ball, and hence a side force. At more nominal spin rates, such as those encountered on sports balls, the boundary layers cannot negotiate the adverse pressure gradient on the back part of the ball and they tend to separate, somewhere in the vicinity of the sphere apex. The extra momentum applied to the boundary layer on the retreating side of the ball allows it to negotiate a higher pressure rise before separating and so the separation point moves downstream. The reverse occurs on the advancing side and so the separation point moves upstream, thus generating an asymmetric separation and an upward deflected wake.

Following Newton's Third Law of Motion, the upward deflected wake implies a downward (Magnus) force acting on the ball. The dependence of the boundary layer transition and separation locations on Re can either enhance or oppose (even overwhelm) this effect. Since the effective Re on the advancing side of the ball is higher than that on the retreating side, in the subcritical or (especially) supercritical regimes, the separation location on the advancing side will tend to be more upstream compared to that on the retreating side. This is because the $C_D$ increases with Rein these regions, thus indicating an upstream moving separation location. However, in the region of the critical Re, a situation can develop whereby the advancing side winds up in the supercritical regime with turbulent boundary layer separation, whereas the retreating side is still in the subcritical regime with laminar separation. This would result in a negative Magnus force, since the turbulent boundary layer on the advancing side will now separate later compared to the laminar layer on the retreating side. Therefore, a sphere with topspin for example, would experience an upward aerodynamic force. So in order to maximize the amount of (positive) Magnus force, it helps to be in the supercritical regime and this can be ensured by lowering the critical Re by adding surface roughness (e.g. dimples on a golf ball).

Two basic aerodynamic principles are used to make a baseball curve in flight: spin about an axis perpendicular to the line of flight and asymmetric boundary-layer separation due to seam location on non-spinning baseballs. Consider a pitch, such as the curveball, where spin is imparted to the baseball in an attempt to alter its flight just enough to fool the batter. The baseball for this particular pitch is released such that it acquires topspin about the horizontal axis. As discussed above, under the right conditions, this results in a (downward) Magnus force that makes the ball curve faster towards the ground than it would under the action of gravity alone. The spin parameter S is defined as the ratio of the equatorial velocity V at the edge of the ball to its translation velocity U, hence S=V/U. At such a low Re, the flow over the baseball is expected to be subcritical, but the asymmetric separation and deflected wake flow are clearly evident, thus implying an upward Magnus force. At higher Re, the rotating seam would produce an effective roughness capable of causing transition of the laminar boundary layer. Spin rates of up to 35 revs/sec and speeds of up to 45 m/s (100 mph) are achieved by pitchers in baseball. Always analyzed high-speed video data of pitched baseballs (by humans and a machine) and used a parameter estimation technique to determine the lift and drag forces on spinning baseballs. For a nominal pitching velocity range of 17 to 35 m/s (38 to 78 mph) and spin rates of 15 to 70 revs/sec, Always gave a $C_D$ range of 0.3 to 0.4. This suggests that the flow over a spinning baseball in this parameter range is in the supercritical regime with turbulent boundary layer separation. As discussed above, an asymmetric separation and a positive Magnus force would therefore be obtained in this operating range.

In some wind tunnel measurements of the lateral or lift force L on spinning baseballs, Watts and Ferrer (4) concluded that the lift force coefficient, $C_L=L/(½U^2A)$ was a function of the spin parameter only, for S=0.5 to 1.5, and at most only a weak function of Re, for Re=30,000 to 80,000. Their trends agreed well with Bearman and Harvey's golf ball data obtained at higher Re (up to 240,000) and lower spin parameter range (S=0 to 0.3). Based on these correlations, Watts and Bahill suggested that for spin rates typically encountered in baseball (S<0.4), a straight line relation between $C_L$ and S with a slope of unity is a good approximation. Always' lift measurements on spinning baseballs obtained for Re=100,000 to 180,000 and S=0.1 to 0.5, were in general agreement with the extrapolated trends of the data due to Watts and Ferrer. However, one main difference was that Alaways found a dependence of seam orientation (2-seam versus 4-seam) on the measured lift coefficient. The C was higher for the 4-seam case compared to the 2-seam for a given value of S. Watts and Ferrer had also looked for seam orientation effects, but did not find any. Always concluded that the seam orientation effects were only significant for S<0.5, and that at higher values of S, the data for the two orientations would collapse, as found by Watts and Ferrer. The main difference between these seam orientations is the effective roughness that the flow sees for a given rotation rate. As discussed above, added effective roughness puts the ball deeper into the supercritical regime, thus helping to generate the Magnus force. It is possible that at the higher spin rates (higher values of S), the difference in apparent roughness between the two seam orientations becomes less important.

In golf ball aerodynamics, apart from the lift force (which is generated by the backspin imparted to the ball), the drag and gravitational forces are also important, since the main objective is to "tailor" the flight path of the ball. The lift force is generated due to the Magnus effect and the role of the dimples is to lower the critical Re. The asymmetric separation and downward deflected wake are both apparent and result in an upward lift force on the spinning golf ball. Also, once transition has occurred, the $C_D$ for the golf ball does not increase sharply in the supercritical regime, like that for the baseball, for example. This demonstrates that while the dimples are very effective at tripping the laminar boundary layer, they do not cause the thickening of the turbulent boundary layer associated with positive roughness. Bearman and Harvey conducted a comprehensive study of golf ball aerodynamics using a large spinning model mounted in a wind tunnel over a wide range of Re (40,000 to 240,000) and S (0.02 to 0.3). They found that & increased monotonically with S (from about 0.08 to 0.25), as one would expect, and that the $C_D$ also started to increase for S>0.1 (from about 0.27 to 0.32) due to induced drag effects. The trends were found to be independent of Reynolds number for 126,000<Re<238,000. Smits and Smith made wind tunnel measurements on spinning golf balls over the range, 40,000<Re<250,000 and 0.04<S<1.4, covering the range of conditions experienced by the ball when using the full set of clubs. Based on their detailed measurements, which included measurements of the spin decay rate, they proposed a new aerodynamic model of a golf ball in flight. Their measurements were in broad agreement with the observations of Bearman and Harvey, although the new $C_L$ measurements were slightly higher (~0.04) and a stronger dependence of $C_D$ on the spin parameter was exhibited over the entire S range. A new observation was that for Re>200,000, a second decrease in $C_D$ was observed, the first being that due to transition of the boundary layer. Smits and Smith proposed that this could be due to compressibility effects since the local Mach number over the ball reached values of up to 0.5. Note that Bearman and Harvey used a 25 times larger model, and so their Mach number was correspondingly lower. Smits and Smith (8) proposed the following model for driver shots in the operating range, 70,000<Re<210,000, 0.08<S<0.2, $C_D=C_d+C_{d2}S+C_{D3}\sin\{\pi(Re-A)/A_2\}$. $C_L=C_tS^{2.4}$, Spin Rate Decay SRD=RWδω/δt $[d^2/(4U^2)]=R_tS$. Suggested values for the constants are: $C_d$=0.24, $C_{d2}$=0.18, $C_{d3}$=0.06, $C_t$=0.54, $R_t$=0.00002, $A_1$=90,000 and $A_2$=200,000.

Smits and Smith have reported wind-tunnel measurements of the lift and drag coefficients and the spindown rate on a golf ball (mass=0.04593 kg, radius=0.02134 m). Their data demonstrate that the parameter $\omega R^2/v^2$ is an approximately linear function of S, and independent of Re (for fixed S) in the range (1.0–2.5)×$10^5$. Numerically, the spin-down rate is given by golf ball (Smits): $d\omega/dt=-4.0\times10^{-6}v^UR^2$ S, with v in mph. For v=100 mph, $\omega=\omega/23.8$, implying a spin-down time constant of 23.8 s. Note that $\omega$ scales with $v^2S/R^2$ in the Smits model and with $v^2RCL/M$ in the model described above. The two models would therefore appear to be different. However, it should be noted that M scales with R and $C_L$ scales with S, so the scaling of $\omega$ with R, v, and S is essentially identical. In effect, the Smits model provides empirical evidence for the more physically based model described above. It is useful to apply the latter model to the golf ball, then use the Smits data to fix the torque parameter k. Putting in the mass and radius appropriate to a golf ball and assuming that $C_L$=S for a golf ball, an expression identical to Eq. 4 can be derived with the numerical factor equal to 0.0215. This means that for comparable v and k the time constant for spin decay for a baseball will about 8% larger than that of a golf ball. Using the golf data, we fix the value k=0.020, a factor of 5 smaller than that hypothesized by Adair, corresponding to a factor of 4 larger spin decay time constant.

Tavares et al. have proposed a model for spin decay in which the torque responsible for the spin decay is parametrized as $Id\omega/dt=-R\rho AC_Mw^2$, where $C_M$ is the so-called coefficient of moment. The spin decay measurements of Tavares to measure the time-dependent spin, show that CM=0.012S. Using $I=0.4MR^2$ and the values of M and R appropriate to a golf ball, Tavares' result can be expressed as golf ball (Tavares): $d\omega/dt=-5.0\times10^{-6}v^2/R^2$ S, with v in mph. For example, the spin-down time constant for v=100 mph will be 18.9 sec. More generally, if $I=\alpha M/R^2$ and if CM=δS, then one rearrange Eq. 6 to derive an expression for the spin decay time constant $\tau$, $\tau=\omega/\dot\omega=M/R^2$ $\alpha/\pi\delta v$. Therefore, for a given v and fixed values of $\alpha$ and $\delta$, the spin decay time constant scales with $M/R^2$, allowing a comparison among different spherical balls. For example, a golf ball and baseball have $M/R^2$=101.2 kg/m² and 109.4 kg/m², respectively, so that the time constant for a baseball will be about 8% larger than for a golf ball.

Aerodynamics of Non-Rotating Fixed Winged Craft

Aerodynamic forces for bilaterally symmetric aerodynamic, fixed wing craft are well studied. (see, en.wikipedia.org/wiki/Flight_dynamics (fixed-wing_aircraft), expressly incorporated herein by reference. Refer to FIG. 1 for axis definitions.

Components of the Aerodynamic Force

The expression to calculate the aerodynamic force is: $F_A = \int_\Sigma (-\Delta p n + f) d\sigma$, where:

$\Delta p$ Difference between static pressure and free current pressure n≡outer normal vector of the element of area f≡tangential stress vector of the air on the body $\Sigma$≡adequate reference surface projected on wind axes, obtaining: $F_A = -(i_w D + j_w Q + k_w L)$ where: D≡Drag; Q≡Lateral force; and L≡Lift Aerodynamic Coefficients Dynamic pressure of the free current≡$q=\tfrac{1}{2}\rho V^2$ Proper reference surface (wing surface, in case of planes)≡S $$\text{Pressure coefficient} \equiv C_p = \frac{p - p_\infty}{q} \quad \text{Friction coefficient} \equiv C_f = \frac{f}{q}$$

$$\text{Drag coefficient} \equiv C_d = \frac{D}{qS} = -\frac{1}{S}\int_\Sigma [(-C_p)n\bullet i_w + C_f t\bullet i_w]d\sigma$$

$$\text{Lateral force coefficient} \equiv C_Q = \frac{Q}{qS} = -\frac{1}{S}\int_\Sigma [(-C_p)n\bullet j_w + C_f t\bullet j_w]d\sigma$$

$$\text{Lift coefficient} \equiv C_{LO} = \frac{L}{qS} = -\frac{1}{S}\int_\Sigma [(-C_p)n\bullet k_w + C_f t\bullet k_w]d\sigma$$

It is necessary to know $C_p$ and $C_f$ in every point on the considered surface.

Dimensionless Parameters and Aerodynamic Regimes

In absence of thermal effects, there are three remarkable dimensionless numbers:

Compressibility of the flow: Mach number $$\equiv M = \frac{V}{a}$$

Viscosity of the flow: Reynolds number $$\equiv Re = \frac{\rho V l}{\mu}$$

Rarefaction of the flow: Knudsen number $$\equiv Kn = \frac{\lambda}{l} \quad \text{where}: a = \sqrt{kR\theta}$$

speed of sound; R≡gas constant by mass unity; $\vartheta$≡absolute temperature, and $$\lambda = \frac{\mu}{\rho}\sqrt{\frac{\pi}{2R\theta}} = \frac{M}{Re}\sqrt{\frac{k\pi}{2}} \equiv$$

mean free path.

According to $\lambda$ there are three possible rarefaction grades and their corresponding motions are called:

Continuum current (negligible rarefaction):

$$\frac{M}{Re} \ll 1$$

Transition current (moderate rarefaction):

$$\frac{M}{Re} \approx 1$$

Free molecular current (high rarefaction):

$$\frac{M}{Re} \gg 1$$

The motion of a body through a flow is considered, in flight dynamics, as continuum current. In the outer layer of the space that surrounds the body viscosity will be negligible. However viscosity effects will have to be considered when analyzing the flow in the nearness of the boundary layer.

Depending on the compressibility of the flow, different kinds of currents can be considered: Incompressible subsonic current: 0<M<0.3; Compressible subsonic current: 0.3<M<0.8; Transonic current: 0.8<M<1.2; Supersonic current: 1.2<M≤5; and Hypersonic current: 5<M In most cases, the human-powered embodiments according to the present technology fall into the incompressible subsonic current regime, though the bottom end of the compressible subsonic range may be approached on some surfaces due to spin. In an embodiment with mechanism-powered rotation, higher rotational speeds can be achieved, and thus parts of the system can reach the compressible subsonic range or above.

Drag Coefficient Equation and Aerodynamic Efficiency

If the geometry of the body is fixed and in case of symmetric flight ($\beta$=0 and Q=0), pressure and friction coefficients are functions depending on: $C_p = C_p(\alpha, M, Re, P)$; $C_f = C_f(\alpha, M, Re, P)$, where: $\alpha$≡angle of attack, and P≡considered point of the surface.

Under these conditions, drag and lift coefficient are functions depending exclusively on the angle of attack of the body and Mach and Reynolds numbers. Aerodynamic efficiency, defined as the relation between lift and drag coefficients, will depend on those parameters as well.

$$\begin{cases} C_D = C_D(\alpha, M, Re) \\ C_L = C_L(\alpha, M, Re) \\ E = E(\alpha, M, Re) = \dfrac{C_L}{C_D} \end{cases}$$

It is also possible to get the dependency of the drag coefficient respect to the lift coefficient. This relation is known as the drag coefficient equation: $C_D = C_D(C_L, M, Re)$ =drag coefficient equation.

The aerodynamic efficiency has a maximum value, $E_{max}$ respect to $C_L$ where the tangent line from the coordinate origin touches the drag coefficient equation plot.

The drag coefficient, $C_D$ can be decomposed in two ways. First typical decomposition separates pressure and friction effects:

$$C_D = C_{Df} + C_{Dp} \begin{cases} C_{Df} = \dfrac{D}{sS} = -\dfrac{1}{S}\int_\Sigma C_f t \cdot i_w d\sigma \\ C_{Dp} = \dfrac{D}{sS} = -\dfrac{1}{S}\int_\Sigma (-C_p) n \cdot i_w d\sigma \end{cases}$$

There's a second typical decomposition taking into account the definition of the drag coefficient equation. This decomposition separates the effect of the lift coefficient in the equation, obtaining two terms $G_{DD}$ and $C_D$. $C_{DD}$ is known as the parasitic drag coefficient and it is the base drag coefficient at zero lift. $C_D$ is known as the induced drag coefficient and it is produced by the body lift:

$$C_D = C_{D0} + C_{Di} \begin{cases} C_{D0} = (C_D)_{C_L} \\ C_{Di} \end{cases}$$

Parabolic and Generic Drag Coefficient

A good attempt for the induced drag coefficient is to assume a parabolic dependency of the lift $$C_{Di} = k C_L^2 \Rightarrow C_D = C_{D0} + k C_L^2$$

Aerodynamic efficiency is now calculated as:

$$E = \frac{C_L}{C_{D0} + k C_L^2} \Rightarrow \begin{cases} E_{max} = \dfrac{1}{2\sqrt{k C_{D0}}} \\ (C_L)_{E_{max}} = \sqrt{\dfrac{C_{D0}}{k}} \\ (C_{Di})_{E_{max}} = C_{D0} \end{cases}$$

If the configuration of a plane is symmetrical respect to the XY plane, minimum drag coefficient equals to the parasitic drag of the plane:

$$C_{Dmin} = (C_D)_{C_L=0} = C_{D0}$$

In case the configuration is asymmetrical respect to the XY plane, however, minimum drag differs from the parasitic drag. On these cases, a new approximate parabolic drag equation can be traced leaving the minimum drag value at zero lift value.

$$C_{Dmin} = C_{DM} \neq (C_D)_{C_L=0}; C_D = C_{DM} + k(C_L - C_{LM})^2$$

Variation of Parameters with the Mach Number

The Coefficient of pressure varies with Mach number by the relation:

$$C_p = \frac{C_{p0}}{\sqrt{|1 - M_\infty^2|}},$$

where
$C_p$ is the compressible pressure coefficient
$C_{p0}$ is the incompressible pressure coefficient
$M_\infty$ is the freestream Mach number.

This relation is reasonably accurate for $0.3 < M < 0.7$ and when M=I it becomes $\infty$ which is impossible physical situation and is called Prandtl-Glauert singularity.

Dynamic Stability and Control

Longitudinal Modes

It is common practice to derive a fourth order characteristic equation to describe the longitudinal motion, and then factorize it approximately into a high frequency mode and a low frequency mode. The approach adopted here is using qualitative knowledge of aircraft behavior to simplify the equations from the outset, reaching the result by a more accessible route.

The two longitudinal motions (modes) are called the short period pitch oscillation (SPPO), and the phugoid.

Short-Period Pitch Oscillation

A short input (in control systems terminology an impulse) in pitch (generally via the elevator in a standard configuration fixed-wing aircraft) will generally lead to overshoots about the trimmed condition. The transition is characterized by a damped simple harmonic motion about the new trim. This damped harmonic motion is called the short period pitch oscillation, it arises from the tendency of a stable aircraft to point in the general direction of flight. The motion involves mainly the pitch attitude $\vartheta$ (theta) and incidence $\alpha$ (alpha). The direction of the velocity vector, relative to inertial axes is $\vartheta - \alpha$. The velocity vector is: $u_F(u \cos(\vartheta - \alpha)$; $w_F(U \sin(\vartheta - \sigma)$, where $u_L$, $w_f$ are the inertial axes components of velocity. According to Newton's Second Law, the accelerations are proportional to the forces, so the forces in inertial axes are:

$$X_f = m\frac{du_f}{dt} = m\frac{dU}{dt}\cos(\theta - \alpha) - mU\frac{d(\theta - \alpha)}{dt}\sin(\theta - \alpha)$$

$$Z_f = m\frac{dw_f}{dt} = m\frac{dU}{dt}\sin(\theta - \alpha) - mU\frac{d(\theta - \alpha)}{dt}\cos(\theta - \alpha)$$

where m is the mass. By the nature of the motion, the speed variation $$m\frac{dU}{dt}$$

is negligible over the period of the oscillation, so:

$$X_f = -mU\frac{d(\theta - \alpha)}{dt}\sin(\theta - \alpha); Z_f = -mU\frac{d(\theta - \alpha)}{dt}\cos(\theta - \alpha)$$

The forces are generated by the pressure distribution on the body, and are referred to the velocity vector. But the velocity (wind) axes set is not an inertial frame so we must resolve the fixed axis forces into wind axes. Also, for fixed wing craft, we are generally only concerned with the force along the z-axis:

$$Z = -Z_f \cos(\theta - \alpha) + X_f \sin(\theta - \alpha), \text{ or } Z = -mU\frac{d(\theta - \alpha)}{dt}.$$

In words, the wind axis force is equal to the centripetal acceleration.

The moment equation is the time derivative of the angular momentum:

$$M = B \frac{d^2\theta}{dt^2},$$

where M is the pitching moment, and B is the moment of inertia about the pitch axis. Let:

$$\frac{d\theta}{dt} = q,$$

the pitch rate. The equations of motion, with all forces and moments referred to wind axes are, therefore:

$$\frac{d\alpha}{dt} = q + \frac{Z}{mU}, \frac{dq}{dt} = \frac{M}{B}.$$

Phugoid

If the control is held fixed, the aircraft will not maintain straight and level flight, but will start to dive, level out and climb again. It will repeat this cycle until the pilot intervenes. This long period oscillation in speed and height is called the phugoid mode. This is analyzed by assuming that the SSPO performs its proper function and maintains the angle of attack near its nominal value. The two states which are mainly affected are the climb angle γ (gamma) and speed. The small perturbation equations of motion are:

$$mU \frac{d\gamma}{dt} = -Z,$$

which means the centripetal force is equal to the perturbation in lift force.

For the speed, resolving along the trajectory:

$$m \frac{du}{dt} = X - mg\gamma,$$

where g is the acceleration due to gravity at the earth's surface. The acceleration along the trajectory is equal to the net x-wise force minus the component of weight. We should not expect significant aerodynamic derivatives to depend on the climb angle, so only $X_u$ and $Z_u$ need be considered. $X_u$ is the drag increment with increased speed, it is negative, likewise $Z_u$ is the lift increment due to speed increment, it is also negative because lift acts in the opposite sense to the z-axis.

The equations of motion become:

$$mU \frac{d\gamma}{dt} = -Z_u u; m \frac{du}{dt} = X_u u = mg\gamma.$$

These may be expressed as a second order equation in climb angle or speed perturbation:

$$\frac{d^2 u}{dt^2} - \frac{X_u}{m} \frac{du}{dt} - \frac{Z_u g}{mU} u = 0$$

Now lift is very nearly equal to weight:

$$Z = \frac{1}{2}\rho U_{C_L}^2 S_w = W,$$

where ρ is the air density, $S_w$ is the wing area, W the weight and $C_L$ is the lift coefficient (assumed constant because the incidence is constant), we have, approximately:

$$Z_u = \frac{2W}{U} = \frac{2mg}{U}.$$

The period of the phugoid, T, is obtained from the coefficient of u $$\frac{2\pi}{T} = \sqrt{\frac{2g^2}{U^2}}, \text{ or}: T = \frac{2\pi U}{\sqrt{2} g}.$$

Since the lift is very much greater than the drag, the phugoid is at best lightly damped. Heavy damping of the pitch rotation or a large rotational inertia increase the coupling between short period and phugoid modes, so that these will modify the phugoid.

Equations of Motion

Dutch Roll is induced in a fixed wing aircraft by an impulse input to the rudder. The yaw plane translational equation, as in the pitch plane, equates the centripetal acceleration to the side force:

$$\frac{d\beta}{dt} = \frac{Y}{mU} - r,$$

where β (beta) is as before sideslip angle, Y the side force and r the yaw rate. As noted above, in a rotating disk craft, the base yaw is not zero, but remains relatively constant. Due to gyroscopic effect, any change in yaw axis with respect to an inertial reference will create forces along the other axes, thus modifying the behavior with respect to fixed wing aircraft.

Rotating Aerodynamic Structures

FIG. 1B defines various parameters of a spinning disk aerodynamic projectile. See, Scodary, A, "The Aerodynamics and Stability of Flying Discs", large.stanford.edu/courses/2007/ph210/scodaryl/10/30/2007. To first approximation, a flying disc is simply an axisymmetric wing with an elliptical cross-section. Of course, most ordinary wings would be unstable if simply thrown through the air, but the essential mechanics of its lift are mostly ordinary. The lift on a body is described by the lift equation, $L = \frac{1}{2} C_L A \rho V^2$. Where A is the cross-sectional area, ρ is the density, V is the free-stream velocity, and $C_L$ is the coefficient of lift, a semi-empirical constant that is a function of the shape of the object and its angle of attack with respect to the free-stream velocity of the fluid. Typically, $C_L$ increases linearly with the angle of attack, α, until some critical angle where the lift drops off steeply. If a typical commercial flying disc were a perfectly flat disc, $C_L$ would be zero at an angle of attack of zero. Although, the camber or shape of the disc allows for non-zero lift at an angle of attack zero. The coefficient of lift at zero angle of attack is often denoted $C_{LO}$, and the increase of $C_L$ with α is denoted $C_{L\alpha}$. Hence, $C_L=C_{LO}+C_{L\alpha}\alpha$. Empirically, $C_{LO}$ is roughly 0.188 and $C_{L\alpha}$ is 2.37 for a typical flying disc. This means an angle of attack of 15° would have a coefficient of lift of roughly 0.62 While this value varies from disc to disc, it is to be expected that this quantity will be of order unity. The drag on the flying disc is defined in a fashion similar to that of the disk. The equation is now $D=\frac{1}{2}C_D A\rho V^2$. The only difference from the lift is that the coefficient of lift has been replaced by the analogous coefficient of drag. Unlike lift, drag typically depends on the angle of attack quadratically. So now, $C_D=C_{DD}+C_{D\alpha}\alpha^2$, and the empirical values have been found to be approximately $C_{DD}=0.15$ and $C_{D\alpha}=1.24$. The maximum ratio of lift to drag occurs around 15°. For a wing with an elliptical cross-section, the center of pressure due to lift is offset ahead of the center of gravity. Therefore, if one were to simply throw a flying disc, the lift would also cause a moment on the disc and cause it to flip over backwards. The key to the stability of the flying disc is its spin. The spin of the disc results in gyroscopic stability or pitch stiffness, and the greater the speed, the greater the stability. Typically, the moment due to lift and drag pressure on the disc is nearly perpendicular to the angular momentum of the spinning disc, and thus the disc experiences gyroscopic precession. The frequency of precession is $\Omega=M/k\omega$, where M is the moment, I is the moment of inertia of the disc about its axis of symmetry, and co is the angular frequency of the disc's spin. This precession causes the disc to wobble as a gyroscope wobbles when its axis of spin is perturbed from the direction of gravity. Likewise, by spinning the disc, one trades roll stability for pitch stiffness. The equations of motion of the system, accounting for the external forces and moments is found to be [2] m (dv/dt+Ω×v)=F=mg and Idω/dt+Ω×Iω=M. The details of F and M depend on the aerodynamics of the disc. The typical mass of a flying disc is between 90 g and 175 g. The lighter discs maximize duration of flight, and the heavier discs will maximize distance thrown and minimize the effects of wind and stray currents. It is also apparent from the equations of motion that a greater moment of inertia/would also increase stability. The viscous no-slip condition at the boundary of the spinning disc causes the disc to generate some degree of vorticity. The circulation about the disc and the free-stream flow of air past the disc causes a force in the direction of the cross product of/with the angular momentum of the disc. This is attributed to the Magnus Effect, which is caused by one side of the disc having a higher free-stream velocity than the other, causing a pressure gradient. This causes a flying disc thrown clockwise to veer to the left, which is particularly noticeable as the viscous effects become more pronounced at the end of the flight. The center of pressure and the center of gravity are displaced. According to the present technology the center of gravity may be repositioned.

The disk rim at the edge of flying disc serves multiple important purposes. First and foremost, the thick rim eases gripping and tossing the disc. Without the thick rim, throwing a flying disc would be significantly more difficult. Additionally, the thick rim significantly increases the moment of inertia of the disc about the axis of symmetry, enhancing the stability of the disc. A flat plate without a thick rim, such as a dinner plate, has much less stability than a typical flying disc. Finally, the cupped region on the bottom of the disc substantially increases the coefficient of drag from the vertical profile, while the horizontal profile is still somewhat streamlined. As a result, as the disc begins to fall, the cupped profile behaves like a parachute, and the horizontal component of drag is dwarfed by the vertical component. This allows the flying disc to be thrown much further than a ball of equivalent velocity.

The top surface of a typical flying disk has several concentric grooves, which serve to trigger turbulence at the leading edge, which helps to keep the boundary layer of the flow over the top of the disc attached to the disc, substantially increasing lift. This effect also allows the disc to be thrown at a higher angle of attack before it stalls. A stall occurs when the flow separates from an object, causing a catastrophic decrease in lift and increase in drag. One can cause a Frisbee to stall by simply throwing it at a very high angle of attack. The disc will quickly destabilize and fall to the ground.

See, Lorenz, Ralph D. Spinning flight: dynamics of Frisbees, boomerangs, samaras, and skipping stones. Springer Science & Business Media, 2006, expressly incorporated herein by reference in its entirety. The spin axis of a rotating body precesses in a direction apparently orthogonal to the applied torque. The angular momentum of a rotating body is equal to the product of its moment of inertia (integral of mass times distance from axis of rotation) and its angular velocity. On the other hand, the rotational kinetic energy is equal to half of the product of the moment of inertia and the square of the angular velocity. Unless external moments are applied, the angular momentum of a system must remain constant. In general, the mechanics of rotation can be described by a set of expressions known as the Euler equations. The inertia properties can be represented by a tensor (a matrix of 9 numbers), but for most applications only three numbers (and often only two) are needed: Only the three diagonal terms in the tensor are nonzero. These are the moments of inertia about three orthogonal axes, the so-called principal axes. The principal axes are the axis of maximum moment of inertia, the axis of minimum moment of inertia, and the axis orthogonal to the other two. It can be shown that stable rotation only occurs about the minimum or maximum axis. Although it is possible to spin an object about its long axis, this motion is not necessarily stable in the long term. Specifically, internal energy losses force the object to ultimately rotate about the axis of maximum moment of inertia. However, internal energy dissipation (for example, flexing of imperfectly elastic elements or flow of viscous fluids) can absorb energy. If an object is spinning about an axis other than that of maximum moment of inertia, and energy is dissipated, the system must compensate for a drop in angular velocity by increasing the moment of inertia. In other words, it rotates such that the (constant) angular momentum vector becomes aligned with the maximum moment of inertia—the only way of reducing energy while keeping the angular momentum constant is to increase l as w decreases. The rotation about the axis of maximum moment of inertia, the stable end state, is sometimes called a "flat spin," since the object sweeps out a flat plane as it rotates.

Lorenz states, "To date, the most comprehensive series of experiments have been conducted by Jonathan Potts and William Crowther at Manchester University in the UK, as part of the Ph.D. research of the former. One aim of the research was to explore the possibilities of control surfaces on a disc wing." (p. (77), "A control surface, such as a flap. would have little useful effect on a Frisbee's flight were it to be simply fixed onto the disc. As the disc spins around, the control effect would vary or even reverse, and the spin-averaged effect would be small. However, if on-board sensors were used to trigger a fast-acting flap at a particular phase of rotation, the prospect of a maneuverable Frisbee can be envisaged. This might simply involve some stability augmentation-say to suppress the hook at the end of the flight. But much more appealing ideas become possible-a Frisbee with a heat sensor to detect a player, such that the disc tries to avoid being caught!" (p. 189). Frisbee flight is very sensitive to the initial parameters; small variations in angle of attack can lead to very different flights.

Precession is the movement of an angular momentum vector by the application of an external moment. Nutation is a conical motion due to the misalignment of the axis of maximum moment of inertia and the angular momentum vector. The maximum moment axis of the vehicle essentially rolls around in a cone around the angular momentum vector. Nutation is usually a very transient motion, since it is eliminated by energy dissipation. Coning refers to the apparent conical motion indicated by a sensor which is not aligned with a principal axis. Even in a perfectly steady rotation, a misaligned sensor will appear to indicate motion in another axis. A torque can be impulsive, i.e., of short duration. In such a case, the torque-time product yields an angular momentum increment which changes the direction of the vehicle's angular momentum before the body itself has had time to move accordingly. In this situation, the body spin axis (usually the axis of maximum moment of inertia) will be misaligned with the angular momentum vector. The vehicle will appear to wobble, due to the nutation motion. The amplitude of this wobble will decrease with time as energy dissipation realigns the spin axis with the new angular momentum vector. The rate of the wobble depends on the moments of inertia of the object: for a flat disk, where the axial moment of inertia is exactly double the transverse moments of inertia, the wobble period is half of the spin period.

Angular dynamics of aircraft are usually described by three motions: roll, pitch, and yaw. Roll denotes motion about a forward direction. Yaw is motion about a vertical axis, while pitch is motion in a plane containing the vertical and forward directions. Aerodynamic forces and moments can be considered in several ways. Ultimately, all forces must be expressed through pressure normal to, and friction along, the surfaces of the vehicle. For most common flows, viscous forces are modest and only the pressures are significant. For a body to generate lift, pressures on its upper surfaces must in general be lower than those on its lower surface.

Another perspective is that the exertion of force on the flying object must manifest itself as an equal and opposite rate of change of momentum in the airstream. If an object is developing lift, it must therefore push the air down. Streamlines must therefore be tilted downwards by the object.

The distribution of pressures on the flying object will yield a resultant force that appears to act at an arbitrary position, the center of pressure. No torques about this point are generated. The weight (mg) of the vehicle acts at the center of mass (COM) (actually, the center of gravity, but since the flying object is typically exposed to a spatially uniform gravitational field, there is no meaningful difference) whereas the aerodynamic force acts at the center of pressure (COP) and is usually defined by a lift and drag, orthogonal and parallel to the velocity of the vehicle relative to the air. Because the COM and COP are not in the same place, there is a resultant pitch torque. The airflow hits the vehicle at an angle of attack.

The force is calculated as if it acted at the geometric center of the vehicle. Usually this force is expressed in three directions, referred to the direction of flight. Drag is along the negative direction of flight; lift is orthogonal to drag in the vehicle-referenced plane that is nominally upwards. The orthogonal triad is completed by a side-force. The forces are supplemented by a set of moments (roll, pitch, and yaw). These determine the stability of a vehicle in flight. Both forces and moments are normalized by dimensions to allow ready comparison of different sizes and shapes of vehicles. The normalization for forces is by the dynamic pressure ($\frac{1}{2}\rho V$) and a reference area (usually the wing planform area). Dividing the force by these quantities, the residual is a force coefficient. These coefficients; dimensionless numbers usually with values of 0.001 to 2.0, are typically functions of Mach and Reynolds number (which are generally small and constant enough, respectively, to be considered invariant in the models) and of attitude.

The attitude (the orientation of the body axes in an external frame, e.g., up, north, east) may be compared with the velocity vector in that same frame to yield, in still air, the relative wind, i.e., the velocity of the air relative to the vehicle. In cases where there is a nonzero wind relative to the ground, an ambient wind vector may be added to the relative wind. In addition to changing the speed of the air relative to the vehicle, wind may be instrumental in changing the angle of the airflow relative to the body datum.

The most significant angle is that between the freestream and the body datum in the pitch plane. This is termed the angle of attack, and it is upon this parameter that most aerodynamic properties such as lift and moment coefficients display their most significant sensitivity. A second angle is relevant for conventional aircraft, and this is the angle of the freestream relative to body datum in the yaw plane: this is the sideslip angle. If a sideslip angle were to be defined relative to a body datum, it would vary rapidly owing to the body spin. The spin rate is usually not itself of intrinsic aerodynamic interest. However, when multiplied by a body length scale (the span of a boomerang, or the radius of a Frisbee) it corresponds to a tip or rim speed. This speed can be significant compared with the translational speed of the body's center of mass, and thus a measure of the relative speed is used, referred to as the advance ratio (c$\omega$r/V).

Several parameters describe flight conditions: the density and viscosity of the fluid, the size and speed of the object, etc. These properties may be expressed as dimensionless numbers to indicate the ratio of different forces or scales. Because flow behaviors can be reproduced under different conditions but with the same dimensionless numbers, these numbers are often termed similarity parameters. The Mach number, for example, is simply the ratio of the flight speed to the speed of sound in the medium. Since the sound speed is the rate of propagation of pressure disturbances, a Mach number in excess of 1 indicates a supersonic situation where the upstream fluid is unaware of the imminent arrival of the flying object, and the flow characteristics are very different from subsonic conditions. In particular, a shock wave forms across which there is a discontinuous jump in pressure and temperature as the flow is decelerated. This shock wave typically forms a triangle or (Mach) cone around the vehicle, with a half angle equal to the arctangent of the Mach number. The objects considered herein remain within a subsonic regime, and Mach number variations ($<<1$) are not of concern. Much more important is the Reynolds number, the ratio of viscous to inertial (dynamic pressure) forces. This may be written Re=vIρ/μ, where v is the flight speed, /a characteristic dimension (usually diameter, or perhaps a wing chord), μ the (dynamic) viscosity of the fluid, and ρ the density of the fluid. The dynamic viscosity is the ratio of the shear stress to the velocity gradient in a fluid. This is a constant for a given fluid, and is what is measured directly. The units are those given by stress/velocity gradient=Newtons per meter squared, divided by meters per second per meter, thus Newtons/m²×s, or Pascal-seconds (Pa-s) in SI units, or the Poise (P). 1P=10 Pa-s.

The effects of Reynolds number cause variation of drag coefficient. At very low values of Re (<I), viscous forces dominate, and the drag coefficient for a sphere is equal to 24/Re, which may be very large. Since the drag coefficient $C_a$ is defined with respect to the fluid density, which directly relates to the (insignificant) inertial forces, this relation for $C_a$ is equivalent to substituting a formula for drag that ignores density and instead relates the drag only to viscosity. This substitution leads to Stokes' law for the fall velocity of spheres in a viscous fluid. As the Reynolds number increases (the flow becomes "faster"), the inertial forces due to the mass density of the fluid play a bigger and bigger role. The flow becomes unable to stick to the back of the sphere, and separates. At first (Re of a few tens) the flow separates from alternate sides, forming two lines of contra-rotating vortices. This is sometimes called a von Karman vortex street. This alternating vortex shedding is responsible for some periodic flow-driven phenomena such as the singing of telephone wires. Control of drag is essentially equivalent to controlling the wake-whatever momentum is abstracted from the flow onto the object (or vice versa) is manifested in the velocity difference between the wake and the undisturbed fluid. If the wake is made narrower, then the momentum dumped into it, and thus the drag, will be kept small. One way of doing this is by streamlining. Another circumstance is to make the boundary layer (the flow immediately adjacent to the object) turbulent, which allows it to "stick" better to the object and thus marrow the wake.

Symmetric control of the boundary layer is of course known in golf, whereby the dimples on the ball increase the surface roughness so as to make the boundary layer everywhere turbulent. The turbulent boundary layer is better able to resist the adverse pressure gradient on the lee (downstream) side of the ball and remains attached longer than would the laminar layer on a smooth ball. The result is that the wake is narrower and so drag is lessened. Similar boundary layer control is sometimes encountered on other (usually cylindrical) structures that encounter flow at similar Reynolds numbers. An example is the bottom bar on a hang glider. This bar can be faired with an aerofoil, but such a shape is harder to grip with the hands, and a cylindrical tube is rather cheaper. However, a smooth cylinder has a high drag coefficient, so a "turbulating" wire is often attached at the leading side to trip the boundary layer into turbulence and so reduce drag.

It is often said that the airflow across the curved top of a wing is faster than across the bottom, and since Bernoulli's theorem states that the sum of the static pressure and dynamic pressure in a flow are constant, then the faster-flowing (higher dynamic pressure) air on the upper surface must "suck" the wing upwards. This is sometimes true in a sense, but it is a rather misleading description—it fails utterly, for example, to explain why a flat or cambered plate can develop lift. In these cases, in particular, the air travels the same distance over top and bottom, and so faster flowing air is not required on the upper surface, at least not from geometric considerations alone. Conservation of momentum dictates that if the airflow is to exert a lift force on the wing, then the wing must exert a downward force on the air. The flow of air past the wing must be diverted downwards. Whatever causes the lift, a result will be a downwards component of velocity imparted to the air. In an idealized sense, one can imagine the downward diversion of the airflow as a rotation of the streamlines, and consideration of the wing as a circulation-inducing device is a powerful idea in fluid mechanics. As for pressure, which is force per unit area, there will indeed be on average a lower pressure on the upper surface of a lifting wing than on the lower surface. The net force is simply the integral of the pressure over the wing. Indeed, since both of these aspects of the flow will depend on the shape of the wing, its orientation (a flat plate inclined slightly upwards to the flow will obviously divert the flow downwards), and on how the flow stays attached to the wing, one might consider both the flowfield and the pressure field to be effects. But it is not always true that the air flows faster across the upper surface. The attachment of the flow is crucial. Once the flow has passed the suction peak, the area on the upper surface of the wing where pressure is least, the boundary layer may struggle to remain attached. If the layer separates, the drag will increase (as for a smooth sphere) and the lift will be reduced. This condition is known as the "stall."

The Magnus effect (or Robbins-Magnus effect) provides that, even a perfectly symmetric sphere can be made to veer in flight by causing it to spin. The airflow over the side of a ball (or cylinder) that is spinning against the direction of fluid flow will cause the flow to separate earlier, while the flow running with the rotating surface will stick longer. The result is that the wake is diverted sideways. Because the flow is diverted sideways, there must be a reaction on the spinning object, a side-force. This side-force causes spinning objects to veer in flight, a ball "rolling forward" (i.e., with topspin) will tend to swing down, while a ball with backspin will tend to be lofted upwards, a key effect in golf. In essence the ball "follows its nose." If the spin axis is vertical, then the ball is diverted sideways. The Magnus force is explained just as lift and drag-momentum dumped into the wake via control of flow separation.

A flat plate tends to pitch up in flight, and this tendency must be suppressed in order to have sustained flight. The basics are outlined in Schuurman (1990) and Lorenz (2004). This suppression is achieved by some combination of aerodynamic tuning to reduce the pitch-up moment and the application of spin to give gyroscopic stiffness. These are, however, only palliative measures that extend the duration of level flight—simple adjustment of shape and flight parameters cannot keep an object flying forever for the following reason: Spin stabilization only slows the destabilizing precession due to the pitch-up moment—the useful flight time is only a transient interval whose duration is proportional to the spin rate divided by the pitch moment. Of course, if the pitch moment could be made zero, then the spin axis precession would take an infinitely long time. However, a static design disk flying shape does not have a zero pitch moment at all angles of attack, and since the angle of attack will change in flight due to the changing flight speed and flight path angle (due to the actions of gravity, lift, and drag), then sooner or later the pitch moment must be dealt with.

Nakamura and Fukamachi (1991) performed smoke flow-visualization experiments on a Frisbee at low flow velocity in a wind tunnel (I m/s). The disc (a conventional, although small, Frisbee) was spun with a motor at up to 3 times per second, yielding an advance ratio of up to 2.26. The smoke indicated the presence of a pair of downstream longitudinal vortices (just like those behind a conventional aircraft) which create a downwash and thus a lift force. These investigators also perceived an asymmetry in the vortex pattern due to the disc's spin, and also suggested that the disc spin increased the intensity of the down-wash (implying that the lift force may be augmented by spin). The low flow velocity (21 times smaller than typical flights) used in these experiments may have given a disproportionate effect of rotation.

Yasuda (1999) measured lift and drag coefficients of a flying disc for various flow speeds and spin rates. He additionally performed a few free-flight measurements on the disc (with the disc flying a short distance indoors in the field of view of a camera) and wind tunnel measurements on a flat disc. His free-flight measurements on a conventional disc show that typical flight speeds are 8-13 m/s and rotation rates of 300-600 rpm (5-10 revolutions per second) and the angle of attack was typically 5-200. The most common values for these parameters were about 10.5 m/s, 400 rpm, and 100, respectively. The flat disc had a zero lift coefficient at zero angle of attack, and a lift curve slope between 0 and 250 of 0.8/25. The Frisbee had a slight lift ($C_L$–0.1) at zero angle of attack, and a lift curve slope of –1/25. The Frisbee paid a price for its higher lift: its drag was commensurately higher. The flat plate had a drag coefficient at zero angle of attack of 0.03 and at 25° of 1.4; the corresponding figures for the Frisbee were 0.1 and 0.55. (The drag curves are parabolic, as might be expected for a fixed skin friction drag to which an induced drag proportional to the square of the lift coefficient is added.) Yasuda notes that the lift: drag ratio of a flat plate is superior to that of the Frisbee. No significant dependence of these coefficients on rotation rate between 300 and 600 rpm was noted. Higuchi et al. (2000) performed smoke wire flow visualization and PIV (particle image velocimetry) measurements, together with oil flow measurements of flow attachment on the disc surface. They used a cambered golf disc, with and without rotation and (for the most part) a representative flight speed of 8 m/s, and studied the downstream vortex structure and flow attachment in some detail.

Jonathan Potts and William Crowther (Manchester University UK) conducted research to explore the possibilities of control surfaces on a disc wing. In addition to measuring lift, drag, and pitch moment at zero spin for the classic Frisbee shape, a flat plate, and an intermediate shape. Coefficients as well as side-force and roll moment coefficients were measured for the Frisbee shape at a range of angles of attack and spin rates. Additionally, Potts and Crowther performed pressure distribution measurements on a nonspinning disc, smoke wire flow visualization, and oil flow surface stress visualizations. (They performed these on the regular Frisbee shape, and one with candidate control surfaces.) Potts states, "The simulation is also used to demonstrate that with control moments from suitable control effectors, it is possible to generate a number of proscribed flight manoeuvres"; also "Finally, it has been shown that with appropriate initial conditions and appropriate control moment input, it is feasible to explore hypothetical disc-wing manoeuvres such as a spiral turn and a spiral roll." The model of flight is developed in Section 7.3.4 of the Potts dissertation. Potts, Jonathan R., and William J. Crowther. "Flight control of a spin stabilised axi-symmetric disc-wing." 39th Aerospace Sciences Meeting, Reno, Nevada, USA. 2001, discloses various flight control methods, none of which are spin-angle synchronized. ("The control forces generated by a disc-wing with installed turbulence strips are capable of producing a banked turn manoeuvre of around a 100 m radius for the rotating case. If this degree of aerodynamic control could be gained from active on/off turbulence strips or some other method of control then that would offer practical possibilities for aerodynamic control of a disc-wing UAV").

A useful and instructive comparison can be made between a flat plate and a Frisbee. Let us first consider drag. The drag coefficient is the drag force normalized with respect to dynamic pressure ($\frac{1}{2}\rho V^2$) and the planform area of the disc. Since at low incidence angles the area of the disc projected into the direction of flow is very small (they used a plate with a thickness: chord ratio of 0.01), it follows that a flat plate will have a very low drag coefficient, ~0.02. On the other hand, the Frisbee, with its deep lip (thickness: chord ratio of 0.14) has a much larger area projected into the flow, and its drag coefficient at zero angle of attack is therefore considerably larger (~0.1). The Frisbee maintains a more or less constant offset of 0.1 above the value for a flat plate. This in turn has a parabolic form with respect to angle of attack, owing to the combination of a more or less constant skin friction drag term and the induced drag term, which is proportional to the square of lift coefficient. While a flat plate has zero lift at zero angle of attack, and a lift coefficient that increases with a slope of ~0.05/degree, the Frisbee, having a cambered shape, develops appreciable lift at zero angle of attack ($C_{LO}$~0.3), its lift curve slope is similar.

The major difference between the Frisbee and flat plate is in the pitch moment coefficient. While this is zero for a flat plate at zero angle of attack (which is not a useful flying condition, since a flat plat develops no lift at this angle), it rises steeply to ~0.12 at 10°. Because the Frisbee's trailing lip "catches" the underside airflow and tries to flip the disk forward, the pitch-up tendency of the lift-producing suction on the leading half of the upper surface is largely compensated. Its pitch moment coefficient is slightly negative at low incidence and is zero (i.e., the disc flies in a trimmed condition) at an angle of attack of about 8°. Over the large range of angle of attack of –10 to +15°, the coefficient varies only between –0.02 and +0.02. The existence of a trimmed position (pitch moment coefficient $C_M$=0) permits the possibility of a stable glide. If the disc is flying downwards at a speed (dictated by the lift coefficient at the trimmed condition) such that drag is balanced by the forward component of weight, then the speed will remain constant. However, although the zero pitch moment means the disc will not roll, the roll moment is not zero, and so the spin axis will be slowly precessed forward or back, changing the angle of attack.

Hummel suggests a role of the sign change in pitch moment in causing the sometimes serpentine (S-shaped) flight of Frisbees. When thrown fast at low angle of attack, the pitch moment is slightly negative and causes the Frisbee to very slowly veer to the right. However, as the disc's speed falls off, its lift no longer balances weight, and it falls faster downwards, increasing the angle of attack. When the angle of attack has increased beyond 90, the pitch moment becomes positive and increases rapidly. This leads to the often-observed left curve at the end of a flight.

Potts and Crowther also study the side-force coefficient (which might be thought of as due to the Robins-Magnus force, although in reality it is rather more complicated, since most of the boundary layer develops over the flat surface of the disk, rather than its somewhat cylindrical lip) and the roll moment. The side-force coefficient is not strongly variable over the range of angles of attack studied (–5 to 15°). It does vary with spin rate. For low values of advance ratio AR (<0.5, at an airspeed of 20 m/s) the coefficient is just slightly positive (0.02). However, for more rapid spin, the coefficient increases, at AR-0.69, Cs=0.04-0.05, and for AR=1.04, $C_s$~0.8. To first order, then, these data show that the side-force coefficient is proportional to advance ratio; a reasonable expectation is that the coefficient is in fact directly proportional to the tip speed, although this parameter was not varied independently in these tests. Although the lift and drag coefficients were not appreciably affected by spin, the pitch moment did become more negative (by 0.01, almost a doubling) at 0-100 angle of attack as the spin rate was increased from AR-0 to 1. The roll moment coefficient was also determined, and was almost zero (within 0.002 of zero) for low spin rates and more or less constant with angle of attack over the range −5 to 15°. However, the higher aspect ratio data showed a significant roll moment $G_{mf}$~-0.006 for advance ratio AR=0.7 and $C_{mf}$~-0.012 for AR=1: in both cases the moment coefficient increased in value with a slope of about 0.0006/degree.

Studies have revealed the prominent existence of nutation in the early part of the throw. A good throw will avoid exciting nutation, which seems to substantially increase drag. It can be seen in some photographs of hard Frisbee throws that the disc becomes visibly deformed by inertial loads. The disc is held only at one edge, and to reach flight speeds of ~20 m/s in a stroke of only a meter or so requires ~20 g of acceleration, which for the half disc (90 grams) being accelerated at this rate corresponding to a force of 20 N; equivalent to hanging a ~2 kg weight at the edge of the disc, and causing a transient deformation that might excite nutation.

In-flight measurements offer the prospect of measuring flow properties such as pressure on the rotating disc. Pressure distribution measurements are confounded by radial forces of the rotating disk, while microphones show how as the angle of attack increases, the pressure fluctuations on the disc become larger even as the flight speed decreases towards the end of the flight.

Aerobie produces the "Epic," which has a conventional-looking (Frisbee-like) upper surface, with an inside cylindrical cavity smaller than most discs, and is offset from the center. The offset permits a suitably narrow region for gripping the disc, but the offset displaces the disc center of mass further from the fingers, and in effect lengthens the arm of the thrower, allowing for a faster launch. Aerobie also produces the Superdisk, a disc with a rather flat spoiler rim (made of a comfortable rubber). This disc is allegedly easier to throw than a conventional Frisbee, but does not go as far. If the claim of easy throwing is true, it is presumably a result of the spoiler aerofil having a pitch moment coefficient that is small over a wider range of angle of attack.

Because of the thickness of the disc required to suppress the pitch moment, the draggy Frisbee does not permit flights of extreme length. A throwing toy that achieves longer distance was developed by Dr. Alan Adler, founder of Aerobie, Inc., (formerly Superflight, Inc.) in Palo Alto, California, in the 1970s. The flying ring, most commonly encountered in modern times as the Aerobie, is an attempt to circumvent the flying disc's most salient problem, namely the forward center lift and its resultant pitch-up moment. Almost all aerofoil sections have their center of pressure at the quarter chord point, while the center of mass is at the half chord. A ring-wing gets around this problem in part by pure geometry: it can be considered by crude longitudinal section as two separated wings. While the lift on each wing will act forward of the center of each, if the two wings have a sufficiently short chord, this lift offset will be small compared with the overall diameter of the vehicle. For recreational applications, the diameter of the vehicle relates to ergonomics (size of human hand).

A 30 cm diameter provides a large chord, which makes the trailing wing shorter than the leading wing. The trailing wing is also immersed in the downwash from the leading wing. This has the effect of reducing its effective angle of attack and throwing the ring out of balance by reducing the lift on the trailing wing. One approach that was tried initially in the "Skyro" (the first flying ring sold by Aerobie) was to use a rather symmetric aerofoil, but to have it angled such that the wing formed a cone. The trailing wing therefore was mounted at a higher angle of attack to the freestream flow than was the leading wing, and thus when downwash was taken into account the two were at a comparable angle of attack. The two wings thence had the same lift coefficient and the ring flew in a trimmed condition. However, this tuning (a cone angle of only about 1.5° was necessary) was only strictly correct at one flight speed, and thus a perfectly trimmed condition was only found during a portion of a typical flight. Tuning the vehicle over a range of flight conditions instead needed a carefully selected aerofoil section, which had a lift curve slope higher for outwards (trailing) flow than for inwards (leading wing) flow. The higher lift curve slope therefore compensated for the lower angle of attack, such that the resultant lift coefficients were similar. The aerofoil with this characteristic had a rather severe reflex, almost as if it had to spoilers on its trailing edge. This flying ring is rather thin (~3 mm) compared with a Frisbee, and thus has much lower drag. As a result, the range achievable with a flying ring is much further—the present record is some 1400 ft. This flight was made by throwing along a ridge (so it may have gained from some updraft lift) although it was terminated prematurely, ending about 1.5 m above the ground by striking a bush. This flight lasted only 7 seconds—much shorter than many boomerang flights; although the lift: drag ratio is very good, the actual lift coefficient is small and thus the flight speed must be fairly high.

Material selection for fabrication of a Frisbee is important. The ring must be adequately weighted to efficiently extract energy from the throw, and to provide sufficient moment of inertia to remain spinning. An additional consideration in this sort of application is compliance, as a metal Aerobie would be rather unpleasant to catch. The flying ring is constructed with a polycarbonate "backbone" which is placed in a mold into which a lower-density rubber is injected. This combination yields the desired density, as well as the desired compliance and "memory" (the ring can be "tuned" slightly by flexing it-were it perfectly elastic, such adjustments would be impossible).

Direction Cosine Matrices (DCM) and Quaternions

Orientation sensing systems may use a DCM to calculate and present data. Their features are that they: contain no singularities; provide no linear interpolation over rotation space; require orthonormalization to ensure proper rotations (complex operation); are easy to transform many vectors between different frames; and have many elements for math operations and filtering. Direction cosine matrices can be used to define a 3-dimensional frame orientation or frame transformation. The transformation can include rotations and translations about all 3 axes. An initial frame consists of the orientation and position of the body in the following manner:

$$\text{Initial} = \begin{bmatrix} nx & ox & ax & px \\ ny & oy & ay & py \\ nz & oz & az & pz \\ 0 & 0 & 0 & 1 \end{bmatrix}$$

The n-o-a vectors are unit vectors, and they are orthogonal to each other. They describe the orientation of the body with respect to a reference frame. The letters 'n', 'o', and 'a' stand for normal, orientation and approach, respectively. The 'p' vector describes the position of the body with respect to the reference frame. To describe a transformation, we use the following matrices. These matrices, when post or pre-multiplied with the current frame, will result in a new frame after the transformation is applied.

$$\text{Trans} = \begin{bmatrix} 1 & 0 & 0 & dX \\ 0 & 1 & 0 & dY \\ 0 & 0 & 1 & dZ \\ 0 & 0 & 0 & 1 \end{bmatrix}$$

$$\text{Rot } x = \begin{bmatrix} 1 & 0 & 0 & 0 \\ 0 & \cos(\varphi) & -\sin(\varphi) & 0 \\ 0 & \sin(\varphi) & \cos(\varphi) & 0 \\ 0 & 0 & 0 & 1 \end{bmatrix}$$

$$\text{Rot } y = \begin{bmatrix} \cos(\theta) & 0 & \sin(\theta) & 0 \\ 0 & 1 & 0 & 0 \\ -\sin(\theta) & 0 & \cos(\theta) & 0 \\ 0 & 0 & 0 & 1 \end{bmatrix}$$

$$\text{Rot } z = \begin{bmatrix} \cos(\psi) & -\sin(\psi) & 0 & 0 \\ \sin(\psi) & \cos(\psi) & 0 & 0 \\ 0 & 0 & 1 & 0 \\ 0 & 0 & 0 & 1 \end{bmatrix}$$

When a transformation is described by two or more of the basic transformations (we might first rotate around the x-axis, then translate on the resulting z-axis, and then rotate about the y-axis), we can multiply the basic transformation matrices together to get one transformation matrix that describes the complete transformation. If the transformation matrix is left-multiplied to the current frame, then the transformation is done with respect to the original frame. If the transformation matrix is right-multiplied to the current frame, then the transformation is done with respect to the last resulting frame.

Quaternions require more complicated algebra and calculus than DCM. Their features are that: they contain no singularities; a linear interpolation exists over rotation space; they require normalization to ensure proper rotations (simple operation); have a minimal non-singular representation of orientation; and filtering exists entirely in quaternion space on the surface of the 4-D hypersphere. Quaternions are a complex number system with three distinct imaginary parts (i, j, k), where the complex parts are defied as $i^2=j^2=k^2=ijk=-1$, given by the equation $q=w+ix+jy+kz \; w,x,y,z \in \mathfrak{R}$ The set of quaternions is denoted by the symbol H, and the identity quaternion is (1, 0, 0, 0). A quaternion can also be represented as a scalar s and a vector v defined by $q=(s, \vec{v})=s+\vec{v}\cdot\langle\hat{i},\hat{j},\hat{k}\rangle$ The norm of a quaternion is its length in the complex 4-space, defined as $|q|=\sqrt{w^2+x^2+y^2+z^2}$ The scalar product of two quaternions a and b is defined as $a \cdot b = w_a w_b + x_a x_b + y_a y_b + z_a z_b$ The conjugate of a quaternion $q=(s, v)$ is $q'=(s,-\vec{v})$, and the inverse of q is $$q^{-1} = \frac{q'}{|q|}$$

For a unit quaternion, the inverse is equal to the conjugate. A subset of the quaternions is the Unit Quaternion, denoted by $H_r$. For a unit quaternion, one which lines on the surface of a unit 4-D hypersphere, $|q|=1$. These quaternions have a simple relationship to the set of rotations in 3-space, named S0(3), defined by $$q = \left(\cos\left(\frac{\theta}{2}\right), \vec{n}\,\sin\left(\frac{\theta}{2}\right)\right),$$

where n is a unit 3-vector of the axis of rotation and θ is the angle to rotate around n by the right-hand-rule. Note that a rotation defined by this method has a single redundancy that $q=-q$ when used as a rotation. Rotating an orientation quaternion using a rotation quaternion is a simple operation defined by $p_{rot}=qpq'$, where p is the original quaternion, $p_{rot}$ is the rotated quaternion, and q is the quaternion that defines the rotation. Rotating a vector using a rotation quaternion is an almost identical operation $(n, \vec{v}_{rot})=q(0, \vec{v})q'$, where v is the original vector, $v_{rot}$ is the rotated vector, and q is the quaternion that defines the rotation. To perform two sequential rotations around 'a' and then around 'b', the rotation q is constructed by $q=b \cdot a$. The orthogonal matrix corresponding to a rotation by the unit quaternion $z=a+bi+cj+dk$ (with $|z|=1$) is given by $$\begin{pmatrix} a^2+b^2-c^2-d^2 & 2bc-2ad & 2ac-2bd \\ 2ad+2bc & a^2-b^2+c^2-d^2 & 2cd-2ab \\ 2bd-2ac & 2ab+2cd & a^2-b^2-c^2+d^2 \end{pmatrix}$$

A unit quaternion can be described as:

$q = [q_0 \; q_1 \; q_2 \; q_3]^T$ $|q|^2 = q_0^2 + q_1^2 + q_2^2 + q_3^2 = 1$ $q_0 = \cos(\alpha/2)$ $q_1 = \cos(\alpha/2)\cos(\beta_x)$ $q_2 = \cos(\alpha/2)\cos(\beta_y)$ $q_3 = \cos(\alpha/2)\cos(\beta_z)$ where α is a simple rotation angle and $\cos(\beta_x)$, $\cos(\beta_y)$ and $\cos(\beta_z)$ are the "direction cosines" locating the axis of rotation (Euler's Theorem).

The orthogonal matrix corresponding to a rotation by the unit quaternion q is given by $$\begin{bmatrix} 1-2(q_2^2+q_3^2) & 2(q_1q_2+q_0q_3) & 2(q_0q_2+q_1q_3) \\ 2(q_1q_2+q_0q_3) & 1-2(q_1^2+q_3^2) & 2(q_2q_3+q_0q_1) \\ 2(q_1q_3+q_0q_2) & 2(q_0q_1+q_2q_3) & 1-2(q_1^2+q_2^2) \end{bmatrix}$$

The orthogonal matrix corresponding to a rotation with Euler angles $\phi, \vartheta, \psi$, is given by $$\begin{bmatrix} \cos\theta\cos\psi & -\cos\phi\sin\psi + \sin\phi\sin\theta\cos\psi & \sin\phi\sin\psi + \cos\phi\sin\theta\cos\psi \\ \cos\theta\sin\psi & \cos\phi\cos\psi + \sin\phi\sin\theta\sin\psi & -\sin\phi\cos\psi + \cos\phi\sin\theta\sin\psi \\ -\sin\theta & \sin\phi\cos\theta & \cos\phi\cos\theta \end{bmatrix}$$

By comparing the terms in the two matrices, we get $$q = \begin{bmatrix} \cos(\phi/2)\cos(\theta/2)\cos(\psi/2) + \sin(\phi/2)\sin(\theta/2)\sin(\psi/2) \\ \sin(\phi/2)\cos(\theta/2)\cos(\psi/2) - \cos(\phi/2)\sin(\theta/2)\sin(\psi/2) \\ \cos(\phi/2)\sin(\theta/2)\cos(\psi/2) + \sin(\phi/2)\cos(\theta/2)\sin(\psi/2) \\ \cos(\phi/2)\cos(\theta/2)\sin(\psi/2) - \sin(\phi/2)\sin(\theta/2)\cos(\psi/2) \end{bmatrix}$$

For Euler angles we get: $\begin{bmatrix} \phi \\ \theta \\ \psi \end{bmatrix} = \begin{bmatrix} \arctan\dfrac{2(q_0 q_1 + q_2 q_3)}{1 - 2(q_1^2 + q_2^2)} \\ \arcsin(2(q_0 q_2 - q_3 q_1)) \\ \arctan\dfrac{2(q_0 q_3 + q_1 q_2)}{1 - 2(q_2^2 + q_3^2)} \end{bmatrix}$ Dual quaternions can also be used to parameterize a rotation and a translation at once, rather than first rotating, and then translating based on the results of that rotation. Dual quaternions representation simultaneously solves for orientation and position estimate by minimizing a single cost function associated with the sum of orientation and position errors, rather than estimating the translation based on the estimation of the rotation.

See, U.S. Patent and U.S. Pat. Nos. 100,466; 129,401; 129,402; 613,809; 730,097; 905,547; 931,966; 996,627; 1,012,631; 1,291,345; 1,405,035; 1,816,707; 1,907,815; 1,911,041; 1,959,270; 2,051,151; 2,077,471; 2,201,042; 2,201,108; 2,201,146; 2,418,269; 2,461,435; 2,469,144; 2,567,392; 2,598,349; 2,728,537; 2,730,311; 2,835,073; 2,863,261; 2,876,965; 2,949,693; 2,953,321; 2,968,318; 2,968,453; 2,988,301; 3,002,709; 3,053,480; 3,104,853; 3,199,809; 3,204,891; 3,224,488; 3,229,416; 3,256,020; 3,359,678; 3,394,906; 3,395,876; 3,402,488; 3,442,469; 3,477,168; 3,503,573; 3,508,360; 3,518,788; 3,528,284; 3,549,109; 3,557,304; 3,568,358; 3,570,467; 3,608,033; 3,673,732; 3,677,503; 3,727,055; 3,742,643; 3,752,417; 3,774,865; 3,852,910; 3,884,466; 3,933,325; 3,935,663; 3,939,602; 3,946,970; 3,960,379; 3,976,265; 3,982,126; 4,047,832; 4,048,947; 4,051,622; 4,052,927; 4,065,873; 4,072,049; 4,111,594; 4,112,612; 4,145,839; 4,161,843; 4,166,618; 4,184,654; 4,196,877; 4,212,131; 4,214,720; 4,222,242; 4,222,361; 4,223,473; 4,225,286; 4,243,190; 4,246,720; 4,249,334; 4,253,673; 4,262,911; 4,266,773; 4,273,302; 4,274,639; 4,301,616; 4,311,342; 4,313,512; 4,315,629; 4,330,130; 4,334,385; 4,335,537; 4,355,813; 4,366,386; 4,366,936; 4,370,824; 4,373,734; 4,378,944; 4,386,748; 4,386,779; 4,398,895; 4,401,284; 4,403,565; 4,433,819; 4,438,924; 4,446,379; 4,452,007; 4,452,174; 4,456,265; 4,457,476; 4,461,436; 4,461,485; 4,502,724; 4,516,776; 4,529,390; 4,566,699; 4,576,581; 4,600,398; 4,602,584; 4,630,997; 4,635,474; 4,635,943; 4,661,052; 4,709,928; 4,718,677; 4,732,384; 4,736,948; 4,741,109; 4,748,366; 4,752,267; 4,759,146; 4,778,128; 4,795,111; 4,796,836; 4,804,156; 4,805,583; 4,809,988; 4,818,990; 4,819,947; 4,828,525; 4,832,569; 4,839,838; 4,850,939; 4,852,543; 4,863,317; 4,867,727; 4,869,699; 4,880,071; 4,894,038; 4,903,917; 4,911,020; 4,919,083; 4,919,637; 4,923,196; 4,923,303; 4,931,028; 4,952,196; 4,955,620; 4,955,962; 4,964,837; 4,974,633; 4,976,155; 4,979,746; 4,995,822; 5,014,990; 5,026,067; 5,032,098; 5,033,750; 5,035,377; 5,043,646; 5,049,031; 5,050,439; 5,050,575; 5,063,735; 5,064,143; 5,066,258; 5,067,674; 5,071,383; 5,072,892; 5,078,637; 5,080,624; 5,082,079; 5,082,205; 5,083,799; 5,092,608; 5,103,646; 5,104,126; 5,108,108; 5,125,862; 5,128,671; 5,133,550; 5,133,637; 5,145,444; 5,150,857; 5,152,478; 5,159,407; 5,178,344; 5,180,119; 5,181,724; 5,195,745; 5,195,916; 5,195,920; 5,203,521; 5,209,490; 5,213,284; 5,228,690; 5,232,226; 5,234,367; 5,240,207; 5,254,077; 5,256,099; 5,259,571; 5,259,802; 5,263,819; 5,267,735; 5,269,514; 5,277,380; 5,284,341; 5,287,004; 5,295,643; 5,297,759; 5,303,931; 5,351,911; 5,351,967; 5,360,363; 5,362,065; 5,366,219; 5,367,503; 5,370,699; 5,383,363; 5,395,071; 5,397,130; 5,404,868; 5,407,150; 5,407,151; 5,411,265; 5,417,602; 5,421,538; 5,429,542; 5,440,817; 5,446,599; 5,452,907; 5,453,758; 5,458,329; 5,480,334; 5,492,494; 5,503,351; 5,521,817; 5,522,753; 5,531,624; 5,552,983; 5,569,131; 5,575,438; 5,584,901; 5,620,351; 5,634,839; 5,636,844; 5,645,248; 5,655,777; 5,660,542; 5,672,086; 5,676,344; 5,676,988; 5,687,387; 5,695,420; 5,697,617; 5,726,928; 5,746,930; 5,757,181; 5,774,357; 5,776,021; 5,779,576; 5,781,399; 5,786,984; 5,793,606; 5,799,616; 5,807,198; 5,816,879; 5,853,311; 5,854,736; 5,854,843; 5,865,690; 5,867,386; 5,871,397; 5,872,205; 5,873,545; 5,873,570; 5,875,108; 5,875,627; 5,882,107; 5,890,441; 5,893,790; 5,895,308; 5,899,288; 5,901,246; 5,901,633; 5,902,166; 5,903,454; 5,904,724; 5,909,859; 5,916,179; 5,920,477; 5,920,995; 5,930,804; 5,934,966; 5,934,997; 5,935,023; 5,941,920; 5,951,353; 5,963,957; 5,971,320; 5,975,982; 5,977,778; 5,977,913; 5,984,753; 5,988,562; 5,996,933; 6,000,703; 6,005,395; 6,010,419; 6,024,660; 6,029,764; 6,032,374; 6,042,494; 6,045,095; 6,048,247; 6,049,448; 6,050,250; 6,053,451; 6,056,616; 6,060,815; 6,079,954; 6,081,750; 6,083,128; 6,097,104; 6,106,355; 6,107,910; 6,114,971; 6,120,398; 6,126,332; 6,135,455; 6,142,059; 6,148,271; 6,151,563; 6,157,898; 6,172,429; 6,179,247; 6,182,076; 6,182,923; 6,186,902; 6,193,620; 6,198,275; 6,202,198; 6,206,537; 6,208,247; 6,224,452; 6,227,485; 6,227,992; 6,230,501; 6,231,414; 6,234,102; 6,241,362; 6,247,989; 6,252,544; 6,254,032; 6,254,832; 6,260,796; 6,261,142; 6,265,984; 6,267,070; 6,270,036; 6,270,038; 6,270,391; 6,273,370; 6,287,193; 6,288,633; 6,292,213; 6,293,680; 6,302,229; 6,304,665; 6,308,787; 6,312,349; 6,315,062; 6,315,667; 6,317,049; 6,332,103; 6,338,391; 6,340,884; 6,346,025; 6,347,623; 6,348,010; 6,350,985; 6,351,698; 6,357,158; 6,364,614; 6,371,406; 6,375,117; 6,375,424; 6,386,997; 6,389,329; 6,395,955; 6,398,159; 6,400,996; 6,402,090; 6,402,342; 6,402,584; 6,404,409; 6,405,132; 6,414,955; 6,418,424; 6,421,622; 6,428,381; 6,429,812; 6,431,494; 6,442,336; 6,450,445; 6,450,446; 6,453,595; 6,454,623; 6,457,670; 6,464,166; 6,464,167; 6,468,123; 6,470,976; 6,474,593; 6,484,818; 6,484,971; 6,503,085; 6,513,345; 6,513,752; 6,516,699; 6,519,564; 6,524,073; 6,524,368; 6,526,352; 6,527,223; 6,531,957; 6,539,290; 6,547,180; 6,550,715; 6,554,088; 6,554,285; 6,563,130;

6,565,243; 6,565,404; 6,568,980; 6,570,487; 6,572,053;
6,575,401; 6,581,872; 6,585,551; 6,588,701; 6,591,537;
6,592,071; 6,602,045; 6,604,706; 6,604,742; 6,608,464;
6,611,224; 6,612,893; 6,616,094; 6,622,973; 6,626,078;
6,640,145; 6,647,328; 6,651,511; 6,659,466; 6,666,650;
6,669,587; 6,677,257; 6,681,512; 6,688,936; 6,694,228;
6,695,728; 6,703,827; 6,705,654; 6,708,920; 6,719,069;
6,719,653; 6,720,920; 6,723,013; 6,726,265; 6,735,500;
6,735,630; 6,739,189; 6,749,218; 6,751,529; 6,755,263;
6,755,273; 6,758,436; 6,761,637; 6,768,944; 6,772,124;
6,776,825; 6,791,091; 6,791,472; 6,824,095; 6,826,607;
6,832,251; 6,833,795; 6,843,447; 6,843,699; 6,847,865;
6,850,252; 6,857,079; 6,857,770; 6,859,831; 6,865,825;
6,868,314; 6,872,105; 6,880,722; 6,885,968; 6,887,119;
6,892,666; 6,898,501; 6,899,586; 6,910,977; 6,918,459;
6,921,315; 6,922,632; 6,972,659; 6,978,728; 6,981,499;
6,982,697; 6,987,442; 6,988,026; 6,990,639; 6,991,565;
7,002,553; 7,006,881; 7,018,308; 7,020,701; 7,023,979;
7,029,406; 7,032,861; 7,034,660; 7,064,472; 7,069,684;
7,073,750; 7,081,693; 7,082,890; 7,083,533; 7,085,637;
7,089,099; 7,090,596; 7,096,727; 7,101,293; 7,103,460;
7,104,347; 7,107,706; 7,108,576; 7,108,615; 7,110,525;
7,110,880; 7,136,710; 7,143,844; 7,145,551; 7,147,246;
7,162,035; 7,164,117; 7,170,201; 7,175,542; 7,181,017;
7,187,295; 7,194,838; 7,201,671; 7,202,776; 7,204,041;
7,204,453; 7,204,455; 7,207,701; 7,209,221; 7,213,786;
7,219,033; 7,219,449; 7,219,861; 7,222,452; 7,231,920;
7,237,355; 7,237,634; 7,238,121; 7,242,988; 7,243,945;
7,249,732; 7,250,936; 7,255,304; 7,255,623; 7,259,357;
7,264,534; 7,268,700; 7,269,253; 7,270,614; 7,271,737;
7,285,032; 7,288,037; 7,295,925; 7,298,289; 7,300,363;
7,300,584; 7,307,617; 7,309,967; 7,313,467; 7,322,355;
7,329,099; 7,330,784; 7,331,838; 7,335,000; 7,340,765;
7,343,707; 7,347,200; 7,347,758; 7,352,339; 7,354,017;
7,357,732; 7,359,527; 7,359,782; 7,362,032; 7,365,455;
7,367,901; 7,372,952; 7,379,800; 7,385,443; 7,386,372;
7,391,257; 7,392,871; 7,394,182; 7,395,614; 7,407,029;
7,412,930; 7,418,346; 7,421,321; 7,426,437; 7,427,047;
7,429,801; 7,435,089; 7,444,210; 7,451,005; 7,455,134;
7,467,629; 7,476,865; 7,488,231; 7,497,759; 7,500,898;
7,500,917; 7,504,740; 7,520,353; 7,523,803; 7,527,288;
7,538,473; 7,540,814; 7,541,995; 7,545,994; 7,552,403;
7,555,370; 7,557,433; 7,559,388; 7,563,180; 7,568,986;
7,570,785; 7,575,248; 7,582,981; 7,584,071; 7,584,570;
7,590,589; 7,596,242; 7,596,767; 7,597,099; 7,597,164;
7,602,077; 7,603,998; 7,606,570; 7,607,494; 7,607,610;
7,610,146; 7,614,958; 7,620,521; 7,621,484; 7,622,988;
7,623,053; 7,628,671; 7,629,899; 7,630,806; 7,641,528;
7,647,180; 7,650,212; 7,650,319; 7,662,012; 7,662,013;
7,663,502; 7,663,629; 7,665,453; 7,665,454; 7,670,204;
7,672,756; 7,672,781; 7,676,034; 7,676,062; 7,682,214;
7,689,378; 7,692,127; 7,708,658; 7,709,973; 7,712,225;
7,712,777; 7,714,757; 7,716,008; 7,716,013; 7,719,416;
7,721,231; 7,723,861; 7,725,253; 7,734,061; 7,738,678;
7,746,620; 7,762,582; 7,766,274; 7,766,383; 7,769,513;
7,770,920; 7,772,960; 7,773,749; 7,774,155; 7,775,761;
7,775,910; 7,779,956; 7,781,709; 7,782,590; 7,783,277;
7,783,403; 7,785,098; 7,788,008; 7,789,520; 7,791,503;
7,794,302; 7,794,341; 7,796,081; 7,797,367; 7,798,875;
7,798,883; 7,811,150; 7,813,822; 7,815,482; 7,819,003;
7,821,149; 7,823,089; 7,830,033; 7,832,137; 7,834,301;
7,837,648; 7,840,342; 7,840,355; 7,844,687; 7,845,508;
7,847,628; 7,848,905; 7,850,551; 7,852,462; 7,854,087;
7,856,750; 7,857,718; 7,859,126; 7,860,481; 7,866,717;
7,869,591; 7,873,841; 7,876,010; 7,877,224; 7,878,929;
7,883,392; 7,887,089; 7,891,298; 7,893,413; 7,894,595;
7,896,609; 7,899,616; 7,899,621; 7,900,736; 7,904,187;
7,907,838; 7,912,645; 7,916,858; 7,918,605; 7,920,102;
7,927,216; 7,931,239; 7,931,535; 7,935,013; 7,937,878;
7,942,745; 7,946,048; 7,946,526; 7,947,937; 7,958,796;
7,962,164; 7,962,285; 7,963,442; 7,966,078; 7,971,823;
7,971,824; 7,974,714; 7,976,060; 7,979,172; 7,979,173;
7,983,802; 7,983,836; 7,986,054; 7,986,218; 7,987,003;
7,988,190; 7,989,973; 7,990,283; 7,997,595; 7,999,212;
8,000,314; 8,000,897; 8,002,604; 8,002,652; 8,009,608;
8,013,569; 8,018,933; 8,027,572; 8,031,060; 8,032,324;
8,032,477; 8,033,253; 8,041,483; 8,041,536; 8,046,313;
8,049,193; 8,051,079; 8,052,500; 8,054,203; 8,054,965;
8,060,308; 8,062,087; 8,068,979; 8,086,318; 8,089,458;
8,099,375; 8,106,748; 8,109,029; 8,113,905; 8,119,958;
8,124,921; 8,126,680; 8,132,126; 8,135,413; 8,140,259;
8,140,658; 8,144,619; 8,148,838; 8,152,198; 8,157,651;
8,160,433; 8,161,968; 8,164,567; 8,165,916; 8,167,344;
8,169,406; 8,171,849; 8,174,135; 8,177,260; 8,182,231;
8,182,306; 8,184,097; 8,185,119; 8,186,784; 8,196,540;
8,202,180; 8,205,578; 8,205,822; 8,209,120; 8,209,147;
8,214,097; 8,215,255; 8,225,458; 8,226,493; 8,230,635;
8,231,506; 8,233,471; 8,233,918; 8,235,416; 8,240,508;
8,242,623; 8,247,912; 8,248,367; 8,250,921; 8,253,264;
8,255,144; 8,256,826; 8,257,157; 8,260,537; 8,260,883;
8,261,681; 8,265,769; 8,267,693; 8,267,786; 8,270,603;
8,282,498; 8,286,265; 8,287,406; 8,288,698; 8,289,162;
8,300,798; 8,308,522; 8,308,563; 8,310,368; 8,313,379;
8,315,326; 8,315,327; 8,316,237; 8,319,162; 8,322,308;
8,322,649; 8,325,030; 8,327,803; 8,335,304; 8,341,289;
8,344,998; 8,348,618; 8,351,773; 8,352,400; 8,353,454;
8,354,881; 8,355,410; 8,357,023; 8,362,408; 8,362,631;
8,363,744; 8,364,136; 8,368,648; 8,369,967; 8,373,582;
8,373,659; 8,384,538; 8,384,668; 8,398,449; 8,402,490;
8,406,906; 8,409,003; 8,411,842; 8,417,481; 8,428,913;
8,430,753; 8,432,084; 8,444,513; 8,447,474; 8,451,928;
8,451,929; 8,452,575; 8,452,577; 8,454,459; 8,456,159;
8,456,419; 8,462,109; 8,467,133; 8,469,815; 8,472,120;
8,472,986; 8,473,245; 8,475,275; 8,477,425; 8,482,859;
8,488,246; 8,491,389; 8,494,530; 8,495,879; 8,500,507;
8,500,604; 8,504,008; 8,509,827; 8,511,304; 8,514,825;
8,516,266; 8,516,886; 8,516,887; 8,528,855; 8,535,066;
8,539,894; 8,541,745; 8,554,325; 8,561,937; 8,562,487;
8,565,747; 8,566,247; 8,569,090; 8,571,781; 8,574,146;
8,576,073; 8,578,646; 8,579,671; 8,579,734; 8,582,753;
8,583,263; 8,583,329; 8,584,522; 8,584,944; 8,585,476;
8,593,331; 8,594,779; 8,600,830; 8,601,964; 8,602,350;
8,602,718; 8,608,167; 8,608,535; 8,608,598; 8,612,617;
8,618,690; 8,620,239; 8,625,496; 8,626,472; 8,628,333;
8,628,453; 8,629,789; 8,629,836; 8,630,761; 8,630,795;
8,638,217; 8,644,165; 8,644,692; 8,655,307; 8,656,630;
8,657,351; 8,661,500; 8,668,604; 8,678,873; 8,682,726;
8,683,065; 8,686,579; 8,688,403; 8,689,426; 8,693,653;
8,702,515; 8,707,216; 8,707,608; 8,708,821; 8,708,824;
8,711,094; 8,714,389; 8,718,837; 8,721,520; 8,727,265;
8,738,944; 8,746,162; 8,747,241; 8,750,897; 8,751,063;
8,756,010; 8,756,173; 8,758,136; 8,768,865; 8,770,586;
8,771,148; 8,776,705; 8,777,785; 8,781,595; 8,781,669;
8,784,268; 8,787,246; 8,790,180; 8,795,022; 8,797,167;
8,801,359; 8,803,089; 8,808,100; 8,808,119; 8,812,654;
8,814,688; 8,814,691; 8,816,536; 8,820,782; 8,821,293;
8,822,924; 8,827,761; 8,827,810; 8,827,845; 8,831,205;
8,832,244; 8,833,607; 8,834,271; 8,836,503; 8,843,279;
8,845,557; 8,847,137; 8,849,697; 8,855,838; 8,860,409;
8,870,655; 8,874,129; 8,874,477; 8,874,747; 8,875,643;
8,878,528; 8,878,673; 8,880,296; 8,880,378; 8,884,455;
8,885,979; 8,888,576; 8,892,185; 8,892,271; 8,892,495;
8,893,785; 8,893,971; 8,896,301; 8,899,513; 8,904,181;
8,905,307; 8,905,800; 8,908,922; 8,909,543; 8,912,892;

8,913,011; 8,915,785; 8,920,267; 8,920,287; 8,923,186; 8,924,248; 8,924,249; 8,924,587; 8,924,588; 8,930,300; 8,930,571; 8,931,144; 8,932,092; 8,938,612; 8,939,708; 8,942,301; 8,946,923; 8,947,081; 8,948,442; 8,948,457; 8,951,123; 8,954,290; 8,954,292; 8,957,783; 8,959,824; 8,960,113; 8,961,260; 8,961,312; 8,962,308; 8,963,845; 8,964,298; 8,965,579; 8,965,587; 8,965,677; 8,966,377; 8,966,806; 8,968,195; 8,969,101; 8,971,274; 8,971,519; 8,972,053; 8,974,386; 8,977,494; 8,980,198; 8,982,105; 8,982,856; 8,991,702; 8,996,320; 8,997,564; 8,997,725; 8,998,894; 9,002,583; 9,004,973; 9,005,055; 9,007,178; 9,009,810; 9,010,002; 9,011,248; 9,011,250; 9,011,329; 9,011,331; 9,011,332; 9,013,144; 9,014,773; 9,020,191; 9,021,880; 9,027,490; 9,028,405; 9,030,321; 9,030,437; 9,031,568; 9,031,573; 9,032,796; 9,032,890; 9,033,116; 9,035,777; 9,037,087; 9,037,455; 9,037,578; 9,037,600; 9,038,197; 9,039,533; 9,042,953; 9,044,209; 9,044,671; 9,045,927; 9,046,455; 9,050,972; 9,052,276; 9,053,516; 9,053,562; 9,056,676; 9,057,361; 9,060,683; 9,063,165; 9,066,694; 9,066,695; 9,066,697; 9,068,794; 9,069,067; 9,070,101; 9,072,477; 9,073,532; 9,075,146; 9,078,607; 9,079,311; 9,081,885; 9,086,782; 9,089,760; 9,090,339; 9,095,072; 9,097,662; 9,097,890; 9,097,891; 9,102,220; 9,102,407; 9,103,920; 9,105,025; 9,105,281; 9,106,286; 9,107,586; 9,108,060; 9,114,838; 9,115,989; 9,117,318; 9,117,447; 9,121,217; 9,122,307; 9,122,966; 9,127,908; 9,127,910; 9,128,281; 9,129,295; 9,130,651; 9,132,352; 9,134,464; 9,134,534; 9,134,552; 9,137,397; 9,139,865; 9,140,444; 9,140,715; 9,143,392; 9,146,147; 9,148,530; 9,149,695; 9,149,717; 9,150,263; 9,151,633; 9,155,168; 9,157,736; 9,161,303; 9,162,027; 9,162/201; 9,162,148; 9,166,845; 9,166,953; 9,168,656; 9,170,070; 9,170,074; 9,170,288; 9,172,551; 9,173,600; 9,173,837; 9,174,508; 9,174,733; 9,176,500; 9,176,924; 9,177,476; 9,179,020; 9,182,596; 9,185,246; 9,186,096; 9,186,098; 9,186,567; 9,186,585; 9,187,099; 9,187,173; 9,192,815; 9,193,404; 9,197,173; 9,197,297; 9,197,736; 9,198,563; 9,199,734; 9,204,796; 9,205,921; 9,206,309; 9,208,676; 9,209,871; 9,209,888; 9,211,201; 9,211,811; 9,211,920; 9,211,947; 9,215,322; 9,215,980; 9,215,992; 9,216,249; 9,217,376; 9,218,316; 9,218,364; 9,218,698; 9,219,832; 9,221,356; 9,223,134; 9,225,782; 9,227,122; 9,227,138; 9,229,227; 9,233,623; 9,233,645; 9,235,241; 9,237,211; 9,237,244; 9,237,297; 9,237,411; 9,238,142; 9,239,951; 9,240,018; 9,240,913; 9,242,572; 9,243,282; 9,245,569; 9,246,554; 9,248,288; 9,248,343; 9,250,038; 9,254,759; 9,255,771; 9,257,054; 9,261,289; 9,261,978; 9,264,552; 9,265,453; 9,265,991; 9,266,178; 9,266,233; 9,268,344; 9,269,022; 9,271,851; 9,272,206; 9,272,782; 9,273,666; 9,273,981; 9,274,132; 9,280,205; 9,280,717; 9,283,468; 9,284,062; 9,285,241; 9,285,382; 9,285,589; 9,286,726; 9,290,146; 9,290,220; 9,292,102; 9,292,758; 9,297,358; 9,298,282; 9,300,481; 9,301,085; 9,302,783; 9,309,861; 9,311,670; 9,329,597; 9,329,689; 9,335,123; 9,339,708; 9,341,843; 9,346,527; 9,351,060; 9,352,209; 9,352,216; 9,366,862; 9,371,661; 9,373,149; 9,376,168; 9,383,208; 9,384,668; 9,389,612; 9,394,016; 9,394,043; 9,395,725; 9,403,060; 9,403,272; 9,408,143; 9,408,477; 9,409,643; 9,415,263; 9,419,951; 9,421,448; 9,426,430; 9,427,624; 9,427,864; 9,429,653; 9,429,940; 9,437,088; 9,448,043; 9,451,020; 9,452,287; 9,452,319; 9,452,685; 9,456,086; 9,457,730; 9,457,915; 9,459,077; 9,464,873; 9,468,272; 9,478,063; 9,479,697; 9,481,410; 9,483,876; 9,498,689; 9,500,444; 9,511,260; 9,512,816; 9,514,604; 9,519,750; 9,525,438; 9,527,557; 9,535,563; 9,540,087; 9,545,542; 9,550,582; 9,551,582; 9,552,708; 9,555,292; 9,560,725; 9,573,035; 9,574,850; 9,576,475; 9,579,552; 9,582,034; 9,582,072; 9,589,446; 9,591,902; 9,592,428; 9,600,645; 9,615,264; 9,630,062; 9,630,076; 9,635,177; 9,642,415; 9,645,580; 9,648,452; 9,653,637; 9,656,732; 9,687,698; 9,692,949; 9,697,617; 9,726,447; 9,727,042; 9,736,308; 9,744,448; 9,757,624; 9,764,201; 9,766,620; 9,782,636; 9,782,637; 9,794,797; 9,795,868; 9,795,882; 9,802,083; 9,804,672; 9,807,239; 9,808,678; 9,811,094; 9,818,136; 9,827,487; 9,829,882; 9,841,758; 9,860,391; 9,868,034; 9,873,063; 9,878,214; 9,878,228; 9,886,032; 9,904,292; 9,914,069; 9,915,726; 9,970,732; 9,993,694; 9,993,738; 10,010,750; 10,096,033; 10,099,104; 10,112,076; 10,118,696; 10,126,311; 10,127,563; 10,127,564; 10,129,211; 10,150,014; D17212; D193245; D209763; D20791; D2104; D213708; D214577; D22453; D253525; D261538; D29294; D324890; D346001; D36181; D380017; D419205; D465196; D509259; D526029; D576216; D577392; D640329; D664214; D678959; D691673; D717570; D740892; D800557; RE34383; RE40533; RE45775; RE45807; RE45905; RE46310; 20010000170; 20010020665; 20010021617; 20010021669; 20010024923; 20010033057; 20010033790; 2001003922; 20010039230; 20010044685; 20010049249; 20010051488; 20010056544; 20020005297; 20020005614; 20020017759; 20020020561; 20020049096; 20020067990; 20020077906; 20020079405; 20020092693; 20020093180; 20020100040; 20020104921; 20020105966; 20020106966; 20020115508; 20020116652; 20020118147; 20020124452; 20020139030; 20020142699; 20020142701; 20020154029; 20020163132; 20020166710; 20020179777; 20020180154; 20020189612; 20020190230; 20020193914; 20020194988; 20020198632; 20030000524; 20030005926; 20030010190; 20030027672; 20030045200; 20030056983; 20030079744; 20030096554; 20030096663; 20030100391; 20030111268; 20030111575; 20030122390; 20030145724; 20030149803; 20030184013; 20030190968; 20030191568; 20030193572; 20030194924; 20030199343; 20030217876; 20030234914; 20040007818; 20040008853; 20040009063; 20040022070; 20040025871; 20040049324; 20040061347; 20040073360; 20040077255; 20040077975; 20040078662; 20040094152; 20040094662; 20040099676; 20040113431; 20040129478; 20040130442; 20040148057; 20040157687; 20040162001; 20040163289; 20040169485; 20040185972; 20040190374; 20040192473; 20040195436; 2004020972; 20040211250; 20040024666; 20040220001; 20040231667; 20040235388; 20040244034; 20040245376; 20040256159; 20040263479; 20050005495; 20050005934; 20050017488; 20050021282; 20050022806; 20050043674; 20050046584; 20050048918; 20050049055; 20050060069; 20050061707; 20050066961; 20050076387; 20050076904; 20050082762; 20050090177; 20050091903; 20050095072; 20050110277; 20050110751; 20050126997; 20050134440; 20050137786; 20050140212; 20050145151; 20050151941; 20050154491; 20050156883; 20050161467; 20050173153; 20050173589; 20050192727; 20050192852; 20050195383; 20050200079; 2005020727; 2005020728; 200502520; 2005025764; 20050232186; 20050233672; 20050233749; 20050247312; 20050248136; 20050249667; 20050251289; 2005025773; 20050257174; 20050260548; 20050260918; 2005027378; 20050274378; 20050278098; 20060005449; 20060010757; 20060022083; 20060023117; 20060025149; 20060025897; 20060027404; 20060027482; 20060035726; 20060049304; 20060057549; 20060073758; 20060092630; 20060100057; 20060105838; 20060105865; 200601622; 20060124800; 20060128504; 20060136498; 20060144211; 20060144994; 20060147371; 20060148377; 20060158065; 20060160457; 20060166589; 20060167595; 20060167784; 20060169691; 20060170535; 20060178231; 20060180371; 20060184336; 20060185899; 20060196504; 20060199682; 20060200253;

20060200258; 20060200259; 20060200260; 20060200314; 20060208169; 20060212193; 200602/2194; 20060217864; 20060229143; 20060231304; 20060231305; 20060231306; 20060231677; 20060234596; 20060237246; 20060237247; 20060251505; 20060255281; 2006026220; 20060277466; 20060284839; 2006028737; 20070005609; 20070010342; 20070016476; 20070017498; 2007002915; 2007002729; 20070029272; 20070032318; 20070034738; 20070035059; 20070038743; 20070044364; 20070046029; 20070046143; 2007004837; 20070053513; 20070057781; 20070060416; 20070061022; 20070061023; 20070061735; 20070063875; 20070069064; 20070070038; 20070073482; 20070075919; 20070077857; 20070085697; 20070086624; 20070087756; 20070092549; 20070096445; 20070096446; 20070100666; 20070109111; 20070116327; 20070120347; 20070123952; 20070125351; 20070132219; 20070132220; 20070135247; 20070135982; 20070144052; 20070146325; 20070149496; 20070152804; 20070154063; 20070155263; 20070155541; 20070155549; 20070160472; 20070164150; 20070164641; 20070174163; 20070180751; 20070182528; 20070187897; 20070193811; 20070197318; 20070205553; 20070212973; 20070213126; 20070218988; 20070219426; 20070219744; 20070232412; 20070240903; 20070251749; 20070262574; 20070280505; 20070282506; 20070296571; 20070298913; 20080004798; 20080008588; 20080015771; 20080017193; 20080033581; 20080036185; 20080036252; 20080036580; 20080036617; 20080039246; 20080039250; 20080040004; 20080040023; 20080040029; 20080040749; 20080042408; 20080042409; 20080042815; 20080046150; 20080046200; 20080047329; 20080047770; 20080051957; 20080062677; 20080065182; 20080069403; 20080086240; 20080091309; 20080093838; 20080096654; 20080096657; 20080098640; 20080104422; 20080106436; 20080110388; 20080111312; 20080114502; 20080116644; 20080116692; 2008011942; 20080119993; 20080125001; 20080125002; 20080129475; 20080132361; 20080133136; 20080140318; 20080142060; 20080143085; 20080145224; 20080147253; 20080148723; 20080150786; 20080154495; 20080154629; 20080154898; 20080157940; 20080161986; 20080161987; 20080162036; 20080165018; 20080167535; 20080167819; 20080167821; 20080174281; 20080176676; 20080181773; 20080185785; 20080189053; 20080192007; 20080192070; 20080195261; 20080204410; 20080204411; 2008024068; 2008025202; 2008025231; 20080234899; 20080236275; 20080242415; 20080248449; 20080250869; 2008025262; 20080259055; 20080262893; 20080274844; 20080282817; 20080290650; 20080293523; 20080296157; 20080296905; 20080313575; 20090004628; 20090007661; 20090012741; 20090013983; 2009001774; 20090020649; 20090029754; 20090030605; 20090031438; 20090033034; 20090033540; 20090036235; 20090039207; 20090043506; 20090047861; 20090048750; 20090058091; 20090061727; 20090066065; 20090068018; 2009008244; 20090082691; 20090088266; 20090092284; 20090104836; 2009011521; 20090119543; 2009012484; 20090129929; 20090134580; 20090134966; 20090140887; 20090143175; 20090143923; 20090163110; 20090164952; 20090169388; 20090170639; 20090171788; 20090174192; 20090177345; 20090183417; 20090195497; 20090197658; 20090198354; 20090213519; 20090213520; 20090213521; 20090217851; 20090228157; 20090235570; 20090262074; 20090265974; 20090275262; 20090278317; 20090278353; 20090280931; 20090291614; 20090300551; 20090303204; 20090311924; 20100013160; 20100013238; 20100022157; 20100032963; 20100033142; 20100034466; 20100038915; 20100040025; 20100052945; 20100057305; 20100062847; 20100063774; 20100064983; 20100066093; 20100066095; 2010007290; 20100076642; 20100079748; 20100088532; 20100117363; 20100123605; 20100129193; 20100130093; 20100139738; 20100140873; 20100141609; 20100142447; 20100142868; 20100144866; 20100148940; 20100153175; 20100153215; 20100156676; 20100163573; 20100164711; 20100169009; 20100175575; 20100186648; 20100187829; 20100194573; 20100198514; 20100201516; 20100204615; 20100214216; 20100222802; 20100225266; 20100226775; 20100235285; 20100253624; 20100254312; 20100257251; 20100259050; 20100261526; 20100267492; 20100269069; 20100279639; 20100279776; 20100280751; 20100281874; 20100282918; 20100283273; 20100298958; 20100299102; 20100299738; 20100315516; 20100317420; 20100320333; 20100321449; 20100323730; 20110001696; 20110003653; 20110004329; 20110004363; 20110004513; 20110004851; 20110004975; 2010009218; 20110011856; 20110014933; 20110017114; 20110027087; 20110029922; 20110035491; 20110040535; 20110040879; 20110042476; 20110042901; 2010048374; 20110053440; 20110053716; 20110059672; 20110063114; 20110066398; 2010074109; 20110074850; 20110077758; 20110078461; 2010079453; 20110085530; 20110087431; 2010089238; 2010090338; 20110092319; 20110092337; 20110100823; 20110101692; 20110109097; 20110115624; 2010121578; 20110122261; 20110124442; 2010125063; 20110130114; 20110132983; 20110142025; 20110142108; 20110143631; 20110144574; 20110156896; 20110161076; 20110161254; 2010163955; 20110167110; 2010173988; 20110180654; 20110181422; 2010184602; 20110186177; 20110187136; 20110188597; 20110189440; 20110190056; 20110190694; 2010190971; 20110194591; 20110198857; 2010204187; 20110208444; 20110211080; 20110213664; 2010214044; 20110214082; 20110215586; 20110219634; 20110221219; 20110221656; 20110221657; 2010221658; 20110221659; 20110221668; 20110221669; 20110221670; 20110221671; 20110221672; 20110221793; 20110221896; 20110221897; 20110222745; 20110224498; 20110224499; 20110224500; 20110224506; 20110224507; 20110224508; 20110224556; 20110224557; 20110224564; 20110225536; 20110226191; 20110227812; 20110227813; 20110227820; 20110231757; 20110232555; 20110236207; 20110237151; 20110250819; 20110255513; 2010255577; 20110256944; 20110257701; 20110257945; 2010264230; 20110265564; 20110265565; 2010265566; 20110265568; 20110265958; 2010270569; 20110273061; 20110273378; 20110276123; 20110278355; 20110283438; 20110285527; 20110288480; 20110296006; 20110296517; 20110300001; 2010304497; 20110306304; 20110309624; 2010310209; 20110312279; 20120000408; 20120001463; 20120006282; 20120011853; 20120015734; 20120015766; 20120016492; 20120017232; 20120018567; 20120028680; 20120032876; 20120034954; 20120036016; 20120038185; 20120040758; 20120042835; 20120047443; 20120056799; 20120062445; 20120062744; 20120066883; 20120067294; 20120068927; 20120069799; 20120070294; 20120075168; 20120078/70; 20120078181; 20120078182; 20120078183; 20120078184; 20120078185; 20120078216; 20120078217; 20120078222; 20120091158; 20120091259; 20120091717; 20120092156; 20120092157; 20120095352; 20120095357; 20120097110; 20120101413; 20120103274; 20120103275; 20120106869; 20120109427; 20120113293; 20120115597; 20120116382; 20120116383; 20120120239; 20120132708; 20120133213; 20120136490; 20120137567; 20120140451; 20120142144; 20120142235; 20120143152; 20120143293; 20120150651; 20120151816; 20120158354; 20120160955; 20120161447; 20120165238; 20120166645; 20120166646; 20120168240; 20120168241; 20120172050; 20120173047; 20120173048; 20120173049; 20120173050; 20120176128; 20120176129; 20120176237; 20120179133; 20120183099; 20120194418; 20120194419;

20120194420; 20120194549; 20120194550; 20120194551; 20120194552; 20120194553; 20120197439; 20120197464; 20120198251; 20120200488; 20120200499; 20120200601; 20120203177; 20120206322; 20120206323; 20120206334; 20120206335; 20120206485; 20120207134; 20120209405; 20120209505; 20120211987; 20120212398; 20120212399; 20120212400; 20120212406; 20120212414; 20120212484; 20120212499; 20120217958; 20120218172; 20120218301; 20120221290; 20120221861; 20120222104; 20120223480; 20120224456; 20120233838; 20120235883; 20120235884; 20120235885; 20120235886; 20120235887; 20120235900; 20120236025; 20120236030; 20120236031; 20120239231; 20120242501; 20120242678; 20120242697; 20120242698; 20120245464; 20120248195; 20120248243; 20120249797; 20120250517; 20120253738; 20120254100; 20120256042; 20120258804; 20120259578; 20120262329; 20120264376; 20120265716; 20120265717; 20120268074; 20120270564; 20120287431; 20120291096; 20120293330; 20120297441; 20120299344; 20120301011; 20120302125; 20120308354; 20120308443; 20120309295; 20120309453; 20120310714; 20120316406; 20120316455; 20120323474; 20120330109; 20130000439; 20130001244; 20130001878; 20130002538; 20130006572; 20130006573; 20130007088; 20130008363; 20130009783; 20130010125; 20130010128; 20130010129; 20130010135; 20130010136; 20130010150; 20130010151; 20130010159; 20130010167; 20130013085; 20130013839; 20130013893; 2013001442; 20130015239; 20130016012; 20130016232; 20130016233; 20130016235; 20130016236; 20130016247; 20130016248; 20130016266; 20130018766; 2013002443; 20130021444; 2013002482; 20130024029; 20130024660; 20130029681; 20130030259; 20130032070; 20130033381; 20130033418; 20130035893; 20130038056; 20130042798; 20130043974; 20130043975; 20130043991; 20130043993; 20130045813; 20130046153; 20130046477; 20130055944; 20130063568; 20130065604; 20130069372; 20130069780; 20130072807; 20130073387; 20130073389; 20130078908; 20130078909; 20130079152; 20130080307; 20130083941; 20130085713; 20130092539; 20130095459; 20130096752; 20130096753; 20130096825; 20130102323; 20130108040; 20130109265; 20130110256; 20130119255; 20130124048; 20130124883; 20130127980; 20130130843; 20130139073; 20130141247; 20130144402; 20130146675; 20130147598; 20130151088; 20130154553; 20130157729; 20130158821; 20130164742; 20130165070; 20130166387; 20130169830; 20130170986; 20130170990; 20130172691; 20130173171; 20130178718; 20130184787; 20130186953; 20130194066; 20130197322; 20130201098; 20130201316; 20130204962; 2013021291; 20130212713; 2013024909; 20130217332; 20130217333; 20130218312; 20130218505; 20130220191; 20130221195; 20130222115; 20130225032; 20130226511; 20130229522; 20130231574; 20130233223; 20130238538; 20130250112; 20130250866; 20130250969; 20130251054; 20130252262; 20130253387; 20130260620; 20130265225; 20130267194; 20130273968; 20130274040; 20130276832; 20130278631; 20130281235; 20130281974; 20130282438; 20130285577; 20130285739; 20130289529; 20130289678; 20130291775; 20130294443; 20130297022; 20130297217; 20130297422; 20130298208; 20130302164; 20130303225; 20130303314; 2013030992; 20130314092; 20130314303; 20130317415; 20130320212; 20130324888; 20130325244; 20130325357; 20130328320; 20130329522; 20130333175; 20130334816; 20130334821; 20130338267; 20130344958; 20130345566; 20140001308; 20140012531; 20140013557; 20140018792; 20140020964; 20140025330; 20140028539; 20140031743; 20140032034; 20140039277; 20140041174; 20140046260; 20140046463; 20140048037; 20140048174; 20140052275; 20140054883; 20140054895; 20140055268; 20140055284; 20140055588; 20140055589; 20140059914; 20140059915; 20140061379; 20140063054; 20140063055; 20140063255; 2014006412; 20140066206; 20140070493; 20140071432; 20140074180; 20140074263; 20140076415; 20140077946; 20140081076; 20140081793; 20140083402; 2014008924; 20140099853; 20140102344; 20140104059; 20140106908; 20140107579; 20140109459; 20140111187; 20140111594; 20140111595; 20140112695; 2014013561; 20140113739; 20140113828; 20140119567; 20140120961; 20140121476; 20140123533; 20140123534; 20140126431; 20140128021; 20140128182; 20140130570; 20140130748; 20140131124; 20140133428; 20140133656; 20140136414; 20140137781; 20140137840; 20140140846; 20140141865; 20140142467; 20140142498; 20140142507; 20140142733; 20140143031; 20140143038; 20140143064; 20140144417; 20140147248; 20140152008; 20140152507; 20140153773; 20140156039; 20140156676; 20140158704; 20140159894; 20140159903; 20140162779; 20140163425; 20140163428; 20140163429; 20140163430; 20140163664; 20140163768; 20140164049; 20140166751; 20140168443; 20140171046; 20140171749; 20140172200; 20140172310; 20140173452; 20140180914; 20140183269; 20140184496; 20140187258; 20140187969; 20140194702; 20140195078; 20140196648; 20140197304; 20140197926; 20140202800; 20140203797; 20140204984; 20140207286; 20140208841; 20140212986; 2014024357; 20140215876; 20140220849; 20140221732; 20140222334; 20140228157; 20140231259; 20140232516; 20140235169; 20140235380; 20140236393; 20140240916; 20140243971; 20140245161; 20140246471; 20140246472; 20140246473; 20140246474; 20140246475; 20140246476; 20140246477; 20140246478; 20140246479; 20140246538; 20140249429; 20140249557; 20140256479; 20140257141; 20140257519; 20140259549; 20140262862; 20140263537; 20140263538; 20140263539; 20140263541; 20140263542; 20140263543; 20140263553; 20140263554; 20140263564; 20140263565; 20140263697; 20140263989; 20140264047; 20140266669; 20140266773; 20140266780; 20140266787; 20140267586; 20140268601; 20140269555; 20140269658; 20140273730; 20140276718; 20140277017; 20140277739; 20140279546; 20140288682; 20140288776; 20140288873; 20140292654; 20140297312; 20140299783; 20140301598; 20140301600; 20140301601; 20140303591; 20140303900; 20140306580; 20140306799; 20140306821; 20140306826; 20140309805; 20140309847; 20140309852; 20140309853; 20140309935; 20140310186; 20140312242; 20140313303; 20140316235; 20140319231; 20140323142; 20140324348; 20140328199; 20140328423; 20140335952; 20140336561; 20140337346; 20140337732; 20140337733; 20140339307; 20140340300; 20140342324; 20140345563; 20140349269; 20140350459; 20140353332; 20140354350; 20140358261; 20140360083; 20140361079; 20140364254; 20140376427; 20140376656; 20140376657; 20140378810; 20140379696; 20150001335; 20150002336; 20150003698; 20150003699; 20150005039; 20150005084; 20150005640; 20150005644; 20150005912; 20150006186; 20150008260; 20150009034; 20150016712; 20150019266; 20150020431; 20150025917; 20150027125; 20150031293; 20150031294; 20150031480; 20150036047; 20150040243; 20150040665; 20150040669; 20150042619; 20150046582; 20150049487; 20150051571; 20150053104; 20150053562; 20150054318; 20150054633; 20150057112; 20150057808; 20150058159; 20150058192; 20150059002; 20150061294; 20150061859; 20150062959; 20150067008; 20150068069; 20150070323; 2015007648; 20150075486; 20150078680; 20150078732; 20150078888; 20150079869; 20150079989; 20150081220; 20150081247; 20150081444; 20150082172; 20150083495; 20150087257; 20150088452; 20150088546; 20150088547;

20150088786; 20150090237; 20150091507; 20150091531; 20150091729; 20150094867; 20150095789; 20150097719; 20150099941; 20150100107; 20150102156; 20150103168; 20150105631; 20150108872; 20150109104; 20150109112; 20150109128; 20150111465; 20150111591; 20150112536; 20150112885; 20150113417; 20150115767; 20150116106; 20150116107; 20150116108; 2015016109; 20150120015; 20150120596; 20150120598; 20150125832; 20150126997; 20150127712; 20150128067; 20150130135; 20150133855; 20150134107; 20150134345; 20150134346; 20150137806; 20150137994; 20150140893; 2015014140; 20150144018; 20150145643; 20150146579; 20150148238; 20150150140; 20150150647; 20150151180; 20150151857; 20150154850; 20150156030; 20150156031; 20150157537; 20150158600; 20150160791; 20150165/14; 20150166072; 20150168105; 20150174320; 20150174577; 20150178794; 20150178998; 20150180372; 20150186700; 20150191245; 20150192416; 20150192682; 20150192976; 20150194165; 20150195145; 20150197248; 20150198419; 20150200562; 20150200738; 20150202770; 20150204305; 20150204559; 20150205298; 20150215323; 20150215740; 20150215858; 20150218913; 20150219425; 20150219457; 20150220109; 20150220701; 20150224378; 20150224845; 20150226522; 20150227794; 20150229019; 20150231329; 20150237424; 20150238963; 20150239534; 20150242120; 20150243068; 20150243085; 20150247702; 20150247709; 20150247917; 20150250393; 20150250682; 20150258373; 20150258413; 20150258679; 20150258682; 20150258683; 20150260512; 20150264626; 20150264627; 20150265458; 20150265459; 20150266180; 20150266181; 20150268355; 20150269825; 20150271004; 20150273296; 20150273351; 20150274272; 20150283031; 20150283397; 20150283398; 20150284058; 20150290453; 20150290454; 20150293580; 20150294141; 20150294363; 20150297951; 20150297964; 20150298317; 20150302207; 20150302393; 20150302777; 20150303563; 20150303768; 20150306455; 20150307191; 20150308782; 20150309316; 20150309562; 20150309563; 20150312764; 20150313663; 20150314086; 20150314449; 20150319562; 20150321000; 20150326049; 20150328516; 20150330738; 20150330778; 20150330943; 20150331420; 20150335288; 20150338525; 20150339570; 20150344109; 20150346726; 20150347910; 20150351690; 20150352450; 20150353206; 20150356261; 20150356285; 20150356289; 20150356610; 20150359467; 20150360049; 20150360050; 20150360777; 20150362287; 20150362288; 20150362919; 20150367212; 20150367243; 20150370257; 20150372819; 20150373036; 20160001158; 20160001882; 20160004253; 20160005320; 20160008686; 20160009364; 20160010950; 20160012707; 20160013818; 20160015004; 20160015006; 20160018083; 20160020506; 2016002/178; 20160023762; 20160025500; 20160025856; 20160027399; 20160033966; 20160033967; 20160039542; 20160048369; 20160048370; 20160052618; 20160058644; 20160059074; 20160059075; 20160061396; 20160067556; 20160082953; 20160089089; 20160090133; 20160091938; 20160096093; 20160096095; 20160099602; 20160099613; 20160099614; 20160099756; 20160099757; 20160101516; 20160101517; 20160101741; 20160107309; 20160119541; 20160120733; 20160120734; 20160121164; 20160121986; 20160123301; 20160135431; 20160136482; 20160136494; 20160136525; 20160136532; 20160137208; 20160147228; 20160147308; 20160150362; 20160153749; 20160154170; 20160155200; 20160163204; 20160167807; 20160171744; 20160179096; 20160184720; 20160187654; 20160191121; 20160199598; 20160202696; 20160205500; 20160209648; 2016027327; 20160221683; 20160224951; 20160227361; 20160233912; 20160234356; 20160236102; 20160243701; 20160246299; 20160246326; 20160250516; 20160252325; 20160257388; 20160259979; 20160262608; 20160267809; 20160269812; 20160269819; 20160271492; 20160273879; 20160278652; 20160280347; 20160282871; 20160282956; 20160287937; 20160290637; 20160291591; 20160295978; 20160296053; 20160300508; 20160302148; 20160310838; 20160313174; 20160327073; 20160332060; 20160332064; 20160332712; 20160332748; 20160338457; 20160338644; 20160342767; 20160346627; 20160349748; 20160353996; 20160354664; 20160355257; 20160357187; 20160357188; 20160357262; 20160358477; 20160368811; 20160371944; 20160375333; 20160375983; 20160377271; 20160377380; 20160379141; 20160381536; 20160381727; 20170010622; 20170014625; 20170018001; 20170023458; 20170039336; 20170039599; 20170043216; 20170043478; 20170045327; 20170046979; 20170050113; 20170050116; 20170055652; 20170060646; 20170061404; 20170064058; 20170071300; 20170076194; 20170078400; 20170080332; 20170080352; 20170080861; 20170082749; 20170086015; 20170103457; 20170132931; 20170165551; 20170206512; 20170220046; 20170246552; 20170304705; 20170305538; 20170331988; 20170356707; 20170358103; 20180036641; 20180043229; 20180049043; 20180068358; 20180082601; 20180093133; 20180093781; 20180147455; 20180161637; 20180161638; 20180161639; 20180182147; 20180189971; 20180200641; 20180200642; 20180271062; 20180274938; 20180275248; 20180280780; 20180326318; 20180338709; 20180349504; 20180369639; 20190054358; 2019006074; 20190060770; JP3083654; JP3150942: JP59-088173; JP2002-172277; JP2002-292153; JP4-022386; JP63-005784;

Achenbach, E., "Experiments on the Flow Past Spheres at Very High Reynolds Number," Journal of Fluid Mechanics, 54 (1972), 565-575;

Achenbach, E., "The effects of surface roughness and tunnel blockage on flow past spheres" Journal of Fluid Mechanics, Vol. 65, 113-25 (1974);

Adair, R. K., The Physics of Baseball. 3rd ed. (HarperCollins Publishers, New York, 2002);

Adler, A., The Evolution & Aerodynamics of the Aerobie Flying Ring, note available at www.aerobie.com;

Alaways, L. W., "Aerodynamics of the Curve-Ball: An Investigation of the Effects of Angular Velocity on Baseball Trajectories" (Ph.D. dissertation, University of California, Davis, 1998);

Alaways, L. W., S. P. Mish, M. Hubbard. "Identification of Release Conditions and Aerodynamic Forces in Pitched-Baseball Trajectories," Journal of Applied Biomechanics, Vol. 17, 63-76 (2001);

Asai, T. T. Akatsuka, and S. Haake "The Physics of Football," Physics World, 11-6 (1998), 25-27;

Bahill, A. T., D. G. Baldwin, and J. Venkateswaran, Predicting a baseball's path, American Scientist, 93 (3), 218-225, May-June 2005;

Barkla, H., and A. Auchterlonie, The Magnus or Robins effect on rotating spheres, Journal of Fluid Mechanics, 47, 437-447, 1971;

Bearman, P. W., and J. K. Harvey. "Golf ball aerodynamics," Aeronautical Q., V. 27, 112-22 (1976);

Carre, M. J. T. Asaum, T. Akatsuka, and S. J. Haake, The curve kick of a football II: Flight through the air, Sports Engineering 5, 193-200, 2002;

Cooke, A. J., "An Overview of Tennis Ball Aerodynamics," Sports Engineering, 3 (2) (2000), 123-129;

Craft, Tim, Nick Johnson, and Brian Launder. "Back to the future? A re-examination of the aerodynamics of Flettner-Thom rotors for maritime propulsion." *Flow, turbulence and combustion* 92, no. 1-2(2014): 413-4Z7;

Cricket Ball Aerodynamics: Myth Versus Science. In: The Engineering of Sport. Research, Development and Innovation [eds. A. J. Subic and S. J. Haake], pp. 153-167. Blackwell Science Ltd, Oxford;

Crowe, C. T., F. D. Elger, J. A. Roberson. Engineering Fluid Mechanics. 8th ed. (John Wiley & Sons, Hoboken, 2005) pp 440;

De Marco, A, S. Mancini, C. Pensa, G. Calise, and F. De Luca. "Flettner rotor concept for marine applications: A systematic study." *International Journal of Rotating Machinery* 2016 (2016):

Egerton, (The Honourable Wilbraham, M. A., M. P.), An Illustrated Handbook of Indian Arms, 1880;

Fregene, Kingsley, David Sharp, Cortney Bolden, Jennifer King, Craig Stoneking, and Steve Jameson. "Autonomous guidance and control of a biomimetic single-wing MAV." In *AUVSI Unmanned Systems Conference*, pp. 1-2. Arlington, VA: Assoc. for Unmanned Vehicle Systems Int., 2011;

Frohlich, C., "Aerodynamic drag crisis and its possible effect on the flight of baseballs," American Journal of Physics, 52, 325-34 (1984);

Frohlich, C., Aerodynamic effects on discus flight, Am. J. Phys. 49 (12), 1125-1132, 1981;

Haake, S. J., S. G. Chadwick, R. J. Dignall, S. Goodwill, and P. Rose, P. "Engineering Tennis Slowing the Game Down," Sports Engineering, 3 (2) (2000), 131-143;

Hably, Ahmad, Jonathan Dumon, and Garrett Smith. "Control of an airborne wind energy system with a Magnus effect." In *American Control Conference (ACC)* 2016, pp. 4978-4983. IEEE, 2016;

Hannah, Elizabeth Mackenzie. "Constraining frisbee tracking methods through Bayesian analysis of flying disc models." (2017).

Higuchi, H., Goto, Y., Hiramoto, R., & Meisel, I., Rotating flying disks and formation of trailing vortices, AMA 2000-4001, 18th AIAA Applied Aero. Conf., Denver, CO, August 2000;

Hubbard, M, and S. A. Hummel. "Simulation of Frisbee flight." In Fifth Conference on Mathematics and Computers in Sport. University of Technology, Sydney, pp. 124-134. 2000.

Hummel, S., and M. Hubbard, "Identification of Frisbee Aerodynamic Coefficients using Flight Data," The International Conference on the Engineering of Sport, (Kyoto, Japan, September 2002);

Hummel, S., Frisbee Flight Simulation and Throw Bionwchanics, M. Sc. thesis, UC Davis, 2003;

Imayama, Shintaro, "Experimental study of the rotating-disk boundary-layer flow". May 2012, Technical Reports from Royal Institute of Technology, KTH Mechanics, SE-100 44 Stockholm, Sweden.

John, Benzi, Xiao-Jun Gu, Robert W. Barber, and David R. Emerson. "High-speed rarefied flow past a rotating cylinder: the inverse magnus effect." *AIAA Journal* (2016): 1670-168;

Johnson, S., Frisbee-A Practitioner's Manual and Definitive Treatise, Workman Publishing, 1975;

Karabelas, S. J., and N. C. Markatos. "Aerodynamics of fixed and rotating spoked cycling wheels." *J. of Fluids Eng.* 134, no. 1 (2012); 011102;

Kensrud, Jeffrey R., Lloyd V. Smith, Ball Aerodynamics, 8th Conference of the International Sports Engineering Association (ISEA) In situ drag measurements of sports balls;

Khalid, Hanaa Khalid Moukhtar, Study of the aerodynamics of translating spinning discs in laminar and turbulent flow, Doctoral dissertation, University of Khartoum (2012);

Kim, Jooha, Haecheon Choi, Hyungmin Park, and Jung Yul Yoo. "Inverse Magnus effect on a rotating sphere: when and why." *Journal of Fluid Mechanics* 754 (2014);

Knight, R. D., Physics for Scientists and Engineers. Vol. 1 (Pearson Education, Boston, 2007);

Lord Rayleigh, On the irregular flight of the tennis ball, Mathematical Messenger 7,14-16, 1878;

Lorenz, Ralph D. "Flight Dynamics Measurements on an Instrumented Frisbee." (2003)

Lorenz, R. D., "Flight Dynamics Measurements on an Instrumented Frisbee," Measurement Science and Technology. (2005);

Lorenz, Ralph D. "Flight and attitude dynamics measurements of an instrumented Frisbee." Measurement Science and Technology 16, no. 3 (2005): 738

Lorenz, Ralph D. "The Instrumented Frisbee (Registered TradeMark) as a Prototype for Planetary Entry Probes." (2005).

Lorenz, R. D., Flight of the Frisbee, Engine, April 2005b;

Lorenz, R. D., Flying saucers, New Scientist, 40-41, 19 Jun. 2004;

Lorenz, Ralph D. Spinning flight: dynamics of Frisbees, boomerangs, samaras, and skipping stones. Springer Science & Business Media, 2007 Magnus, G., Ann. Phys. Chem. 88, 1-14, 1953;

Malafronte, V., The Complete Book of Frisbee: The History of the Sport and the First Official Price Guide, American Trends Publishing, 1998;

Marchaj C (1979) Aero-hydrodynamics Of Sailing. Dodd, Mead & Company, New York.

Martin-Alcantara, Antonio, Enrique Sanmiguel-Rojas, and Ramon Fernandez-Feria. "On the development of lift and drag in a rotating and translating cylinder" *Journal of fluids and structures* 54 (2015): 868-885;

Mehta R. D. & Palis J. M. (2001a) Sports Ball Aerodynamics: Effects of Velocity, Spin and Surface roughness. In: Materials and Science in Sports. [eds. F. H. Froes and S. J. Haake], pp. 185-197. The Minerals, Metals and Materials Society [TMS], Warrendale, USA;

Mehta R. D. & Pallis J. M. (2001b) The Aerodynamics of a Tennis Ball. Sports Engineering, 4, 177-189;

Mehta, R. D., "Aerodynamics of Sports Balls," Annual Review of Fluid Mechanics, 17 (1985), 151-189;

Mehta, R. D., "Cricket Ball Aerodynamics: Myth Versus Science," The Engineering of Sport. Res., Dev. and Innovation, ed. A. J. Subic and S. J. Haake (Oxford, UK: Blackwell Science, 2000), pp. 153-167;

Millikan, C. B., A. L. Klein. "The effect of turbulence. An investigation of maximum lift coefficient and turbulence in wind tunnels and in flight," Aircraft Engineering, Vol 5, 169-74, 1933;

Nakamura, Y., and N. Fukamachi. "Visualization of the flow past a Frisbee." Fluid Dynamics Research 7, no. 1 (1991): 31-35.

Nathan, A. M., "Analysis of PITCHf/x Pitched Baseball Trajectories," 2007. University of Illinois, 8 Jul. 2009 webusers.npl.illinois.edu/~a-nathan/pob;

Nathan, A. M., "The effect of spin on the flight of a baseball," Am. J. of Physics, 76 (2), 119-24 (2008);

Nowak, Chris J., Venkat Krovi, William J. Rae, Flight data recorder for an American football, Proceedings of the 5th International Conference on the Engineering of Sport, Davis, California, Sep. 13-16, 2004;

Pallis J., Banks D. & Okamoto K. (2000) 3D Computational Fluid Dynamics in Competitive Sail, Yacht and Windsurf Design. In: The Engineering of Sport. Research, Development and Innovation [eds. A. J. Subic and S. J. Haake], pp. 153167. Blackwell Science Ltd, Oxford;

Pallis, J. M. and R. D. Mehta. "Aerodynamics and hydrodynamics in sports." *The Engineering of Sport* 4 (2002): 31-39;

Panton, R. L., Incompressible Flow. 3rd ed. (John Wiley, Hoboken, 2005) pp 324-34;

Pearson, D. R. "The use of flettner rotors in efficient ship design." In *Proc. of the Influence of EEDI on Ship Design Conference.* 2014;

Plakhov, Alexander, Tatiana Tchemisova, and Paulo Gouveia. "Spinning rough disc moving in a rarefied medium." In *Proceedings of the Royal Society of London A: Mathematical, Physical and Engineering Sciences,* p. rapa20090518. The Royal Society, 2010;

Potts, J. R., and W. J. Crowther, "Visualisation of the Flow Over a Disc-wing." 9$^{th}$ Intl. Symp. on Flow Visualization, Edinburgh, UK (8/2000);

Potts, Jonathan Roger, and William J. Crowther. Disc-wing aerodynamics. University of Manchester, 2005.

Potts, J. R., and W. J. Crowther, The flow over a rotating disc-wing, RAeS Aerodynamics Research Conference, London, UK, 17-18 Apr. 2000; [3] J. R. Potts and W. J. Crowther, Frisbee Aerodynamics, 20th AIAA Applied Aerodynamics Conf., 24-26 Jun. 2002 St. Louis, Missouri;

Potts, J. R., Crowther, W. J., 2002. Frisbee Aerodynamics AIAA paper-3150. In Proceedings of the 20th AMA Applied Aerodynamics Conference, St. Louis, Missouri (2002);

Povarov, O. A. O. I. Nazarov, L. A. Ignat'evskaya, and A. I. Nikol'Ski. "Interaction of drops with boundary layer on rotating surface." *Journal of Engineering Physics and Thermophysics* 31, no. 6 (1976): 1453-1456;

Rae, W. J., and R. J. Streit, Wind tunnel measurements of the aerodynamic loads on an American football, Sports Eng., 5, 165-172, 2002;

Rae, W. J., Flight dynamics of an American football in a forward pass, Sports Eng., 6, 149-164, 2003;

Renshaw, A. A., C. D'Angelo I I I, and C. D. Mote Jr. "Aerodynamically excited vibration of a rotating disk." Journal of Sound and Vibration 177, no. 5 (1994): 577-590;

Rizzo, F. The Flettner rotor ship in the light of the Kutta-Joukowski theory and of experimental results, NACA TN 228, October 1925;

Robins, B., New Principles of Gunnery Containing the Determination of the Force of Gunpowder and Investigation of the Difference in the ResLiting Power of the Air to Swift and Slow Motion, 1742;

Rohde, A. A., Computational Study of Flow around a Rotating Disc in Flight, Aerospace Engineering Ph.D. dissertation, Florida Institute of Technology, Melbourne, Florida, December 2000;

Sadek, Shereef A., Saad A. Ragab, Aerodynamics of Rotating Discs, Tenth International Congress of Fluid Dynamics Dec. 16-19, 2010, Ain Soukhna, Red Sea, Egypt, ICFDIO-EG-3901;

Sawicki, G. S., M. Hubbard, and W. Stronge, "How to hit home runs: Optimum baseball bat swing parameters for maximum range trajectories," Am. J. Phys. 71, 1152-1162 (2003);

Scdary, A, "The Aerodynamics and Stability of Flying Discs", Oct. 30, 2007, large.stanford.edu/courses/2007/ph210/scodaryl/;

Schroeder, Erynn J., An Aerodynamic Simulation of Disc Flight, Honors Thesis, College of Saint Benedict and Saint John's U. (4-2015);

Schuurmans, M., Flight of the Frisbee, New Scientist, July 28, 127 (1727) (1990), 37-40;

Schroeder, Erynn J. "An Aerodynamic Simulation of Disc Flight." (2015).

Seifert. Jost. "A review of the Magnus effect in aeronautics." *Prog. in Aerospace Sciences* 55 (2012) 17-45;

Smits, A. J., and D. R. Smith, "A new aerodynamic model of a golf ball in flight," Science and Golf II, Proceedings of the 1994 World Scientific Congress on Golf, edited by A. J. Cochran and M. R. Farraly (ESFN Spon, London, 1994), pp. 340-347;

Stepanek, Antonin, The aerodynamics of tennis balls: The topspin lob, American Journal of Physics 56, 138-142, 1988;

Stilley, G. D., & Carstens, D. L., adaptation of Frisbee flight principle to delivery of special ordnance, AIAA 72-982, AIAA 2nd Atmospheric Flight Mechanics Conference, Palo Alto, California, USA, September 1972;

Swimming Faster: A Comprehensive Guide to the Science of Swimming, Mayfield Publishing Co; Marchaj C (1979);

Tait, P. G., Some points in the physics of golf, Nature 42, 420-423, 1890. Continued in 44, 497-498, 1891 and 48, 202-204, 1893;

Talay, T., Introduction to the aerodynamics of flight, NASA SP-367, 1975;

Tapan K. Sengupta and Srikanth B. Talla, Robins-Magnus effect: A continuing saga, Current Science Vol. 86, No. 7, 10 Apr. 2004;

Tavares, G., K. Shannon, and T. Melvin, "Golf ball spin decay model based on radar measurements," Science and Golf III, Proceedings of the 1998 World Scientific Congress on Golf, edited by M. R. Farraly and A. J. Cochran (Human Kinetics, Champaign IL, 1999), pp. 464-472;

Thomson, J. J. The dynamics of a golf ball, Nature 85, 251-257, 1910 Volume 3, Issue 2, 123, May 2000;

Tokaty, G. A., A History and Philosophy of Fluid Mechanics, Dover, 1994.

Wang, Chong-Tsun. "Free molecular flow over a rotating sphere." *AIAA. Journal* 10, no. 5 (1972): 713-714;

Watts R. G. & Sawyer E. (1975) Aerodynamics of a Knuckleball. American Journal of Physics, 43, 960-963;

Watts, R. G., and G. Moore, The drag force on an American football, Am. J. Phys, 71, 791-793, 2003;

Watts, R. G., and A. T. Bahill, Keep your eye on the ball: Curve balls, Knuckleballs, and Fallacies of Baseball (NY, NY: W. H. Freeman, 2000);

Watts, R. G., and R. Ferrer, "The Lateral Force on a Spinning Sphere: Aerodynamics of a Curveball," Am. J. of Physics, 55 (1987), 40-44;

Weidman, Patrick D., and Michael A. Sprague. "Steady and unsteady modelling of the float height of a rotating air hockey disk." *Journal of Fluid Mechanics* 778 (2015): 39-59.

Wei, Q., R. Lin, and Z. Liu, "Vortex-Induced Dynamic Loads on a Non-Spinning Volleyball," Fluid Dynamics Research, 3 (1988), 231-237, Whidden T. & Levitt M. (1990) The Art and Science of Sails. St. Martin's Press, New York.

Yasuda, K., Flight- and aerodynamic characteristics of a flying disk, Japanese Soc. Aero. Space Sci, Vol. 47, No. 547, pp. 16, 22, 1999;

Zdravkovich, M. M., A. J. Flaherty, M. G. Pahle and I. A. Skellhorne, Some aerodynamic aspects of coin-like cylinders, Journal of Fluid Mechanics, 1998, vol 360, pp 73-84;

Zdravkovich, M., A. J. Flaherty, M. G. Pahle, and I. A. Skelhorne, Some aerodynamic aspects of coin-like cylinders, J. Fluid Mechanics, 360, 73-84, 1998;

Zhan, Jie, Qingming Hou, Hongzhe Jin, Jihang Yan, Yanhe Zhu, and Ge Li. "Discussion on improving Magnus effect of cylinder based on CFD." In *Mechatronics and Automation (ICMA), 2013 IEEE International Conference on*, pp. 539-543. IEEE, 2013;

en.wikipedia.org/wiki/Flight_dynamics_(fixed-wing_aircraft); en.wikipedia.org/wiki/Guided_bomb;

news.bbc.co.uk/sportacademy/hi/sa/tennis/features/newsid_2997000/2997504.stm;

science.howstuffworks.com/smart-bomb.htm; www.freestyle.org;

www.aerobie.com; www.discgolfassoc.com/history.html www.discwing.com;

www.flyingproducts.com/; www.hq.nasa.gov/alsj/a14/a14.html; www.innovadiscs.com;

www.ultimatehandbook.com/Webpages/History/histdisc.html; Frisbee Dynamics: www.disc-wing.com www.l-pl.arizona.edut-rlorenz mae.engr.ucdavis.edut-biosport/frisbee/frisbee.html.

www.whatisultimate.com/; www.xzylo.com.

Each of which is expressly incorporated herein by reference in its entirety.

SUMMARY OF THE INVENTION

The present invention provides various options for steering a rotating projectile, preferably a disk or sphere. In a lofted axisymmetric gyroscopically stabilized object, flight control may be achieved by controlling lift, drag, or asymmetry of lift or drag. These may in turn be controlled by a Euclidian plane force, i.e., x y or z or a spherical coordinate torque about $\phi$, $\vartheta$, $\psi$. The torque may be provided by a mass or aerodynamic force. A number of basic principles are available to control the flight path, generally divided between those that require rotational synchronization, and those that do not. Further, some methods apply course corrections by forces in a Cartesian coordinate system and thus do not apply a torque on the gyroscopically-stabilized axis, while others apply forces in a spherical coordinate system (r; $\vartheta$, $\varphi$), and may tend to generate a reaction torque. Of course, some controls apply hybrid forces.

In general, a device according to the present invention is gyroscopically stabilized during the bulk of its flight, and has both appreciable aerodynamic forces along an axis normal to its translational axis, and drag. Exemplary objects are Frisbees, boomerangs, baseballs, golf balls, footballs, soccer balls, basketballs, tennis balls, and to a lesser extent, hockey pucks, among other objects.

In order to provide lateral control, one set of embodiments provide a control force or influence that is generally be effected in an angle-of-rotation responsive manner, i.e., a rotating frame of reference. According to some embodiments, an external shell or frame may be driven to a relative stationary position with respect to the environment, in order to provide aerodynamic control surfaces in fixed positions. These may be employed in traditional manner as with typical winged aircraft, as discussed above.

There are many different parameters that can influence the flightpath of a projectile or craft. The surface configuration/shape, spin, and speed all exert independent influences, and each represents an opportunity for control under various circumstances. The present technology seeks to dynamically change configuration/shape/surface/mass distribution/forces, in some cases surface rotation speed, and linear airspeed, which can have the effect of generating forces on the object during flight.

The projectile is preferably manually graspable and catchable in flight without permanent damage to control surfaces or significant risk of such damage. Therefore, the control system preferably does not employ extending fragile wings, rudders, ailerons, or shutters, though in particular cases, such types of controls might be suitable. Further, the projectile preferably has non-sharp exterior surfaces to avoid injury to a person interacting with the projectile. Because dirt and mud may be environmental issues, small functional gaps in which dirt or debris might become trapped are preferably avoided.

Further, the projectile preferably has a "passive" propulsion (i.e., translational forces and lift provided principally by energy and momentum which are established at launch) and control paradigm, in which the projectile is launched and rotational and translational inertia and aerodynamic forces are employed to alter the flight path without any active forward thrusters. The control system typically is an electronic system, which may include a microprocessor, battery, memory, sensors, wireless communications, and actuator drivers, for example. Typically, the battery has sufficient capacity to operate the projectile over a suitable period without requiring intervening recharge or battery replacement. The suitable period may be 15-250 minutes. The projectile is preferably water resistant, e.g., 5 feet underwater for 30 minutes; in some cases, the projectile may have affirmative under, in, or on-water capabilities, such as to effect a self-retrieval to shore. Because the object may be used in wet environments, exposed elements are preferably non-corroding and non-moisture sensitive. The projectile preferably meets aspects of MIL 810 G.

It is noted that one embodiment encompasses quadrotor or hexrotor drone technology, and therefore the preference for passive vs. active is not a mandatory feature or limitation. Because the object has limited weight and size, and due to operating cost concerns, the flight control is preferably not active (i.e., thrusters, propellers). However, in some embodiments, an active propulsion mechanism is provided.

A Frisbee may be provided having a controllable relationship between center of lift and center of mass (typically intersecting the gyroscopic axis), which then creates a torque and resultant reaction force about the gyroscopic axis. This, in turn, orients the lift vector, providing control over steering. However, in a typical gyroscopically stabilized projectile, a high moment of inertia is critical, and therefore stationary masses are disfavored, and rotational speeds are relatively high, limiting use of actuators to dynamically move mass. A further asset of embodiments, provide a vectored active thrust (e.g., by a fan or blower), which may be operated to provide active lift during flight as well.

Steering of the projectile may be effected by control over any one or more of aerodynamic lift (and distribution), aerodynamic drag (and distribution), mass distribution, moment of inertia, thrusters/fan(s), turbulence and laminar flow patterns, shunting of pressure differentials, rudders, ailerons, etc. Other control systems include sonic or ultrasonic transducers to alter the boundary layer on the surface, texture or surface configuration control. Steering or other control may be provided according to the "rules of the game", and may be preprogrammed or the system may receive commands while in flight. The automated control system may be autonomous externally defined, and for example, may autonomously steer around obstacles and toward a moving or stationary target.

In one set of embodiments, the invention comprises a toy or novelty. In this case, cost (at manufacturing scale) is a significant issue. This typically requires that the hardware feature set be limited to those minimally required to achieve the purpose, and that the design be simple, robust, safe, and inexpensive. While this aim does not exclude in some cases violations of simplicity, robustness, safety, or cost constraints, any such violations preferably substantially advance another aim. For example, a target bill of materials (BOM) for a Frisbee toy for use in a modified Ultimate Frisbee market is <$25 (2019), with a target market price to consumers of <$100. (Margin issues may be abated by employing a modular design, in which a low margin generic controller is user-supplied). In some embodiments, a bill of materials of <$5 is possible. Therefore, a design which includes proposed components which tend to prevent meeting these cost targets would be disfavored. An objective figure of purchasing power is the U.S. Patent System micro entity income level cutoff per 35 USC (23. Therefore, the "target cost" is less than about $1/2000$ of the micro entity annual income limit. At a $25 price point, the BOM permits a microcontroller, Wifi or similar communications, rechargeable lithium ion battery(ies) with inertial sensors and real time kinematics, and multiple available actuators. At a $5 price point, the BOM permits an analog control circuit or simple digital microcontroller, a single actuator (e.g., DC brush motor), simplified sensors, and an amplitude-modulated remote control.

In some embodiments, the steering system does not require rotational synchronization, while in others the steering provides actuators or other elements whose activation is synchronized to the absolute (e.g., compass heading) or relative (with respect to axis of translation) angle of rotation. Note that various embodiments may be combined, where they do not represent mutually exclusive options. Various options, combinations, subcombinations, and permutations fall within the scope of the invention, and the options enumerated herein are merely exemplary of limited function feasible designs. Each feature disclosure herein may be combined with any and all other features, to the extent consistent, without limitation, except where expressly prohibited. Each stated preference may be violated in particular embodiments, with the concomitant advantages and disadvantages resulting therefrom. Thus, the system may provide a plurality of different steering or guidance mechanisms, which operate according to different controls signals and/or principles.

The present invention provides, according to one set of embodiments, a system and method for automatic control of a rotating and translating aerodynamic projectile, having an automated control system that controls and/or selectively alters a flight path of the projectile. Because such craft are nominally radially symmetric about the axis of rotation, forces tend to be balanced over a period of rotation, and the rotation leads to a gyroscopically stabilized flight path. Further, the flight dynamics typically provide aerodynamic lift from forward translation that balances the weight, to provide extended level flight. The rotating frame and gyroscopic stabilization tend to complicate attempts at in-flight guidance.

Aerodynamic asymmetry with Phase controlled Motor

One set of embodiments synchronizes aerodynamic asymmetry with rotational angle, without significantly altering mass balance or dynamically controlling a significant mass. Therefore, large control forces and diminution of moment of inertia by counter-rotating masses is avoided. In a preferred embodiment, a rotating structure the projectile is a disk, rotating about a radial axis of symmetry. The disk has an upper aerodynamic surface which generates a lift from translational movement.

On the upper surface, one or more features are exposed, which rotate about a radial axis, i.e., normal to the general axis of rotation of the disk. The feature rotation is synchronized with the rotation about the general axis, for example by a servo speed controlled electrical motor. The feature is asymmetric, and has one side which interacts with translational flow of air to generate lift, while the other side produces less lift. Because of the synchronized rotation and asymmetric lift, the feature generates a pseudostatic torque about the general axis of rotation, and therefore permits steering. The feature may be provided on a shaft that extends across the disk, and therefore provides two exposed surfaces, which are in antiphase (180° offset). Of course, a greater number of features is possible, such as providing a second shaft with additional features, permitting multiple interactions per rotation.

The features may be, for example, a cylinder or cone with a smooth side (minimal interaction with air flow) or upward deflecting aerodynamic features, for example and a rough side or downward deflecting aerodynamic features. The features need not be axisymmetric about their radial axis of rotation, and may have a flattened side and an oblate side. In any case, the aerodynamic effects of the features are distinctly different as a function of rotational angle about the radially oriented axis. The lower side of the features may be shrouded, to avoid unnecessary interaction with air below the disk, unless additive with respect to the desired aerodynamic effect.

The motor may be controlled with a phase locked loop circuit (analog or digital) based on an absolute directional signal (e.g., magnetometer, fluxgate compass, which provides a reliable rotational speed signal), or a relative directional signal (e.g. a hot wire or other anemometer, or pitot tube arrangement, which provides translational axis, but may be noisy). The motor speed may be measured by back EMF, commutation signals, a Hall effect, optical sensor, or other rotation signal, or other means. For example, a light emitting diode may be reverse-biased, and used as a photosensor, responsive to a light signal modulated in dependence on rotational angle of the motor by a mirror, patterned surface, or retroreflector. Since the required input is the timing of rotation, linearity or trigger latency is less importance that low jitter. Further, if jitter is stochastic, it may be filtered.

A microphone may also be used as an air flow direction sensor. For example, a time-of-flight detector may be employed. An ultrasonic emitter may be used to excite the sound wave. See, www.engineeringtoolbox.com/ultrasonic-doppler-flow-meter-d_495.html; www.navysbir.com/10_1/266.htm. Alternately, a diaphragm microphone may be employed as a pressure sensor, which would provide an oscillating signal if exposed to the air flow surrounding the projectile as it rotates. Further, the air flow may pass through a resonant chamber, such as a whistle, and thereby produce an oscillation selectively dependent on angle of rotation.

Therefore, the translational axis of the disk is determined with respect to external air flow, and the phase of the motor controlled to maintain an external pseudostatic lateral asymmetry of lift, drag, or other aerodynamic effect. As noted below, if the motor instead drives eccentric masses, the upper shell of the disk will wobble to minimize change in inertia, and the pseudostatic inclination of the disk may also vector the lift to provide steering.

It is noted that, in case of wind, the external air flow may not correspond to translational vector. In order to provide absolute translational control, an inertial guidance system or geographic positioning system (triangulation or trilaterization) may be provided. However, these increase cost, computational complexity, and impose technological constraints in the inertial measurement unit (IMU) in terms of tracking rate, since the platform is rotating).

Another way of determining direction of translation is by ground tracking. This can be performed by an optical flow analysis (sequential images) or radar, for example. See, en.wikipedia.org/wiki/Optical_flow; ardupilot.org/copter/docs/common-cheerson-cxof.html; ardupilot.org/copter/docs/common-px4flow-overview.html; ardupilot.org/copter/docs/common-mouse-based-optical-flow-sensor-adns3080.html; www.openimpulse.com/blog/wp-content/uploads/wpsc/downloadables/ADNS-3080.pdfwww.tindie.com/products/onehorse/pmw3901-optical-flow-sensor/; Nejah, Tarek M., "Application of optical flow sensors for dead reckoning, heading reference, obstacle detection, and obstacle avoidance", Dissertation, Monterey, California: Naval Postgraduate School, 9/2015; www.thedronefiles.net/2018/11/02/10-best-toy-drones-with-optical-flow-positioning/; iopscience.iop.org/article/10.1088/1748-3190/11/6/066007, Mafrica, Stefano, et al., "Minimalistic optic flow sensors applied to indoor and outdoor visual guidance and odometry on a car-like robot", Bioinspir. Biomim. 11 (2016) 066007; Dahmen, Hansjuergen & Mallot, Hanspeter. (2014). Odometry for Ground Moving Agents by Optic Flow Recorded with Optical Mouse Chips. Sensors (Basel, Switzerland). 14. 21045-21064. 10.3390/s14121045, I. Fantoni, G. Sanahuja, "Optic Flow-Based Control and Navigation of Mini Aerial Vehicles", J. AerospaceLab Issue 8, 12/2014 AL08-03, ADNS-3060, ADNS-3080, ADNS-6000, ADNS-6010. Note that, due to rotation, a fast frame grab rate is required, as well as a real-time kinematic analysis to compensate for spin. These systems may operate by analyzing images below the disk, or by projecting a light pattern (structured illumination), and detecting movement of the background.

In any case, a reference time is established for an angle of rotation of the disk, and the motor is driven so that the motor is phase-locked to the angle of rotation of the disk. These will, of course, have the same rotational speed. Directional control is then asserted by adjusting a phase of the motor timing with respect to the rotation of the disk. When no steering is desired, the motor speed is desynchronized with the disk rotation, and thus produces no pseudostatic torque in the disk. Advantageously, the motor is not stopped, since this will increase the resynchronization time if steering control is again desired. If the motor is run at high speed, a Magnus-effect type lift may be generated.

For simplicity, the motor may be run to arrange the aerodynamic features to provide lift at a position with respect to the front of the disk, determined by a pressure or flow vector. A so-called hot wire anemometer may be provided in the form of a directional aperture on the disk, with an electrically heated wire or low thermal inertia device, which has an electrical property, e.g., impedance, which varies with temperature. Such a device will have a variation in impedance ultimately as a function of angle of rotation if the disk is translating, and a half-bridge output may be AC coupled to a comparator, to generate a rotational phase signal representing the direction of translation. Note that the variation in resistance may not correspond exactly to the angle of rotation, but the rate will be generally accurate, and the offset for any given translational speed is likely to be fixed. The comparator output may be used as one input to a phase locked loop motor speed control, while a rotation sensor (e.g., a commutator, Hall effect sensor, or optical sensor) may provide the motor speed signal.

An inertial guidance system may be provided, which can measure the pitch and roll of the disk, as well as acceleration (deceleration), loss of height, deflections by wind, rotation, etc. Due to the rotation, a 3-axis accelerometer mounted slightly off-axis with respect to the general axis of rotation of the disk may be used. In this case, the z-axis will produce a sinusoidal signal due to inclination of the axis of rotation with respect to the gravitational vector, and can measure loss of height, while x and y measure deceleration of the disk (and thus drag along the translational axis), a centrifugal force due to rotation, and various perturbations. The general strategy, absent steering input, is to maintain an optimal angle of attack, while compensating for perturbations to achieve a straight flight. This requires determining the axis of translation and speed of rotation. When a directional change is desired, the motor speed is increased or reduced to achieve a phase relationship so that the lift is pseudostatically applied to the right or left of disk with respect to the translational axis. Of course, more complex inertial and guidance calculations may be performed, but these may not be required in all cases.

The guidance strategy may be controlled internally, or received remotely, such as by a radio frequency signal. For example, a WiFi or Class 1 Bluetooth signal (e.g., 100 mW) generally provides 100 m range, sufficient for most game use. Other types of RF, infrared, optical, or acoustic remote control signals may be employed. Further, depending on the controller, a voice (microphone) or gesture (camera) control may be implemented.

Accordingly, in one embodiment, a Frisbee is outfitted with a motor, to drive a shaft which is parallel to the plane of rotation. The shaft extends to near the peripheral edge on both sides, and has a three dimensional cam on either end. The cams are in antiphase, with one to three lobes, such that when one cam surface extends above the top surface of the disk, the other is non-protruding. More generally, the cam surface provides a variation in lift with respect to angle of rotation. As discussed above, the cams may provide a direct aerodynamic effect, or a z-axis mass offset to generate a wobble in the shell. Optionally, there is a neutral state of rotation in which lift is balanced. The motor is then servo driven to control the shaft to control the lift vector at the rotational rate of the disk to provide a pseudostatic offset from normal, i.e., the gravitational axis. The control may receive sensor signals from a two or three axis accelerometer, and optionally a one-to three axis magnetometer. Optionally, a set of MEMS or fiber optic gyroscopes, barometer, and other sensors may be employed. In a minimal control system, the controller estimates the rotational speed of the disk by magnetic fluctuations due to rotation, gravitational fluctuations due to rotation, or other rotational sensor. In one embodiment, the back-EMF of the motor is measured to determine speed, which in conjunction with drive parameters, may be used to determine aerodynamic orientation. However, inertial guidance sensors are also useful in achieving goal-oriented guidance, and therefore are preferably provided and used.

Edge Effect Steering

One set of implementations of the steerable projectile has an axis of rotation during translational flight, wherein the axis or rotation has or assumes a component normal to the translational vector. The translational movement in a compressible medium leads to an asymmetry between the leading and trailing edges, which induces the Magnus effect. A source of compressed gas, e.g. an accumulator, gas cylinder, compressor, combustor, chemical reaction, or the like, is exhausted through a set of peripheral vents or venting region, to alter the peripheral drag of the projectile. Alternately, a source of vacuum, e.g., a centrifugal blower or fan, intakes through a set of peripheral intakes or intake region. Both options may be used in the same device. When the flow of gas at the periphery is outward from the disk, the rotational drag will be reduced, and the Magnus effect minimized. When the flow is inward the rotational drag will be increased, and the Magnus effect (or reverse Magnus effect) maximized. The periphery may be designed to optimize the drag under the higher drag state, while reducing the drag in the low drag state. For example, a non-woven felt such as is provided on tennis balls may be provided in a peripheral ring on a disk projectile. Under the felt is a plenum, which may be pressurized or depressurized, to change a net air flow direction of air through the felt. In order to steer the projectile, the pressure in the plenum is altered, which alters the drag at the periphery of the disk, and therefore the Magnus effect. This provides a unidirectional steering effect, dependent on the direction of spin. The beginning and end of the steering may be controlled based on a timer, e.g., from moment of launch, radio control infrared control, voice or sound activation, proximity to an object or ground, or other control system. The projectile may contain a bladder with a compressed gas (or a vacuum chamber with a stiff wall) that is inflated or deflated before launch, and at the appropriate time, releases or intakes gas, based on a relief valve. For example, the projectile is a disk with an aerodynamic upper surface. The gas chamber is provided underneath, and activated by compression between the upper surface of the disk and the lower surface of the chamber. Alternately, a battery operated motor is provided, which typically intakes from the center of the upper surface (to provide lift), and exhausts through a set of radial channels in a centrifugal fan design. The peripheral drag may also be provided by a set of retractable and extendable peripheral features, which change the drag properties of the edge.

In another embodiment, a low-mass peripheral ring is driven rotationally to steer the projectile by the Magnus effect. This, however, creates a critical bearing, which either is suspended at the center of the structure, with a large spider suspension, or requires a large diameter roller or air bearing. Another option is to induce a synthetic Magnus effect with vectored gas flow. In this case, a centrifugal blow is provided to generate a static pressure in an accumulator. The gas is directed to the periphery of the disk by a set of tubes, plenums, chambers, etc. About the periphery of the disk, the pressurized gas is exhausted. A flow director directs the gas clockwise or counterclockwise (left or right) and therefore is controlled by a binary mechanism, which is, for example, a solenoid-operated displaceable ring that controls vane direction. In this case, the fan may be constant speed, and unidirectional.

If the platform is more massive than the remaining portion, then the remaining portion can reverse spin rotation direction; this may be useful for controlling Magnus effect.

Vectored Lift

Another aspect of the invention provides an inertial mass which provides a gyroscopic stabilization, and a separate aerodynamic shell, which provides lift. A set of actuators, i.e., one or more, preferably four, tilt a plane of the shell with respect to the inertial mass. For example, the actuators are solenoids about a radius of about 25 cm from a center of the inertial mass, which are effective to selectively displace the shell by 1.5 mm. The shell has a diameter of about 25-30 cm. This means that, at the edge, the relative displacement is ~7.5 mm. Because the desired angle is maintained with respect to an external frame of reference, the actuation of the actuators does not incur a corresponding inertial change; that is, in a constant steering state, the shell maintains a constant angle with respect to the external frame, and therefore the actuation rate, e.g., 3-30 Hz, is feasible. Typically, the shell is centrally mounted on a universal joint, with a ferrite or rare earth magnet located on the shell opposite the coils, which rotate together. The universal joint is spring loaded from the inertial mass, permitting the solenoids to pull in the shell, to provide a solid structure for launch. After launch, the solenoids release, and the joint extends above the inertial mass surface, e.g., ~1 mm. The solenoids then proceed to cycle synchronized with the rotation of the inertial mass (and the shell), so that the shell maintains a constant offset with respect to the mass.

Alternately, the shell is supported on a retractable cam (or selectively extended or unbalanced cam), which is mounted to a motor. The motor then matches the spin speed of the projectile, with the cam maintaining a constant offset angle. Friction between the cam and shell may be minimized by using a roller bearing of other low friction surface. The non-steering state may be engaged or disengaged by a latching solenoid, which, for example, extends a plunger to relieve the pressure of the cam against the shell, to stop angular motion, and cause the shell to align with the spin axis of the inertial mass. In this embodiment, the motor counters the rotational speed of the projectile, with minimum rotating mass with respect to the inertial mass, and is required to exert a force corresponding to the frictional force of the mechanism and certain aerodynamic forces.

A hub motor driven in speed servo mode with feedback from a rotational sensor, e.g., a magnetometer, drives a cam plate to remain pseudostationary. The cam plate angularly displaces a shell, which can incline with respect to a rotating inertial mass, to maintain a pseudo-static lift vector inclined with respect to the inertial mass. This avoids large accelerations (except at startup), and minimizes non-rotating mass. According to this design, the hub driven by the motor is retracted, and the shell pressed against the inertial mass during launch, and thereafter separates and inclines per the cam angle of the cam plate. In this design, the rotating mass is the rotor of the motor, the shaft and cam surface. The drag on the motor is friction of the bearings and between the cam and shell. The shell may be reasonably light, such as a molded PET film. The cam plate can have roller bearings to reduce wear and drag. The lead or lag of the motor with respect to the angular sensor controls the direction of lift vector with respect to gyroscopic spin axis. A rotating inertial guidance system may be used, or put the inertial sensor may be disposed on the pseudostationary platform controlled by the motor. Communication between the controller and sensor may be through slip rings, Bluetooth, backscatter RF communications, or the like.

One aspect of a preferred design comprises a rotating aerodynamic disk projectile, whose inclination is controllable through reaction forces of a set of reaction wheels. An exemplary design provides one or more motors, which control a speed of rotation of an inertial mass. In the simplest case, a motor has an axis of rotation normal to the rotational axis of the disk. In order to steer the disk, as the disk rotates, the speed of the motor is increased to create an unbalanced angularly synchronized reaction force, which alters the axis of rotation of the disk. After the motor passes the range of rotation that applies the correct force, the motor is allowed to slow, or actively braked, or driven in reverse, to provide the opposite force as the disk traverses the next region. Two motors can run in opposite directions, permitting unidirectional motors to be used and create a balanced reaction force, such as 4-pole brushless DC motor. These may advantageously be aligned along the same axis, which in effect creates a reaction wheel across the center axis of the disk. Three motors may be arranged at 120° intervals, and driven according to a 3-phase paradigm, while four motors may be set up at 90° intervals.

The motors are controlled according to angle of rotation, for example based on a compass or magnetometer. Because the disk rotates, a single axis magnetometer may be used. In order to control disk inclination, a 2-axis or more gyroscope may be employed, which permits detection of change in inclination of the disk due to the reaction force motors. A third gyroscope axis aligns with the axis of rotation of the disk, and therefore permits determination of the direction of rotation, and slowing of rotation by drag. Importantly, it also provides a vertical reference. A set of accelerometers (e.g., 3-axis) may be used to detect launch, and accelerations in x, y, and z axes, which may be integrated to estimate speed and distance. The rotation of the disk may exceed the range of the gyroscope on the axis of rotation. The disk rotation may also cause offsets for accelerometer readings, especially if the sensor package is not perfectly aligned with the rotational axis.

The guidance system may employ a microcontroller that receives the guidance sensor information, and controls the timing of the motor(s). The guidance system employs feedback, since the perturbations caused by the motor(s) must be offset to return the disk to a near vertical axis (e.g., −10°) of rotation for stable flight. The guidance system can also be used to right the disk if it is improperly launched or perturbed during flight. Further, the guidance system may execute in-flight alterations, such as based on a remote-control input, a predetermined time or condition, etc.

The reaction wheel(s) provide(s) inclination control over $\theta$ and $\phi$. To provide control over a third axis, a fan may be provided aligned with the center axis of the disk, which provide selectively-controlled active lift. The fan may be unidirectional, with an axial or centrifugal design. The fan may be a typical 3-7.2V computer-type fan design (with limited shroud to reduce weight) or drone propulsion design (motor and propeller). The reaction motors may be, e.g., 8 mm×20 mm, 10 mm×30 mm, 12 mm×30 mm (N60), 10 mm×15 mm (M20), etc., which operate over a range of 3-7.2V (2-4 AA cells, 1-2 LiPo cells).

The reaction wheel produces an instantaneous force essentially as if a mass is displaced normal to the axis of rotation. Thus, an alternate to the cyclic oscillation of the wheel is a direct displacement of a mass, which offsets the center of gravity of the remainder. However, the rotation of the motor provides a resonant structure (i.e., the rotation about the axis of motor rotation), and permits use of a smaller mass to achieve a similar force.

Counter-Rotating Platform

An alternate design provides actively-driven counter-rotating platform within the projectile, which does not rotate with respect to the inertial frame, or rotates slower or opposite to another portion of the projectile. If the projectile is launched with net angular momentum, an internal mechanism to control or servo the platform will generally not alter the net angular momentum of the projectile, since angular momentum is preserved. On the other hand, the platform may spin prior to launch, and transfer the angular momentum to another element as it slows, therefore provide increased net angular momentum to that element after launch. Further, if there is a rotational drag, on the slow element, the net angular momentum may increase over time. Note that the guidance system is not strictly required before launch, and therefore its inoperability under the prelaunch condition is of little consequence. As one portion of the system is actively driven with respect to another, the net angular momentum will be conserved.

The system may have two or three or more rotating components. These may be independent, driven with respect to each other, or interconnected in a gear train or planetary gear set arrangement, or electromagnetic motor arrangement. Typically, the peripheral edge of the shell is designed to assume a large portion of the angular momentum of launch. For example, >50% of the mass of the projectile, e.g., disk, is present in the peripheral 25% of the projectile with respect to its axis of rotation. According to a preferred design, the battery or batteries are located at or near the peripheral rim of a disk, though these may also be in other locations. Further, a motor or motors rotate with the rim, and if feasible, are located peripherally. (However, a preferred design has a motor build into a hub, at the center of a disk).

A motor may be provided which a propeller or impeller, that causes air flow from the upper portion of the disk to underneath, and therefore actively creates lift, independent of translational movement. The thrust may be vectored, and therefore the angle of the thrust vector induce a steering force. The speed of the motor may be used to control the angle of the thrust with respect to the axis of rotation. In this case, absent additional elements, neither the shell nor the rotor of the motor is stationary with respect to the inertial frame, and a typical low-cost inertial guidance system may have difficulty tracking the projectile.

A sensor for guidance may be a magnetometer (compass) which can typically track over the range of speeds. The magnetometer provides external linear direction reference, and thus can control absolute geographic direction. The magnetometer cannot directly determine the direction of movement of the projectile.

The vector of translation may be measured with a wind vane, ultrasonic flow meter, pressure sensor located at periphery of disk, Pitot tube arrangement, etc. For example, in an ultrasonic flow meter, the direction of flow of air may be determined based on the time required for sound to transit from an emitter to a microphone spaced apart on the outside of the shell. In a rotating frame, the phase of the ultrasonic emission will vary cyclically with the angle of rotation with respect to the gaseous medium, with the phase advanced when the microphone is in front of the speaker, and retarded when it is behind. The rotation of the disk will also influence the phase delay, but will not vary much over the cyclic rotation, and thus is normalized. Therefore, both absolute geographic, and relative direction of movement may be sensed, permitting steering based on these two parameters. This is useful when the flightpath of the projectile is no longer limited by the initial momentum of the disk, and therefore the disk can assume an arbitrary flightpath.

In the case of a sphere, the control of the sub-platform may have to be extended to two dimensions, but this may be straightforward. It is noted that a poled magnetic structure (e.g., with two or more poles, typically balanced, identical, and evenly distributed) and within a sphere may be controlled along the two orthogonal axes ($\theta$, $\phi$) by a 3D brushless motor arrangement, for example with multiple coils in a symmetric spherical/geodesic arrangement, e.g., a dodecahedral arrangement.

It is noted that reaction wheels may also be provided on a spherical projectile, and controlled in a manner of space satellites. In the case of a spherical projectile, the aerodynamic control arises from aerodynamic features, and therefore the control over the sphere is intended to position the aerodynamic features with respect to the external air flow vector. It is further noted that reaction wheels and subplatforms may be used together, independently, or in combination with other aspects of the invention.

The platform may perform various functions. For example, the rotating portion of the system may operate in a dynamic state beyond the tracking capability of an inertial guidance system, but allow the driven platform remain within the performance envelope. This stationary structure then permits control with respect to a non-rotating frame of reference, and therefore typical static aerodynamic control features may be employed.

Ine alternate is to have a craft which includes a low-inertia bidirectionally controlled centrifugal fan that provides lift. The fan rotor is gimballed to rotate with respect to a shroud, which is itself rotatably mounted to the shell. A tail fin extends along the top of the disk from the shroud, providing asymmetric drag so that the tail fin remains toward the rear along the axis of translation (wind vector). If an aerodynamic normalizing device is not employed, the shroud may have an asymmetric duct to produce an off-rotational axis force, which is then steered by servoing the axis, by changing the speed and direction of the fan motor. The fan is controlled to produce a net angular momentum that provides a controlled rotational force on the shroud to maintain the tail fin or thrust vector at a desired angle with respect to ground. The shroud has a larger moment of inertia than the fan rotor, and therefore the reaction force on the shroud will be low, tending to permit high fan rotational speed and therefore lift during steering, and also permit lift during unsteered flight. For example, the motor stator and battery are provided linked to the shroud.

The shroud may be linked to the shell during launch, to provide a high moment of inertia, and released thereafter, to permit independent rotation. For example, a magnetic force may be controlled to lock them together. A planet gear arrangement may be provided to transfer angular momentum from the shroud to shell after disengagement, so that the drag force on the tail fin slows the shroud and spins the shell. After slowing of the shroud, the planet gears may be disengaged. For example, the planet gears may be withdrawn from a gap between the shroud and shell, thus freeing these for independent motion. Advantageously, the planet gears are conical to facilitate engagement and disengagement. However, this complexity is not required, and the shroud may be independent of the shell normally, thus permitting rapid settling after launch. In this embodiment, the reaction force of the fan acts against the tail fin (if provided), and provides a steering force with respect to the stream of air over the disk. Therefore, the rotor power is typically constrained to be below the restoring force on the tail fin due to forward movement, in order to avoid unconstrained tailfin rotation. In this embodiment, inertial guidance is not imperative. For example, a remote control may provide left-right control, or a preprogrammed timer may control directional change. The system may detect landing when the shell and shroud have the same speed, and thus shut down the motor.

In general, gears, and especially planetary gear type arrangements, may be used, but due to friction and damping, are preferably avoided, especially if alternates that do not require complex motion transfer between elements is not required.

The platform may have an asymmetric (or selectively controllable to be asymmetric) mass distribution or lift, thus altering the relationship of center of mass and center of lift. Other rationales are possible as well.

Typically, it is desired to have the mass of the disk located peripherally, and to be rotating, in order to maximize angular momentum and gyroscopic stabilization. However, various compromises may be effected. Thus, according to one embodiment, a shell is provided which is rotationally mounted on a platform, and actively driven for rotation by a motor, e.g., a 3-phase brushless DC motor, similar in design to a Mitsumi M29-BL motor, which may be driven by a MTD6508ADJ controller from a lithium ion battery, under control of an ESP32 microcontroller, and employing an ICM-20601 or ICM-20649 6-axis or ICM-20948 or BN0055 or BMX055 or KMX62G or LSM9DS1 or MC7030 or MAX21100 9-axis sensor, or as part of a solution, an ITG-3701, LPR4150AL or LPY4150AL 3-axis gyroscope. In a first embodiment, the coils, driver and battery are within the shell, and the sensor located in a counter-rotating platform. The sensor may communicate with the controller by RFID type backscatter communications or inductive coupling, or optical coupling, with supplied inductive or optical power, respectively. Further, the power may also be derived from a coil which interacts with a magnetic field (from a magnet that moves with respect to the platform, or from the motor coils). In operation, the motor is driven in a servo-controlled scheme, which may conveniently hold the platform stationary with respect to the earth's magnetic field. Adjustments to the magnetic angle may then be used for steering.

Active Lift

According to one embodiment, the motor runs a fan or centrifugal blower that provides lift. A centrifugal blower may be bidirectional, and therefore may drive the steering mechanism as well. For example, the rotating shell with respect to the stationary platform provides a centrifugal force on air in a set of channels that draw sir from the top of the shell, and release it under the shell. Advantageously, the air flow may be drawn eccentrically, and the position of the inlet served to a desired orientation. The stationary platform can then have a traditional non-rotating aerodynamic type control system, e.g., ailerons, flaps, rudders, etc. In addition, a mass may be shifted, e.g., with a servo-operated ball screw. Further, the rotating platform may drive an aerodynamic ring or plate, to induce a Magnus effect steering. For example, a reversing clutch may be used to control direction of rotation.

Chiral Flow Control

According to one embodiment of the technology, a selectively controllable chiral flow pattern (i.e., a flow pattern which cannot be mapped to its mirror image by rotations and translations alone) is established, such that for a given spin of the disk, the chiral flow pattern provides a different curl vector for air flow in each state. In particular, for a rotating and translating disk, an aerodynamic force is applied which causes a left or right movement of the disk (with respect to the axis of translation) or opposite torques about the axis of rotation. Such a curl vector may be provided by providing an asymmetric flow passage which has a higher impedance to flow in one direction or the other. Because the rotating and translating disk has a high pressure at (or near) the leading edge and a low pressure at (or near) the trailing edge of the disk, there is an inherent chirality due to the rotating, corresponding to the Magnus (or reverse Magnus) effect). The goal of the system is to therefore permit a range of control that includes both positive and negative steering, and thus provide full control over the degree of freedom.

For example, a flow path between ports on the top or edge of the disk which has a biased flow direction, e.g., clockwise (CW) or counterclockwise (CCW) will tend to cause steering, depending on the chiral bias direction. This may be a flow channel between points on the periphery of the disk. Air enters a respective port, which are spaced, e.g. 90 (¼), 120 (⅓), or 144 (⅖) degrees apart, such that the flow pattern is significantly asymmetric and this produces a lateral force with respect to the axis of translation. As the disk rotates, successive ports are presented at the front of the disk, however, the chirality is radially symmetric, and therefore no change in configuration is required to respond to the rotation. An actuator is present which biases the air in the channel CW or CCW, with the air released at the lateral aspect of the disk behind the point of entry. For a translating (forward flying) disk, the pressure at the front edge is highest, and at the rear, somewhat displaced from dead center due to rotational drag, lowest. The preferential flow of air from the front to the right or left side of the disk creates a lateral force. The Bournoulli effect may dominate, and release of air at the side will lead to a lower air pressure, and thus a force toward the side where the air is vented. However, in practice, the effects are more complex, and in some cases a contradictory effect may dominate.

Because the flow path(s) within the disk are directional, a patent flow path will also be present from the rear of the disk toward the front; however, because the pressure at the rear is below the pressure at the front, reverse flows will be dominated by mass flows from front to right-rear or left-rear. Likewise, a patent flow path may shunt the right and left side of the disk. However, the differences in pressure will be lower than the front-rear difference, and therefore the shunt path flow is expected to be small. The directional flow actuator may take the form of a checkvalve, or flexible vane within a channel, that when inclined in one direction, flow in that direction has a low impedance, but when seeking to flow against the preferred direction, the flexible vane tends to obstruct the channel. The rotation of the disk will also influence the steering effect. When the air flow direction is aligned with the rotational direction, the drag within the channel will assist the air flow. When bucking the disk rotational direction, the drag within the channel will increase the back pressure at the entrance port, and slow the flow through the channel. Likewise, drag on the outside of the disk will cause external pressure asymmetries. This can be counteracted to some extent by providing an asymmetric actuator, which corrects for the asymmetry. Another correction may employ a set of radial flow paths in the disk, that accelerate air outward using centrifugal force, to induce outward flow at all or a portion of the exit ports. This enhanced flow may diminish the asymmetric effects. Preferably, the radial flow path draws air from above the disk, e.g., a central port on the top, and releases the air with a downward vector, to provide enhanced lift.

According to another embodiment, a pressure balancing valve arrangement is implemented that self-synchronizes valves to the rotational angle, without an active actuator required. Since the front observes the highest pressure, a pressure balance can sense this peak pressure with respect to other peripheral locations on the disk, and organize structures according to the force vector. According to further embodiment, a set of ports are provided on the periphery of the disk, with an in-only checkvalve. Behind the checkvalve is diverter which deflects the incoming air CW or CCW. The relief pressure is set so that only the leading edge valve opens during flight, leading to a net left or right deflection. The exit in this case may be under the disk or at the lower lip of the periphery, providing lift in addition to a steering force. The steering in this case is essentially inertial, since it is the mass of air moving net left or right that provides the steering force. In practice, a disk may be formed with a tubular rim manifold. A series of ports are provided about the periphery of the rim, which allow air to enter or exit the manifold based on pressure differences, which is then selectively directed CW or CCW in dependence on a chiral set of checkvalves or other asymmetric flow directors. The air in the manifold flows in the preferential direction, and exits at the subsequent port if the pressure is lower. Since, for the moving Frisbee, the highest pressure will always be at the leading edge, and once pressurized, only air from the leading edge will enter the manifold. Within the manifold, flexible vanes or other chiral structures are provided that have two states, permitting CW flow or CCW flow. These may be controlled by a single actuator, though it is preferred that there are at least 3 states: left, right and neutral. The vanes may be provided between each port. The exhaust is preferably between +/−120-144° from the intake.

Control Paradigms

The projectile may be under-actuated, optimally-actuated, or over-actuated. The projectile typically has 6+ degrees of freedom of movement, for example, x, y, z, $\phi/\alpha$, $\theta/\beta$, $\psi/\gamma$. In a rotating disk, there is minimal control over $\psi/\gamma$, though by altering the moment of inertia, the speed of rotation can be altered, and through drag, the speed of rotation can be reduced. Note that with multiple rotating frames, additional degrees of freedom may be present. Similarly, in the absence of active propulsion, changes in y are typically limited to forward drag modulation, and conversion of potential energy (mgh) to kinetic energy (½ mv$^2$). Changes in z are effected by lift, and may typically be controlled without an external angular frame of reference. X-axis shifting requires a side force, which may be generated by modulating the Magnus effect, such as by providing a rotating ring about the peripheral edge, controlled to rotate somewhat independently of the projectile as a whole. There are other possible means for providing x-axis deflection of the projectile. This leaves phi/$\alpha$ and theta/$\beta$, each of which is stabilized by gyroscopic action about the psi/$\gamma$ axis. One way to alter these angles is to provide an eccentric torque on the projectile, which may be produced aerodynamically or gravitationally. In the gravitational case, a mass offset from the center or rotation (in a balanced system) is counter-rotated with respect to the hull, to maintain a stationary external angular reference. The offset mass induces a torque with respect to the external reference, and this changes in phi/$\alpha$ and/or theta/$\beta$. Note that the gyroscopic stabilization will result in a reaction force, and therefore the control system should predict or compensate for this. Typically, feedback can be used to iteratively null the effect over time. In the aerodynamic case, aerodynamic elements are deployed or employed, synchronized with the angle of rotation. Rotation may be up to 40 rotations per second, and therefore 2400 RPM. Assuming that the disk is divided into quadrants, the control system must be able to fully deploy and cease within about 6 ms, or about 160 Hz. This speed of deployment in order to obtain useful control imposes significant constraints. Another option is to provide an aerodynamic feature that is mounted on a counter-rotating subframe, which then is non-rotating (stationary) with respect to the external reference. It is noted that repositioning an inertial mass at 40 Hz requires a large amount of energy, unless the system is resonant. Since the rotational speed, and therefore the required resonant frequency, vary, the resonant system should be tunable. This can be accomplished with various types of actuators, which may be slowly responsive. A resonant state may be achieved using feedback.

Focusing on phi/α and theta/β, control over these parameters would provide directional control over the flight path, and with an additional z-axis control (lift), together would provide three dimensional under-actuated control over the flight path. As discussed above, lift may be controlled without angular responsivity, such as by symmetric ridges, a vent, a fan, or the like.

Magnus Effect Steering

In some embodiments, the Magnus effect is used to steer the disk. This effect may be dynamically tuned by altering the aerodynamic drag on the outside of the disk. For example, a set of apertures or grooves, may be provided. In order to decrease drag, air flow may be driven from the apertures or groove, which would enhance a boundary layer and reduce turbulence. Similarly, air flow into the apertures or groove would reduce the boundary layer, and promote turbulence, especially when interacting with a macroscopically rough surface. The air flows may be generated by, e.g., a centrifugal fan or membrane pump, for example driven by the same motor as used to drive the sub-frame. In a coaxial motor design, the fan may also be coaxial/radially symmetric. In a peripheral drive configuration, the race itself may be configured as a plenum or compressor/vacuum pump. Preferably, the air flows are designed to generate lift, for example drawing air from the top of the disk, or releasing air below the disk.

A dynamically-controlled Magnus effect provides an ability to drive the disk left or right, or provide a neutral flight condition with no control exerted. Preferably, the neutral flight condition requires low power or no power, with the motor drive and active air movement deactivated, but alternates exist.

According to a first aspect of the technology, a steerable disk is provided having a power supply, controller, guidance system, control interface, and at least one selectively actuatable aerodynamic element.

The power supply is preferably a lithium ion battery pack, capable of supplying 7.5 W peak power and 3.5 W continuous power. Voltage booster may be used to provide 5-6 VDC from a single cell. Advantageously, the coil of a solenoid or motor may be included as a functional component of a switching power supply.

The controller is, for example, an Arduino type microcontroller, though other devices may be used, which are suitable for the control task at hand. The guidance system preferably includes a magnetometer (e.g., fluxgate compass) to determine the spin rate and absolute orientation. The sensors also preferably include a microphone or pressure sensor, to detect pressure differences about the peripheral edge of the Frisbee, with permits determination of direction of flight. Acoustic propagation delays may be used to determine translational vector. For example, an ultrasonic anemometer design may be employed. The control interface may be a keypad, Bluetooth radio, WiFi radio, other ISM band radio, or the like.

The selectively actuatable aerodynamic element may comprise a surface on the peripheral edge and/or upper surface of the Frisbee, that is spun either clockwise or counterclockwise, or unpowered, with respect to the body of the Frisbee. This spinning causes a Magnus effect which induces a leftward or rightward force on the Frisbee with respect to the translational vector. The spinning mass may be minimized, and the surface appropriately texture or configured, to optimize the steering force from the available power. The element may be proportionally powered (speed control) or run at a single speed, since the duration of the spinning provides control over the net effect. Note that the moment of inertia of the spinning mass may be minimized, to avoid significantly altering the rotation of the frame.

An alternate provides a fixed surface with modulated drag. The modulation may be binary, i.e., straight/turn, with a single turning direction in flight. The Magnus effect modulation may be provided by a set of retractable protrusions. For example, a pneumatic or hydraulic source may pressurize or depressurize a plenum, which causes a surface deformation on the edge of the Frisbee, resulting in high or low turbulence at the edge. This, in turn, modulates the Magnus effect, causing a steering force. In this simplified embodiment, sensors may be avoided, and the actuator controlled based on a radio frequency or acoustic remote control or timer. Indeed, a mechanical, pneumatic or hydraulic timer may be implemented and no electronic control provided at all.

It is noted that right and left steering need not be implemented symmetrically or quasi-symmetrically. For example, while a left turn (for a right handed thrower) may be implemented by modulating edge roughness/drag, a right turn may be implemented by altering the relationship between center of lift and center of mass, to cause a reaction force. For example, a set of ridges or other aerodynamic features on the top surface of the Frisbee may be selectively deployed, to shift the center of lift (and perhaps the amount of lift). The net result is that the torque resulting from the displacement of the center of lift from the axis or rotation will tend to alter an inclination of the rotational axis of the Frisbee along the translational axis. This, in turn, causes a reaction force that causes the Frisbee to bank and turn. Depending on the type of aerodynamic features and their change, different steering maneuvers may be executed.

In the preferred embodiment, the steering force is relative to the axis of translation, and therefore no synchronization with rotational angle is required. The control surface is preferably recessed from the peripheral edge of the Frisbee by 3-4 inches. Therefore, for a 10.75 inch diameter disk, the control surface is about 25-5 inches in diameter. Assuming the larger surface, a suitable actuator is a 5" or 5¼" diameter brushless DC muffin fan, modified for bidirectional operation, and with a modified rotating surface. The Surface may be raised from the upper surface of the Frisbee, with a rough edge of the vertical relief portion, and a dimpled or turbulated horizontal surface.

The Frisbee may be a right-handed or left handed design, and have an asymmetric aerodynamic design, since clockwise and counterclockwise result in different steering forces. An alternate provides that the spinning surface is unidirectional, and has two speeds. For neutral flight, the intermediate speed is employed (which may be feedback controlled to neutrality). The zero speed and high speed, represent left and right steering forces.

In the case of a shell that rotates independently of the sub-frame, the rotation of the shell may be bidirectionally controlled to employ the Magnus effect. Further, a fan or centrifugal blower may be provided within the disk, to generate a pressure in a plenum. A valve manifold arrangement may be provided to vent the air to enhance or reduce the Magnus effect. For example, one side of the disk may be the intake, and the other side the exhaust, with the manifold counter-rotating to maintain orientation. In this case, the fan may run continuously, with a front-to-rear flow in the neutral state, and a back-to-front flow to brake the movement. This provides a true y-axis steering. If the fan assembly has an eccentric mass, then the air flow may be supplemented by a torque on the z-axis. The intake and outlet may be unitary, or split, with a pair of checkvalves distinguishing flow direction. Thus, the outlet me be directed down, and the inlet up, for example.

Vents

Typically, if the leading edge has vents (apertures) that have an outward (i.e., pressurized) flow of air, this will tend to reduce the drag of stationary air on the edge surface of the spinning disk, thus reducing the Magnus effect (and reverse Magnus effect). On the other hand, if the leading edge has vents that flow inward (i.e., vacuum), this will tend to increase the drag of stationary air on the edge surface of the spinning disk (by reducing the boundary layer), thus increasing the Magnus effect. All other things being equal, the reverse Magnus effect may be modulated by controlling rotational drag on the trailing edge of the disk. In that case, if the trailing edge has vents that flow outward (i.e., pressurized), this will tend to reduce the drag of stationary air on the trailing edge surface of the spinning disk, thus reducing the reverse Magnus effect. If the trailing edge has vents that flow inward (i.e., vacuum), this will tend to increase the drag of stationary air on the trailing edge surface of the spinning disk, thus increasing the reverse Magnus effect. These two effects may be coordinated. For example, if a flowpath is provided between front and rear of the disk, then the leading edge will have reduced pressure and increased Magnus effect, while the trailing edge will have increased pressure and reduced reverse Magnus effect. This can be accomplished through a set of tubes or conduits which run across the Frisbee. These tubes may have a modulated flow, and thus permit control over an intensity of the Magnus effect. It is difficult, absent a more complex control, to reduce the Magnus effect while concurrently increasing the reverse Magnus effect, and therefore bidirectional steering is often impractical. However, some configurations permit this. In the case of blocked flow through the conduits (or at least the conduit from front to back at any time), the Frisbee will be in a neutral steering state. Advantageously, a single actuator may control a set of actuators, e.g. vanes or plungers, to block or permit flow in all flow paths. For example, there may be 2-40 flow paths, for example, 2, 3, 4, 5, 6, 8, 10, 12, 16, 20, 24, 30, or 36 paths.

If the flow path has a partial vacuum, then both the Magnus and reverse Magnus effect will increase. However, while in most cases the Magnus effect will dominate, the aerodynamic structure may be configured for the reverse Magnus effect to dominate, thus permitting bidirectional steering. This can be controlled with a second state of the actuators, which permit all conduits to feed to a vacuum plenum. The vacuum plenum is maintained by a fan or blower, with exhaust typically under the Frisbee to increase lift.

In order to get the reverse Magnus effect to dominate, one needs a relatively reduced drag on the leading edge with an increased drag on the trailing edge. This implies pressurizing the conduit on the leading edge, while reducing pressure on the trailing edge. However, other features may be used which achieve this effect.

Another option is to have a set of aerodynamic features selectively deployed in the rear, and retracted on the leading edge. For example, a plenum is provided with an aperture peripheral wall. An elastic membrane is provided over the wall, with a set of protrusions to extend through the peripheral wall of the Frisbee, interacting with the airflow around the peripheral edge. Therefore, when the pressure in the plenum exceeds the pressure at the rear of the risk the protrusions are deployed, enhancing the reverse Magnus effect. If the pressure rises so that the pressure exceeds the pressure at the leading edge of the disk, then the protrusions will be fully deployed around the disk, a state which promotes the Magnus effect. When there is no pressure applied, a neutral steering state is achieved.

Internal Conduits

There is a pressure differential between the front and rear edges of the Frisbee. Therefore, a conduit between them will shunt the pressure. However, there is also a pressure differential between the front of the Frisbee and the lateral edges. If the pressure is asymmetrically shunted to one side, but not the other, a lateral thrust vector may be achieved. The pressure at a point on the edge varies as a function of rotational angle and speed.

In the simplest case, a set of three conduits are provided spaced 120° apart. In a first steering state, air is shunted from the leading edge to the right passage, and in a second steering state, the air is shunted to the left passage. As the Frisbee rotates (and regardless of direction of rotation), the leading edge portal changes, and the former passage which is open needs to be closed, and vice versa. However, a checkvalve arrangement can ensure that the passage from the higher pressure leading edge is patent to the right or left, but not both. Similarly, the same checkvalve arrangement assures that the passage from the higher pressure side to the lower pressure trailing edge is patent. Thus, depending on which way the checkvalves are set to operate, the Frisbee will be subject to a rightward or leftward steering force. A checkvalve may be a vane or flap that is free to incline in one direction under flow, and is blocked in the other direction and traps air. The flap may be held open independent of air flow, to override operation. Thus, a pair of checkvalves which are controlled to have unidirectional flow in one direction or the other, or fully blocked or fully unblocked flow, provides three steering states. This same paradigm works with larger numbers of conduits. Because all checkvalves operate concurrently, a single actuator may be used to control all of the conduits. Other types of checkvalves, and checkvalve controls, are possible.

The vane or checkvalve array structure, is inherently synchronized with the angle of rotation of the Frisbee, because it is responsive to the pressure differential, which in turn results from the kinetic energy of translation of the disk. Vane structures may be non-linear and exhibit hysteresis. For example, a cantilevered vane which has a curved surface will exhibit flexion hysteresis. Below a given pressure differential, the vane will remain upright (blocking flow through the passage), but as the pressure differential increases the force imposed on the vane, it will bend, thus permitting flow. When the pressure differential is relieved, the vane will right itself, but at a different, lower pressure differential than that which caused the flexion. The curve also imposes an asymmetry between positive and negative pressure differentials. Other types of hysteretic pressure relief valves are known. Thus, if a number of vanes (valves) are provided at the periphery of the disk, they may be designed to relieve (or collapse) only at the leading edge of the disk, and restore before the disk rotates 180°. Since this process is dependent on the pressure differential, it is self-synchronizing. Vanes may be provided which selectively relieve positive or negative pressure differentials, or in some cases both (with a null band at low pressure differential). If the conduits flow to a plenum, rather than another port, this allows the process to be modulated by altering the pressure in the plenum. A vacuum plenum may selectively draw air from the leading edge, while a pressure plenum may selectively expel air on the trailing edge. The pressure in the plenum is controlled by a fan, blower or compressor. Thus, in a vacuum regime, the Magnus effect may be modulated. In a pressure regime, the reverse Magnus effect may be modulated.

By controlling the plenum pressure, the relief at the leading edge may be permitted or avoided, providing a degree of control. Similarly, the relief at the trailing leading edge may be permitted or avoided, providing another degree of control. For example, an outflow reduces the Magnus effect at the leading edge and reduces the reverse Magnus effect at the trailing edge. Inflow increases the Magnus effect at the leading edge and increases the reverse Magnus effect at the trailing edge. However, since the front and rear of the Frisbee are subject to different pressure, the states of the various portions of the disk may differ. There may be two plenums, which may be supplied by a common fan or blower. On the other hand, a single (common) plenum, with a pressure that may be positive, negative, or neutral may be employed. In the case of a single plenum driven to compression or vacuum, the pressure may be controlled by a bidirectional fan. The fan may be controlled to operate in suction or compression at the partial vane opening states, by sensing fan load, indicative of fan back-pressure. For example, the back-EMF of the motor be a surrogate for air flow, which in turn is indicative of the states of the valves or vanes. Therefore, according to one embodiment, a centrifugal blower is provided within the projectile, which pressurizes a plenum. Actuators may therefore act to both alter the aerodynamic surfaces and vent the pressure. Alternately, the plenum may be a vacuum plenum, and for example, exhaust air may be used for lift. Both types of plenums (or an accumulator) may be employed concurrently. In a Frisbee, the intake is typically on top, to provide lift, while in a football, the intake is in front. For symmetric balls, a set of mutually orthogonal intakes may be provided to provide neutral effect.

Angular Momentum Transfer Between Aerodynamic Shell And Inertial Mass

Because of conservation of angular momentum, the spinning momentum imparted during launch may be maintained during flight. Any internal torques will tend to counter-rotate component parts, but will not alter the momentum, absent drag or active means. An inertial mass which spins with the disk during launch, and then is driven afterwards, will speed up or slow down (to zero or even negative rotation rate) the mass against which the drive applies a torque, all while generally maintaining angular momentum. For example, a motor whose stator is fixed to the shell, and whose rotor is free spinning, will alter the rotational rate of the shell depending on the moment of inertia of the rotor, and its rotational velocity. According to another embodiment, the gyroscopic stabilization of the disk is produced by an internal mass, and the external shell may be stationary. As such, the shell may provide non-rotating aerodynamic steering effects. It is noted that the eccentric masses need not be non-rotating, and may in fact themselves be driven in rotation to assist in gyroscopic stabilization. Thus, a light subframe may be provided to keep position the rotating masses with respect to the rotating shell. In accordance with a further aspect of the technology, a motor in the disk is controlled to transfer the angular momentum from the external shell of the disk to another (internal) rotating mass, after launch, resulting in a relatively stationary disk that can employ typical aerodynamic techniques for non-rotating platforms, such as controllable ailerons on the upper surface to steer the disk. A motor may be servoed to null rotation of the external surface with respect to the environment (e.g., based on a compass or other orientation sensor, or based on a translation axis sensor, such as a pressure sensor measuring differences with respect to rotation of the disk), and may be advanced or recessed to incline the shell to provide an aerodynamic steering force.

The disk may be launched manually, and after launch, the motor spin up to transfer the angular momentum from the shell to an internal (typically non-aerodynamically interacting) mass. Ailerons or a rudder can then steer the air flowing around the disk, producing forces.

The external aerodynamic surface may be driven to rotate at various speeds (zero, medium, high; or clockwise, zero, counterclockwise) with respect to the ground (or with a larger number of intermediate states), by angular momentum transfer with a motor driven rotational mass. The external shell may be static, or the drag on the edge may be modulated. The edge-drag modulation may be by retractable features, compressed or vacuum air flow through a set of peripheral apertures, vibrational transducers at the edges (or producing vibrations through ports at the edges), or the like. Where the edge turbulence is modulated, it is not necessary to servo the external disk during neutral flight control, conserving energy.

According to a third aspect, a motor in the disk transfers angular momentum from the outer shell, after launch, leading to a net clockwise or counterclockwise rotation. The peripheral edge of the disk may be textured or ridged, to increase drag on the front edge. This, in turn, results in a Magnus effect that creates a leftward or rightward force to steer the disk.

In one configuration, in a typical motor design, the central portion with coils is fixed to the shell, and the peripheral magnets, along with batteries and control circuits rotate with respect to the shell. In this way, the moment of inertia of the driven components may be maximized, since the batteries may be located peripherally, e.g., near the lip of the disk. In this type of design, the bearings of the motor are subject to high stresses, and may be a point of failure. One option is to provide a race between the lip of the disk and the sub-frame, with a set of ball bearings supporting the sub-frame with respect to the shell for low friction rotation. Similarly, a planetary gear set may be employed. This design reduces stress points, but increases the peripheral mass, which may be advantageous, to a point. The sub-frame may be driven with respect to the shell by one or more motor-driven frictional wheels, in the case of a race, or a portion of the planetary gear set driven (depending on desired RPM and torque requirements).

According to one embodiment, a DC to DC converter power supply is provided to allow use of a high voltage motor or actuator. For example, a motor designed to operate off a single lithium ion battery, e.g. 3.3-4.4V, typically has a power capability of <3 W, and more typically <1.5 W. A similar 12V motor may have a power capability of 5-12 W. Also, the driver circuitry is often current limited, and subject to a maximum voltage, which may be 14V, has the same or lower current drive capability at 3V as it has at 6V or 12V. Further, an equivalent motor operating at lower voltage employs a lower coil resistance as compared to a higher voltage motor, for the same number of turns, and therefore the lower voltage imposes a weight penalty. The DC-DC converter output voltage may be employed as a control variable for motor speed, especially for a brushed DC motor. In a brushless motor design, speed is controlled by a digital controller, but the dynamics are affected by the supply voltage as well as the PWM signal supplied to the coils. Further, motors are standardized at 5V and 12V input voltages for computer and automotive applications. According to another design, a motor intended for a drone, e.g., 500-3200 kv, is employed, along with an electronic speed controlled (ESC) and a customized controller, powered off e.g., two lithium ion cells.

According to another embodiment, a single axis of control is provided. A counter-rotating mass is driven by a motor, such that the speed of the motor matches the rotational speed of the disk. The mass is controlled to adjust the center of mass with respect to the center of pressure, with respect to a stationary angular frame of reference. As a result, the disk can be steered laterally and vertically. In addition, the same motor may be driven to generate additional lift by pressurizing the lower region, and may generate additional gyroscopic stabilization, especially if the fan causes rotational drag to permit increases in moment of inertia. A clutch may be provided to selectively drive the peripheral edge in the same direction as the disk rotation, an opposite direction, or no rotation, and therefore provide lateral steering independent of pitch.

In general, while mass and moment of inertia-shifting embodiments are possible, these may be difficult to achieve while providing a design that meets all design objectives, and in particular a 200 gram upper limit. Further, the optimal design tends to maximize the moment of inertia, compelling against mass which does not optimally contribute to the moment of inertia. Thus, according to one set of design principles, the guidance system is aerodynamic and not mass-dynamic. In a dynamic mass system, the steering tends to apply forces in the radial degrees of freedom phi/α, theta/β, psi/γ, with phi/α and theta/β being aliased due to rotation, and psi/γ representing rotational speed, which is typically only a weak factor in steering. The aerodynamic controls can effect x (velocity, tradeoff with potential energy and drag), y (Magnus effect left-right steering), z (lift), phi/α and theta/β (angle-sensitive applied torque about rotational axis), psi/γ (rotational drag, convert to lift). However, the aerodynamic effects tend to incur drag, and thus limit flight time or gyroscopic stabilization.

A motor may be provided concentric with the axis of rotation, and may be capable of bidirectional operation, so it always rotates with the rotation of the disk, regardless of launch rotation direction. A gear set, e.g., a planetary gear set, may be provided to drive a pair of masses which are independently positionable, so that they may be balanced or imbalanced. The movement may be controlled by a magnetic clutch, e.g., using a ferrofluid whose viscosity is modulated by an electric field. One advantage of a planetary gear is that the outer ring gear can be efficiently driven separately from the planet gears, which in this case (along with their cage) may represent the gyroscopic mass. The sun gear is driven by a motor, which may bidirectionally drive the ring, which has an aerodynamic surface, to generate the Magnus effect.

In launch, the masses are balanced, and the motor is quickly spun up so that the masses are non-rotating with respect to a stationary frame of reference. The system may be biased to a dynamically balanced (neutral) state with a spring. A steering input causes one of the masses to precess or advance with respect to the other, by a controlled drag on the rotating shell or other rotating element, leading to an imbalance. In this case, it is advantageous if each mass has an associated clutch, facilitating bilateral mass redistribution. If, for example, one mass is forward and the other rear, and the shell is rotating clockwise, a drag of the front mass with respect to the shell will cause the mass to move to the right, and a drag of the rear mass with respect to the shell will cause the mass to move to the left. A continued drag can align the masses together, with arbitrary angular orientation. After the steering maneuver is executed, the drag is released, and the bias spring permitted to rebalance the masses. Alternately, a pair of motors may be provided, each independently controlling the masses. The masses may be, for example, batteries for operating the motor(s). In the case of dual motors, the motor for each mass may be located within the mass, and be driven with respect to the rotating shell independently, with coordinated control. In this case, wireless battery charging is preferred, since there are two batteries to charge.

In an eccentric mass embodiment, the mass is provided on a counter-rotating substructure driven by a motor to match the speed of the gyroscopic mass. The eccentricity of the mass is also controlled, permitting a null position and at least one eccentricity position. A clutch or solenoid may be used to permit use of a single motor for both counter-rotation and eccentricity control. The eccentricity mechanism may employ a linear stepper motor, rack and pinion, pulley and/or band, in order to move the mass inward and outward. A mechanical or opto-encoder, variable resistor, or LDVT may be used to provide feedback for intermediate states of eccentricity. The distance may be continuously or discretely encoded, e.g., 2-32 positions. In order to minimize aggregate mass, the eccentric mass may be the motor and/or batteries, which may move with respect to a low mass structure. The motor may be on end of an arm, with a band/belt/gear drive to counter-rotate the arm with respect to the shell, thus leaving the arm stationary when the shell spins. A clutch can then engage or disengage to move the motor inward and outward. A key feature is to permit the motor to assume a balanced position, so that active steering ceases, and the counter-rotation drive may be stopped. Alternately, a second motor may be used to reposition the mass. Of course, the mass may be passive, with the rotational motor concentric with the axis of rotation.

Planetary Gear Mechanism

According to one embodiment, a disk is provided with a planetary gearset, with the sun gear in the center, planet gears outside, and the ring gear housed within the disk shell. In this case, the planet gears rotate in a direction opposite the sun and ring, and advance around the sun gear. The sun gear is driven by a motor with respect to the ring. The planet gears are low mass, and therefore do not significantly detract from the rotational inertia. A control system is provided for the planetary gearset as follows, to permit the following modes: Brake between planet cage and shell; Brake between ring gear and shell: highest ratio between motor speed and shell; and Brake between sun gear and planet cage. During normal operation, the sun gear spins faster than shell, ring and shell spins slower. Assuming a mass concentration in the sun gear, this leads to high gyroscopic stabilization, and reduction of Magnus effect (steering). A brake between the ring and shell is engaged during spin up mode. While the moment of inertia is conserved, the spin of the shell can be modulated (and even reversed), if the moment may be transferred to another rotating mass. Therefore, the rotational moment may be controlled to permit steering.

Acoustic Modulation of Aerodynamics

According to a fourth aspect, surfaces of the disk have vibrating transducers, such as piezo electric benders, either at the surface, or below the surface with apertures or ports to the surface, to locally modulate the drag on the surface. Vibrational transducers, such as piezoelectric transducers, and especially a piezoelectric bender within a Helmholtz resonator configuration, may induce aerodynamic modulation at the surface, to provide a steering force. In order to reduce external noise emissions, noise cancellation techniques may be used which maintain or increase the aerodynamic effect, while avoiding high net intensity external acoustic emissions. The transducers may be operated in synchronization with the angular rotation of the disk, or provided peripherally without angular rotational synchronization.

Ine advantageous aerodynamic feature which is consistent with various motivations expressed above is the use of a piezoelectric element, operated in a resonant state such as a Helmholtz resonator chamber. It can be electronically actuated based on angle of disk rotation, to locally alter the surface boundary layer, for example by expelling air (creating pressure) or inspiring air (creating vacuum) over a selected region of the disk surface. This resonant piezoelectric bender may be time modulated, and for example may interact with a surface pattern on the disk to create constructive or destructive interference with an air flow pattern, to alter the surface boundary layer. In this case, the transducer may be feedback operated to optimize frequency and phase. For example, the upper surface of the Frisbee may have a set of undulations, spaced at w/80 radians, which corresponds to 1600 Hz at 20 rotations per second. For a 10.75 inch diameter disk, the circumference is 33.75 inches, corresponding to an undulation spacing at the outer edge of 0.21", about 5.33 mm. At the nadir of each undulation, a slit is provided, which is pneumatically connected to a chamber with a piezoelectric bender on one wall. The chamber may be a Helmholz resonator or a broadband tuned chamber. The piezoelectric bender is oscillated at a phase and frequency to control separation of the boundary layer. The separation may be controlled to be bound to the surface on one side, and separated on the other, to apply a differential force about the rotational axis, i.e., a torque. The disk may have two or more benders, and the benders may be connected on opposed sides to different chambers, connected to opposite sides of the disk.

Aerodynamic Lift Effects

The front and rear edges of a disk craft have asymmetric effects, and the direction of rotation also imposes an asymmetry. Therefore, it is also possible to provide some steering dependent on these intrinsic asymmetries, and without an angularly responsive control system per se. Thus, if a control system were to alter the profile of the outer edge of the rotating disk, the flight path could be controlled to some extent; typically with interactivity between control over pitch and roll.

While the Aerobie provides static shaped aerodynamic inner and outer edges to provide stability over a range of speeds, and long distance flight, the profile of these edges is a compromise, and therefore an adaptive mechanism for altering the shape of the edge profile(s) would provide enhanced performance and additional control possibilities, in a manner that need not be referenced to a non-rotating frame. The changes fall into two categories: first, since the edge profile can change as a function of rotational angle, the leading outer edge of the disk (or leading out and inner edges of the toroid) need not be of the same profile, and can change during rotation. Second, the edges need not be symmetric, that is, they may have multiple profiles (more than two) over the course of rotation, such as leading front edge, trailing front edge, leading rear edge and ailing rear edge. While larger numbers of variations are possible, unless these are continuous changes from the preceding state, this may tax the control system for marginal benefits. Similarly, ridges or other features on the top or bottom surface may also be modified during flight, to alter lift, drag, etc.

Spin Synchronized Aerodynamic Features

According to another embodiment, one or more motors are driven to rotate airflow disruptors located at the top of the disk. If the disruptor rotates with the rotation of the disk, it will promote laminar flow, while if rotated against the air flow, it will promote turbulent flow. Since different regions of the disk can have different flow, a differential effect is possible. As discussed above, in a correct configuration, this may provide lateral steering based on the Magnus effect. The actuator suite may be a single flap on the surface, or a set of flaps, which act to push air up or down with respect to the surface. Since these will generally be located off of the gyroscope axis, they provide phi, and theta control, i.e., a torque about psi. Further, if a plurality of flaps are operated symmetrically, they can provide z control (lift). Typically speed (dx/dt) is not independently controllable (unless there is active propulsion), and is dependent on tradeoffs with between potential energy and kinetic energy. y may be independently controllable using the Magnus effect, with an aerodynamic actuator. Therefore, the control may provide an opposing bias using $\phi$ and $\theta$, to permit bidirectional control. If a single active propulsion device is provided, this will typically be concentrically aligned with the gyroscopic axis (z), and provide continuous lift or air pressure, with possible interaction with other passive actuators. Therefore, the control can be effected with lesser effect on kinetic energy.

Pitch and Roll Control by Eccentric Force

In a rotational angle responsive control system, a synchronized force eccentric with respect to an external observer could steer a craft with independence of pitch and roll. The control may provide a force acting normal to the gyroscopic axis, or act to alter the gyroscopic axis. In the typical case, the gyroscopic stabilization is advantageous. In order to effect a cumulative control effect, the force should act eccentrically to the craft, responsive to an angle of the rotation (e.g., rotational angle with respect to a fixed reference) of the object, such that the flight path is intentionally altered. If a portion of the projectile is servoed to a relative stationary orientation (e.g., a magnetic compass heading), it then becomes possible to align the center of mass with the center of lift. The center of lift may be determined by inertial guidance or other sensors, which detect forces on and movements of the device. For example, an eccentric mass may be relocated to null the offset between lift and weight vectors, are driven to provide a desired relationship.

Dynamic Balancing

Preferably, mass is distributed near the peripheral edge, to provide a maximum moment of inertia to mass ratio. Thus, batteries, motors, and drivetrain may be peripherally located in a dynamically balanced configuration. A control, especially sensor module(s), may be located at or near an axis of rotation, to minimize centrifugal forces. An internal dynamic balancing adjustment may be provided. For example, the disk may have a natural state which is displaced from balance. During launch, the imbalance creates a vibration, which is then captured and used to balance the system. As the vibration nears zero, the mechanism ceases adjustment, thus maintaining the system near the balanced condition. A slow decay to the imbalanced state can be used to permit a single-ended adjustment, which may be passive in nature. For example, a fluid may be pumped to redistribute mass based on vibration, with a slow leakage or backflow path to a reservoir. Because the disk or ring may be rotated clockwise or counterclockwise during launch, the control system preferably provides a symmetrical or bidirectional control paradigm (or self-aligning with required control rotation-handedness).

Spin-Synchronized Aperture Plate

Another option is to provide one or more electric motors, driving one or more disks that have apertures, driven with respect to an aperture plate structure (which may be stationary or moving). When the hole in the disk aligns with the hole in the aperture plate, the pressure between the top and bottom of the disk is locally equalized. When the holes to not align, a pressure differential is maintained. Therefore, the lift profile across the surface may be controlled, to produce a torque. Other types of actuators may be employed to open and close vents. Another option is to provide a centrifugal fan which creates a pressure in a plenum, which is then blocked, vented upwards, or vented downwards, depending on angular rotation of the disk.

Sensors

If a counter-rotating substructure is provided, it is preferred that accelerometers, gyroscopes, and compasses be mounted on the stationary reference substructure. If the inertial guidance elements are provided on the spinning elements of the disk, then it is preferred that the devices be capable of handling 50+ rotations per second. Speed of rotation may be detected by a back-EMF sensor, magnetic pulse detector, an optical sensor, Hall effect sensor, or the like. The counter-rotating elements may be driven by a permanent magnet motor, brushless DC motor, servo motor, stepper motor, ultrasonic motor, or other type of motor.

Control System

The control system has the main function of stabilizing flight against perturbations or incorrect current/launch conditions, and to steer/direct the projectile according to a steering signal or rule. The various references cited herein define various options for the rules, flightpaths, or goals, which need not be repeated herein. For example, a Frisbee initially launched at in incorrect angle may be corrected in flight. As the Frisbee slows its forward velocity, and the lift suffers, compensating control inputs may assist in the last portion of the flight. As the disk nears its target or goal, the control system may destabilize flight. In a game, the disk may have a predetermined control pattern, a program which is controlled at launch, or may receive external control signals in flight. The complexity of the control system typically increases cost, and therefore in a commercial design, tradeoffs are required to achieve a target cost, weight, size, durability, and other characteristics. However, where cost is not an overriding design constraint, the various other considerations permit a rich and sophisticated system, which can serve various purposes. While a preferred design flies under power provided at launch, a "drone" embodiment may employ active propulsion as a primary or supplemental feature.

Gesture Control

In general, a remote control system is provided, which may be a WiFi or Bluetooth, 315 MHz, 433 MHZ, 928 MHZ, 2.5 GHz, ISM band system. The report control may be analog or digital, and unidirectional or bidirectional. Preferably, it has a range of >50 m, and preferably greater than 100 m. The system may also include alternate user interfaces, such as a keypad, touchscreen or touch-sensitive surface, or gesture recognition. The gesture recognition may be optical, infrared, or radar, for example. For example, a Radar implementation may be used to track player, disk, and environment. The Radar sensors may be distributed, implemented in various smart devices, provided within the game play disk, or provided as a separate unit. For example, if each player has a smartphone, the smartphone itself may provide the gesture recognition. Likewise, a single unit or a set of distributed sensors may detect gestures, for example by analyzing Wifi backscatter and shadowing. See:

Abdelnasser, Heba, Moustafa Youssef, and Khaled A. Harras. "Wigest: A ubiquitous wifi-based gesture recognition system." In *Computer Communications (INFOCOM)*, 2015 *IEEE Conference*.

Adams, Vinh N., Robert Adams, and Wesley H. Dwelly. "Standoff range sense through obstruction radar system." US20110102234.

Adib, Fadel, and Dina Katabi. See through walls with Wifi (Vol. 43, no. 4. ACM, 2013.

Byers, Charles Calvin, Gonzalo Salgueiro, Aparna Vellala, Salini Kumar Bogadapati, and Jagadish Chandra Prasad Mynampati. "Smart postal box in support of autonomous delivery nodes." U.S. patent application Ser. No. 15/794,293, filed Feb. 22, 2018.

Chen, Feng. "Gesture Recognition System Based on RFID." In Mobile Ad-hoc and Sensor Networks: 13th International Conference, M S N 2017, Beijing, China, Dec. 17-20, 2017, Revised Selected Papers, vol. 747, p. 413. Springer, 2018.

Chetty, Kevin, Graeme E. Smith, and Karl Woodbridge. "Through-the-wall sensing of personnel using passive bistatic wifi radar at standoff distances." *IEEE Transactions on Geoscience and Remote Sensing* 50. no. 4 (2012): 1218-1226.

Chetty, Kevin, Graeme Smith, Hui Guo, and Karl Woodbridge. "Target detection in high clutter using passive bistatic WiFi radar." In *Radar Conference, 2009 ICEE*, pp. 1-5. IEEE, 2009.

Falconer, David G, Karl N. Steadman, and David G. Watters. "Through-the-wall differential radar." In *Command, Control, Communications, and Intelligence Systems for Law Enforcement*, vol. 2938, pp. 147-152 International Society for Optics and Photonics, 1997.

FS2014, Ubiquitous Computing Seminar. "The Use of Wireless Signals for Sensing and Interaction." (2014).

Gennarelli, Gianluca, Raffaele Solimene, Francesco Soldovieri, and Moeness G. Amin. "Three-dimensional through-wall sensing of moving targets using passive multistatic radars." *IEEE J. of Selected Topics in Applied Earth Observations and Remote Sensing* 9, no. 1 (2016): 141-148.

Kellogg, Bryce, Vamsi Talla, and Shyamnath Gallakota. "Bringing Gesture Recognition to All Devices." In *NSDI*, vol. 14, pp. 303-316. 2014.

Li, Gang, and Robert J. Burkholder. "Hybrid matching pursuit for distributed through-wall radar imaging." *IEEE Transactions on Antennas and Propagation* 63, no. 4 (2015): 1701-1711.

Li, Hong, Wei Yang, Yang Xu, Jianxin Wang, and Liusheng Huang, "WiCare: A Synthesized Healthcare Service System Based on WiFi Signals." In *International Conference on Service-Oriented Computing*, pp. 557-565. Springer, Cham, 2016.

Li, Wen-gao, and Ting U. "Research and Optimization on Redundant Computation in Wireless Gesture Recognition." *Mobile Communications* 7 (2015): 023.

Ma, Yongsen, Gang Zhou, Shuangquan Wang, Hongyang Zhao, and Wonsub Jung. "Signft: Sign Language Recognition Using Wifi." *Proceedings of the ACM on Interactive, Mobile, Wearable and Ubiquitous Technologies* 2, no. 1 (2018): 23.

Melgarejo, Pedro, Xinyu Zhang, Parameswaran Ramanathan, and David Chu. "Leveraging directional antenna capabilities for fine-grained gesture recognition." In *Proc. of the 2014 A M International Joint Conference on Pervasive and libiquitous Computing*, pp. 541-551. ACM, 2014.

Nanani, Gaurav K. and M. V. V. Kantipudi. "A study of wi-fi based system for moving object detection through the wall." *International Journal of Computer Applications* 79, no. 7 (2013).

Nandakumar, Rajalakshmi, Bryce Kellogg, and Shyamnath Gollakota. "Wi-fi gesture recognition on existing devices." *arXiv preprint arXiv:*141.5394(2014).

Prajapati, Nikul A. Patell Chandrakant D. "Gesture Recognition using Wireless Signal."

Pu, Qfan, Sidhant Gupta, Shyamnath Gollakota, and Shwetak Patel. "Gesture recognition using wireless signals." *GetMobile: Mobile Computing and Communications* 18, no. 4 (2015): 15-18.

Pu, Qifan, Sidhant Gupta, Shyamnath Gollakota, and Shwetak Patel. "Whole-home gesture recognition using wireless signals." In *Proceedings of the 19th annual international conference on Mobile computing & networking*, pp. 27-38. ACM, 2013.

Rai, Anshul, Krishna Kant Chintalapudi, Venkata N. Padmanabhan, and Rijurekha Sen. "Zee: Zero-effort crowdsourcing for indoor localization." In *Proceedings of the 18th annual international conference on Mobile computing and networking*, pp. 293-304. ACM, 2012.

Rai, Santosh. "Radio Based Device Activity Recognition." *Journal of Switching Hub* 2, no. 1, 2, 3 (2017).

Saha, Himadri Nath, Mousumi Nandi, Udyami Biswas, and Tiyasha Das. "Heart-rate detection and tracking human body movements through walls at home." In *Information Technology, Electronics and Mobile Communication Conf. (IEMCON), 2016 IEEE 7th Annual*. pp. 1-4. 2016.

Setlur, Pawan, Graeme E. Smith, Fauzia Ahmad, and Moeness G. Amin. "Target localization with a single sensor via multipath exploitation." *IEEE Transactions on Aerospace and Electronic Systems* 48, no. 3 (2012): 1996-2014.

Taghizadeh, Omid, Vimal Radhakrishnan, Gholamreza Alirezaei, Ehsan Zandi, and Rudolf Mathar. "Optimal linear MMSE design for passive distributed radar sensor network systems." In *Wireless for Space and Extreme Environments (WISEE)*, pp. 81-85. IEEE. 2017.

Tan, Bo, Karl Woodbridge, and Kevin Chetty. "A real-time high resolution passive WiFi Doppler radar and its applications." In *Radar Conference (Radar). 2014 International* pp. 1-6. IEEE, 2014.

Tang, Mu-Cyun, Fu-Kang Wang, and Tzyy-Sheng Horng. "Human gesture sensor using ambient wireless signals based on passive radar technology." In *Microwave Symposium (IMS), 2015 IEEE MIT-S International* pp. 1-4. IEEE, 2015.

Tian, Zengshan, Jiacheng Wang Xiaolong Yang, and Mu Zhou. "WiCatch: A Wi-Fi Based Hand Gesture Recognition System." IEEE Access 6 (2018): 16911-16823.

Uma Maheswararan, Munipalli, and Bala Brahmeswara Kadaru. "Seeing Through Walls Using Wi-Vi."

Wang Chan, Siwen Chen, Yanwei Yang, Feng Hu, Fugang Liu, and Jie Wu. "Literature review on wireless sensing-Wi-Fi signal-based recognition of human activities." Tsinghua Science and Technology 23, no. 2 (2018): 203-222

Wang, Wei. Alex X. Liu, and Muhammad Shahzad. "Gait recognition using wifi signals." In *Proceedings of the 2016 ACM International Joint Conference on Pervasive and Ubiquitous Computing* pp. 363-373. ACM, 2016.

Wang, Wei, Alex X. Liu, Muhammad Shahzad, Kang Ling, and Sanglu Lu. "Understanding and modeling of wifi signal based human activity recognition." In *Proceedings of the 21st Annual International Conference on Mobile Computing and Networking*. pp. 65-76. ACM, 2015.

Wang, Yan, Jian Liu, Yingying Chen, Marco Gruteser, Jie Yang, and Hongbo Liu. "E-eyes: device-free location-oriented activity identification using fine-grained wifi signatures." In *Proc. 20th An. Int. Conf. on Mobile computing and networking*. pp. 617-628. ACM, 2014.

Wilson, J, and Patwari, N. "Radin tomographic imaging with wireless networks." *IEEE Tran. on Mobile Computing* 9, no. 5 (2010): 62-632.

Wilson, Joey, and Neal Patwari. "See-through walls: Motion tracking using variance-based radio tomography networks." *IEEE Transactions on Mobile Computing* 10, no. 5 (2010): 612-621.

Wilson, Joey, and Neal Patwari. "Through-wall tracking using variance-based radio tomography networks." *arXiv preprint arXiv:*0909.5417(2009)

Xiao, Fu, Jing Chen, Xiao Hui Xie, Linqing Gui, Juan Li Sun, and Wang none Ruchuan. "SEARE: A System for Exercise Activity Recognition and Quality Evaluation Based on Green Sensing." IEEE Transactions on Emerging Topics in Computing (2018).

Xiao, Fu, Qianwen Mian, Xiaohui Xie, Lijuan Sun, and Ruchuan Wang. "SHMD: A Seniors Health Monitoring System Based on Energy-free Sensing." *Computer Networks* (2018).

Xu, Yang, Wei Yang, Jianxin Wang, Xing Zhou, Hong Li, and Liusheng Huang. "WiStep: Device-free Step Counting with Wifi Signals." *Proceedings of the ACM on Interactive, Mobile, Wearable and Ubiquitous Technologies* 1, no. 4 (2018): 172.

Yang, Lei, Qiongzheng Lin, Xiangyang Li, Tianci Liu, and Yunhan Liu. "See through walls with cots rfid system!" In *Proceedings of the 21st Annual International Conference on Mobile Computing and Networking*. pp. 487-499. ACM, 2015.

Yousefi, Siamak, Hirokazu Narui, Sankalp Dayal, Stefano Ermon, and Shahrokh Valaee. "A Survey on Behavior Recognition Using WiFi Channel State Information." *IEEE Communications Magazine* 55, no. 10 (2017): 98-104; arXiv preprint arXiv:1708.07129 (2017).

Zhang, Zhenyuan, Zengshan Tian, and Mu Zhou. "Latern: Dynamic Continuous Hand Gesture Recognition Using FMCW Radar Sensor." *IEEE Sensors Journa/*18, no. 8 (2018): 3278-3289;

Zhang Yi, Zheng Zhou, and Ting Jiang. "A novel gesture recognition method by Wi-fi communication signal based on fourth-order cumulants." In *Communication Workshop (ICCW), 2015 IEEE International Conference on*, pp. 2519-2523. IEEE, 2015.

Zhou, Zimu, Chenshu Wu, Zheng Yang, and Yunhan Lu. "Sensorless sensing with WiFi." *Tsinghua Science and Tech.* 20, no. 1 (2015): 1-6.

Zhu, Dali, Na Pang, Gang Li, and Shaowu Liu. "NotiFi: A ubiquitous WiFi-based abnormal activity detection system." In *Neural Networks (IJCNN), 2017 International Joint Conference on*, pp. 1766-1773. IEEE, 2017.

An instant replay or other review process for manual or automated game play calls may be provided. A reviewing official or artificial intelligence may be responsible for arbitrating outcome.

Because different sensors may have different perspectives, capabilities, or motivations (i.e., risk of bias), a consensus scheme is implemented to produce a game status, which advantageously is reported to the smart device of each player. As the game progresses, the status is updated in a blockchain or distributed ledger implemented with the smart devices of the players, and/or optionally external resources. Thus, the game play status (e.g., score, penalties, handicap, disk location (e.g., during a break, when implementing an American Football style "down" system, or basketball style backcourt violation), etc.) may be implemented through a distributed ledger or blockchain. Indeed, the individual game rules may be agreed to and defined before game play, with automatic or semi-automatic implementation and policing. Therefore, many or selected rules of Ultimate Frisbee, American football, basketball, baseball, soccer, hockey, water hockey, field hockey, etc., may be implemented or adapted. See, youthgroupgames.com.au/search/; www.ultimatecampresource.com/site/camp-activities/large-group-games.page-I.html; assets.ngin.com/attachments/document/0055/6038/field-day-games.docx; www.thesource4ym.com/games/default.aspx?Search=Outdoor, en.wikipedia.org/wiki/Track and field; en.wikipedia.org/wiki/List_of_ball games; etc.

The disk itself may have embedded intelligence, for autonomous control. For example, the disk may have a self-guided strategy to aim for a desired player, avoid all players, head for goal, try to avoid goal, etc. Distributed intelligence and control may be implemented. This may be implemented according to traditional logic, neural network(s), fuzzy logic (en.wikipedia.org/wiki/Fuzzy_logic), etc. As noted elsewhere, the intelligence of the system need not reside on the projectile, and may be resident on smartphones, routers, cloud resources, remote servers, etc.

See, U.S. Pat. Nos. 5,774,357; 5,867,386; 5,875,108; 5,901,246; 5,903,454; 5,920,477; 5,930,804; 5,963,957; 6,081,750; 6,182,076; 6,230,501; 6,252,544; 6,350,985; 6,400,996; 6,418,424; 6,429,812:6,519,564; 6,640,145; 6,772,124; 6,791,091; 6,791,472; 6,850,252; 6,865,825; 6,987,442; 7,006,881; 7,023,979; 7,107,706; 7,110,525; 7,136,710; 7,162,035; 7,181,017; 7,204,041; 7,219,449; 7,242,988; 7,268,700; 7,269,253; 7,271,737; 7,298,289; 7,372,952; 7,395,614; 7,451,005; 7,590,589; 7,650,319; 7,676,034; 7,773,749; 7,813,822; 7,869,591; 7,894,595; 7,904,187; 7,916,858; 7,966,078; 7,974,714; 7,987,003; 8,031,060; 8,032,477; 8,046,313; 8,054,965; 8,144,619; 8,165,916; 8,225,458; 8,233,918; 8,270,603; 8,300,798; 8,316,237; 8,352,400; 8,364,136; 8,369,967; 8,373,582; 8,402,490; 8,418,428; 8,516,266; 8,566,247; 8,582,753; 8,583,263; 8,600,830; 8,629,789; 8,682,726; 8,831,205; 8,874,477; 8,892,495; 8,904,181; 8,971,519; 9,045,927; 9,053,562; 9,121,217; 9,132,352; 9,151,633; 9,215,322; 9,239,951; 9,311,670; 9,419,951; 9,456,086; 9,535,563; 9,551,582; 9,615,264; 9,635,177; 9,727,042; 9,736,308; 9,794,797; 9,795,882; 9,807,239; 9,818,136; 9,860,391; RE46310; 20060167784; 20060200253; 20060200258; 20060200259; 20060200260; 20070016476; 20070053513; 20070061022; 20070061023; 20070061735; 20070063875; 20070070038; 20070087756; 20080040749; 20080262893; 20100076642; 20100235285; 20100317420; 20110004513; 20110029922; 20110156896; 20110167110; 20120017232; 20120036016; 20120150651; 20130080307; 20130147598; 20130165070; 20130166387; 20140081793; 20140089241; 20140173452; 20150081444; 20150111591; 20150204559; 20160025500; 20160224951; 20170103457; 20170132931; 20170206512; 20180049043; and 20180068358.

Blockchain and distributed leger technologies are well-established.

See, Christidis, Konstantinos, and Michael Devetsikiotis. "Blockchains and smart contracts for the internet of things." *IEEE Access* 4 (2016): 2292-2303.

Vukalić, Marko. "The quest for scalable blockchain fabric: Proof-of-work vs. BFT replication." In *International Workshop on Open Problems in Network Security*, pp. 112-125. Springer, Cham, 2015.

Pilkington, Marc. "II Blockchain technology: principles and applications." *Research handbook on digital transformations* (2016): 225.

Swanson, Tim. "Consensus-as-a-service: a brief report on the emergence of permissioned, distributed ledger systems." *Report, available online, April* (2015).

Eyal, Ittay, Gencer, A. E., Sirer, E G, and Van Renesse, R. "Bitcoin-NG: A Scalable Blockchain Protocol." In *NSDI*, pp. 45-59. 2016.

Azaria, Asaph, Ariel Ekblaw, Thiago Vieira, and Andrew Lippman. "Medrec: Using blockchain for medical data access and permission management." In *Open and Big Data (OBD), International Conference on*, pp. 25-30. IEEE, 2016.

Kiayias, Aggelos, Alexander Russell, Bernardo David, and Roman Oliynykov. "Ouroboros: A provably secure proof-of-stake blockchain protocol." In *Annual International Cryptology Conference*, pp. 357-388. Springer, Cham, 2017.

Xu, Xiwei, Cesare Pautasso, Liming Zhu, Vincent Gramoli, Alexander Ponomarev, An Binh Tran, and Shiping Chen. "The blockchain as a software connector." In *Software Architecture (WICSA), 2016 13th Working IEEE/IFIP Conference on*, pp. 182-191. IEEE, 2016.

Aste, Tomaso. "The fair cost of Bitcoin proof of work." (2016).

Milutinovic, Mitar, Warren He, Howard Wu, and Maxinder Kanwal. "Proof of luck an efficient blockchain consensus protocol." In *Proceedings of the 1st Workshop on System Software for Trusted Execution*, p. 2. ACM, 2016.

Biswas, Kamanashis, and Vallipuram Muthukkumarasamy. "Securing smart cities using blockchain technology." In *High Performance Computing and Communications, IEEE 14th International Conference on Smart City; IEEE 2nd International Conference on Data Science and Systems (HPCC/SmartCity/DSS), 2016 IEEE 18th International Conference on*, pp. 1392-1393. IEEE, 2016.

Beck, Roman, Jacob Stenum Czepluch, Nikolaj Lollike, and Simon Malone. "Blockchain—the Gateway to Trust-Free Cryptographic Transactions." In *ECIS*, p. ResearchPaper 153. 2016.

Ghosh, Mainak, Miles Richardson, Bryan Ford, and Rob Jansen. *A TorPath to TorCoin: proof-of-bandwidth altcoins for compensating relays*. NAVAL RESEARCH LAB WASHINGTON DC, 2014.

Xu, Xiwei, Ingo Weber, Mark Staples, Liming Zhu, Jan Bosch, Len Bass, Cesare Pautasso, and Paul Rimba. "A taxonomy of blockchain-based systems for architecture design." In *Software Architecture (CSA), 2017 IEEE International Conference on*, pp. 243-252. IEEE, 2017.

Ren, Larry. "Proof of stake velocity: Building the social currency of the digital age." *Self-published white paper* (2014).

Carboni, Davide. "Feedback based Reputation on top of the Bitcoin Blockchain." *arXiv preprint arXiv:*150201504 (2015).

Kakavand, Hossein, Nicolette Kast De Sevres, and Bart Chilton. "The Blockchain Revolution: An Analysis of Regulation and Technology Related to Distributed Ledger Technologies." (2017).

Huckle, Steve, Rituparna Bhattacharya, Martin White, and Natalia Beloff. "Internet of things, blockchain and shared economy applications." *Procedia Computer Science* 98 (2016): 461-466.

Bahga, Arshdeep, and Vijay K. Madisetti. "Blockchain platform for industrial Internet of Things." *Journal of Software Engineering and Applications* 9, no. 10 (2016): 533.

Underwood, Sarah. "Blockchain beyond bitcoin." *Communications of the ACM* 58, no. 11(2016): 15-17.

Zhang, Yu, and Jiangtan Wen. "The Iol electric business model: Using blockchain technology for the internet of things." *Peer-to-Peer Networking and Applications* 10, no. 4 (2017): 983-994.

Mainelli, Michael, and Mike Smith. "Sharing ledgers for sharing economies: an exploration of mutual distributed ledgers (aka blockchain technology)." (2015).

Swanson, Tim. "Consensus-as-a-service: a brief report on the emergence of permissioned, distributed ledger systems." *Report, available online, April* (2015).

Kshetri, Nir. "Can Blockchain Strengthen the Internet of Things?" *IT Professional* 19, no. 4 (2017): 68-72.

Beck, Roman, Jacob Stenum Czepluch, Nikolaj Lollike, and Simon Malone. "Blockchain-the Gateway to Trust-Free Cryptographic Transactions." In *ECIS*, p. ResearchPaper 153. 2016.

Samaniego, Mayra, and Ralph Deters. "Blockchain as a Service for IoI." In *Internet of Things (iThings) and IEEE Green Computing and Communications (GreenCom) and IEEE Cyber, Physical and Social Computing (CPSCom) and IEEE Smart Data (SmartData), 2016 IEEE International Conference on*, pp. 433-436. IEEE, 2016.

Sharma, Pradip Kumar, Sen Yeon Moon, and Jong Hyuk Park. "Block-VN: A distributed blockchain based vehicular network architecture in smart City." *Journal of Information Processing Systems* 13, no. 1 (2017): 84.

Glaser, Florian. "Pervasive decentralisation of digital infrastructures: a framework for blockchain enabled system and use case analysis." (2017).

Nakamoto, Satoshi. "Bitcoin: a peer-to-peer electronic cash system, October 2008." www.bitcoin.org/bitcoin.pdf.

Badev, Anton, and Matthew Chen. "Bitcoin: Technical Background and Data Analysis." (2014).

Nian, Lam Pak, and David L E E Kuo Chuen. "Introduction to bitcoin." In *Handbook of Digital Currency*, pp. 5-30. 2015.

OBJECTS OF THE INVENTION

It is an object to provide a projectile, comprising: a surface configured to have aerodynamic interaction with an external medium, comprising a lift, configured to rotate about an axis of rotation and translate about an axis of translation; a motor, configured to control at least one of an aerodynamic steering feature and a steering mass; a sensor configured to determine an axis of translation; and a motor control, configured to drive the motor with a selective phase of rotation dependent on an angle of rotation of the surface about the axis of rotation.

The motor control may comprise a phase locked loop receiving a motor rotation signal, a surface rotation signal having a phase dependent on a rotational angle of the surface about the axis of rotation, and a control signal configured to control a phase of the motor with respect to the rotational angle of the surface about the axis of rotation. The motor may comprise a DC brush motor, and the motor control produces a motor drive signal comprising a pulse modulated signal to drive the motor. The motor may alternately comprise at least one of a brushless DC motor and a stepper motor, and the motor control produces a multiphase motor drive signal.

The motor may be configured to drive an aerodynamic steering feature, exposed to the external medium, and which selectively produces a torque about the axis of rotation dependent on a phase of motor rotation. The motor may be configured to drive an eccentric mass about an axis of eccentric mass rotation. In some embodiments, the motor drives both an aerodynamic feature and an eccentric mass.

The motor control may receive a remote control signal from a source external to the projectile. The signal may be WiFi (IEEE-802.11, e.g. a/b/g/n/ac/ad/ax, etc.) or Bluetooth (IEEE-802.15.2 e.g., Bluetooth 5.1, Class 1). It may also be various other ISM band signals, or rely on communications over licensed spectrum, e.g., 3G, 4G/LTE. 5G, etc.

The sensor may comprise an inertial measurement unit comprising at least one accelerometer, an optical flow sensor, a LIDAR or RADAR sensor, a camera, an anemometer, a hot wire anemometer, a sonic anemometer, an ultrasonic anemometer, a sky sensor, radio frequency triangulation or trilateralization, GNSS/GPS/Glonass/Galileo/Beidou, a homing beacon sensor (optical, acoustic, ultrasonic, radio frequency), an IMU, etc.

The surface may comprise an oblate disk configured to rotate about a vertical axis during movement along a horizontal axis of translation. The projectile may be a Frisbee, golf ball, baseball, soccer ball, basketball, American football, tennis ball, shuttlecock, bullet or other munition, skeet, etc.

For example, the surface may comprise an oblate disk configured to rotate about a vertical axis during movement along a horizontal axis of translation; the motor may be configured to rotate at a same rate as the surface rotates about the axis of rotation, having an axis of rotation normal to the axis of rotation, and rotating at least one element in a manner configured to produce as a result of translation of the surface in the medium, an average lift over a cycle of rotation of the surface which causes a controlled torque about the axis of rotation; and the sensor may comprise at least one of a ground movement sensor and an air movement sensor.

The sensor may further comprise an inclination sensor (e.g., accelerometer), configured to determine an offset of the rotational axis with a gravitational axis, wherein the motor control is configured to drive the motor with a selective phase dependent on the offset. The accelerometer may also determine kinematic acceleration vectors, for example a drag vector which generally aligns with the axis of translation.

The aerodynamic steering feature may be exposed through the surface, and comprise a structure which rotates along an axis normal to the axis of rotation and has radial asymmetry, such that an aerodynamic interaction with the external medium is dependent on an angle of rotation of the structure about the axis normal to the axis of rotation.

The projectile may further comprise, or be associated with a computer readable medium, e.g. for a smartphone, storing therein non-transitory instructions for controlling the projectile by execution of the non-transitory instructions. The projectile (e.g., motor control) may be is responsive to commands dependent on a distributed ledger.

The projectile may further comprise a second motor configured to rotate an aerodynamic lift element to produce active lift for the projectile. The projectile may further comprise a mass redistributor, configured to selectively alter a moment of inertia of the rotating shell.

Another object provides a projectile configured to spin during flight, comprising: an aerodynamic surface configured to spin about an axis of rotation, and to produce aerodynamic lift based on translational movement; an element configured to rotate about an axis different from the axis of rotation during flight; and a controller configured to selectively control a phase of rotation of the element with respect to the spin, wherein the element generates a net steering force with respect to an external frame of reference. The element may comprise an aerodynamic feature exposed through the aerodynamic surface, having aerodynamic characteristics selectively dependent on the phase of rotation of the aerodynamic feature, wherein the aerodynamic effect of the aerodynamic feature is altered as the aerodynamic surface spins about the axis of rotation.

A further object provides a method of steering a rotating projectile, having an aerodynamic surface configured to spin about an axis of rotation, and an element configured to rotate about an axis different from the axis of rotation, comprising: determining a rotation angle of the projectile about the axis of rotation; and controlling a phase of rotation of the element with respect to the angle of rotation of the projectile, wherein the element generates a net steering force with respect to an external frame of reference.

An object provides a projectile which is gyroscopically stabilized during flight about a gyroscopic axis, comprising: a rotating shell having an aerodynamic surface configured to interact with surrounding air during flight along a translational flight path, to produce aerodynamic forces on the projectile; at least one of a rotating and axially displaceable feature, configured to produce a reaction force or aerodynamic force on the projectile as a function of rotational angle of the projectile about the gyroscopic axis; and an actuator configured to rotate or displace the feature in dependence on an angle of rotation of the projectile.

It is an object to provide an aerodynamic rotating disk projectile, having an axis of rotation, an at least one reaction wheel, configured to control a rotation of a reaction mass, having a dynamically-controlled rotational speed synchronized with a rotation about the axis of rotation of the rotating disk projectile, to induce a reaction force on the axis of rotation. The force causes the aerodynamic disk to incline, and thus the aerodynamic forces on the disk are different with respect to the non-rotating, non-translating frame of reference. A control alters the speed of the motor, and thus the reaction mass, as a function of rotational angle of the disk. The rotational angle may be determined with a rotation sensor, such as a magnetometer, or, where the axis of rotation is imperfectly aligned with gravity, an accelerometer. If the alignment is parallel, the reaction motor may activate to create an offset, so that the guidance signal is again available.

Another object provides a projectile configured to spin during flight, comprising: a shell having an aerodynamic surface configured to interact with surrounding air during flight, to produce aerodynamic lift based on translational movement; an aerodynamic feature configured to rotate about a radial axis during flight; and a controller configure to control a rotational speed of the aerodynamic feature with respect to the spin, wherein the aerodynamic feature generates a steering force.

A further object provides a steerable gyroscopically-stabilized disk projectile, comprising: a radially symmetric rotating aerodynamic shell, at least one selectively controllable motor driving an aerodynamic feature, configured to produce at least one of a force normal to an axis of rotation and a torque about the axis of rotation, and a control system configured to supply the control input.

A still further object provides a method of steering a rotating projectile, comprising: determining a rotational angle of the projectile about a gyroscopic axis; and cyclically modulating an aerodynamic feature with respect to a rotation about the gyroscopic axis, having a modulation state synchronized with the rotational angle. The aerodynamic feature may be displaced rotationally, linearly or pivotally, for example.

Another object provides a method of steering a rotating projectile, comprising: determining a rotation of the projectile about a gyroscopic axis; and selectively controlling an inclination angle of a surface of the projectile with respect to a non-rotating external frame of reference according to the determined rotation, to thereby produce an aerodynamic lift on the surface along a vector which is not aligned with the gyroscopic axis and which produces a net steering force.

A still further object provides a method of steering a projectile rotating about an axis of symmetry, comprising: determining a rotational phase of the projectile about the axis of symmetry; and servoing an externally exposed non-axisymmetric aerodynamic feature to match a rotational speed of the projectile, and having a phase controlled by a steering signal, whereby an aerodynamic force is applied to alter a translational vector of the projectile. The projectile may be a disk or a Frisbee.

It is also object to provide an aerodynamic rotating disk projectile, having an axis of rotation, at least one peripheral mass which is repositionable parallel to the axis of rotation having a dynamically-controlled position synchronized with a rotation about the axis of rotation, to induce a torque about the axis of rotation.

A set of reaction motors may be provided, preferably 2 pairs, provided on 90° offset axes, which are activated according to quarter-rotation phases. The motors may be allowed to spin down naturally after activated, braked by shunting, or reversed (for reversible motors).

It is also an object to provide a rotating disk aerodynamic projectile having a subplatform which is controlled to rotate independently of the projectile, typically counter-rotating. The platform may be used to support a sensor package, or provide other functions.

It is therefore an object to provide a rotating disk projectile, which has a series of ports about its periphery. The flow is directed asymmetrically, leading to a lateral force. Advantageously, the asymmetric flow is controllable to provide opposing lateral forces, leading to bidirectional steering. The ports may be connected with conduits, having passive checkvalves, which maintain the asymmetry as the Frisbee rotates. An actuator may be provided to control the direction of flow. A neutral steering state may be provided which does not exhibit asymmetry. The asymmetry may take the form of a vent from the conduit 60-150° from the intake port, with preferred symmetries being 3-fold (120°), 4-fold (90°), and five-fold (144°, $2^{nd}$ order).

It is a further object to provide a Frisbee-type rotating disk projectile, having a set of conduits between respective edge ports, such that each port has a connection to two other ports not diametrically opposed to it, and a control to ensure unidirectional flow between ports. The controls for the various ports are coordinate to provide an asymmetric flow pattern, leading to a net lateral force on the disk during flight. The controls preferably permit bidirectional steering, and a balanced state with no net asymmetric force It is another object to provide a method for controlling a flying projectile which rotates during flight, comprising: determining an angle of rotation of an inertial mass spinning about an axis during flight; and controlling at least one actuator for altering at least a portion of an aerodynamic structure with respect to an axis or rotation of an aerodynamic surface, selectively in dependence on the determined angle of rotation, to control aerodynamic forces during flight. The at least one actuator may be configured to control an aerodynamic property of at least a portion of a peripheral edge of the flying projectile with respect to an axis of rotation. The at least one actuator may comprise at least two actuators, configured to independently control an aerodynamic property of at least two different portions of a peripheral edge of the flying projectile with respect to an axis of rotation. The at least one actuator may comprise at least three actuators, configured to independently control an aerodynamic property of at least three different portions of a peripheral edge of the flying projectile with respect to an axis of rotation spaced evenly about the peripheral edge. The at least one actuator may comprise a selectively controlled baffle. The control system may be further configured to be responsive to a guidance signal to selectively alter a flightpath of the flying projectile from an uncontrolled flightpath. The control system may be responsive to a guidance signal to selectively maintain a predetermined flightpath of the projectile against an external aerodynamic perturbation during flight.

The at least one actuator may be configured to alter at least the portion of the aerodynamic surface during flight to generate a Magnus effect force synchronized with angular rotation of the flying projectile. A Magnus effect force may be generated to shift a flight path of the flying projectile in a horizontal plane or vertical plane (height) during flight. The at least one actuator may be configured to alter at least the portion of the aerodynamic surface during flight to selectively generate lift eccentric to an axis of rotation, wherein the generated lift is synchronized with angular rotation of the flying projectile. The at least one actuator may be configured to selectively alter an angle of an axis of rotation of the flying projectile with respect to a gravitational vector. The at least one actuator may be configured to selectively alter a flightpath of the flying projectile substantially without altering an angle of an axis of rotation of the flying projectile with respect to a gravitational vector. The at least one actuator may be configured to selectively alter a turbulence of air flowing over the flying projectile during flight at the at least the portion synchronized with angular rotation of the flying projectile. The at least one actuator may be configured to selectively alter a texture of the at least the portion of the aerodynamic surface synchronized with angular rotation of the flying projectile. The at least one actuator may comprise at least two actuators, and the control system may be further configured to control each of the at least two actuators to selectively produce different aerodynamic forces as a function of the angular rotation of the flying projectile. The at least one actuator may comprise a rotating motor, linear motor, bimetallic element, piezoelectric element, fluid pump, pneumatic actuator, hydraulic actuator, MEMS device, magnetorheological fluid, etc. For example, the at least one actuator may be configured to respond to a pneumatic pressure in a plenum, the pneumatic pressure being controlled by the control system as a function of the angular rotation of the flying projectile. The at least one actuator may be configured to respond to a movement of a hydraulic fluid, controlled by the control system as a function of the angular rotation of the flying projectile. The at least one actuator may comprise a set of controllable shutters which selectively block and permit air flow. The at least one actuator may comprise a set of controllable intake valves. The actuator may comprise a set of vector-thrust conduits, whose angle with respect to a radial chord is variable under control of the control signal; the variation may be laterally or vertically, or both. The at least one actuator may comprise an elastic membrane disposed on the aerodynamic surface, wherein an aerodynamic force is dependent on a pressure beneath the elastic membrane controlled as a function of angular rotation. The at least one actuator may comprise at least one rib which selectively protrudes into and interacts with the air surrounding the flying projectile during flight. The at least one actuator may comprise a source of compressed gas. The at least one actuator may comprise a valve configured to selectively permit flow of a gas or liquid. The at least one actuator may comprise vent configured to exhaust a flow of a gas to the atmosphere surrounding the flying projectile. The flying projectile may comprise a thruster and/or a rotating propeller.

The system may further comprise a directional sensor configured to determine a direction to a moving object, wherein the control system is further responsive to the determined direction to the moving object. The system may further comprise a geolocation system producing a geolocation signal, wherein the control system is further responsive to the geolocation signal. The system may further comprise a memory configured to store at least one planned maneuver, wherein the control system is further configured to read the at least one planned maneuver from the memory and to control the at least one actuator to execute the at least one planned maneuver during flight. The sensor may comprise a magnetometer.

It is a further object to provide a barometer or pressure sensor which is responsive to a change in pressure surrounding the rotating disk as it rotates, to thereby indicate translational axis of the disk by the pressure vector. The pressure sensor may be a microphone type device having a diaphragm responsive to pressure variations in the range 2-40 The control system may execute flight control logic, dependent on at least two competing goals, and to control the at least one actuator to execute the flight logic to optimize between the at least two competing goals. The flying projectile may further comprise an electronic camera, wherein images from the electronic camera are synchronized based on at least the determined angular rotation. The flying projectile may further comprise a rechargeable battery power source and/or an energy harvesting power source.

The flying projectile further may comprise a rotating inertial mass, distinct from the inertial mass configured to spin during flight, which has a portion of its surface isolated from interaction with the surrounding air. That is, the rotating inertial mass is isolated from, the environment, and typically is rotated to be nearly stationary with respect to an external frame of reference. The inertial mass configured to spin during flight may be integral with the aerodynamic surface.

The control signal may be responsive to a guidance signal to selectively alter a flightpath from an uncontrolled flightpath. The control signal may be responsive to a guidance signal to selectively maintain a predetermined flightpath of the projectile against an external aerodynamic perturbation.

The rotating aerodynamic object may comprise a mechanical energy storage structure configured to release energy under control of the control signal during flight, the mechanical energy storage structure having mechanical energy replenished prior to flight. The mechanical energy storage structure may be a spring or elastic membrane, for example. The actuator may comprise at least one element which rotates (e.g., counter-rotates) with respect to the rotating aerodynamic object at approximately the same rate of rotation as the rotating aerodynamic object.

The control signal may implement a dynamic computer-implemented mathematical model of flight dynamics of the rotating aerodynamic object. The dynamic computer-implemented mathematical model of flight dynamics of the rotating aerodynamic object may calculate a coefficient of lift and a coefficient of drag for the rotating aerodynamic object, and may predict a precession and/or nutation of an axis of rotation of the rotating aerodynamic object.

The at least one actuator may comprise an actuator configured to a selectively create a Magnus effect synchronized with angular rotation of the flying projectile, e.g., applied to shift a flight path of the flying projectile in a horizontal plane. The at least one actuator may comprise a reconfigurable aerodynamic surface, a vibrating transducer, e.g., configured to control a boundary layer separation from the aerodynamic surface, a rotating motor, a linear actuator, a vane (e.g., a valve, shutter, aleron, etc.) controlled selectively block and permit an air flow. The at least one actuator may comprise at least three actuators, configured to independently control an aerodynamic property of at least three different portions of the flying projectile with respect to an axis of rotation. The control system may be further responsive to a guidance signal to selectively alter a flightpath of the flying projectile. The control system may be further configured to stabilize an instability of a flightpath of the flying projectile, e.g., a wobble of a Frisbee. The at least one actuator may be configured to alter at least the portion of the aerodynamic surface during flight to selectively generate lift eccentric to an axis of rotation, wherein the generated lift is synchronized with angular rotation of the flying projectile. The at least one actuator may also be configured to selectively alter an angle of an axis of rotation of the flying projectile with respect to a gravitational vector. The at least one actuator may be configured to selectively alter a turbulence of air flowing over the flying projectile during flight. The control system may control each of the at least two actuators to selectively produce different aerodynamic forces as a function of an angle of rotation of the flying projectile. The at least one actuator may be configured to selectively a relationship between a center of mass with respect to an axis of rotation of the flying projectile in response to the at least one control signal. The control system may be further configured to execute flight control logic, dependent on at least two competing goals, and to control the at least one actuator to execute the flight logic to optimize between the at least two competing goals. The control system may comprise a transceiver that operates according to a IEEE-802 protocol, such as IEEE-802.11x (WiFi local area network) or IEEE-802.15.4 (Bluetooth personal area network). The control system may receive a flight plan prior to launch or during flight launch of the rotating aerodynamic object. The control system may autonomously generate a homing signal to home on an external moving target or an evasion signal to evade an external moving target during flight, or both.

The control system may determine an external wind speed, a geolocation with a geolocation navigation system (GPS/GNSS/triangulation-trilateralization), and/or a terrain height with a height sensor.

The rotating aerodynamic object may comprise a fan configured to move air from a first part of the rotating aerodynamic object to the second part of the rotating aerodynamic object. The rotating aerodynamic object may comprise a duct and an air flow modulating baffle under control of the control signal, configured to control a flow of air from a first part of the rotating aerodynamic object to the second part of the rotating aerodynamic object. The duct may comprise a plurality of radially-oriented ducts pressurized by centrifugal forces.

The flow of air over the exterior surfaces may be modulated by vibration that is advantageously induced by a piezoelectric transducer, or electromagnetic transducer (speaker). The mechanical configuration of the surface is typically fixed, and therefore the acoustic emission by the transducer controlled to selectively alter the aerodynamic properties, such that a differential lift and/or drag is created on the surface, to steer or otherwise control a flight path of the disk.

It is therefore an object to provide a projectile, comprising: a control system configured to generate a control signal; a shell having an aerodynamic surface configured to interact with surrounding air during flight, to produce aerodynamic forces on the projectile, the projectile being gyroscopically stabilized during flight about a gyroscopic axis; and a chiral aerodynamic control, having a chirality direction controlled in dependence on the control signal, configured to selectively modify a force vector orthogonal to the gyroscopic axis in dependence on the chirality direction.

It is also an object to provide a projectile which is gyroscopically stabilized during flight about a gyroscopic axis, comprising: a control system configured to generate a control signal; a rotating shell having an aerodynamic surface configured to interact with surrounding air during flight along a translational flight path, to produce aerodynamic forces on the projectile; and an aerodynamic control, generating a chiral flow of surrounding air, which selectively causes a deflection of the translational flight path in a direction normal to the gyroscopic axis in dependence on the control signal.

The chiral aerodynamic control may comprise a set of conduits, connecting to ports at peripheral portions of the shell, to provide alternate gas flow paths which each respectively impart an asymmetric force on the shell, a selection between the alternate gas flow paths being responsive to the control signal. The aerodynamic control may comprise a conduit, connecting to ports at peripheral portions of the shell, to provide a selectively biased gas flow direction, which respectively imparts an asymmetric force on the shell, a selection of gas flow direction being responsive to the control signal.

The chiral aerodynamic control may have at least three ports, and respective conduits leading between the at least three ports, each conduit having at least one checkvalve. A checkflow valve flow direction may be selectively controlled by the control signal. The chiral aerodynamic control may comprise at least one flow path having at least one checkvalve, wherein a preferred direction of flow through the flow path is determined based on a state of the control signal.

The control signal is selectively dependent on at least one of a wireless radio frequency signal, a magnetometer signal, a barometric signal, an accelerometer signal, a gyroscopic signal, an optical signal, an imaging sensor signal, a nonimaging optical signal, an infrared remote control signal, a global positioning satellite signal, a magnitude of at least one received signal, a relative timing of at least one received signal, a Doppler shift of at least one received signal, an angle of receipt of at least one received signal, an audio signal, a microphone output, a speech command, a human user gesture, an output of a human user gesture sensor, an interaction with an electronic dog collar, an interaction with an electronic bracelet, a beacon signal, a movement of an external object, an output of an object movement sensor, an output of a video camera, and a pressure balance.

The projectile may comprise at least one aperture in the shell, and a blower configured to selectively move air through the at least one aperture. The projectile may comprise a propeller supported by the shell and driven by a motor, configured to actively produce lift. The projectile may comprise an inertial mass, driven by a motor with respect to the shell, configured to transfer rotational inertia from and to the shell. The projectile may comprise a rotating element, which has a speed of rotation controlled with respect an angle of the shell with respect to ground during flight.

The shell may rotate about the gyroscopic axis during flight. The shell may be radially symmetric. At least half of a moment of inertia may be attributable to the shell, wherein the shell is configured to rotate during flight. The shell may produce aerodynamic lift from translational movement orthogonal to the gyroscopic axis. The shell may have an upper convex surface and a lower concave surface.

The projectile mass may be ≤500 gm, 350 gm, 250 gm, 200 gm, 185 gm, or 175 gm.

The projectile may further comprise at least one motor, having a speed responsive to the control system, and/or at least one aerodynamic flap, having a position with respect to the shell responsive to the control system, and/or at least one propeller.

The projectile may comprise at least one cam, having at least two positions, comprising a first position representing a clockwise chirality direction, and a second position representing a counterclockwise chirality direction. The projectile may also comprise at least one cam, having at least two positions, comprising a first position representing a CW curl vector, and a second position representing a CCW curl vector.

The projectile may comprise at least one aperture plate, having at least two positions, comprising a first position configured to cause lift on the shell from clockwise rotation, and a second position configured to cause lift on the shell from counterclockwise rotation.

The shell may have a peripheral lip, a convextop, and a lower void space, and the chiral aerodynamic control may selectively permit a chiral air flow from the lower void space to a port on an exterior of the peripheral lip, in each of a clockwise chirality direction, and a counterclockwise chirality direction.

The shell may be configured to rotate during flight, and have a peripheral lip and a top having a convex surface adjacent to the peripheral lip, and wherein the chiral aerodynamic control may be configured to interact with a translational flow of air surrounding the rotating shell during flight to selectively alter a lateral pressure distribution surrounding the peripheral lip. The shell may be configured to rotate during flight, and have a peripheral edge, and the chiral aerodynamic control may be configured to selectively direct air from a leading portion of the shell to either of diametrically opposed portions of the peripheral edge, selectively in dependence on the control signal. The shell may be configured to rotate during flight over a speed range of between at least 120 to 600 rotations per minute. For example, a design specification tolerance of at least 2400 RPM operation may be provided. Likewise, operation at 25-50 RPM may be tolerated.

The projectile is preferably configured to be manually launched from the hand of a human, to rotate and translate dependent on a release vector.

The control system may be configured to cause the projectile to follow a predetermined flight path, to correct a flight path to a nominal flight path, to follow an adaptively determined flight path, and/or to follow a flight path received through a wireless communication during Flight The control system may communicate through wireless communication according to an Internet communication protocol. Communications may be according to an IEEE-802.11 wireless communication protocol (e.g., selected from the group consisting of 11a, 11b, 11g, 11n, 11ac, 11ad, 11ah, 11aj, 11af, 11ag, 11ai, 11p, 11s). Communications may be according to an IEEE-80215 wireless communication protocol (e.g., selected from the group consisting of 15, 15.1, 15.2, 15.3, 15.4, 15.5, 15.6, and 15.7). The control system may communicate through wireless communication according to a wireless ad hoc networking protocol.

The control system may implement a smart contract according to a distributed ledger or blockchain.

The projectile may be configured for game use, and control system may be configured to implement rules of the game and/or to wirelessly receive and store a set of parameters defining rules of the game.

The projectile may be configured for use in a team sport, and control system configured to selectively respond to commands issued by members of a single team.

The control system may be selectively responsive to a rotational angle sensor. The shell may be configured to rotate during flight, having a pressure sensor or air flow sensor configured to sense a pressure or air flow along a translational axis of the projectile, such that an output of the pressure or air flow sensor oscillates in a pattern corresponding to a rotation of the shell. The projectile may be configured to fly with a vertical or horizontal gyroscopic axis. The control system may produce at least one control signal which selectively modifies the gyroscopic axis during flight. The control system may produce a second control signal adapted to control an actuator to modify a flight path of the projectile, independent of the control signal.

The projectile preferably meets MIL 810 G (everyspec.com/MIL-STD/MIL-STD-0800-0899/MIL-STD-810G (2306) or equivalent, test method 504.1, 506.5, 507.5, 513.6, 514.6, and/or 516.7, procedure I.

The chiral aerodynamic control may have a clockwise chirality direction and a counterclockwise chirality direction, and therein the structures within the chiral aerodynamic control may be asymmetric for achieving clockwise chirality direction and the counterclockwise chirality direction. The selectively modified force vector orthogonal to the gyroscopic axis may be selectively dependent on a rotational direction of the shell. The aerodynamic control may be configured to provide controllable lift, rotational drag, translational drag, moment of inertia (by way of mass redistribution), during flight.

The at least one of a rotating and axially displaceable feature may comprise an elongated form configured to rotate about a radially-oriented shaft having a rotation synchronized with a rotation of the projectile about the gyroscopic axis, the elongated form being asymmetric and having a portion exposed at a surface of the projectile, such that an aerodynamic interaction of the elongated form with air surrounding the projectile is dependent on an angle of rotation of the elongated form about the radially-oriented axis. The actuator may comprise a motor driven by a phase locked loop to selectively control a rotational angle of the elongated form with respect to a rotational angle of the projectile, to thereby selectively apply a torque on the gyroscopic axis with respect to an external frame of reference. The at least one of a rotating and axially displaceable feature may also comprise a pair of elongated forms configured to rotate on a common radially-oriented shaft having a rotation synchronized with a rotation of the projectile about the gyroscopic axis, the elongated forms each being similarly shaped, asymmetric, and disposed in antiphase, each having a portion exposed at a surface of the projectile, such that an aerodynamic interaction of the elongated forms with air surrounding the projectile is dependent on an angle of rotation of the elongated forms about the radially-oriented axis on the common radially-oriented shaft.

A sub-platform may be controlled to counter-rotate with respect to the rotating shell during flight. The sub-platform may be configured to redistribute a mass to selectively exert a torque about the gyroscopic axis. The sub-platform may be configured to selectively exert an aerodynamic force on the projectile with respect to the surrounding air. The sub-platform may be configured propel air along a non-rotating vector.

It is a further object to provide a projectile configured to spin during flight, comprising: a shell having an aerodynamic surface configured to interact with surrounding air during flight, to produce aerodynamic lift based on translational movement; a set of ports disposed at a periphery of the shell; a set of conduits, connecting respective pairs of the set of ports; and a controllable checkvalve in each conduit configured to selectively permit unidirectional flow in a selected direction.

Each port may be connected to a pair of conduits, each having an opposite permitted unidirectional flow direction. A control system may be provided to generate a control signal; wherein a direction of the selectively permitted unidirectional flow is selectively responsive to the control signal. Each port may be connected to a pair of conduits, each having an opposite permitted unidirectional flow direction having a direction of the selectively permitted unidirectional flow selectively responsive to the control signal. At least one port may be connected to two other ports, through two respective conduits, each respective conduit having a respective checkvalve operating to block flow in an opposite direction, wherein the two other ports are disposed laterally with respect to an axis of symmetry of the projectile passing through the at least one port, such that a flow from the at least one port, through a respective conduit in a direction permitted by the respective checkvalve, causes an asymmetric force on the projectile with respect to the axis of symmetry. A permitted flow direction in each respective conduit may be reversible based on a state of a control signal.

It is a still further object to provide a method of controlling a gyroscopically stabilized projectile, comprising a control system, a shell having an aerodynamic surface configured to interact with surrounding air during flight, and a chiral aerodynamic control, the method comprising: imparting rotational kinetic energy to induce gyroscopic stabilization of the projectile about a gyroscopic axis; imparting translational kinetic energy to induce a movement of the projectile; interacting the shell with surrounding air while moving, to induce aerodynamic forces; generating a control signal from the control system; and altering a state of the chiral aerodynamic control selectively in dependence on the control signal, to alter a chirality direction of the chiral aerodynamic control, to thereby selectively modify a force vector orthogonal to the gyroscopic axis in dependence on the chirality direction.

It is another object to provide a projectile configured to spin during flight, comprising: a shell having an aerodynamic surface configured to interact with surrounding air during flight, to produce aerodynamic lift based on translational movement; a set of peripheral ports; a manifold connecting the set of peripheral ports; and a directionally-controllable chiral flow mechanism, configured to selectively provide clockwise flow through the manifold in a first state, and counterclockwise slow through the manifold in a second state, to thereby interact with translationally-induced flow of surrounding air during flight to generate a steering force. The directionally-controllable chiral flow mechanism may be further configured to selectively provide non-chiral flow third state, to thereby interact with translationally-induced flow of surrounding air during flight to generate a net neutral steering force.

It is another object to provide a steerable gyroscopically-stabilized disk projectile, comprising: a radially symmetric rotating aerodynamic shell, at least one selectively controllable chiral aerodynamic element, configured to selectively produce different curl vectors of surrounding air during flight in dependence on a control input, to produce at least one of a force normal to an axis of rotation and a torque about the axis of rotation, and a control system configured to supply the control input.

It is a further object to provide a method of controlling a gyroscopically-stabilized projectile, comprising a control system, a shell having an aerodynamic surface configured to interact with surrounding air during flight, and a chiral aerodynamic control, the method comprising: imparting rotational kinetic energy to induce gyroscopic stabilization of the projectile about a gyroscopic axis; imparting translational kinetic energy to induce a movement of the projectile; interacting the shell with surrounding air while moving, to induce aerodynamic forces; generating a control signal from the control system; and altering a state of the chiral aerodynamic control selectively in dependence on the control signal, to alter a chirality direction of the chiral aerodynamic control, to thereby selectively modify a net Cartesian coordinate force vector acting on the gyroscopically-stabilized projectile in dependence on the chirality direction.

It is a still further object to provide a method of controlling a gyroscopically-stabilized projectile, comprising a control system producing a control signal, a rotating aerodynamic shell, and an aerodynamic control responsive to the control signal, the method comprising: imparting rotational and translational kinetic energy to induce gyroscopic stabilization of the projectile about a gyroscopic axis and a movement of the projectile along a flight path; interacting the shell with surrounding air while moving, to induce aerodynamic forces; generating the control signal from the control system; and altering a state of the aerodynamic control selectively in dependence on the control signal, to alter a chirality direction of an air flow within a passage, to thereby deflect the flight path.

BRIEF DESCRIPTION OF THE DRAWINGS

FIG. 8 provides four peripheral flow paths which lead to adjacent locations, while FIG. 9 shows six flow paths which lead to non-adjacent locations.

DETAILED DESCRIPTION OF THE PREFERRED EMBODIMENTS

Figure 1A:
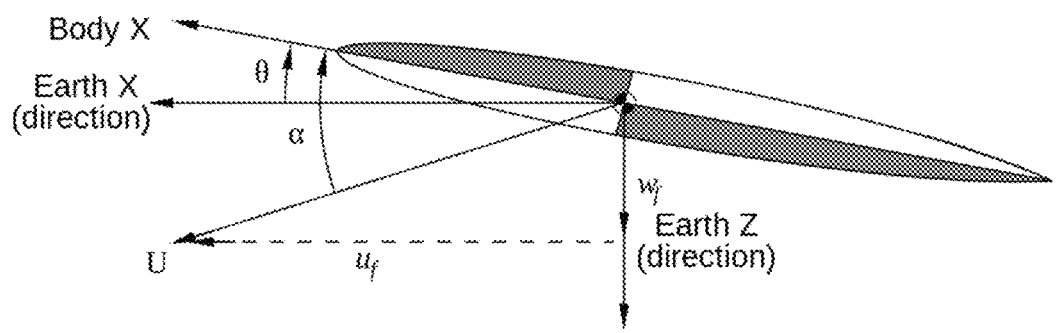
FIGS. 1A and 1B show a schematic representation of the various aerodynamic parameters of a generic craft and a spinning disk.
Figure 1B:
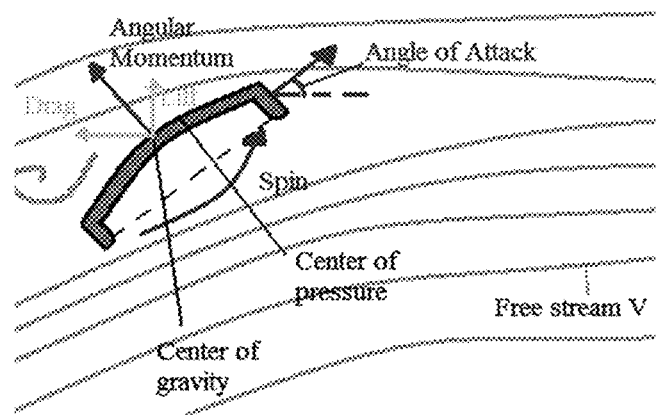

POWER. Since the actuator(s) are necessarily local within the disk, the actuator(s) and their controls should be located within the disk and powered by a self-contained power supply within the disk which may be an electrical (e.g., battery and/or supercapacitor) or chemical storage system (e.g., combustion, expansion, etc.), or power may be parasitically derived from the height, translation and/or rotation of the disk. Operative power may be added to a short term power storage system upon launch, for example, as a pneumatic pressure, spring tension, supercapacitor, etc. Preferably, an auxiliary power source remains available even after exhaustion of a short term power source. In a design that provides active motor drive control over a rotating mass, a primary or secondary battery is preferred.

A rechargeable lithium ion battery or alkaline primary battery may be used as the power source. Likewise, a supercapacitor may be employed with energy harvesting, e.g. solar or inertial energy. The energy harvesting preferably avoids significant parasitic losses during flight, but may be charged before flight or after landing/catching. Typically, the disk is used outdoors in daylight, and therefore a solar cell array may be provided on the upper surface to power the system. Typically, the output of a solar array will be insufficient to supply peak power required for the actuators, and therefore the solar cell array, if provided, generally acts to recharge a battery or supercapacitor.

The projectile tends to have a maximum flight time of less than 1 minute, and more typically less than 30 seconds. During that time, the control and actuators may have a power draw of 100 mA @ 3.7V, or ~370 mW. Rechargeable lithium polymer batteries may be employed. Indeed, a pair of batteries may be provided to achieve equal weight balance with a symmetric layout. The battery may be cylindrical or prismatic, for example. A USB 20, 3.0, or 3.1 charger/communications port may be provided, for example, and/or an inductive charging system. It is typically preferred that as much cellphone technology as possible be employed to achieve economies of scale. Typically, a touchscreen will not be required, though this may provide a means for local user input. Likewise, 3G, 4G, 5G radios may not be required.

Guidance Sensor System.

Because sensor packages are available, it is typically efficient to provide a sensor system that includes 3-axis magnetometer, 3-axis accelerometer, 3-axis gyro, air pressure/barometer, thermometer, microphone/peripheral pressure axis sensor, etc.

A rotational orientation sensor (absolute, relative, or both) may be preferably provided within the disk or projectile, though technically the rotational orientation sensor can be remote. If only the rotational angle sensor is provided, then the object will typically assume a flight path which is either predetermined or externally provided. For example, the guidance system may be provided to impose a straight flight path, i.e., to increase the stability of flight. In the case of a Frisbee, the system may require a rotational frame of reference, which may be provided, for example, by a magnetometer (e.g., fluxgate compass). Of course, more complex guidance or different systems are possible. A rotating disk may be controlled in at least pitch, roll, yaw, x, y and z axis, passively (without expenditure of stored energy to effect these changes, though the control system requires power) with some interactivity between these axes. The disk is gyroscopically stabilized along its rotational axis, and stable flight generally requires level flight. Therefore, any steering input that alters the gyroscopic axis should restore level flight (or the desired static perturbation) after the maneuver is complete. The disk therefore preferably has a sensitive "gravitometer", to determine with high precision the gravitational axis. This sensor may be separate or different from that provided in an inertial guidance sensor package. Note that the "gravitometer" should be immune to the rotation of the disk, even at high speeds. Technology as employed in the Sphero robot may be employed to drive an outer shell with respect to an inner frame.

See, U.S. Patents and Patents App. Nos. 20170080352; 20170076194; 20170043478; 20160349748; 20160291591; 20160282871; 20160246299; 20160202696; 20160101741; 20160090133; 20160033967; 20160004253; 20150370257; 20150362919; 20100079748; 20050095072; U.S. Pat. Nos. 9,886,032; 9,841,758; 9,829,882; 9,827,487; 9,795,868; 9,766,620; 9,483,876; 9,481,410; 9,457,730; 9,429,940; 9,395,725; 9,394,016; 9,389,612; 9,292,758; 9,290,220; 9,280,717; 9,218,316; 9,211,920; 9,193,404; 9,150,263; and 9,114,838.

Available sensor modules provide measurement of 3-axis magnetometer (x, y and z heading), 3-axis gyroscope (pitch, roll, yaw), 3-axis accelerometer (x, y and z), air pressure, temperature, and GPS/GNSS (position and time). A humidity sensor may be provided in the same sensor package or separately. A radar, LIDAR or sonar sensor can provide height/altitude and in some cases, distances from other objects. A pilot tube (or a plurality of such sensors) may be provided to sense airspeed, and likewise, a differential barometer may be used to detect lift as an air pressure difference between upper and lower surfaces of the disk. Wind conditions and turbulence may in some cases be detected by LIDAR/Doppler sensing.

It is noted that a formal compass is not required; since the disk rotates during flight, a solenoid will generate a sinusoidal signal from the earth's magnetic field, and the peaks and troughs may be used to determine the disk's rotational speed and rotational phase. From the speed, the flight control can be synchronized to produce the eccentric force. Once the rotational speed is determined, a feedback signal may be used to determine the phase relationship of the desired steering signal with the rotation. That is, it is not required in all cases that the disk know its actual forward propagation vector, only the rotational speed and the relationship between its current direction and the desired direction. The translation vector may be determined with a pressure sensor at the peripheral edge, which will read a high pressure at or near the leading edge, and a low pressure at or near the trailing edge.

A less comprehensive sensor package may be provided. For example, if a horizon sensor is provided for detecting axis of rotation, the z-axis accelerometer may be of limited value (though it is useful for detecting updrafts, downdrafts, and precession of the disk rotational axis for example). Likewise, the z-axis magnetometer may have limited value. Air properties may be determined empirically, and thus barometer, thermometer and hygrometer may be dispensed with. In some cases, a simplified control system with only a rotational axis determination, such as a magnetometer, may be employed. Because the disk rotates, a fluxgate magnetometer design is not required, since the rotation will induce a periodicity in a solenoid voltage corresponding to rotational angle. Indeed, a comparator may trigger based on a predetermined orientation, to produce a square wave, and the angular rotation within that phase estimated based on interpolation.

Height is difficult to measure with a purely inertial guidance system, and use of barometer or GPS/GNSS would typically result in unacceptable errors. Therefore, a sonar or radar sensor may be provided on the bottom of the disk, which measures height (compensated for sin x/x distortion by pitch and roll estimates). If this is not provided, a heuristic may be employed which assumes that the launch height is 1 meter and the ground is level, which obviously has limitations. Of course, these presumptions may be modified by providing a statistical launch height for the thrower, and/or a terrain map. More generally, the GPS/GNSS system may be used to provide velocity (Doppler), an absolute position on a map, and changes in position and height over time.

Automated Control. Typically, the control system is an electronic, microprocessor controlled control system, which alters a flight control surface synchronized with the rotation. Typically, the flight control surface is a plurality of surfaces which are dynamically balanced to minimize dynamic imbalance, which causes vibration and instability. The rotational rate of the projectile may be, for example, 120-2500 RPM. An angularly responsive control system should have a deterministic response time of less than about 12-100 mS to deploy and retract the flight control surface (which may be driven in oscillation). Faster spin rates require correspondingly lower response times. While solenoid actuation is possible, because of the cyclic actuation, a rotating motor is preferred, for example with a rotating speed and phase matching the rotational speed of rotation of the projectile, and a cam to provide the flight control surface actuation profile. Because of the small size and power, it is preferred that the motors, which may be "pager" motor type or coreless DC motors as used in drones, e.f., 7×20, have a gear reduction transmission, which may also include a clutch mechanism (e.g., magnetic clutch or friction clutch). Alternately, the motor(s) may be of a stepper motor design. In one case, a single motor may provide for actuation of multiple flight control surfaces, while in another case, each surface has its own actuator.

The system may provide a complex guidance system, which can target a stationary or moving target, avoid obstacles in the flight path, and execute evasive maneuvers. The sensor package may include a multiaxis (e.g., 2+ axes) magnetometer (compass), accelerometer, gyroscope, as well as GPS, camera(s), microphone(s) or a microphone array, radio frequency direction-finding, altimeter/barometer, light sensor, etc. Some or all of these sensors are found in common smartphones, and therefore one embodiment provides all or portions of a smartphone within the projectile; another embodiment permits attachment of a user's smartphone to the projectile, with control of the projectile effected through a USB, Bluetooth, Apple® proprietary bus, or other interface. However, the weight and fragility of a smartphone tend to make this option less appealing. In a complex model-based control system, the dynamics of the disk are predicted during flight based on a model of the disk, with external parameters relating to air density, humidity, temperature, wind, updraft/downdraft, turbulence and vortices as all being further influences. Bulk air conditions, such as air pressure, humidity, and temperature are readily measured in real time. Further, an adaptive control may estimate these parameters or their effect on flight control in real time or at the commencement of each flight. In a simple design, a disk model may not be required. For example, in a vector steering embodiment, a model based control is not required.

While the disk is typically maintained aloft by passive aerodynamics, it is possible to include a fan in the design, to actively provide lift, and thus provide z-axis control during flight.

At the commencement of each flight, the disk is launched with a linear velocity, angular velocity, pitch, roll, and height. The linear and angular velocities may be measured by the sensor package using the accelerometers and magnetometers, for example, though over a longer time span, linear velocity can be estimated using GPS/GNSS. Pitch and roll may be extracted from the accelerometer readings with reference to the gravitational vector.

Radio control signals may be employed, e.g., 27 MHz, 49 Mhz, etc. Any other ISM band may also be employed. Optical, infrared, acoustic and other remote control signals may be used. Gesture recognition, such as through a camera, radar, lidar, or other input may be used. Speech recognition and control may also be provided. An RFID subsystem is preferably provided, configured to have a range of 100-300. The antenna on the disk may be highly directional (high gain), and thus longer range is available than for an omnidirectional reader. The microcontroller receives a navigational signal, such as a fluxgate compass or other magnetometer, and may also include pitch, roll yaw rate gyros, x, y, z accelerometers, altimeter (e.g., radar ranging or sonar), temperature, pressure, humidity, etc. These later sensors are useful for determining or predicting the flight dynamics of the Frisbee. Pressure sensors may be useful for determining wind and updraft/downdraft. Standard sensor packages may be employed, that may contain extra sensors. A light sensor directed radially may also be provided. A GPS sensor may also be provided. A lithium ion prismatic battery may be employed, or cylindrical cells advantageously arranged about the periphery of the disk to provide suitable weighting to provide a high moment of rotational inertia.

In some embodiments, the projectile is controlled by a remote control system, and provides a stream of sensor data to an off-board control system and receives flight control commands from the control system. In other embodiments, the control system is internal or distributed (on and off board).

However, aspects of smartphone technology appear in android appliances and smart-TV fobs, Raspberry Pi and other SBC solutions, smartwatch technology, etc., and therefore a smartphone per se is not required. In order to provide a low cost system, a PIC microcontroller or other low-cost microcontroller may be employed, which may include various peripheral devices. Arduino control may also be used. In general, Arduino systems provide lower-level control over hardware, and facilitate deterministic real-time (RT) control, either without an operating system (OS), or a lightweight RT-OS such as FreeRTOS www.freertos.org/. On the other hand, the modularity and expandability of an interrupt driven operating system such as Linux, per the Raspberry Pi platform. Intermediate OS are available, such as RTLinux en.wikipedia.org/wiki/RTLinux, and Real Time Linux en.wikipedia.org/wiki/Real-Time Linux, PREEMPT-RT, www.linux.com/news/event/elce/2017/2/inside-real-time-linux.

Remote Control

According to a third aspect of the technology, a remote control is employed. For example, the disk may have Bluetooth 4.0 communication capability, providing >100 meter range, which approximates the maximum distance the disk can normally be thrown during normal use. This permits an automated device, such as a smartphone or tablet computing device, to control the disk dynamically. Sensors on the disk may telemeter back to the remote control device. Advantageously, the remote control is implemented as a software application ("app") on a programmable control device (e.g., smartphone), and therefore the rules of the game to be played are not static or embedded within the disk when manufactured. The control device may also be a smartwatch or other wearable technology. The controller of the system may support communications using TCP/IPV4 and IPV6, ZigBee, IEEE-80215.4 (see, en.wikipedia.org/wiki/IEEE_80215.4), and thus qualify as a node of the "Internet of Things" (IoT). Further, the controller preferably supports mobile ad hoc/mesh network protocol communications. The system may employ a SIMD processor (e.g., GPU technology) to facilitate mathematical modeling and flight dynamics control. For example, when the disk is steered, there will often be a transient response different than the desired end response. Preferably, this transient response is modeled and predicted before execution, to ensure that the device remains within a desired flight envelope.

The controller preferably comprises a microcontroller to control flightpath, such as a low power Arduino, with infrared receiver and Bluetooth 4.0 (or above) interface, e.g., IEEE-80215.1. Other suitable protocols may include Zigbee IEEE-802.11.4, IEEE-802.11.6, Zwave, IEEE-802.15.3a (UWB), mesh network IEEE-802.15.5, WiMedia, etc. The processor that operates the device may be a system-on-a-chip device, similar to that employed in WiFi routers, and indeed components of a Wifi radio may be repurposed for the radio functions of the disk. Advantageously, the Wifi radio remains operational and compliant with 802.11b/g/n/s/ac/ad/x/etc., or other IEEE-802.11 protocols, and therefore permits communication with a base station controller or nodes of an ad hoc network. The base station may be used to control higher levels of the game play, such as team management, scoring, rules implementation, timing, etc. The base station may be, for example, a smartphone that accepts downloadable applications, and the game itself may be controlled by such an "app". The disk may also be controlled by a remote server, through a cloud-based system, or the like, either through direct communications with the disk, or relayed through the base station/smartphone.

The disk may include local intelligence, be part of a distributed intelligent system, or act as a slave to a remote intelligent controller. The tradeoff is typically to minimize the power drain in the disk, including actuator, telecommunications, and intelligent processing, though the minimization need not be strict. In some cases, a plurality of disks may simultaneously be present, and communicate with each other, for example using a mobile ad hoc networking (MANET) technology. Alternately, all communications may pass through a base station or other infrastructure.

Distributed Control

According to another embodiment, the disk is subject to distributed control by a plurality of agents, which may be smartphones. In this case, the control logic is negotiated between, or as a compromise or result, of the logic in the plurality of controllers. This distributed control may employ a low complexity blockchain or distributed ledger, to coordinate the distributed control with authentication and permissions. For example, in a competitive team sport, each team may have various players, which take turns controlling the device. In some cases, a plurality of projectiles are interactive with each other, and the players. Each player needs to be authenticated, and the level of control managed in a distributed manner. Since this is a game and "toy", and risks generally low, very high levels of security may be unwarranted. However, basic levels of security may advantageously employ blockchain or distributed ledger technology. For example, smartphones, routers, or other local electronic devices may provide a distributed database and block validation/"mining" functions. Further, transactional elements of known blockchain systems may be employed as part of the game. For example, the game may provide that each player must expend a token in order to exert a control operation over the toy. The tokens, in turn, are generated by or within the context of a distributed ledger system. Tokens are either consumed upon use, or expire based on time, or some combination, to ensure a stable economy with a set amount of currency. Alternately, during the game, the currency supply may increase or decrease. Indeed, the tokens themselves may be part of the scoring of the game, with the amount of currency accumulated representative of a score between players or teams that may be compared. Because distributed scoring requires trust, this is a reasonable application of blockchain technology.

Game Control

The projectile and the associated infrastructure may be provided with sufficient sensors to operate as an automated referee system, with respect to the major rules of the game. That is, such issues as possession, in or out of bounds, scoring, and delay are automatically determined, and a user interface provided to enunciate the findings. Some aspects require use of internal sensors in the projectile, but others may employ smartphone cameras surrounding the game play.

According to one embodiment, the rules of the game are embodied in a "smart contract" implemented through a distributed trust architecture. For example, each team has 3-12 players, and each player has a smart device, such as a phone, watch, or the like. The aim of the game is to progress the Frisbee toward a goal, which may be and end zone or region at the edge of the field of play. A team scores a point when the Frisbee reaches the target goal for that team. A player on the team in possession of the Frisbee has access to control the flightpath of the Frisbee. The team in possession is the last team having a player which touched the Frisbee. A player is limited in the number of steps he or she may take while holding the disk, e.g., may take only 3 steps, and must release the disk within a time period, which may be constant, adaptive, or context-dependent, and is, e.g., 10 seconds. Substitutions of players are permitted while the disk is not in flight. The game also has rules regarding game play boundaries, fouls, legal and illegal launches of the disk, etc. To the extent possible, the rules are self-policing, based on sensors in the disk, smart devices on the players, cameras disposed around the field of play, and/or sensors. For example, a set of distributed sensors may be provided to monitor player contact, illegal plays, etc. For examples, players may wear helmets having various inertial guidance and navigational sensors (video cameras, 3-axis accelerometer, 3-axis magnetometer, 3-axis gyroscope, barometer, near field communication device for communicating with disk, other players, and smart device, heads-up display, stereo headphones, microphone, GPS/Glonass, proximity and ambient sensors (optical, ultrasonic, laser/holographic), Bluetooth, WiFi (e.g., IEEE-80211ac MU-MIMO), gesture sensing and/or depth-based gesture sensing; physiological sensors, AR/VR/MR display, etc. The smart device may be integrated into the helmet Versions of the sport which have varying levels of physical contact may be implemented. One set of embodiments provides a Radar implementation, to track player, disk, and environment. The Radar sensors may be distributed, implemented in various smart devices, provided within the game play disk, or provided as a separate unit.

The game rules, and parameters selected by the teams, become part of or a basis for a smart contract, which is automatically implemented to the extent feasible by the automated elements. The steering of the disk, and control over steering of the disk, are of course generally novel features that can be added in each case.

It is noted that, in some cases, the control over steering is not by active players, but rather by coaches or others on the game sidelines. Further, the disk may have various control paradigms, which may be limited or controlled according to game rules. For example, the disk may have features which control lift and actively control flying height. This feature may be disabled in certain game play. Further, in some games, active issuance of control commends during disk flight is prohibited. In further examples, the disk is programmed to assume a straight or predetermined path after launch, and therefore the player launching the disk is denied uncorrected manual control. For example, the disk may have a feedback control to assume a straight level flightpath until touchdown. Therefore, players on both teams may plan for the disk dynamics, without full knowledge of the launch conditions.

In other cases, the disk provides random variation in flightpath, and therefore adds unpredictability to game play.

Embedded Processor

Not all embodiments are computerized, and some employ a microprocessor to perform real-time control, and not "intelligent" interaction. However, in other cases, the projectile employs a microprocessor which is both capable of, and implemented to perform, intelligent control algorithms, for example, responsive to users/players, the environment, and context. The control system for the disk may this include a microprocessor, which may be a low power 8- or 16-bit microcontroller, though more capable processors can also be employed, such as 32 or 64 bit ARM processors or IA-x64 processors. For programmability, battery charging, etc., a USB port may be provided. While USB 3.0 and 3.1 are available, USB 20 is lower power, and provides sufficient data rates for most uses. A radio is typically provided, which is preferably a Bluetooth 3.0 or 4 (long range), and may also include 802.11a/b/g/n/ac/ad, etc. The microcontroller may be of an Arduino or Raspberry Pi type system. A GPU may be used, for example to provide acceleration to guidance and control processing, blockchain/distributed ledger processing, image input processing, display processing, etc. For example, the Frisbee may have one or more linear arrays of laser diodes or LEDs, which generate a scanned image as the disk spins. The image may be projected onto a vertical or horizontal surface. The radio transceiver may also include radar functionality, either intrinsic to the communications emissions and receptions, or as an additional transceiver.

Actuator.

Flight control may be effected by changes in the gyroscopically stabilized axis, or changes that do not alter the gyroscopically stabilized axis. In general, the difference is whether the force supplied is associated with a torque against the axis, or is orthogonal to the axis. When the gyroscopic axis is dynamically altered from a stable flight axis, it should be restored after intended effect of the alteration is achieved. This requires extended control inputs, and during dynamic changes, the projectile may be in an unstable flight mode. On the other hand, the range of orthogonal forces is limited to a plane normal to the axis of rotation, a line corresponding to the axis of rotation, and the speed of rotation. The types of actuators available include fans, compressed/combustible gas thrusters, aerodynamic lift surfaces, drag surfaces, pressure differential shunts, inertial masses redistributors, and the like. In each case, these should be synchronized with the rotation of the projectile, and thus require high speed actuation and deactuation. In one embodiment, rotation of the disk is induced by a fan; e.g., the disk rotates in response to a force against the relatively stationary surrounding air. Therefore, absent dissipation, the rotational speed of the disk will increase over time (or with opposite spin, decrease). This consumes power, which must be supplied by batteries or another self-contained power source. However, this permits a higher degree of dynamic control over the disk flight path.

A preferred embodiment employs a motor which is driven in a phase-locked relationship with the rotation of the projectile, and is thus capable of maintaining a near stationary external reference. Preferably, the phase lead or lag controls a steering force, and therefore the responsivity of the actuator need respond to control inputs at a modest rate, for example within 0.5-1 second. This is on contrast to position control, which would require response at the rate of projectile spin, e.g., up to 2500 RPM for a Frisbee, higher for some other projectiles.

One embodiment provides an actuator which deploys an aerodynamic feature in rotation-angle-responsive manner. For example, the outer edge of the Frisbee may have a reinforced band, covering a set of plungers. At any given time, one plunger is extended, and all plungers may be connected to a single mechanical control (to provide a constant effective circumference). Under neutral steering control, the extended plunger may be maintained at the rear or a mode provided in which none is extended. Left and right steering result from advancing or retarding the extended plunger. Since the plunger extension is generally synchronized with the rotational speed, a rotational servo motor or stepping motor may be provided to control the plunger. The plunger power need not be high, and an internal frictional, hydrodynamic or magnetohydrodynamic clutch, for example, can isolate a low power motor, such as a pager-type motor, from external stresses. Instead of a plunger, a set of inflatable or fillable bladders may be provided. Further, the outer edge of the disk may be rotationally separated from the center, with either center or periphery having a steering element. During launch, the two may be rotationally fixed, or the center actively maintained without significant spin. The net result of the plunger acting inside the band will be to debalance and de-symmetricize the disk, thus resulting in a steering force. The actuator may control a mass distribution, which may be used to incline the upper surface, leading to a lift vector different from normal.

In other cases, a manual pump may compress a reservoir prior to flight to provide compressed air for a subsequent flight. This type of control system is suitable, for example, in a game wherein prior to propelling the projectile, the player squeezes or pumps the device to provide power for that respective play of the game. Indeed, the amount of pumping or squeezing may be a relevant strategic parameter of the game (e.g., pumping delay vs. stored power, loss of power possibly unexpected by opponent). A player can also hold a compressed gas ($CO_2$) cylinder, or this may be provided within the disk. The disk may have a hollow space which acts as a reservoir, or a set of expandable bladders to store the compressed gas.

A pulse jet arrangement may be employed. A pressure accumulator is provided within a space in the disk. The release valves are provided circumferentially around the edge, for example, spaced at 90°. A sensitive pressure balanced pilot valve is also provided spaced at 90°. (Note that, at a minimum, one pilot valve and two release valves are required, and radial symmetry is not required). As the pilot valve senses that it is at the leading edge of the Frisbee, it releases a burst of air from the accumulator through either a right side or left side release valve, to thereby steer the disk. While selection of right or left may require an electronic control, and reset of the pilot valve may employ an electrical solenoid, substantial portions of the remaining system may operate without electrical power. According this embodiment, a set of control orifices are provided to direct passive air flow, and which have a mode in which a compressed gas is exhausted to clear the orifices of debris before use. In this case, the orifices should be small enough that the available compressed gas can generate sufficient force under partial blockage conditions to effectively clear the passage.

According to a further embodiment, the flight control surface on a Frisbee (rotating disk) is an aerodynamic bulge which controllably extends from the upper surface, and the Frisbee has three such bulges spaced at 120°, controlled according to rotational axis of the disk. In an alternate embodiment, the disk has a set of slots between the upper and lower surfaces which have controlled opening as a function of rotational angle.

Control Paradigm.

In a rotating disk (Frisbee), the projectile is launched with kinetic energy (forward motion $\frac{1}{2} mv^2$), rotational energy ($\frac{1}{2} Iw^2$), and potential energy (height mgh). The greatest opportunity to harness energy is often at the outer edge, which has the highest linear velocity.

The Aerobie® is a disk craft which has advantages over the Frisbee®. The Aerobie has a central aperture, a thin vertical cross section, and aerodynamically optimized edges. As a result, for the same mass, it has a higher moment of inertia, less drag, and more stable flight path. According to one embodiment of the present technology, the edges of the disk craft have a nominal cross section similar to an Aerobie, or have similar functional design principles, but also include control features.

Changes in mass distribution may be achieved by providing a counter-rotating element within the disk that moves synchronized with rotation, e.g., remains stationary with respect to the ground, and thus can servo the mass asymmetry to a desired angular position. Preferably, there are a plurality of eccentric masses that can balance, to achieve neutral mass asymmetry, or imbalance, to provide a net mass asymmetry. In an electronic system, the mass may be the battery and/or circuit board, thus minimizing the penalty for these additional components beyond a passive system. Control of direction of flight can be achieved by changing the inclination angle, left-right lift asymmetry, left-right drag asymmetry, or left-right mass asymmetry, for example. Changes in the angle of attack during flight can generally come from changes in the lift, drag or weight distributions, though it may be possible to effectively change the angle of attack with some independence, such as by an active thruster (rotationally synchronized puff of compressed gas). Note that the angle of attack is represented in two dimensions, x and y, with respect to z, especially where the disk is being steered.

Steering of the projectile requires an asymmetric force, either to translate the disk movement or to induce a torque on the disk to alter the gyroscopically stabilized axis. Three distinct mechanisms are available. First, a lateral force can displace the disk in the horizontal plane. Second, a drag on one lateral edge of the disk will cause the disk to steer toward that edge. Third, a force that alters the axis of rotation of the disk will induce a torque. For example, as the angle of attack (pitch) of the rotating disk changes, it will tend to veer left or right. A disturbance that alters the roll of the disk changes, the angle of attack will change. Since the disk is rotating, the yaw is not a fruitful flight path control parameter, except to the extent one wishes to control the gyroscopic effects by altering yaw rate. The system may employ minimalistic aerodynamic control, or independent or partially redundant controls to effect different types of maneuvers. The flight control may be effected in various ways. In one embodiment, a set of ailerons are provided on the upper surface of the Frisbee. In another embodiment, a set of holes are provided about the periphery of the Disk, e.g., 16 holes, and a disk overlying or underlying the 16 holes, with e.g., 15 holes, is rotated in synchrony with the rotation of the Disk. This provides an air leakage path through one side of the Disk during flight. This disk may also create a mass imbalance. In a further embodiment, a gas is released through orifices on the projectile, e.g. top and peripheral edges of the disk. The gas may be stored or generated in the disk, or represent a flow from one portion of the disk to another. Microvalves or external pressure triggered valves may be used to control the release. A chemical or combustion process may also be used to generate the gas flows or pressure.

Guidance Control

Guidance may be based on two general types of inputs-command and control, and landmarks. Landmarks may be located visually, using a camera and pattern recognition software, or through radio-frequency identification/direction finding, with emitters, receivers, and/or retroreflectors of a high frequency RF signal, e.g. >1 GHZ, preferably 2-6 GHz, which permit efficient direction-finding or ranging. While GPS technology might also be employed, it is not necessary, is generally power hungry, and may have long latency to positional fix. The spinning disk may include antennas which angularly direction-find with respect to the landmarks. In a simple embodiment, the disk is steered toward the landmark while maintaining level flight or a set altitude (relative or absolute). The inclination of the disk may be determined with an accelerometer, level gage, angle sensor, radar height gage, or the like. Signals from two or more antennas located eccentrically from the center of the disk are compared or differenced to determine the maximum and/or minimum values, representing alignment and quadrature to an emissive source of the signal. According to one embodiment, the signal is reflected from an RFID tag, and the source of the signal is within the disk. This permits measurement of range as well, and an encoded identification of the RFID tag. The X-Cyte acoustic wave RFID technology might be used for this purpose. U.S. Pat. Nos. 6,611,224; 6,531,957; 6,114,971; 6,107,910; and 6,060,815. For example, the disk emits an omnidirectional radio frequency signal at 900-25 GHZ which is modulated with a pseudorandom modulation sequence which is unique over its length. The time delay for the modulated emission to return is indicative of distance, while the antenna orientation indicates angular displacement. The direction of flight may be determined by triangulating from two or more tags, which may be presumed to be quasi-motionless with respect to the rotational speed of the disk. Therefore, as the disk translates through space, the distance to the tags will change, and the relative motion to each computed. Since the disk has a single translational vector, the sequential triangulation will yield a direction of movement. The same omnidirectional radio frequency signal can be used to detect a distance from ground, though indoors, a floor-ceiling and possibly wall ambiguity will exist. However, since the floor and ceiling are typically parallel, the ambiguity will have limited effect on the maintenance of level flight.

Disk Game

The disk is launched by translating and twisting the disk along its axis of symmetry. This imparts significant angular momentum to the disk. Advantageously, thus angular momentum may be converted to altitude by aerodynamically drawing energy from the spin and converting it to lift. More complex conversion converts angular momentum into translational velocity. For example, if the edge of the disk is shaped to draw air into the disk, that air can be selectively vented above or below the disk by louvers. Similarly, if the disk is formed with one or more "thrusters", the compressed air from the edge can be vented through the thruster when it is facing the correct direction. This will result in a pulsatile increase or decrease in translational velocity. If angled to coincide with the edge surface, then the rotation rate may be altered. More thrusters will lead to less pulsatile operation, but greater device complexity.

The translational velocity can also be converted to angular momentum, but this is relatively less interesting, except as a braking mechanism, since the angular momentum represents useful stored energy, while the translational energy is typically part of the functional utility and is less readily modulated.

As the disk rotates, the outer rim sweeps past the air at a high speed. This speed may be translated to a pressure within a conduit by an asymmetric aperture. This provides a simple translation the rotational energy of the disk into energy for altering the flight path. Further, the apertures may be modulated in dependence on rotational angle, and thus provide a direct influence on the flight path.

For example, the disk is provided with at least one port situated about its periphery. Preferably, a plurality of ports are provided, and the forces applied are dynamically balanced. The ports are designed to pressurize when the disk rotates, and feed into a common plenum. The plenum, in turn, feeds at least one duct, through a valve or control structure. The valve or control structure is synchronized with the rotation of the disk, for example by a magnetometer, and vents to an eccentrically located port on a top surface of the disk. As the compressed air vents through the top, it selectively alters the aerodynamics of the disk, synchronized with the rotation, which will tend to steer the disk. While the drag on the disk will tend to slow rotation, the drag may be relatively small. Further, if no steering force is required, the plenum may remain pressurized without bleed, which will reduce the drag as compared to the drag when the plenum is bled through the control orifice.

For example, six inlet ports are provided, three designed to operate in each direction of rotation. An inertial switch determines which set of ports is active at any given time, based on the initial torque in a given flight. A plenum is provided about the periphery of the disk, connected to the inlet ports and through a set of valves to the outlet ports. The valves may be micropower magnetically operated blades disposed in the air path. A parasitic electrical generator may be provided which generates a current based on a difference in rotation between an inertial mass (which may be a magnet), and the spinning disk (which may have pickup coils). Alternately, a battery or supercapacitor, for example, supplies power.

According to another embodiment, the disk has a set of radial channels (preferably closed conduits, but may be open), and the spinning of the disk causes a centrifugal pressurization of the channels. One or more control structures, e.g., vanes, selectively control the flow through the channels synchronized with the rotation of the disk. The channels may be tapered inwardly, resulting in a narrowing of the flow path toward the periphery. For example, the disk is divided into thirds or quadrants, with the vane located near the peripheral edge, internal to the disk, which minimizes its size.

Alternately, a pneumatic positioning system is possible, drawing air from either a fan/blower, or from peripheral ports which pressurize during disk spinning. In this case, the microcontroller modulates flow or flow path, and can be effectuated by electromagnetic, piezoelectric, memory metal, or other actuators.

A further method of steering is to provide one or more selectively aerodynamic regions on the disk, which activate and deactivate as the disk spins. For example, an independently rotatable steering disk may be provided on a top surface of the main disk. As the main disk rotates, the steering disk remains relatively stable in absolute rotational position. The steering disk may have a center position which provides no steering force, and may deviate left and right from the center position to impart a force. For example, a tail fin can extend upward from the steering disk. In general, this steering mechanism does not incline the main disk, but maintaining a desired rotational position on the main disk will require either braking the main disk rotation or actively speeding up the rotation. Further, where the disk is provided as part of a game, the tailfin may represent a fragile structure. Alternately, the steering disk may have an asymmetric bulge or ridge, which when passing through air generates lift. The bulge, ridge, or tailfin is maintained by a motor on the lateral side of the rotating disk away from the direction of the desired turn, or centrally (e.g., in the rear) for neutral steering. The bulge would be less fragile than the tailfin, which requires continuous energy input during operation, including neutral steering; however, the bulge may also have a retracted position, in which case the steering motor can be deactivated, and the steering disk spin up to the rotting disk speed by friction during neutral steering periods.

The rotating disk may also be provided with a fan or blower, for example centrally mounted within the disk, and generally drawing air from one or more apertures on top of the rotating disk, although air may also be drawn from the space beneath the disk or from a set of selectively controllable inlet ports. A fan is typically unidirectional, though a centrifugal blower might have alternative direction operation in either spin direction, e.g., with a pair of exhaust ports. The air drawn from above will tend to generate lift for the rotating disk, by increasing the pressure differential above and below, and thus would tend to increase altitude. Further, the fan or blower could also be controlled to reduce lift, and thus provide bidirectional altitude control. The exhaust from the fan or blower is used to steer the rotating disk by directing the exhaust synchronized with rotational angle of the rotating disk.

For example, the exhaust could be provided through one or more controlled ports on top, peripherally, or below the rotating disk. According to one embodiment, the rotating risk has a set of radial channels, leading to ports on the bottom edge of the rotating disk/Frisbee. A rotating valve structure within the central mechanism that includes the fan/blower controls which subset, e.g. a quadrant, third, half, two-third, or all, receives the air flow. (In another embodiment, the fan/blower may receive inlet air from the remaining ports, instead of from above the disk). The exhaust air tends to lift the lip of the rotating disk, and this provides a steering input by deflecting the attitude of the rotating disk.

For example, if the disk spins at up to 10 times per second (600 RPM), and the desired precision of control is 30° ($2\pi/12$), then the controller would be required to adjust the steering at up to 120 times per second. If a counter-rotating mechanism within the rotating disk is desired, the counter-rotation speed would range from 1-12 Hz, making a stepper motor architecture feasible. For example, the rotating disk may have a series of alternating pole magnets which rotate with the disk. A pair of coils controlled by the microcontroller define an advance or retard torque, allowing the stator to change position with respect to the rotor. Alternately, a gearmotor may be provided to control the relative positions. An ungeared electric motor is also possible.

Shutoff.

The control system preferably has inputs for one or more sensors to detect human contact or end of play, and to shut down any active guidance system activity. This saves power, and also reduces risk of injury from any moving parts.

The sensor may be, for example, an accelerometer, physical contact sensor, proximity sensor, feedback from actuator (e.g., stall current), etc. The sensors may be provided and/or used for other purposes within the system.

Fan.

According to one embodiment, a centrifugal fan (e.g., run by a brushless DC electrical motor) is provided coaxial with the center of the disk. The fan acts with reference to the disk body, and thus rotates with or against the rotation of the disk. The intake (inner side of fan) may be fed by upper and lower inlets, which are controlled by electronically controllable louvers. When the upper louver is open the disk will tend to rise, while when the lower louver is open, it will tend to fall. Both can be open, for generally neutral flight and decreased air flow resistance.

The fan produces a pressure differential between the inside of a rotating drum and the outside. The outside of the drum is within a chamber, with the exhaust to the external environment controlled by a set of flaps, or directed by rotating shell around the periphery of the fan, that select the direction of exhaust with respect to angular rotation of the disk. The rotating cylindrical shell is rotated to selectively block and open exhaust ports about the periphery of the disk, which may be directed laterally or downward. Indeed, in another embodiment, the intake and exhaust are both directed by the shell, the shell having upper and lower apertures, to draw intake from one eccentric location and push exhaust from an opposite eccentric location, to provide a translational force or torque on the rotational axis. Typically, the intake is from above, and the exhaust to below, in order to provide lift and increase flight time. The fan may be coupled to an actuatable air drag element, which when deployed, permits the fan to control the rotational speed of the disk during flight. The body of the disk may have a set of apertures, and the cylinder has a single exhaust aperture which is rotated within the body, to obscure or open an air flow path. In such an embodiment, the shell is controlled to generally counter-rotate with respect to the disk, and thus remain relatively stationary. The cylinder may be driven by a servomotor arrangement. In operation, the rotating cylinder will have a counter-rotation with respect to the disk, and thus the active outlet directions will be relatively unchanging. As the cylinder speed is increased or decreased, the active conduit direction will progress or regress, changing the direction of the torque or translation on the disk. Typically, steering is maximized by having the exhaust directed outward at the left and/or right edges of the disk. Altitude can be controlled by applying the torque at the front and/or rear of the disk, to change the angle of attack (pitch) and permitting aerodynamic effects to generate or reduce lift.

In some cases, it may be desired to have a system that electrically spins the Disk, in addition to steering it. In this case, a reaction wheel is provided under or within the Disk, which causes the upper shell to spin in an opposite direction. This can be configured to generate lift, and thus maintain the Disk aloft for an extended period. Likewise, if properly controlled, this allows the Disk to hover, though in a typical scenario, the player imparts a forward momentum to the Disk. If the outer shell of the disk has sufficient rotational drag, it will remain nearly stationary with respect to ground, and thus may assume a non-radially symmetric profile, i.e., a gyroscopically stabilized craft. Such a craft may have traditional airplane aerodynamic controls.

If it is desired to have a disk which has a fan, but does not have a counter-rotating mass, a pair (or other even number) of counter-rotating fan wheels may be provided diametrically opposed. A variant of this design is a pair of meshed gears or wheels, which form a gear-pump, that moves air from one side of the pair to the other. In a pneumatic application, the unmeshed portions of the gear have slats which seal against an outer shell, to provide increased air flow with respect to a gear per se. The pair of gears are provided on an independently rotatable platform within the disk, and served to position such that the inlet and outlet are directed in desired directions to impart a force on the disk. An arrangement without the rotating platform is possible. In that case, the rotation of the gears is controlled to occur only when the disk is aligned with the direction of the desired force. If the pump is bidirectional, it may be operated twice per rotation.

A plurality of sets of gears may be provided. For example, four pairs. In that case, a central intake may be provided, with the pumps controlled to push air synchronized with the angular rotation. In such a system, simple fans or centrifugal blowers may also be employed, preferably with diametrically opposed fans counter-rotating with respect to each other.

One advantage of a gear pump is that relatively higher pressures may be created as compared to a fan, facilitating an accumulator which is maintained in a pressurized state, and the venting from the accumulator is controlled in synchronization with rotational angle. One or more exhaust ports may be provided. The accumulator may be, for example, an elastic wall balloon structure beneath the disk.
Aerodynamic Control.

Pitch control requires a change in the gyroscopically stabilized axis. However, unlike lateral steering, after the pitch is adjusted, the changed state may be maintained; no later correction is required to ensure stability, unless the pitch itself is controlled to be outside of the stable flight envelope. The various ways to change pitch include an eccentric mass, an eccentric upward or downward force, asymmetric lift (front versus rear; on a rotating disk, this needs to be synchronized for angle of rotation), and, to a lesser extent, interactive effects from other control maneuvers. Roll is one of the main effects desired for steering the craft. As with pitch, the various ways to change pitch include an eccentric mass, an eccentric upward or downward force, asymmetric lift (left versus right, controlled for angle of rotation), and, to a lesser extent, interactive effects from other control maneuvers. Typically, steering is a transient effect, and after a steering correction, it would be desired to return to straight flight. Once a roll maneuver is executed (unless itself a correction), it is generally appropriate to exert an opposite maneuver to return to level flight.

In order to facilitate passive operation, the actuator may be a pair of controlled flaps that selectively opens to catch air into a membrane which then inflates, and is then allowed it to exhaust. In this case, the flaps are synchronized with rotational angle, and have relatively low pressure differential with respect to the upper surface. Because the air pressure is higher beneath the disk than above it, the air may be drawn from below and exhausted above. This produces negative lift, and therefore the aerodynamics of the craft should be adjusted to provide a greater nominal lift than required for a neutral flight path, since the lift may be reduced under control to achieve stability. If the flap is on the upper side, and directs flow downward, this creates lift. The flap may draw significant rotational energy, and thus adversely affect fight time. Alternately, an aileron may be deployed, with a vent through the surface.

A further alternate provides a slat which is controlled to move with respect to the surface of the disk to open or obscure an aperture. A flap over the aperture is provided having a pair of holes. If the aperture is open, the leading hole captures a flow of air, and inflates and directs air through the aperture. The trailing hole remains obscured. On the opposite side of the disk, the flap on the bottom side of the disk captures are on the leading side, and vents to the top. The result is a conversion of rotating energy into a change in rotational axis, i.e., rill or pitch. The slat may be moved by a solenoid, though a rotating motor may turn a cam disk to synchronize the slats.
Control of Center of Gravity According to one embodiment, a center of gravity of the projectile is controllable by the control system. This relocatable center of gravity can be controlled at the rotation rate, and therefore provide a stable torque acting on the axis of rotation with respect to the external frame of reference. This, torque, for example, may be used to alter the roll and pitch of the craft. In general, a screw-type or gear-type actuator with a servo or stepping motor is preferred, since this provides friction which would tend to keep the masses in a set location, and helps isolate the centrifugal forces from the actuator by a reduction gear ratio. Further, the screws or gears for the various masses may be mechanically linked, so that only a single actuator is required. In this case, the effect of the actuator is often to make the mass offset appear stationary or slowly moving. However, it is also possible to rapidly shift the external envelope of the object as a result of the repositioning of the radially repositionable masses.

An alternate implementation provides a fluid which is pumped between radially positioned reservoirs, to change the mass distribution. In some cases, a low viscosity fluid, such as methanol, is employed to increase time responsivity of the pump or other fluid redistribution system. In this case, it is possible to alter the center of gravity without altering the moment of inertia.

In one case, each reservoir is pre-pressurized before launch, and the actuator sequentially bleeds contents and pressure from the peripheral reservoirs to a central accumulator. In another case, the centrifugal force on the fluid is employed to pressurize the reservoirs, and which reservoir bleeds, under control of the control signal, to a more peripheral accumulator or set of accumulators. In each case, the moment of inertia is changed, in addition to its distribution. The fluids/pressures may be reset before the next launch. The valve structure may be a single rotating valve body that controls all fluid flows together, or individual valves may be provided. Alternate to fluids (which will have damping effects on the rotational dynamics), a set of masses may be connected to pretensioned springs, that are released by electronically or mechanically controlled elements (catches or ratchets, typically) as control energy is required. The springs are reset before flight.

In another embodiment, the inertial mass is a motor (and/or battery), which repositions itself on a rack or worm gear. This efficiently makes use of mass. Note that the movement need not be radial, and can also be circumferential. In the circumferential case, one or more motors drive mass(es) (which may be the motor itself) about a track within the projectile, e.g., flying disk. If there are two masses, they can be diametrically opposed (and stationary or non-stationary), and thus balanced, or near each other (and both moving to establish the desired dynamically controlled center of gravity), to create an imbalance. If the masses were imbalanced and stationary, the disk would wobble. In this case, the masses may be both radially and circumferentially repositionable.

Yaw/Angular Momentum.

It is also possible to speed up the rotation of the disk during flight, by converting potential energy (height) or kinetic energy into rotational energy to increase spin rate by dropping, one might employ rotating wings. To convert kinetic energy into rotational energy, one could provide eccentric drag on the upper surface of the disk at a radial location where the forward velocity is greater than the rotational velocity. Typically, the lateral edges have a rotational velocity greater than the forward velocity, so the radial position will be relatively inboard. This type of control would generally have to measure or estimate rotational velocity (and not merely angular position). Or, a motor may use chemical energy (battery or internal combustion) into rotation.

In addition, the moment of inertia may be controlled and altered, generally by a radially symmetric change in a radial offset of set of rotating inertial masses. By changing the moment of inertial, the angular speed may be controlled. In this case, the radial offset does not need to be controlled at the rate of rotation, though the moment of inertia and center of gravity controls may be integrated, which would require that speed of operation.

Aerodynamic Lift Control.

Lift can also be achieved by "active" means, e.g., rotating wing. That is, the rotational energy of the disk may be converted to lift by modifying the amount of air pushed down by the disk during flight. In a disk without apertures, this might require deployable/modifiable structures at the peripheral edge, while in a disk with apertures, the flow of air through these apertures may be controlled. Lift may also be controlled by altering the aerodynamic profile of the disk along the axis of flight, i.e., converting forward kinetic energy into lift. Typically, since lift operates along the axis of movement of the disk, asymmetry according to angle of rotation is not required; however, there may be advantage to selectively dynamically modifying the leading or trailing edge synchronized with rotational angle.

Lift is generally created by the flow of air over the upper and lower surfaces of the disk. An elongated path over the upper surface with respect to the lower leads to a greater flow velocity, and lower effective pressure above than below, via the Bernoulli principle. Lift can also be created by a rotating wing, e.g., rotating aerodynamic wings on the disk that generate lift from rotation. Lift can further be generated by a directed centrifugal fan effect, wherein radial air flow is directed downward for lift or upward for drop. A Magnus effect rotating drum, etc. on a horizontally disposed surface may be used to control lift.

Aerodynamic Drag Control.

Drag is readily increased by extending an apron down from the leading (and trailing) edge of the disk. Further, a roughened upper surface that increases turbulence can increase drag as well. Note that these modifications might have interaction with lift dynamics. While reduction in angular momentum is generally not desired, the peripheral surface may also be modified to provide laminar flow or turbulent flow, especially on the surface counter-rotating with respect to the flight forward axis. Depending on how this is implemented, a steering torque may also be imposed.

Typically, manipulation of drag as a main control parameter is ill-advised, unless the goal is to limit the flight distance. On the other hand, increasing drag can be accomplished in many ways, such as extending the height (y-axis) of the disk to displace more air, and changing the smoothness of the surface. The drag is influenced by turbulent flow around the disk, which is interrelated with aerodynamic lift, and thus changes in drag are often a necessary consequence of control parameters motivated for other purposes.

Game/Purpose.

When the projectile is used as part of a game, one mode of operation may provide a user with the ability to program a strategy into the projectile. The programming may be through an on-board user interface, or through a user smartphone or tablet, laptop or other computer, or a smartwatch. In the course of playing a physical game, use of computers, laptops, smartphones and tablets is cumbersome and difficult, while a local user interface within the projectile would add weight and complexity to a device which may suffer damage during use. Therefore, a smartwatch programming system is preferred as a virtual/remote interface for the projectile. Further, this allows multiple players to interact with the projectile, and thus effect "interception" (change of control) logic and game play. In some cases, the projectile is programmed with a game strategy before launch, while in others it can be controlled in flight.

The disk may have various uses. For example, a camera on the disk may be used to capture images over a terrain, and indeed to map the terrain. The images may be automatically rotated based on the angular position of the disk, to provide a normalized image stream. A camera or camera array which rotates with the disk may also be employed, with angle-based normalization. Other non-amusement applications may also be implemented.

According to one embodiment, the controller is employed to direct the disk toward a homing signal, or to steer away from a homing signal. In a game, the two teams may have players who emit different signals, or each player can emit a unique RFID, sonic or optical signal. The disk may have a directional antenna or sensor to detect the heading to a respective emitter. The disk can track multiple emitters, and plot a desired path. As part of the game, the limited steerability of the disk permits opposing players to intercept the disk in some cases.

According to a second aspect of the technology, the disk follows a flight path, which may be absolute or relative. For example, in a game, the thrower may wish to avoid an obstacle or opposing player.

In a game device, durability under shock, submersion, manipulation, and compression is generally desirable. Therefore, exposed portions of the disk need to be tough and non-injurious, while internal components need to be shock resistant. One preferred actuator technology is air flow, with passages provided within the disk that vent air from, for example, the center of the bottom of the disk, though modulated passages, to openings near the periphery in locations that result in generation of a torque about an axis other that the axis of rotation. The passages may have a flexible wall, which is modulated by an actuator outside the passage, thus providing immunity to moisture. The actuators are typically normally closed, and are periodically opened as the disk swings through a rotational sector. Another embodiment provides a counter-rotating element within the disk that drives the actuators, and which is controlled to spin near (but not necessarily at) the rotational speed of the disk. This later embodiment has the advantage of continuous rotational inertia and absence of reciprocation, and may therefore yield a lower power drive, than the pulsatile actuators of the former embodiment. The passages may be passively fed, or a fan/compressor may be provided to actively pump air from the top and/or bottom, or edge of the disk, to another portion to provide a steering torque.

The disk will therefore steer by controlling a perturbing torque on the disk until the target is aligned with the direction of translation of the disk. The altitude/pitch sensors will also guide the disk to avoid landing before the target is reached.

A translational force may also be provided to redirect the disk, without altering the axis of rotation.

In a more complex scheme, the disk is steered to avoid an obstacle/opponent. In this case, the obstacle/opponent is also detected by the radio frequency emission. In the case of an obstacle, a scanning radar may be implemented by a radial emission of RF waves from the disk, and a representation of distance from nearest object maintained. Any object in the path of the disk that is not the target may be deemed an obstacle. The disk, upon detection of the obstacle, effects an evasive maneuver, such as an arced path around the obstacle. Assuming the disk is involved in game play, and each player has an RFID tag, the disk can distinguish between teammates and opponents, and selectively avoid opponents. In the case of an opponent, one strategy involves flying over the opponent instead of around him, or other three dimensional maneuvers. The disk, if involved in game play, may also adopt a chaotic flight path, in order to increase the difficulty of the game.

One mode of operation of the control system is to optimize straight flight, rather than control a curved flight path. Thus, an errant launch may be compensated by the projectile.

In a Bluetooth communication network environment for game play, players may each have a Bluetooth headset/device, and thus control the game play using voice commands, e.g., relayed through a speech recognition device such as a smartphone or cloud computing resource. In a team environment, the network may distinguish between players on different teams.

In a remote control environment, local control system of the disk will determine rotational angle and receive control commands remotely to alter the forces applied to the disk synchronized to angle of rotation with respect to a reference. The reference may be fixed or mobile. The disk may also telemeter its own location, such as by GPS, assisted GPS, RF or sound triangulation (TDOA, etc.) or by other means. For example, if the control device is a smartphone, a camera in the phone may be used to provide positional feedback.

Players in the game may also have coded (e.g. RFID) bracelets, which are read by the control device directly or by an antenna on the disk, which allows feedback on positioning errors. For example, a player may wear a bracelet which indicates that the disk is intended for that player. The disk has an RFID transceiver (reader), that reads both the codes of the various RFID devices in the environment, as well the range and orientation of the Frisbee and its flight path from the target. The disk can then home in to the target. In the remote control case, the remote controller can retarget the disk in flight as desired. The players in that case become positional references, though their movement is within an order of magnitude of the movement speed of the disk itself, and must be taken into account.

According to one embodiment, magnetic field emissions/modulation in a near-field pattern is employed, which tends to have a shorter range and may provide additional information (e.g., orientation), with respect to far field pattern electromagnetic wave propagation.

In one embodiment, the projectile homes toward a beacon, which may change during flight.

In another embodiment, the projectile avoids or evades a beacon or object, which may change during flight.

In a further embodiment, the projectile follows a random or chaotic flight path.

In a still further embodiment, a remote control system transmits steering control commands to the projectile.

In another embodiment, a set of rules is programmed into a controller, and the projectile autonomously flies, according to the predetermined rules.

In a still further embodiment, the projectile corrects a flight pattern of the human launcher, that is, the control exerted during flight is to attain and maintain a desired trajectory in view of perturbations and errors in launch conditions, and not to alter the trajectory from that path defined at launch. Other flight paradigms are also possible.

In another mode of operation, the projectile assumes an unstable and/or unpredictable path. In such a case, the control system senses atmospheric disturbances, such as updrafts, turbulence, wind, and the like, and exploits opportunities for rapid steering corrections as a result. In order to detect atmospheric conditions, a highly sensitive barometer/pitot tube or array, a short range laser sensor, a microphone, or other sensor of air movement or energy dissipation may be provided. For example, a gust of wind may be exploited to rapidly gain height or speed.

The projectile may use various types of known guidance systems, including terrain following (e.g. as used in cruise missiles), GPS and/or triangulation or trilateralization, homing beacons, inertial guidance, magnetometers, etc. In a game played on an athletic field, often a set of line boundaries and zones are established by lines. A camera (rotationally compensated) can be used to guide the projectile with respect to the lines, for example to stay in-bounds, to drop at the goal line, or to aim at the goal. The camera can also spot players and distinguish between teams. The projectile may be programmed with a generic program, i.e., home in on closest player on controlling team, or specific programs such as fly to 50-yard line, turn left, and home in on a particular player, while avoiding defensive players on other team. The play logic and/or control may be internal, or provided through wireless communications, e.g., Bluetooth, Zigbee, Z-wave or WiFi.

In some cases, the projectile may become lost, such as in brush, a tree, on a roof or in a water hazard. The projectile may have a sound alert to help find it (both in air and on ground), and may further have actuators to help in retrieval. For example, when landed on a roof, the projectile may assume a shape that helps it roll off, and avoid becoming trapped in gutter. The projectile in some cases may have and deploy an active lift system. In a tree, the projectile may assume a shape that avoids convex surfaces, and provides a force to help free it from branches. In water, the projectile may deploy a float or balloon, and have an active propulsion system (e.g., air or water propeller) to return to shore. These features may be automatically sense the condition and deploy the countermeasure, or be remotely controlled by a human player.

In some cases, the disk may be launched by a mechanized launcher, rather than by human. For example, the launcher may recharge the battery, and then launch the projectile with an optimal velocity, angle, and spin, as well as create or relay the play to the control within the projectile.

The Frisbee preferably is adapted for use as an animal toy, e.g. for a dog. Since dogs use their teeth to catch Frisbees, the Frisbee must in this case be resilient against biting. Therefore, functional elements should be crust proof either based on elasticity or have a tough protective shell withstands bite forces.

Figure 2:
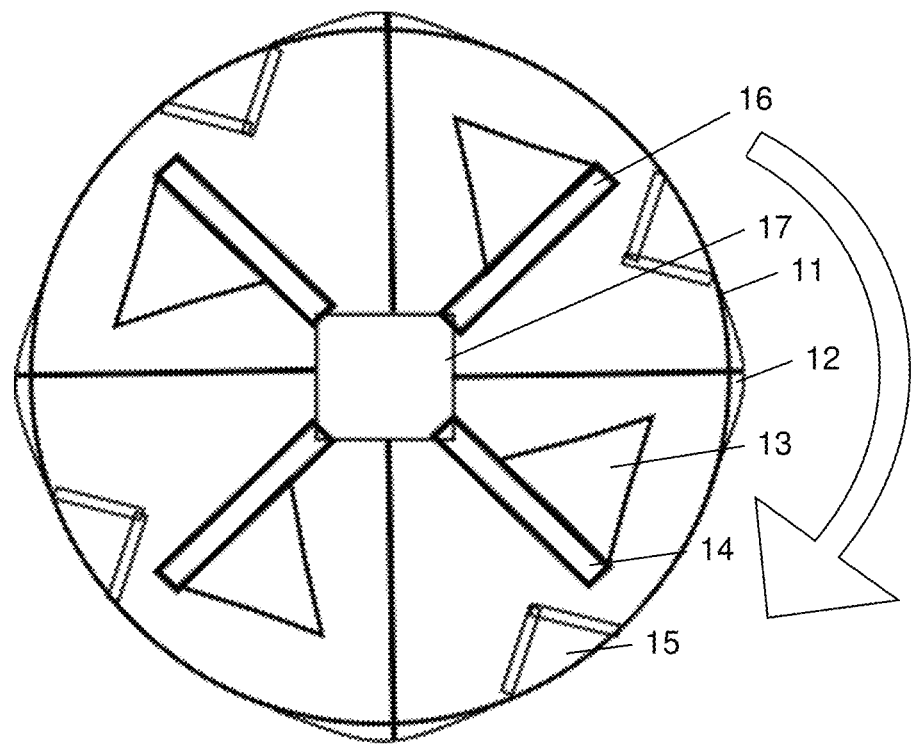
FIG. 2 shows schematic representation of a top view of a disk having three sets of actuators, driven in quadrature. A 1$^{st}$ set operates at a peripheral edge, and induces a Magnus force; a 2$^{nd}$ set provides protruding flaps from or into the plane of the upper surface of the disk; and a 3$^{rd}$ set provides apertures at or near the edge of the craft, with a set of baffles or valves to control flow through the passages.

FIG. 2 shows an embodiment of the invention which provides a flying disk 11, with a set of flaps 13 (e.g., two pairs of opposed flaps 13) which may be raised above the top surface of the disk 11, or returned to a flush position. A central control 17 actuates the flaps through axles 16, though an electronic device may be provided for each flap 13 peripherally. As a separate control scheme, as set of protrusions 12 may be provided at the outer edge of the disk 11, which selectively extend or retract to provide or modulate a Magnus effect. This embodiment also shows a controlled portal 15, which may be open or closed to air flow. In each case, the path may be from the top or edge of the disk, to the bottom space or one of the other portals 15. Therefore, there different and independent aerodynamic effects are available.

Figure 3A:
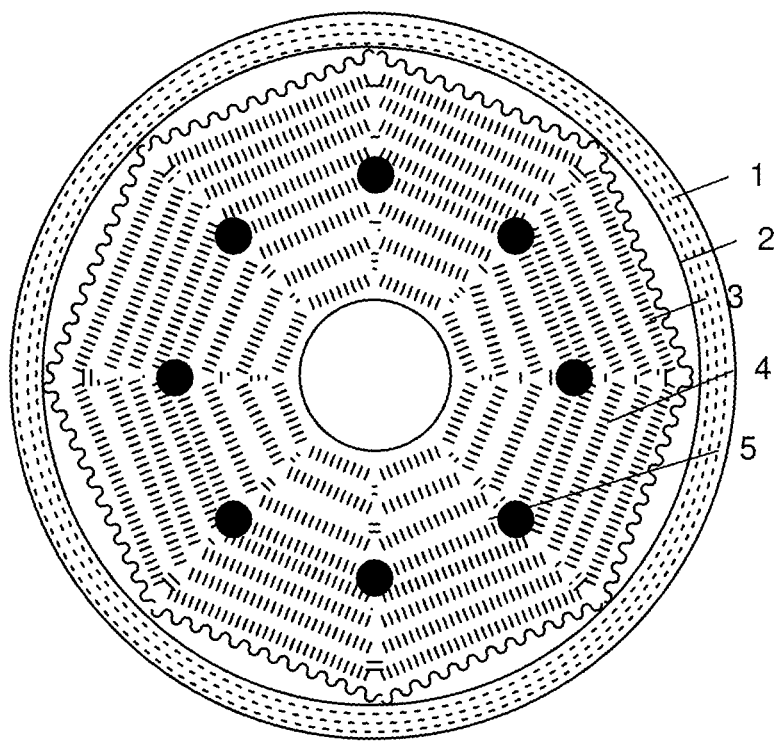
FIGS. 3A and 3B show the top and bottom views of an acoustically-actuated steerable disk.
Figure 3B:
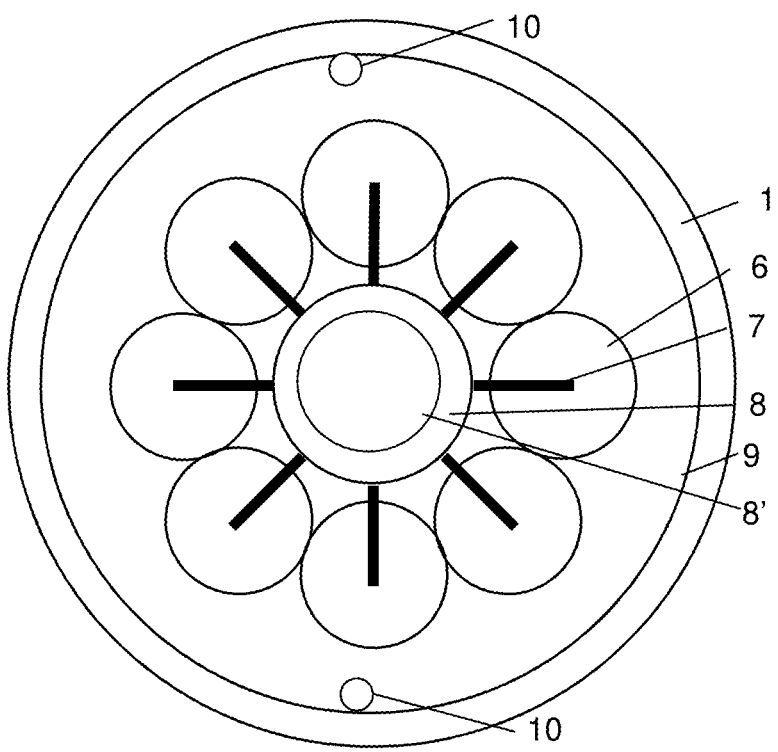

FIGS. 3A and 3B show a top view and bottom view respectively of an acoustically/sonically steered embodiment of a flying disk 1. A peripheral rim 9 is provided which is rotatable with respect to the inner portion of the risk, under power of bidirectional motors 10, which provide a controlled Magnus effect. The upper surface of the rim 9 is textured 2 to enhance this effect. A set of Helmholz resonators 6 (each having a piezoelectric bender and resonant chamber) provided under the top surface, with ports 5 on the top surface. Surrounding the ports are ridges 4 that have a spacing corresponding to a resonant frequency of the Helmholz resonator 6 at a nominal rotation rate of e.g., 10 Hz. Thus, at a resonant frequency of 2 kHz, the spacing of the ridges would be e.g., 0.03 radians, or about 200 ridges 4. At a distance of 5 inches from the center, this corresponds to a spacing of 0.157°. During flight, each resonator 6 may be sensed to determine coupling to the air flow above the aperture 5 by an analog-to-digital converter in the control 8, connected through wiring 7, and then driven to either reinforce the air vibration or suppress it, in dependence on the angular rotation of the disk 1. This requires control over the phase, frequency, and amplitude of the oscillations, and as the disk 1 turns, may require abrupt changes in state. An inertial guidance sensor may optionally be provided on a counter-rotating sub-platform 8', which is driven to provide a non-rotating frame of reference. This reduces the static load on the sensors, and allows use of less expensive devices.

Figure 4A:
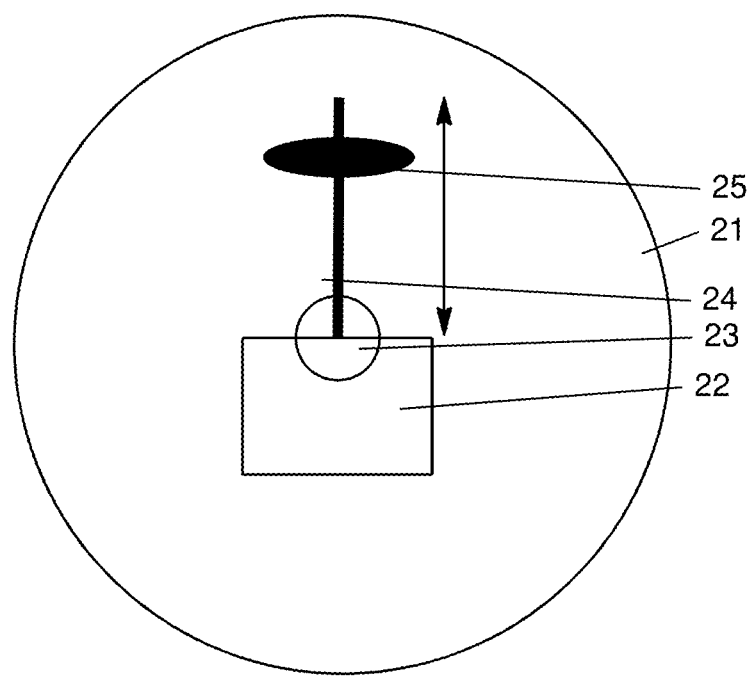
FIGS. 4A and 4B show two alternate bottom views of offset-mass steering embodiments.
Figure 4B:
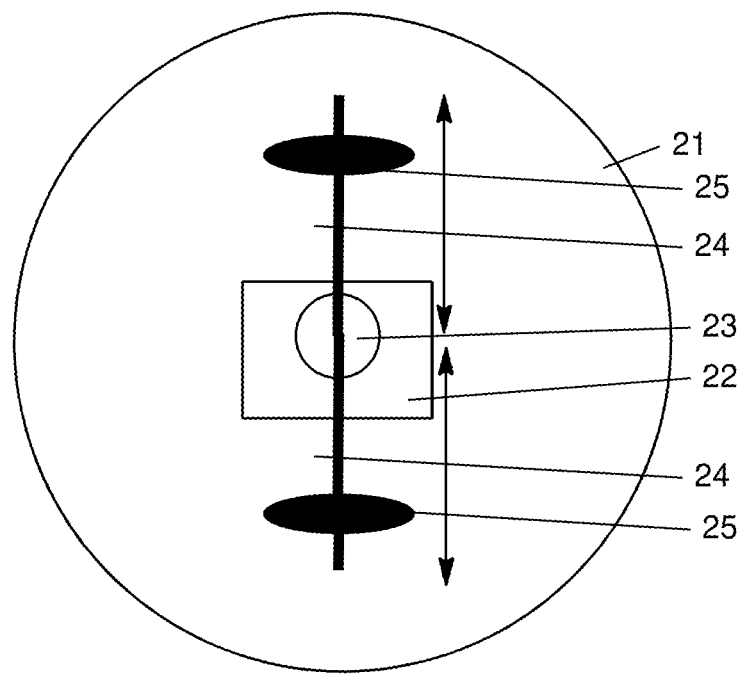

FIGS. 4A and 4B show two embodiments where the center of gravity of the disk 21 may be modified in flight, to control the angle of the disk 21 with respect to gravity, which, in turn permits steering through air. In FIG. 4A, a single actuator is provided, which is, for example, a mass 25 riding on a radially-oriented worm gear 24. The worm gear 24 and mass 25 are counter-rotated with respect to the shell of the disk 21, to remain largely non-rotating with respect to an external frame of reference, by motor 23. Control 22 drives the motor 23 to maintain the non-rotating state, and perturb that state to provide steering inputs. The eccentricity of the mass 25 is also controllable by rotating the worm gear 24 (which can be substituted with a band or other mechanical device), and preferably is able to assume a dynamically balanced state in which the center of gravity coincides with the axis of rotation, and therefore permitting the motor 23 to be turned off, which saves power. This state is also useful for launch of the disk 21, since the motor may not have the torque required to maintain counter-rotation during startup. FIG. 4B differs in that it has two controlled masses 25, which in turn permits a symmetric design. Having two masses permits control over the moment of inertia, and therefore can vary the spin rate of the disk in flight, to some extent.

Figure 5A:
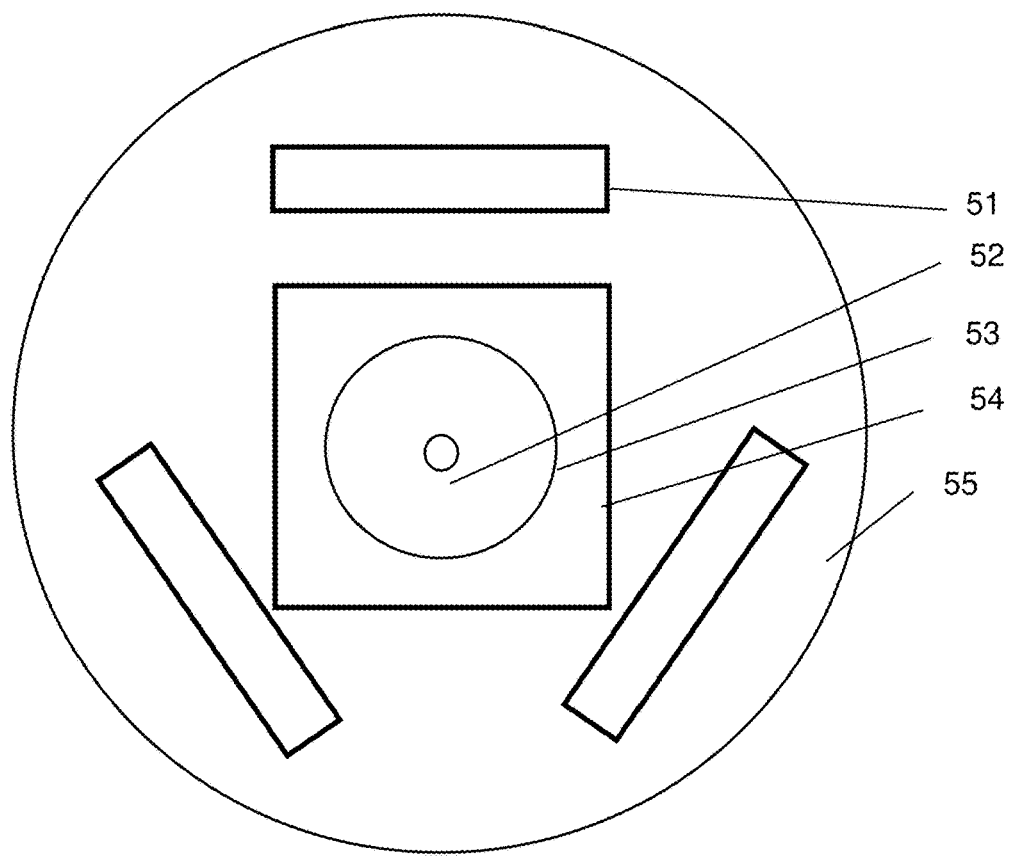
FIGS. 5A and 5B show two alternate embodiments which employ the Magnus effect for steering.

FIG. 5A shows a first embodiment which employs the Magnus effect for steering. A set of batteries 51 are provided in a radially symmetric arrangement to provide balance, and feed power to a control board 54. The control board 54 powers a motor 53 having rotor 52 which has a mass (not shown), which transfers angular momentum to and from the remainder of the projectile when it accelerates and decelerates. The edge of the disk is rough, and therefore induces the Magnus effect in conjunction with moving air surrounding the disk.

Figure 5B:
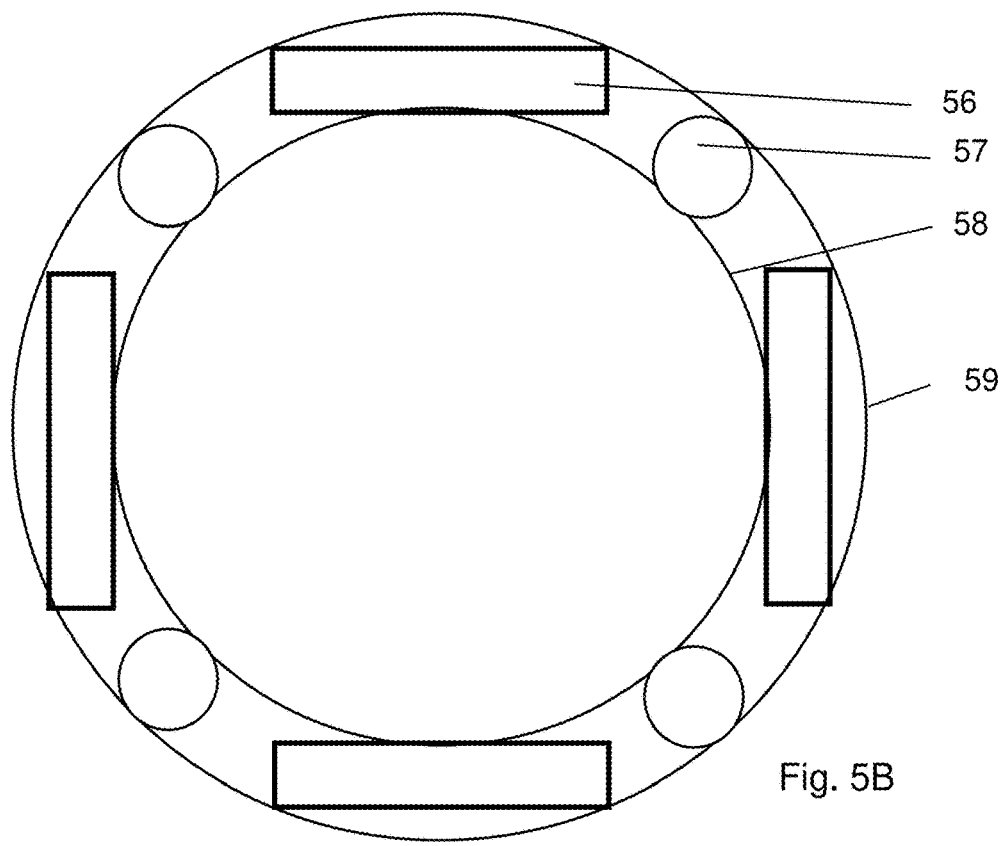

FIG. 5B shows a second embodiment which employs the Magnus effect for steering. A set of batteries 56 are provided in a radially symmetric arrangement to provide balance. One or more motors 57 are provided to drive planetary gears, which counter-rotate the shell 59 with respect to the subframe 58, transferring angular momentum to and from the remainder of the projectile when it accelerates and decelerates. The edge of the disk is rough, and therefore induces the Magnus effect in conjunction with moving air surrounding the disk.

A set of conduits with selectively bidirectionally controlled checkvalves may be defined that selectively connect a port at the edge with either a port to the right or left of it, e.g., displaced by 90 or 120°. A solenoid, piezoelectric element, or other actuator controls the flow to go inward, to the right or to the left, or neutral (a possible blocked or dithered state). Therefore, the actuator controls a steering thrust vector. The unidirectional flow of the check valve prevents the same conduit from defeating the thrust as it circles around. Since the leading edge has the highest pressure, and the trailing edge always has the lowest pressure, flows will always go from the leading edge to the side, or from the side to the trailing edge. Because of the binary and non-rotation angle dependent nature of the flows, all ports may be controlled by a common actuator, which itself may be a latching (zero quiescent power). According to one implementation, 6 conduits are provided, with each port connected to other ports spaced 120° apart. A solenoid actuator shunts flow left or right by determining the flow direction through each conduit, to the respective connected ports. In this case, the conduits are arranged as a pair of interlocking triangles (Star of David configuration), and the control blocks two of the flows at any time, providing 3 states. It is noted that separate conduits with fixed checkvalves may be provided for left and right steering, with a clamp provided to select which set of conduits is active.

Figure 6:
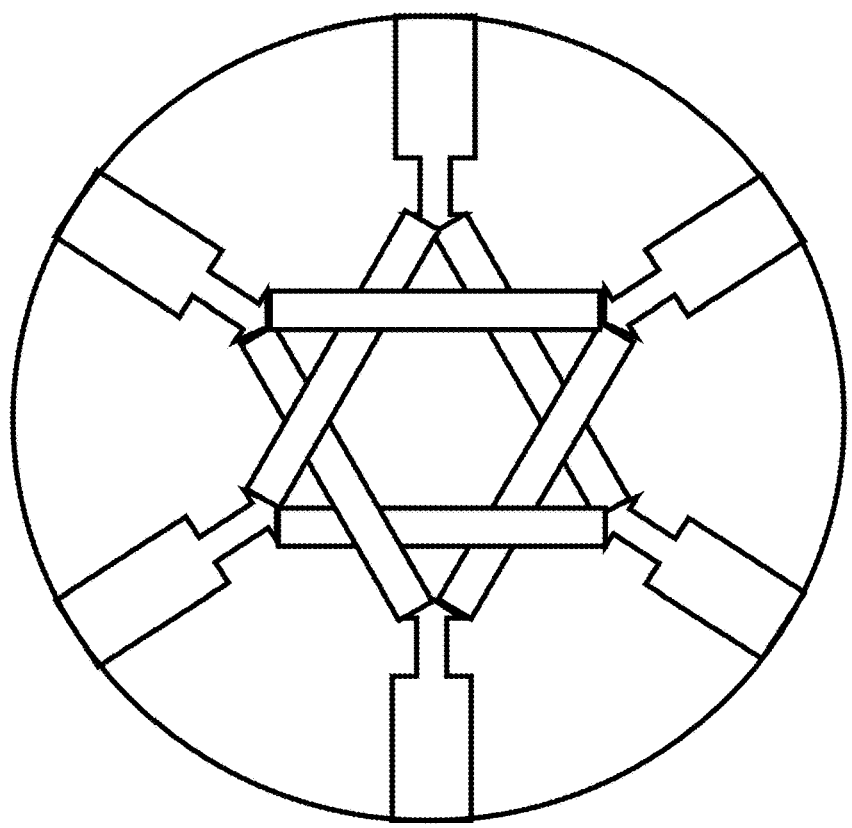
FIGS. 6 and 7 show a thrust vector steering embodiment, in which the flow channels have controllable checkvalves which permit flow to a port ±121° (FIG. 6) or ±144° (FIG. 7), from a respective port.

As shown in FIG. 6, the 6 flowpaths are unidirectional, selectively directing flow right or left. Since the leading edge has higher pressure than the trailing edge, backflow is prevented. The main flow will be from the leading edge to an edge 120° to the right or left, and a flow from an adjacent port to the trailing edge.

Figure 7:
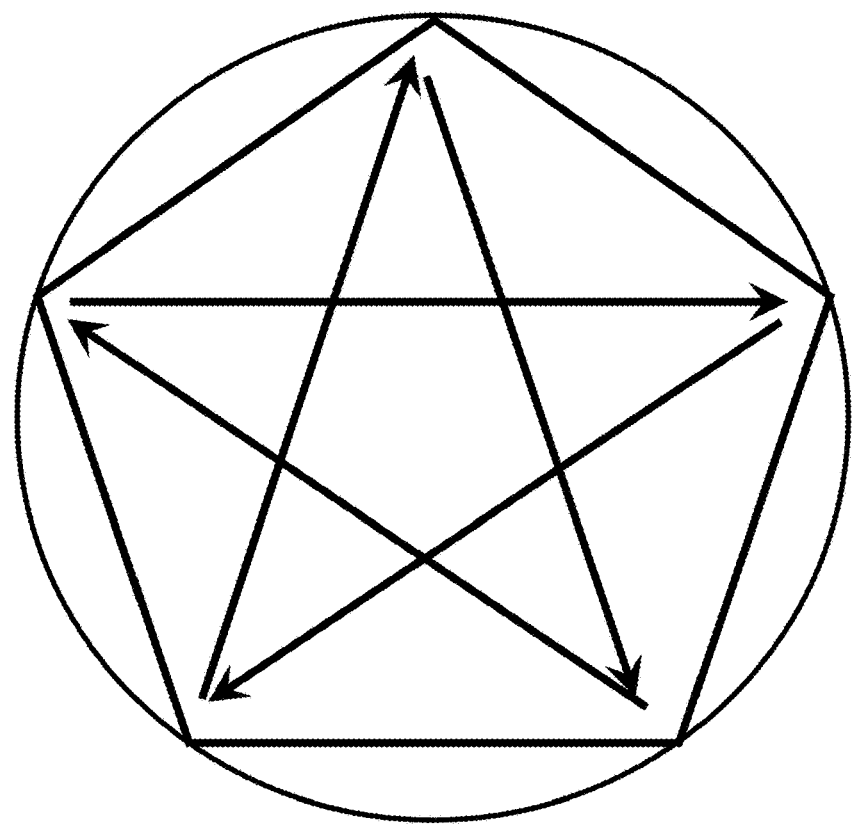

As shown in FIG. 7, a set of 5 flowpaths are provided, with a 5-pointed star arrangement of unidirectional flow paths, whose direction is controllable. In this case, the essential flow path will be from the leading edge to the edge 144° away, right or left. The flowpaths may be formed of heatsealed polymer films, with the checkvalve formed as a free end of an additional layer that occludes flow under reverse flow conditions. The checkvalve may be over-ridden with a magnet acting on a magnetically permeable element, such as a steel plate interacting with a magnet. The solenoid, for example, holds the free end of the additional layer out of the flow path to prevent it from blocking, so that only one such checkvalve structure is operative at a time. A set of magnets may be mounted on an actuator plate of a rotary solenoid, to control all checkvalves together. The rotary solenoid can have three states; a left turn state, a right turn state, and a neutral state in which both checkvalves or held open or closed, or a third valve structure blocks flow.

Figure 8:
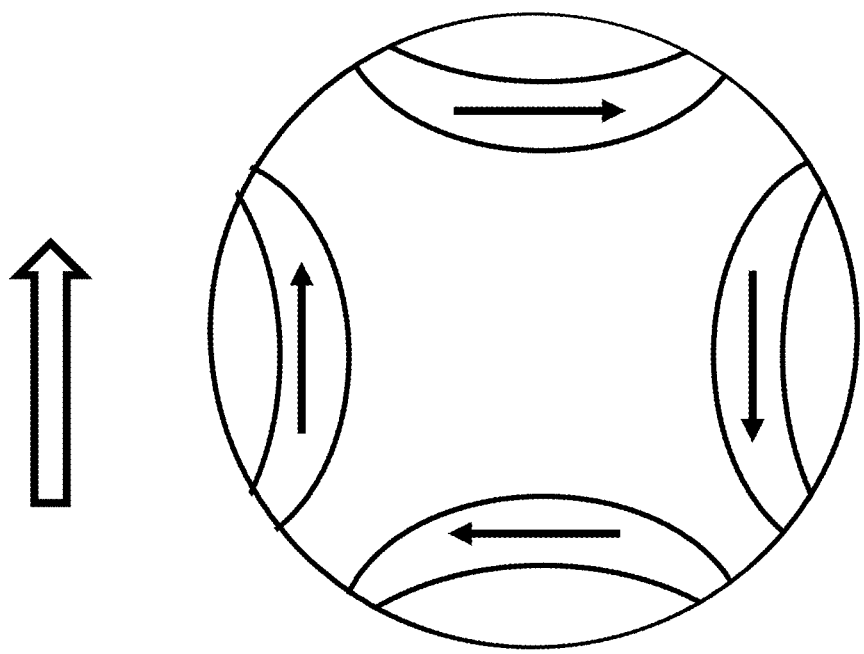
FIGS. 8 and 9 show chiral flow embodiments with a set of flow paths, which permit clockwise or counterclockwise flow through passages.

FIG. 8 shows a chiral flow embodiment with a set of flow paths, which are controlled to permit only clockwise or counterclockwise flow through passages, depending on states of respective checkvalves within the passages. An open or blocked state may also be provided to deactivate steering. In FIG. 8, a set of four passages are provided, which lead from a peripheral location to an adjacent location about the periphery of the disk. In this embodiment, the deflection caused by the diverted air flow is relatively small, since the amount of displacement is under 90°. The checkvalve is, for example, an elastomeric sheet baffle within a conformed shape conduit. The baffle is selectively inclined in one direction or the other within the conduit, based on the state of a control signal. Typically, all of the baffles operate in conjunction based on the same control signal, though there may be cases where a different implementation is provided. When air seeks to flow in the same direction that the baffle is inclined, it further deflects the baffle, and flow is enhanced. The preferred direction of flow through a passage is indicated by an arrow in each path. When air seeks to flow in the opposite direction that the baffle is inclined, it decreases the inclination of the baffle, causing an increased restriction in air flow around the baffle, and flow is reduced. If the disk is translating in the direction of the large arrow to the left, the air pressure on the right side of the disk will be less than on the left, due to the reduced restriction of flow on the right due to the patency of the passage, as compared to the reverse flow state on the left which blocks the flow. (In some disk configurations, the steering force effect may be reversed). This pressure difference will cause the translational vector of the disk to move toward the right. Similarly, if the preferred flow direction is reversed, the translational vector of the disk to move toward the left. The baffle may be controlled with a solenoid or motor-operated lever, cam or magnetic coupling, piezoelectrically, or by other means. The rotation of the disk will have some effect on the steering, since, for the configuration and flow state shown, the drag will be lower than for the opposite spin direction. However, the directional state of flow passages interacts with the translational flow of air in addition to the rotation, and these effects are somewhat independent and additive, so long as the passages are not maintained occluded by the rotation-induced flow against the checkvalves independent of the translation. In order to avoid this effect, an intake may be provided inside the lip of the Frisbee, and thus draw air from a region air which tends to spin with the Frisbee, but the exhaust should typically be on the peripheral edge, to exert maximum effect. Because the system is bidirectional, another set of elastomer sheet checkvalves may be provided at each port to distinguish between intake and exhaust. Pressure-balancing valve arrangements may also be used to control flow paths and states.

Figure 9:
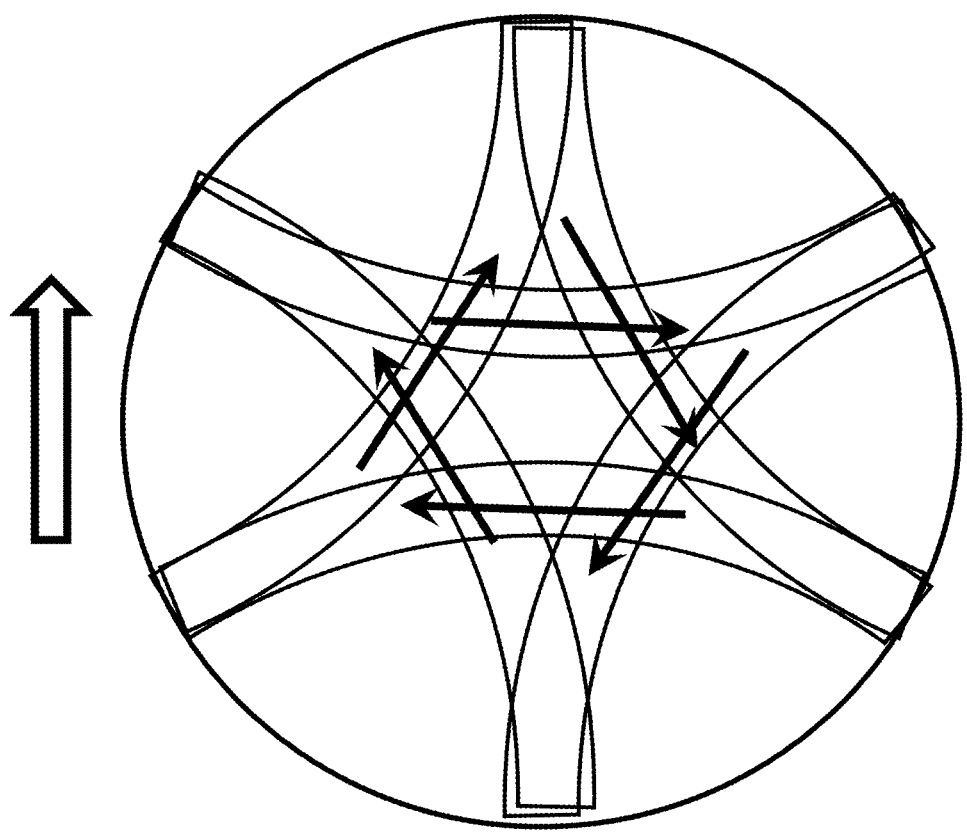

FIG. 9 shows a chiral flow embodiment with a set of flow paths, which are controlled to permit only clockwise or counterclockwise flow through passages, depending on states of respective checkvalves within the passages. An open or blocked state may also be provided to deactivate steering. In FIG. 9, a set of six passages are provided, which lead from a peripheral location to a distant location about the periphery of the disk. In this embodiment, the spacing between intake and exhaust is about 120°. The checkvalve is, for example, an elastomeric cap hinged at the end of a tubular structure. The cap is displaced from the tube under permitted flow, and blocked under reverse flow. A control signal overrides the reverse flow blockage. A pair of reversed valves is provided, controlled so that one is active and one is inactive, and in neutral steering states, both or neither are active. Typically, all of the flowpaths operate in conjunction based on the same control signal, though there may be cases where a different implementation is provided. The preferred direction of flow through a passage is indicated by an arrow in each path. If the disk is translating in the direction of the large arrow to the left, the air pressure on the right side of the disk will be less than on the left, due to the reduced restriction of flow on the right due to the patency of the passage, as compared to the reverse flow state on the left which blocks the flow. This pressure difference will cause the translational vector of the disk to move toward the right. Similarly, if the preferred flow direction is reversed, the translational vector of the disk to move toward the left. Note that under some conditions, the effect may be reversed, i.e., the flow through the disk venting to the right will cause the disk to move left. The rotation of the disk will have some effect on the steering. Each intake may be provided with a flap structure to permit air to be drawn from inside the lip of the Frisbee, while the directing the exhaust to the peripheral edge.

Figures 10, 11, 12:
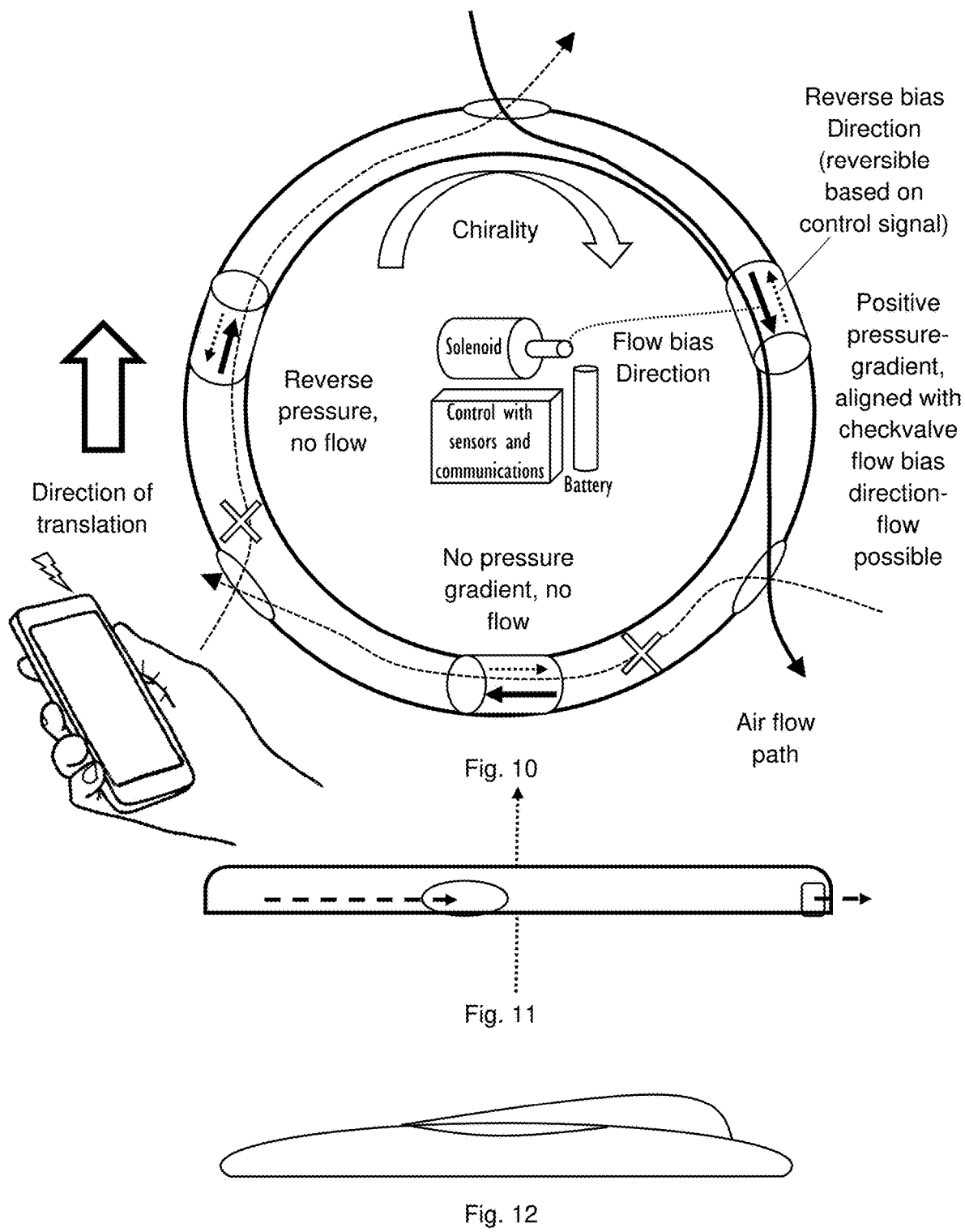
FIGS. 10 and 11 show a top schematic view, and front view, of a chiral flow embodiment which provides a set of peripheral ports and biased flow directors in a plenum, which direct air flow along a pressure gradient in a clockwise or counterclockwise direction based on a control signal.
FIGS. 12 and 13 show a side view and top view, respectively, of an embodiment of the invention having a tailfin located on a counter-rotating hub, driven by a motor, to provide a steering force.

FIG. 10 shows a chiral flow embodiment which provides a set of peripheral ports and biased flow directors in a plenum, which direct air flow in a clockwise or counterclockwise direction based on a control signal of a control system having appropriate sensors and communications/user interface. FIG. 1l shows a side view, and axis of rotation. The flow directors may each be a bidirectionally controllable checkvalve, or a pair of opposed controllable checkvalves, or other directional flow inducers. The control may be a magnetic latch, piezoelectric actuator, shape memory alloy (SMA) actuator, mechanical actuator (e.g. motor or solenoid driven) or the like. In some embodiments, the steering direction is defined manually before flight, and therefore no automated control is required during flight. As shown in FIG. 10, the forward translation of the disk leads to a pressure gradient, along which air flows through the plenum. In this case, the air from the front port is diverted to the right, since the left-path has a reverse biased checkvalve, and the front to rear path has a positive pressure gradient. The air exits at the next port, near the back of the disk. Air from the rear ports do not flow forward due to a reverse pressure gradient. Likewise, flow between these ports is negligible due to low pressure difference. Therefore, at any given time, the air flow in the plenum will be primarily from the front-most port to one of the rearward ports, depending on the state of the checkvalves. In order to provide a neutral steering state, both flow directions may be opened or closed. This requires a tristate control, which can be effected through a bidirectional solenoid, e.g., a permanent magnet core that responds to the polarity of current flow through the coil. The armature of the solenoid is mechanically, hydraulically or pneumatically linked to the checkvalves. Alternately, each checkvalve (or reverse biased pair of checkvalves) may be independently operable and receive a separate electrical signal. The user or control interface is preferably by radio frequency remote control, and may be Bluetooth (e.g., RTL8723BS, HM10 cc2541), WiFi (e.g., MTK MT760IU-01, RTL8189ES, RTL8188ETV), Zigbee, cellular, or unlicensed spectrum permitted for such use, such as 27 MHz, 49 MHZ, 434 MHZ, etc., and may for example comply with FCC Regs. 47 CFR Part 15, and especially 15.201-257, 15.301-323, 15.501-525, and 15.701-717 (each of which is expressly incorporated herein by reference). For example, rather than IEEE-802.11 or 802.15 protocols, a simpler RF communication protocol may be employed, e.g., using serial UART (e.g., ULCI2-01, HC-11, HC-06, ESP8266) or Holtek HT1ZF, HT1ZE, HT1ZD devices. See www.electroschematics.com/8712/rf-based-wireless-remote-control-system/, Sunrom ST14, Qiachip WL101-341 (paired with WL102-341) or RX480-E4, EV1527, MX-05V/FS-03V, HV54D, RXB14, SYN480R, etc. Because of compatibility with user-supplied devices, Bluetooth and WiFi are preferred. Advantageously, the control is provided by an app, i.e., downloadable computer instructions codes, to a smartphone, which are then stored in a non-transitory computer readable medium within the phone, i.e., flash memory. The app may be stand alone, part of a distributed architecture, communicate with a remote server, etc.

In this embodiment, the steering effect is largely due to vectored mass flow through the disk. Because the fontal cross section is small, and the mass of the disk higher than the mass of air through the disk, the steering effect is limited at low translational velocity, buy increases as the translational speed increases.

Figure 13:
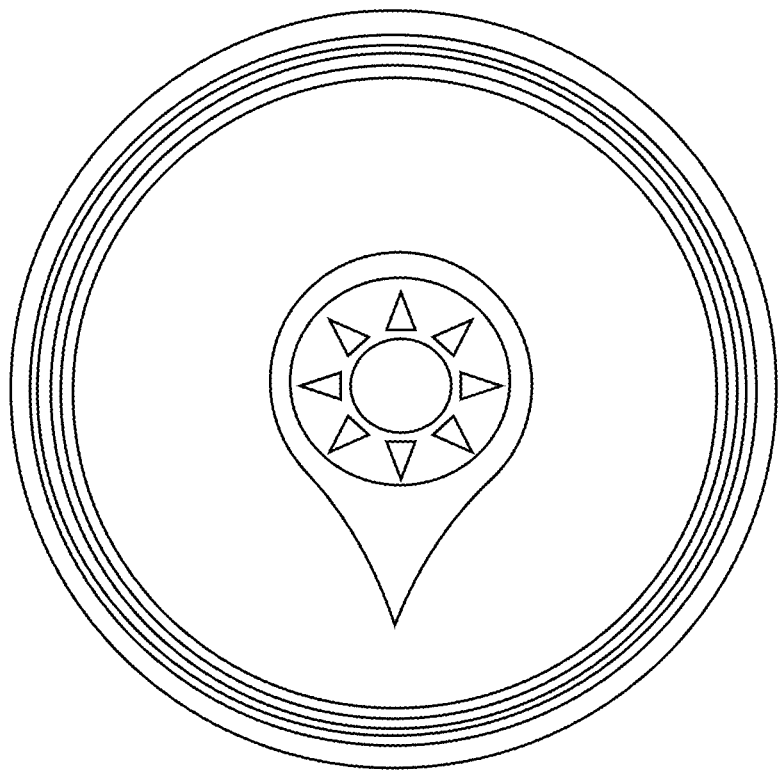

FIGS. 12 and 13 show a side view and top view, respectively, of an embodiment having a counter-rotating central aerodynamic hub, which provides a lateral steering force. The hub has a fin, which is mounted on a rotor of a brushless motor, and servoed to nearly exactly the same speed as the rotating periphery. However, if it is controlled to lead or lag the centerline, to thereby provide an aerodynamic steering force. The motor may also run an axial fan or centrifugal blower, which, for example, may employ a reducing gear or planetary gearset to run faster than the periphery, to thus provide a large air flow.

Figure 14:
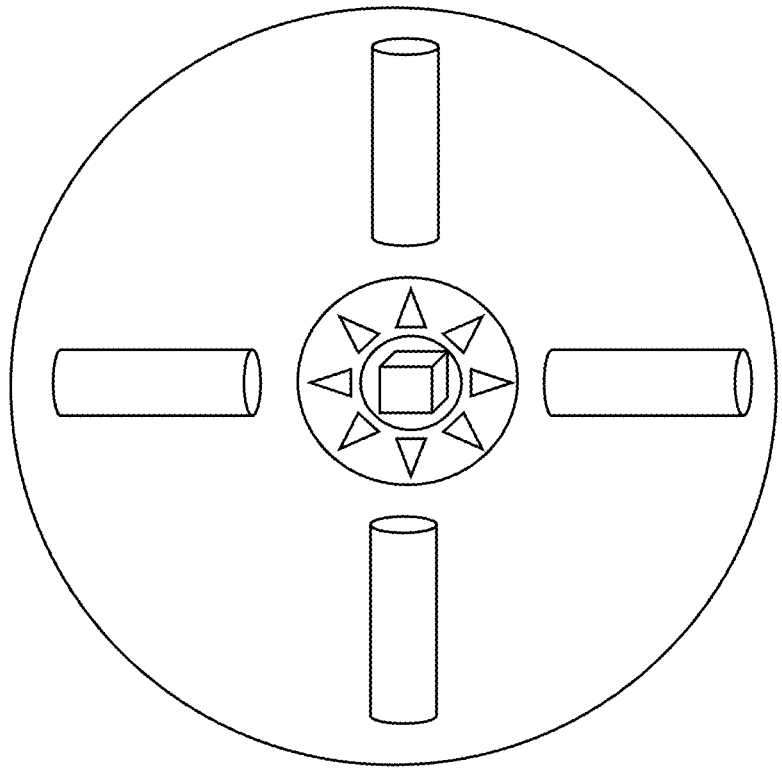
FIG. 14 shows a bottom schematic view of a reaction-wheel embodiment according to the present technology, showing 4 motors in quadrature orientation.

FIG. 14 shows a reaction wheel embodiment of the invention. A set of four brushless DC motors, two each clockwise and counterclockwise, arranged along two axes inclined at 90°, which are activated to rotate in the same absolute direction. As the disk rotates, the pairs of motors induce an upward-downward or downward-upward force about the edge of the disk, thereby perturbing its inclination and/or yaw. The aerodynamic disk has lift along the axis of symmetry of the disk, and therefore the inclination or yaw control leads to a steering effect. After a steering maneuver is completed, the inclination and yaw are correct to normal, by a reverse steering maneuver. A magnetometer or other rotation sensor synchronizes the rotational angle with the maneuver. For example, at 10 revolutions per second, each rotation is 100 mS, and each quadrature phase is 25 mS. The Motors are operated at less than or equal to 50% duty cycle. The motors are preferably high-torque, low friction motors, which generally leads to high RPM at no load. Mass may be added as appropriate. The motors are preferably peripherally located to maximize the moment of inertial of the disk. A fan or blower may be provided in the center of the disk to provide controlled lift. The sensor package is preferably also centrally located.

A minimal design has a single motor, which may have a shaft that extends across the disk, with an inertial mass at the end of the shaft. The moment of inertia and the mass of each side is balanced. The motor is activated as a function of rotation about the gyroscopic axis.

Figure 15:
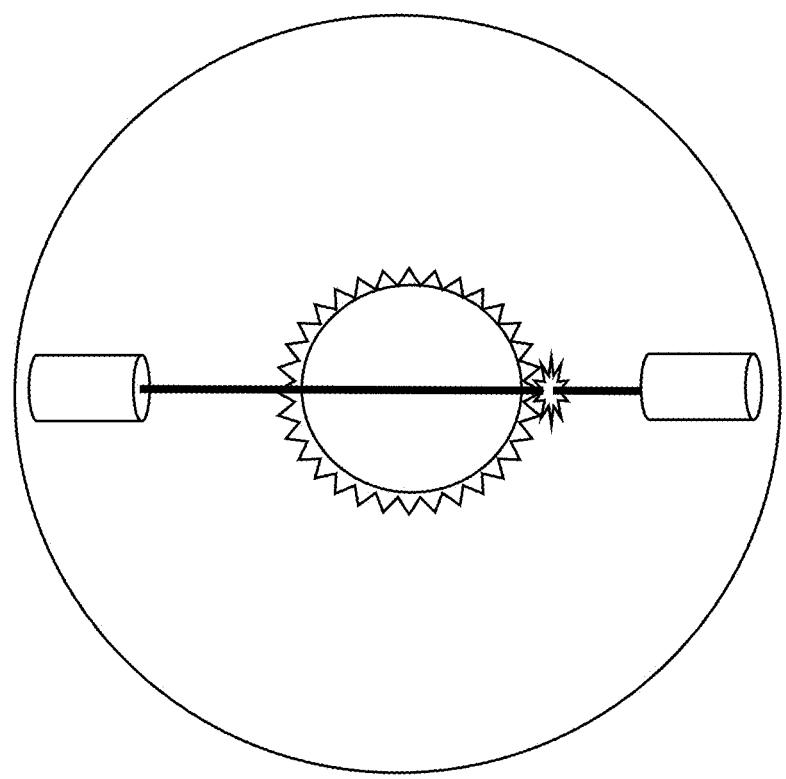
FIG. 15 shows a hub-located motor which drives, through a gear, a rotating mass or feature on an axle, distributed across the centerline of the disk, to provide a reaction force on the disk.

FIG. 15 shows a hub-located motor which drives, through a gear, a rotating mass or aerodynamic feature on an axle, distributed across the centerline of the disk, to provide a reaction force or controlled aerodynamic lift or drag on the disk. The motor is, for example, a brushless DC motor which has a high starting torque. The motor drives an axle, which has two balanced rotating masses connected by a common shaft (unless vibration/disk angular offset is desired). One advantage of this design is that it permits a relatively large diameter motor to drive the shaft, with a high starting torque.

In a mass embodiment, the inertial masses must spin up, and decay, with each revolution of the disk, and therefore the low-end torque of the drive is an important consideration. As compared with a reciprocating mass (one alternate to the rotating inertial masses), this design does not rely on a large mass or large offset, and rather has a rotational resonance that permits operation over a small diameter and large revolution rate, and does not require a physical offset of the mass as a whole. In one design, the inertial mass does not require rotation over an entire revolution and thus represents a pivoting mass, though the low mass, large RPM capability facilitates a size and weight efficient design. This design does not require bidirectional rotation, though direction reversal permits a higher steering effect per unit weight.

On the other hand, in an aerodynamic feature embodiment, the features may be low mass, e.g., hollow or foam, and have a non-radially-symmetric portion exposed at the top surface of the disk, leading to aerodynamic asymmetry as a function of angle of rotation, which is synchronized with disk rotation.

A related design (not shown) provides a solenoid with an inertial mass or aerodynamic feature mounted on a spring (preferably 2-6, to provide dynamic balance), with a resonant frequency of about 500-2000/min=8-33 Hz. Each solenoid is activated and controlled to provide a torque about the gyroscopic axis of the disk, as the disk rotates. A magnetometer provides sensing of rotational rate. For example, a set of 6 rare earth magnets mounted on springs (coil, leaf, etc.), for movement over a range of 2-10 mm, each within or next to a coil, provides the steering force. Each magnet may be an N42 (neodymium) type magnet EP359 (0.55" dia, 0.157" thick) or EP654 (0.394" dia, 0.157" thick), or N52⅝"×¼", or N35, N36, N42, N45, N50, or N52. The steering vector is maintained by moving the masses or aerodynamically-exposed features synchronized with the angle of rotation. Coils in opposed orientation across the disk may be activated by the same signal (inverted), and therefore the driver need only accommodate 3 phases. The solenoid can be a copper coil, such as an inductor coil using 0.16p diameter wire, 5.6Ω, 560 µH, 13 mm DD, 8.85 mm ID, 4 mm thick. For example, the solenoids across the disk may be wired in antiparallel, which corresponds to about 500 mA (with a 0.6V drop across a driver transistor) current. An 8 mm×3 mm N45 magnet weighs about 1.1 gm. Assuming a 1 cm travel, and 1000 RPM rotational speed, the net force is about 110 dynes (gm·cm/S$^2$). The disk weighs about 180 gm, and thus the lift compensates for this. The gravitational coefficient is 980 cm/S$^2$, yielding 176,400 dynes force. Therefore, the steering force is small, but may be increased by increasing the reciprocating mass, or displacement, or reducing disk mass.

Figure 16:
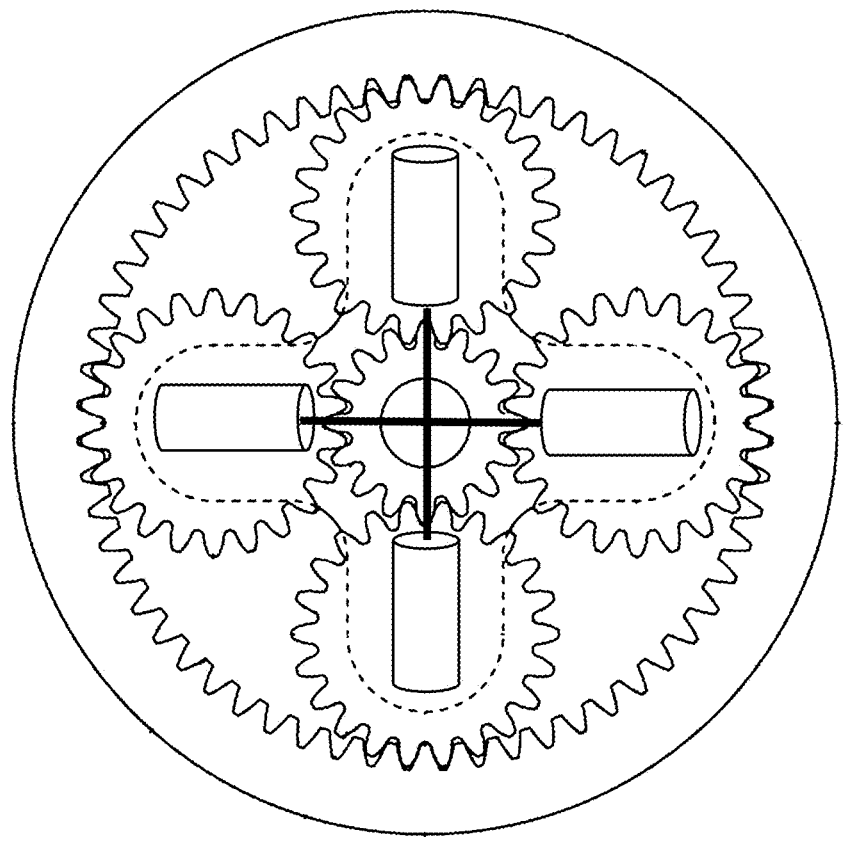
FIG. 16 shows a bottom view of a planetary gear arrangement, in which a set of reaction wheels or feature wheels are servo driven to a desired orientation to provide a reaction force or lift on the disk.

FIG. 16 shows a bottom view of a planetary gear arrangement according to the present invention, in which a set of reaction wheels or exposed aerodynamic features are servo driven to a desired orientation to provide a reaction or aerodynamic force on the disk. The system shows four planet gears, though one or two (for balance) may be sufficient. A motor is provided on the planet gear carrier, which is maintained in a relatively stationary position by a servo motor in the sun gear, which is driven, for example, by a brushless DC motor. The motor is driven to provide a reaction or aerodynamic force on the disk. The motor may be unidirectional, since it can be advanced or lagged to the opposite side as required. A shaft extends to the opposite side with a counterweight, which rotates with the motor. The controller has an inertial guidance component, and therefore feedback may be inertial rather than at the motor level. In this system, the planet gear carrier is non-revolving, and therefore the electronics, e.g., the inertial sensors, controller and power supply may be also located on the planet carrier. The coils for the sun gear motor may be stationary with respect to the planet gear carrier. If the sun gear motor has sufficient power, it may also drive an axial or centrifugal blower, to provide lift. In one embodiment, both mass and aerodynamic steering are provided. For example, the stationary planet gear carrier may extend to the upper surface of the disk, and provide aerodynamic features; note that the optimal axis for the aerodynamic features may differ from the optimal axis for the reaction wheel. The system in that case can either determine a compromise or mode of operation (aerodynamic steering or reaction force steering or both), or an additional offset actuator provided, which may be motor, solenoid, a ball screw linear actuator, etc.

The reaction wheel embodiment has two distinct actions. With a constant rotational speed, a precession of the planet gear carrier will produce a reaction force on the disk. In addition, the acceleration or deceleration of the reaction wheel will produce a torque. In general, the mass of the reaction wheel is small with respect to the disk, and the maximum speed limited. Therefore, the acceleration or deceleration torques are only useful for limited corrections. On the other hand, while spinning at full speed, the reaction wheel has maximum effect, and the time-constant of actuation is an insignificant factor. However, under dynamic control over the steering, both effects should be considered. In embodiments where a motor is operated in a pulse position modulation mode, the time-constant of the motor is a significant consideration, since the speed difference as a function of rotational angle is the steering principal.

In an embodiment that appears similar to FIG. 16, the electronics and motor rotate with the shell. The sensor package may reside on the planet gear carrier, though a suitable wired (e.g., slip ring) or wireless connection. The reaction wheel(s) also rotate with the planet gear carrier. A centrally located motor drives the shell with respect to the sun gear, served to a speed with nearly matches the rotational speed. The shafts of the reaction wheels optionally have a clutch arrangement to couple to the sun or planet gear.

The clutch is, for example, a solenoid friction or magnetic particle clutch. On the other hand, at constant speed, and without relative movement, no steering force is exerted, and thus the clutch may be dispensed with, and a fixed gear coupling provided between the reaction masses and the hub motor. In this case, only a single axis reaction wheel should be employed, to avoid a requirement of forces on two axes simultaneously. Note that, in this case, the reaction when or aerodynamic feature speed is a direct function of the rotational speed of the disk, since these are driven by a single motor. Of course, a transmission, such as a continuously variable transmission system (e.g., bevel gear) may be employed to decouple the speeds, but requiring a transmission control actuator. When the steering is not required, the hub motor may spin down. The startup process may employ a centrifugal clutch, which permits the hub motor to gain speed before the reaction wheels are engaged.

A mathematical model of the steering forces may be implemented by the controller, with predictive actuation of the system based on the desired effect. Feedback from the inertial sensors (magnetometers, accelerometers, gyroscopes, etc.) may correct the flightpath and adapt the model. Over the course of a one-hour game, the disk may be in flight for no more than 15 minutes. Assuming a 1.5 amp draw, this implies that the battery should be at least 400 mAh. Practically, a pair of AA or AAA batteries, or one or more lithium ion 14500 batteries will provide sufficient power for a full game.

Figure 17A:
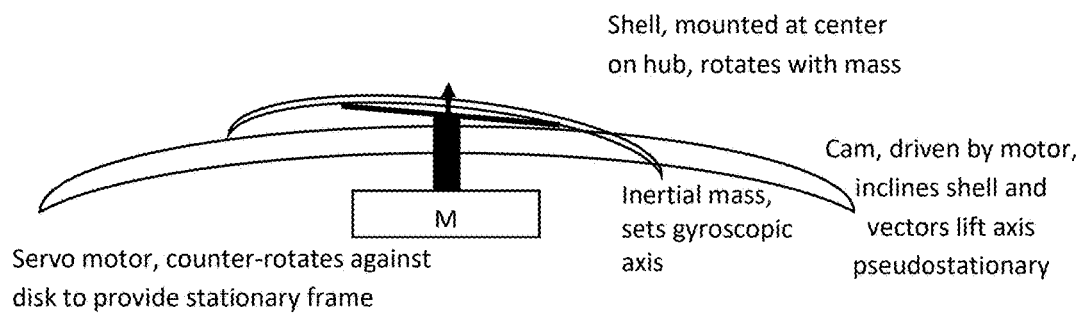
FIGS. 17A and 17B show an embodiment of a rotating disk projectile with a cam-driven aerodynamic shell embodiment in the operative (FIG. 17A) and launch (FIG. 17B) condition.
Figure 17B:
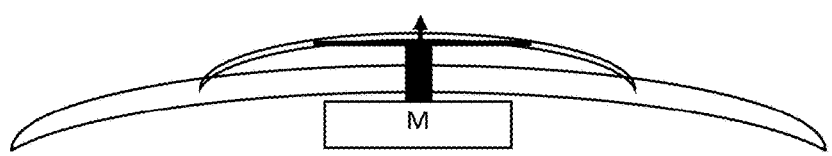

FIGS. 17A and 17B show an embodiment in which an aerodynamic dome which has an asymmetric controlled by a counter-rotating cam on a bidirectionally-controllable rotation servomotor, with respect to the disk, in a manner which causes asymmetric lift or drag of the dome. The dome itself may be lightweight, and for example formed of vacuum formed polyethylene terephthalate film, and may be stationary. A hub motor drives the cam through a central shaft. Advantageously the dome is retracted or otherwise in a symmetric configuration during launch, as shown in FIG. 17B. After launch, a retractable mechanism which holds the dome in place is released as shown in FIG. 17A, and the rotating cam causes the aerodynamics of the dome to become asymmetric with a pseudostationary asymmetry with respect to an external frame. While this embodiment has dome-cam friction, the driven rotating mass is minimized.

Figure 18:
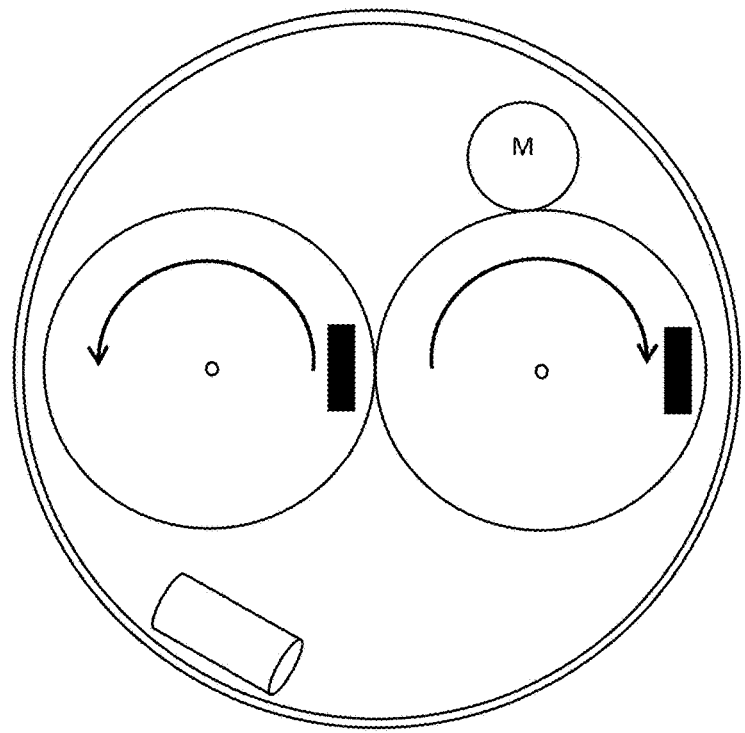
FIG. 18 shows an embodiment of a rotating disk projectile with a pair of wheels eccentric mass that have linked rotation, so that the net center of mass shifts back and forth as a function of rotation, which are driven by a motor according to disk rotation to provide a pseudostationary mass offset as the disk rotates.

FIG. 18 shows a center-of-mass controlled embodiment. Instead of an eccentric mass which remains pseudostationary with respect to an external frame, this embodiment provides a set of wheels with eccentric mass or reciprocating masses whose centers rotate with the disk as a whole. However, the rotation of the wheels is synchronized with the rotation of the disk, such that in a first rotational state, the center of mass of a first wheel is inboard, and the second wheel is outboard, in a second rotational state the center of mass of the first wheel is outboard, and the second wheel is inboard, and in a third state, the masses are symmetric. Advantageously, the two wheels engage each other and counterrotate at the rotational rate of the disk. If the wheels engage, a motor need only drive one wheel, and a battery to drive the motor may be located on an opposite side of the disk to maintain dynamic balance. This embodiment does not require bidirectional rotation of the motor, and naturally provides a balanced state for neutral flight. Further, it does not suffer from non-rotating mass, though the mass of the wheels which counterrotate will offset the gyroscopic effect of each other, though the static mass rotates with the disk as a whole. The sensor is preferably provided near the topological center of the disk, to facilitate accelerometer operation, but is preferably displaced from the motor to avoid magnetic interference of the motor with the compass.

The wheels may have a ratchet to prevent reverse rotation, for example when the centrifugal forces are unbalanced. The wheels may be gears, which mesh between the two. Alternately, the rims of the wheels may be formed of an elastomer, and be frictionally engaged. A belt may be used to link the motor to one or both wheels, or the two wheels may be linked by a belt, with other linkage between the motor and wheels. The motor may be provided in a hub of one or both wheels. The motor may be a 4-pole brushless motor. The control driver circuit may be digitally controlled, or include an analog phase lock loop (PLL). For example, a magnetometer compass detects a directional axis. The value is locked, with closed loop feedback on the motor speed to match the rotational speed of the disk. The static angle of the mass offset is servoed ahead or behind the nominal angle to effect steering, due to the mass offset. A 3 or 4-wire brushless motor drive provides a pulse width modulation (PWM) input to control motor speed (which can be generated or controlled by the PLL). The frequency drive output serves as a tachometer, with two pulses per revolution. These pulses are synchronized with rotational angle, and therefore may be used to control motor position (wheel position).

Figure 19:
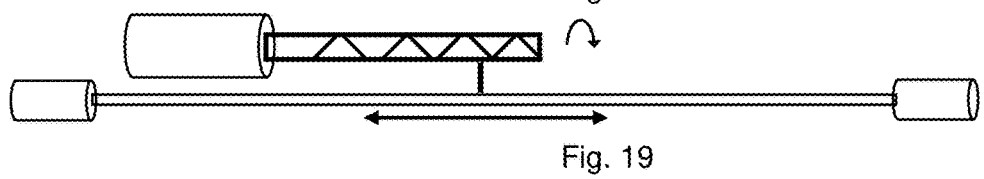
FIG. 19 shows a helical reciprocating groove cylindrical cam (barrel cam, drum cam) embodiment in which rotational movement of a cam causes a follower to reciprocate along a single axis, to provide control over center of mass.

FIG. 19 shows a helical reciprocating groove cylindrical cam (barrel cam, drum cam) embodiment in which rotational movement of a cam causes a follower to reciprocate along a single axis, to provide control over center of mass. The follower is linked to a shaft having weighted ends, which can be located in a balanced, or imbalanced position. The cam is driven to run faster than the disk, and is servoed to ensure synchronization between the offset of the mass and the rotational angle of the disk. In this embodiment, all masses rotate with the disk, with a reciprocating mass along a diameter of the disk. The motor drives a cylindrical cam, which has low mass, and therefore will not appreciably alter dynamics, and in any case will be balanced over 360° of rotation.

Figure 20:
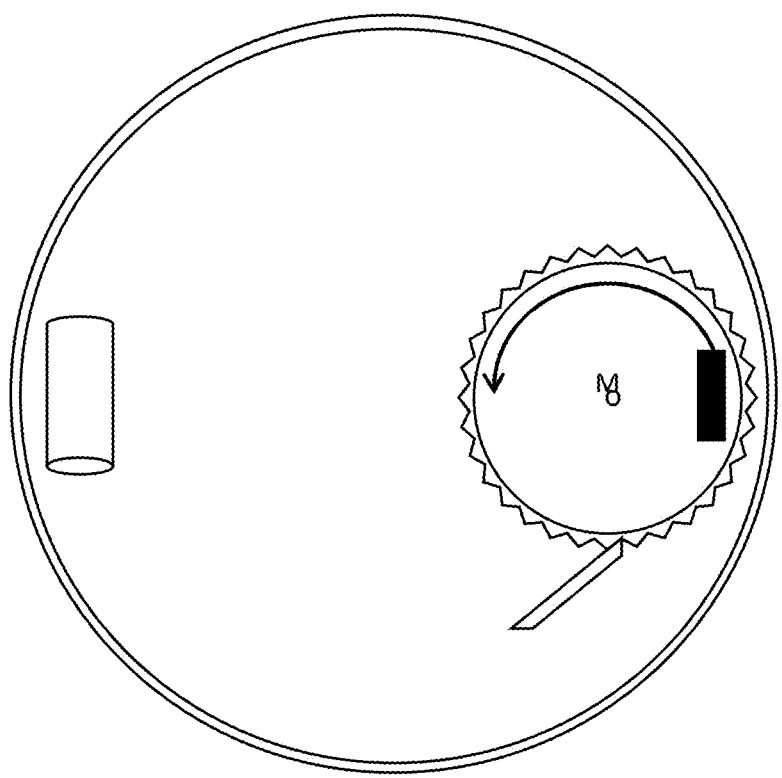
FIG. 20 shows an embodiment of a projectile having an eccentrically located motor, which drives a wheel having an eccentric mass, and a ratchet to ensure unidirectional movement, with a battery located across the diameter to provide a counterweight for the motor.

FIG. 20 shows an embodiment of a projectile having an eccentrically located motor, which drives a wheel having an eccentric mass, and a ratchet to ensure unidirectional movement. The wheel is servo driven at the rotational rate of the projectile, so that the mass is more lateral at one rotational angle than at the opposite position. Thus, the center of mass is, on average, shifted from the null position, thus inducing a torque on the gyroscopic axis. The ratchet helps prevent slippage of the disk due to centrifugal forces. The battery is located across the diameter to provide a counterweight for the motor. The mass may be homed to a dynamically balanced position for a neutral (unsteered) flight path. The torque of the motor will vary with the centrifugal forces on the mass. A spring may be provided to counteract or balance the force. Further, at the cost of increased friction and complexity, additional wheels may be provided around the disk to provide a phased array which is synchronized with rotation.

Figure 21:
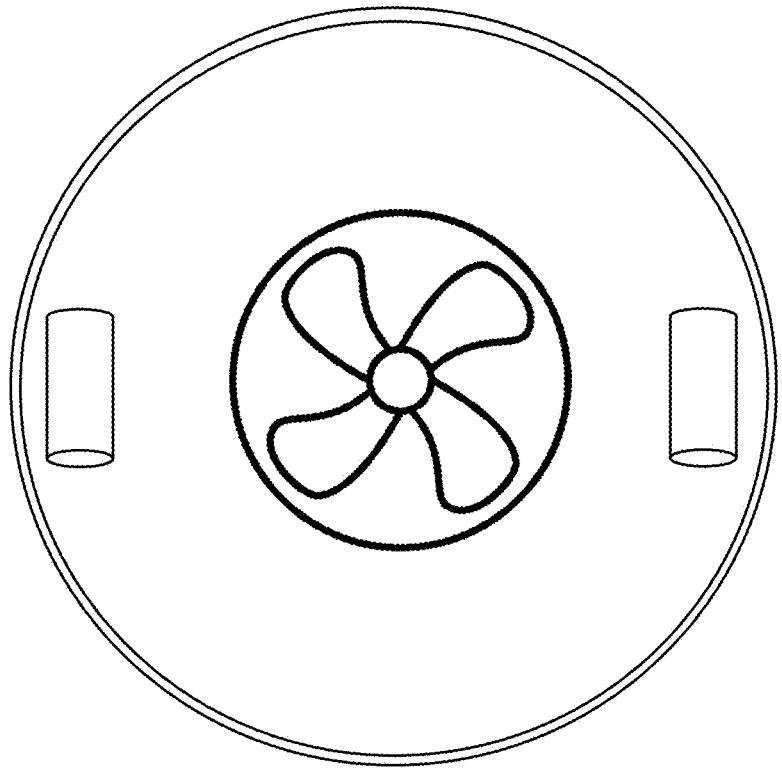
FIG. 21 shows an embodiment of a disk with a central fan or blower, to provide active lift, which may also be vectored (not shown) to provide steering; for example, all or a portion of the pressure or vacuum from the fan or compressor may vent to or draw from the plenum of FIG. 10.

FIG. 21 shows an embodiment of a disk with a central fan or blower, to provide active lift. The intake is generally at the top of the disk, and the exhaust typically under the disk. One or more batteries provide power for the fan. The fan is typically unidirectional, regardless of rotation direction of the disk. The intake or preferably exhaust may be vectored. For example, a louver (not shown) may be provided which counter rotates, or is dynamically activated, to direct air flow along a desired axis. If the plenum is held under vacuum, the Magnus effect is increased, since the drag at the leading surface will be increased. At the trailing edge, the bulk air flow through the disk will dominate, and therefore the leading-edge and training edge asymmetry will persist. Therefore, the pressure in the plenum is modulated by fan speed, the Magnus effect may be controlled. In addition, checkvalves such as those discussed with respect to FIG. 10 may also be controlled.

The fan or blower may also vent to the plenum, e.g., when the blower is a centrifugal blower. In this case, the intake of the blower on top decreases pressure and therefore provides active lift, while the pressurized plenum leads to increased surface boundary layer thickness at the peripheral edge, and therefore reduced rotational drag. Thus, the Magnus effect may be modulated in reverse of the vacuum plenum embodiment. When the blower is off or in a low flow mode, the leading edge encounters high rotational drag, while when pressurized, drag is low.

Figure 22:
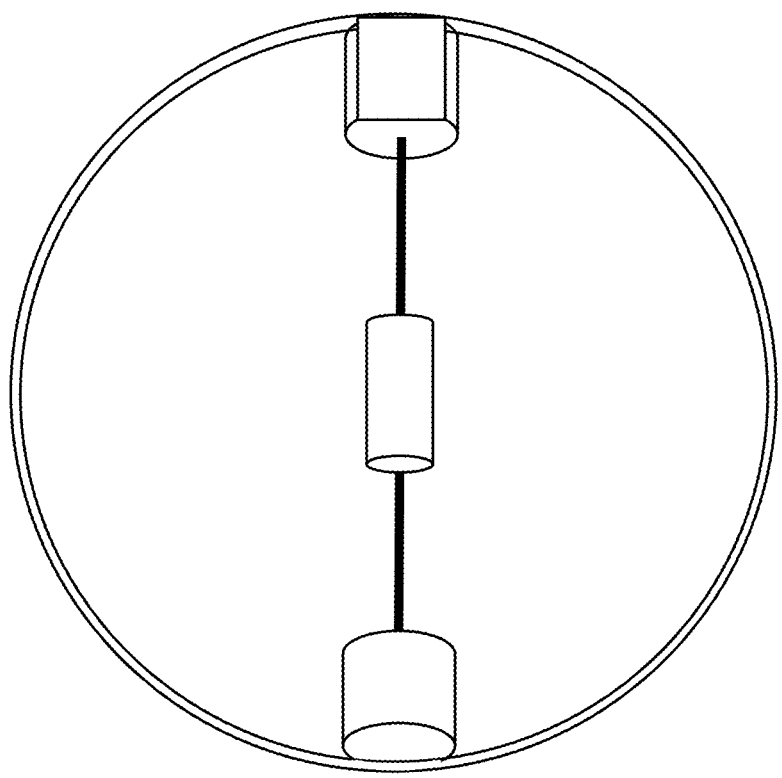
FIGS. 22 and 23 show a bottom and top view, respectively, of a rotating disk having a set of rotating aerodynamic cams, which have features have an alternating aerodynamic state dependent on the angle of rotation of the camshaft.
Figure 23:
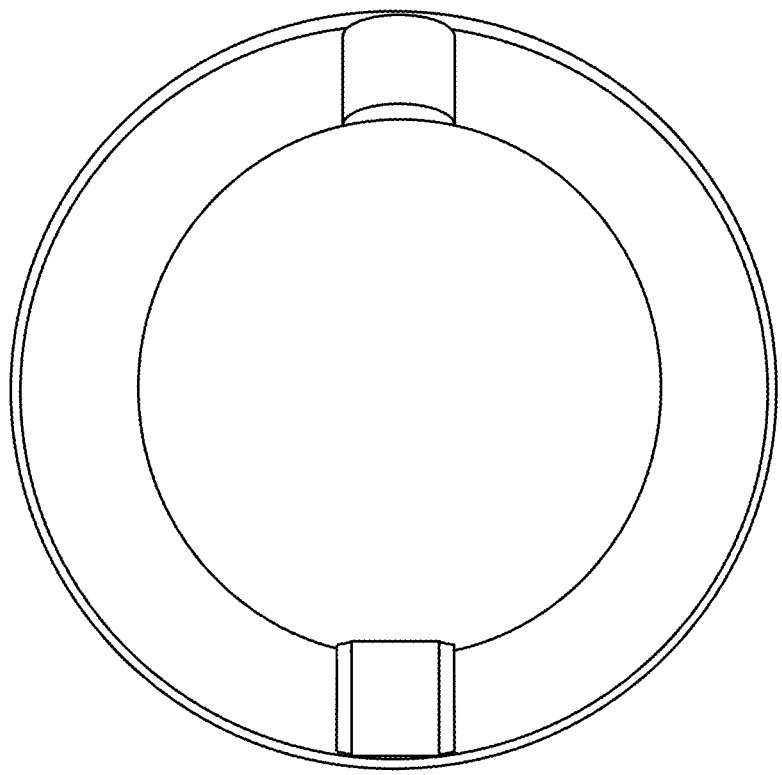
Figure 24:
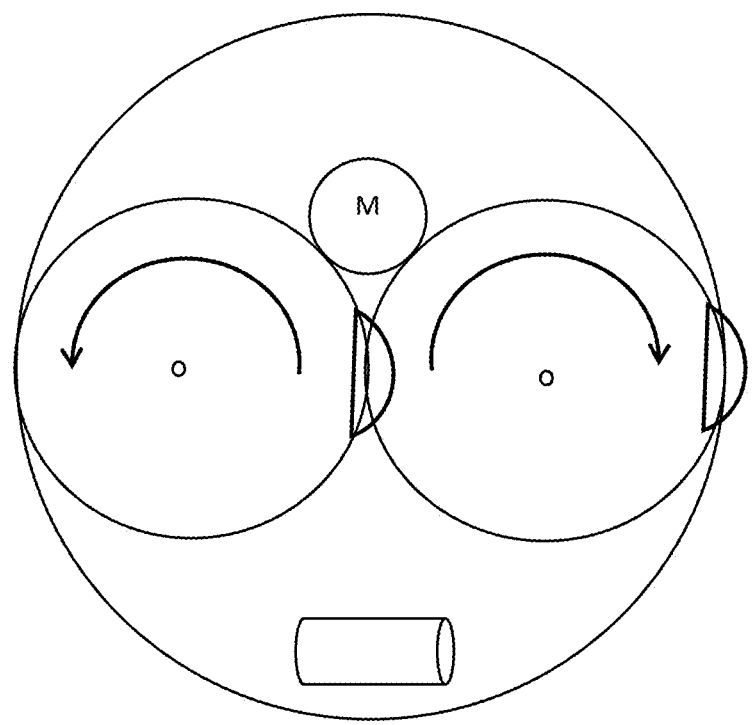
FIG. 24 shows an embodiment with a peripheral protruding cam, driven in synchrony with rotation of the projectile.
Figure 25:
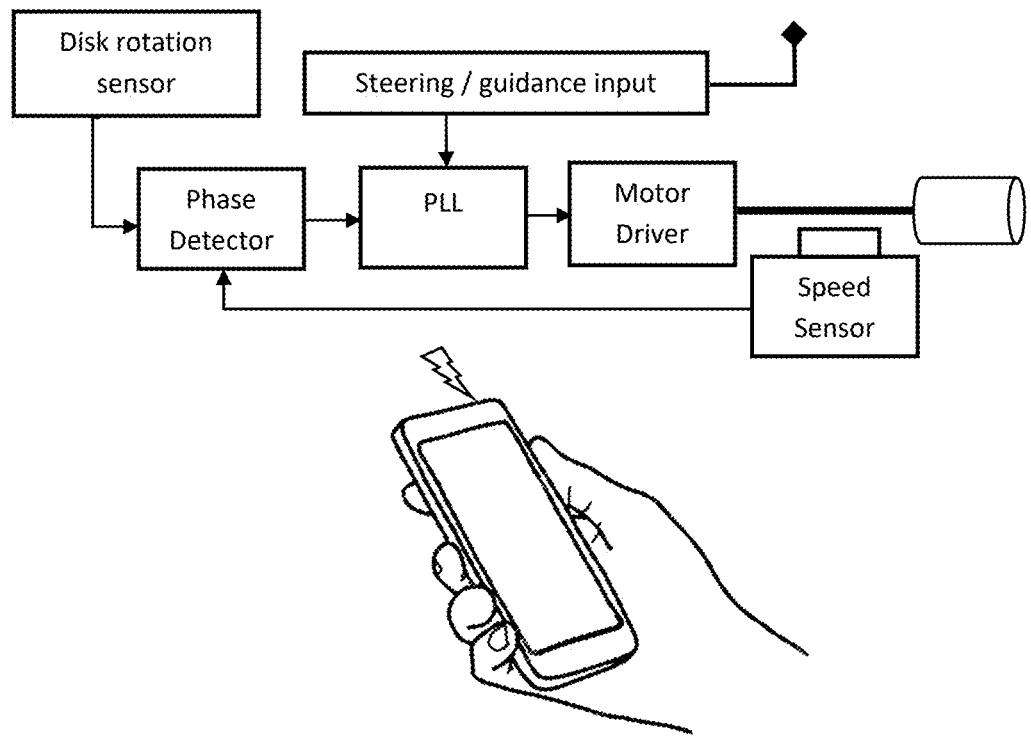
FIG. 25 shows a block diagram of a phase locked loop guidance system.

FIGS. 22 and 23 show a bottom and top view, respectively, of a rotating disk having a set of rotating aerodynamic cams, which have features have an alternating aerodynamic state dependent on the angle of rotation of the camshaft. In this embodiment, the cams may be directly exposed, as shown, or operate against a surface, which is deformed or displaced as a result of the cam action. In either case, the antiphase cams create an asymmetric lift and/or drag, which causes a steering effect on the disk. Note that, if the cams, instead of causing a protrusion or deformation of the top surface, are reconfigured to protrude or deform the peripheral edge, as shown in FIG. 24, a steering effect can be achieved that can cause a lateral translational shift of the disk, without substantial perturbation of the axis of rotation, and corresponding need to reverse the perturbation to return to level and straight flight. A phase locked loop guidance system, as generally shown in FIG. 25, implemented in analog or digital technology, may be used to control the motor speed and phase. In some cases, the motor driver (e.g., a brushless DC motor driver) may produce a motor speed output, and receive a motor speed control signal, integrating and simplifying implementation. As shown in FIG. 25, a smartphone may control the system by remote communication of a control signal, or in the case of a microcontroller-implemented design, communication of an algorithm or parameters, through WiFi or Bluetooth. A garage-door opener type remote control may also be used, operating at 315 MHz or 433 MHz, which may employ a rolling code security system.

Express Disclaimer:

The claims in this application are to be interpreted to encompass only patentable subject matter, pursuant to 35 U.S.C. § 101 and Judicially created interpretations, and no interpretation of the claims as encompassing subject matter which is patent ineligible, shall be deemed reasonable or correct. To the extent that a claim encompasses a system, apparatus or composition, that claim shall be interpreted to encompass a physical manifestation of such system, apparatus or composition, and not a virtual or abstract representation of such system, apparatus or composition.

The present application arises in the fields of electrical, mechanical, and materials engineering, and aerodynamics, and any interpretation of words used shall be in accordance the usage afforded by persons skilled in such arts. Lay dictionaries shall not be employed to interpret the language to the extent that they convey an inconsistent, tautological, vague or incomplete definition of any word or phrase which is distinct from contextually appropriate usage found in the scholarly engineering literature. The person of ordinary skill in the art to which this disclosure is directed has skills corresponding to an education through a master's degree in engineering and three years of experience as an engineer, building products.

The word "comprising" in a claim means open to inclusion of additional elements consistent with the enumerated elements of the claim, but excluding elements which defeat express or inherent functional constraints for the ordered combination as claimed.

Each of the references cited in this disclosure are incorporated herein by reference in their entirety, to provide written description for claims, and shall be deemed within the knowledge of persons or ordinary skill in the art for purposes of enablement. The language in the express disclosure hereof shall be considered to modify the language of the cited references to resolve any inconsistencies.

The various teachings, elements, embodiments, and sub-embodiments are intended to be employed in any available combination, subcombinations and permutations, and no language herein shall be considered a requirement for presence or absence of any feature.

The systems encompassed by this disclosure may encompass command, control, and communication systems that have arbitrary levels of complexity to meet the minimum functional criteria for the respective system, and may include further complexity, and perform additional functions as disclosed herein and in incorporated references.

What is claimed is:

1. A controller, comprising:
   a spatial sensor;
   a memory, configured to store a rule set for a spatial game;
   a wireless transceiver, configured to communicate with a cryptographically-secured distributed ledger configured to automatically execute a smart contract comprising self-executing code and to maintain records via a distributed trust architecture supported by a plurality of other controllers; and
   at least one automated processor, configured to:
      receive information from the spatial sensor,
      apply the rule set within a smart contract comprising the self-executing code deployed on the cryptographically-secured distributed ledger to determine scoring information for the spatial game, and
      communicate the scoring information to the cryptographically-secured distributed ledger to maintain a record of the scoring information in accordance with the distributed trust architecture.

2. The controller according to claim 1, wherein the at least one automated processor is further configured to implement the consensus scheme with the plurality of other controllers, to determine a current game status.

3. The controller according to claim 2, wherein the game status is selected from the group consisting of a score, a penalty, a handicap, and a playing field location.

4. The controller according to claim 1, wherein the spatial game is played by a plurality of teams of human players, and each human player has a respective controller.

5. The controller according to claim 1, disposed within a housing configured as a smart watch configured to be worn by a human player of the spatial game.

6. The controller according to claim 1, wherein the spatial sensor, the memory and the at least one automated processor are contained within a projectile structure used in the spatial game.

7. The controller according to claim 1, wherein the spatial game is played on a playing field having boundaries and zones, the spatial sensor is configured to determine a playing field location of a person or object with respect to the boundaries and zones, and the at least one automated processor is further configured to apply the rule set with respect to the playing field location of the person or object with respect to the boundaries or zones.

8. The controller according to claim 1, wherein the spatial sensor comprises an optical sensor within a moving game play object, and the wireless transceiver is further configured to communicate with a compatible wireless transceiver in the game play object.

9. The controller according to claim 1, wherein the spatial sensor comprises a radio frequency triangulation or trilateralization sensor.

10. The controller according to claim 1, wherein the spatial sensor comprises an optical flow sensor within a spatial game projectile.

11. The controller according to claim 1, wherein the spatial game is played by a plurality of teams of human players, and the at least one automated processor is configured to automatically determine a possession of a game play object by a respective human player based on an internal sensor component in the game play object.

12. The controller according to claim 1, wherein the game play object is selected from the group consisting of a ball and a disk.

13. The controller according to claim 12, wherein the at least one automated processor is configured to steer the game play object during projectile flight selectively in dependence on at least one record maintained in the cryptographically-secured distributed ledger.

14. A control system, comprising:
   a sensor;
   a memory, configured to store rules of a game involving a projectile;
   a wireless transceiver, configured to communicate with a plurality of other control systems together implementing a cryptographically-secured distributed ledger configured to execute a smart contract and to maintain records via a distributed trust architecture supported by a plurality of other control systems;
   at least one automated processor, configured to receive information from the sensor and the plurality of other control systems, apply the rules within a smart contract comprising self-executing code deployed on the cryptographically-secured distributed ledger to determine game information, and communicate the game information to the cryptographically-secured distributed ledger to maintain a record of the game information.

15. The control system according to claim 14, wherein the game is played on a playing field having boundaries and zones, the sensor comprises a spatial sensor configured to determine a playing field location of the projectile with respect to the boundaries and zones, the game information is selected from the group consisting of a score, a penalty, a handicap, and a playing field location, and the at least one automated processor is further configured to apply the rules with respect to the playing field location of the projectile with respect to the boundaries or zones.

16. The control system according to claim 14, wherein the sensor comprises a triangulation or trilateralization sensor configured to determine a position of the projectile.

17. The control system according to claim 14, wherein the game is played by a plurality of teams of human players, and each human player has a respective control system implementing the cryptographically-secured distributed ledger, comprising a respective sensor, a respective memory, and a respective at least one automated processor.

18. The control system according to claim 14, wherein the sensor, the memory and the at least one automated processor are contained within the projectile.

19. The control system according to claim 14, wherein the spatial game is played by a plurality of teams of human players, the at least one automated processor is configured to automatically determine a possession of a game play object by a respective human player based on interaction of the respective human player with an electronic device within the game play object, and the projectile is selected from the group consisting of a ball and a disk having the electronic device within it.

20. A controller for a projectile having an aerodynamic surface configured to rotate about an axis of rotation during flight, comprising:
- a rotation sensor input configured to provide real-time information on a phase of rotation of the aerodynamic surface about the axis;
- a spatial sensor input configured to receive information to determine a spatial characteristic of the projectile;
- a memory configured to store rules of a game involving the projectile;
- a radio frequency transceiver configured to communicate with a distributed ledger;
- an aerodynamic feature, configured to selectively modulate an aerodynamic interaction with a fluid medium surrounding the projectile which varies according to a control signal; and
- a control system, configured to:
  - generate a control signal defining a rotational phase lead or phase lag with respect to the rotation sensor input; and
  - receive the spatial sensor input, apply the rules, and communicate game information to the distributed ledger.

* * * * *